United States Patent [19]
Shobatake et al.

[11] Patent Number: 5,274,641
[45] Date of Patent: Dec. 28, 1993

[54] ATM COMMUNICATION SYSTEM

[75] Inventors: Yasuro Shobatake; Emiko Shobatake, both of Kawasaki; Takashi Kamitake, Tokyo; Kazuhiko Hanawa; Kazuaki Iwamura, both of Yokohama; Yoshinari Kumaki, Urayasu, all of Japan

[73] Assignee: Kabushiki Kaisha Toshiba, Kawasaki, Japan

[21] Appl. No.: 747,850

[22] Filed: Aug. 20, 1991

[30] Foreign Application Priority Data

Aug. 20, 1990 [JP] Japan ................... 2-217084
Aug. 20, 1990 [JP] Japan ................... 2-217216

[51] Int. Cl.⁵ .............................................. H04J 3/24
[52] U.S. Cl. ..................... 370/94.1; 370/60; 370/79; 370/15; 370/16; 370/85.12; 370/85.14; 340/825.16
[58] Field of Search ............ 370/60, 94.1, 79, 15, 370/16, 85.12, 85.14; 340/825.16

[56] References Cited

U.S. PATENT DOCUMENTS

| | | | |
|---|---|---|---|
| 4,638,476 | 1/1987 | Acampora et al. | 370/94.1 X |
| 4,677,615 | 6/1987 | Orimo et al. | 370/16 X |
| 4,769,813 | 9/1988 | Lenart | 370/60 X |
| 4,782,478 | 11/1988 | Day, Jr. et al. | 370/60 |
| 4,870,639 | 9/1989 | Hayashi et al. | 370/60 |
| 4,890,280 | 12/1989 | Hirata | 370/94.1 X |
| 4,912,702 | 3/1990 | Verbiest | 370/79 X |
| 4,995,032 | 2/1991 | Demichelis et al. | 370/60 |
| 5,042,032 | 8/1991 | Dighe et al. | 370/94.1 |
| 5,050,162 | 9/1991 | Golestani | 370/60 |
| 5,050,163 | 9/1991 | Van Bavel et al. | 370/94.1 X |
| 5,084,867 | 1/1992 | Tachibana et al. | 370/54 X |

FOREIGN PATENT DOCUMENTS

| | | |
|---|---|---|
| 2-4071 | 1/1990 | Japan . |
| 2-16628 | 4/1990 | Japan . |
| 2-23109 | 5/1990 | Japan . |
| 2-140037 | 5/1990 | Japan . |

Primary Examiner—Douglas W. Olms
Assistant Examiner—Russell W. Blum
Attorney, Agent, or Firm—Oblon, Spivak, McClelland, Maier & Neustadt

[57] ABSTRACT

A ATM communication system can satisfy various requests from a node system, a link system, and the like, by performing a self-format transform between a format to be transmitted and a format receiving an ATM switch, and using a cell processing function for performing polishing/shaping, counting of passed cells, counting of discarded cells, drop/insertion of OAM cell, and the like.

15 Claims, 78 Drawing Sheets

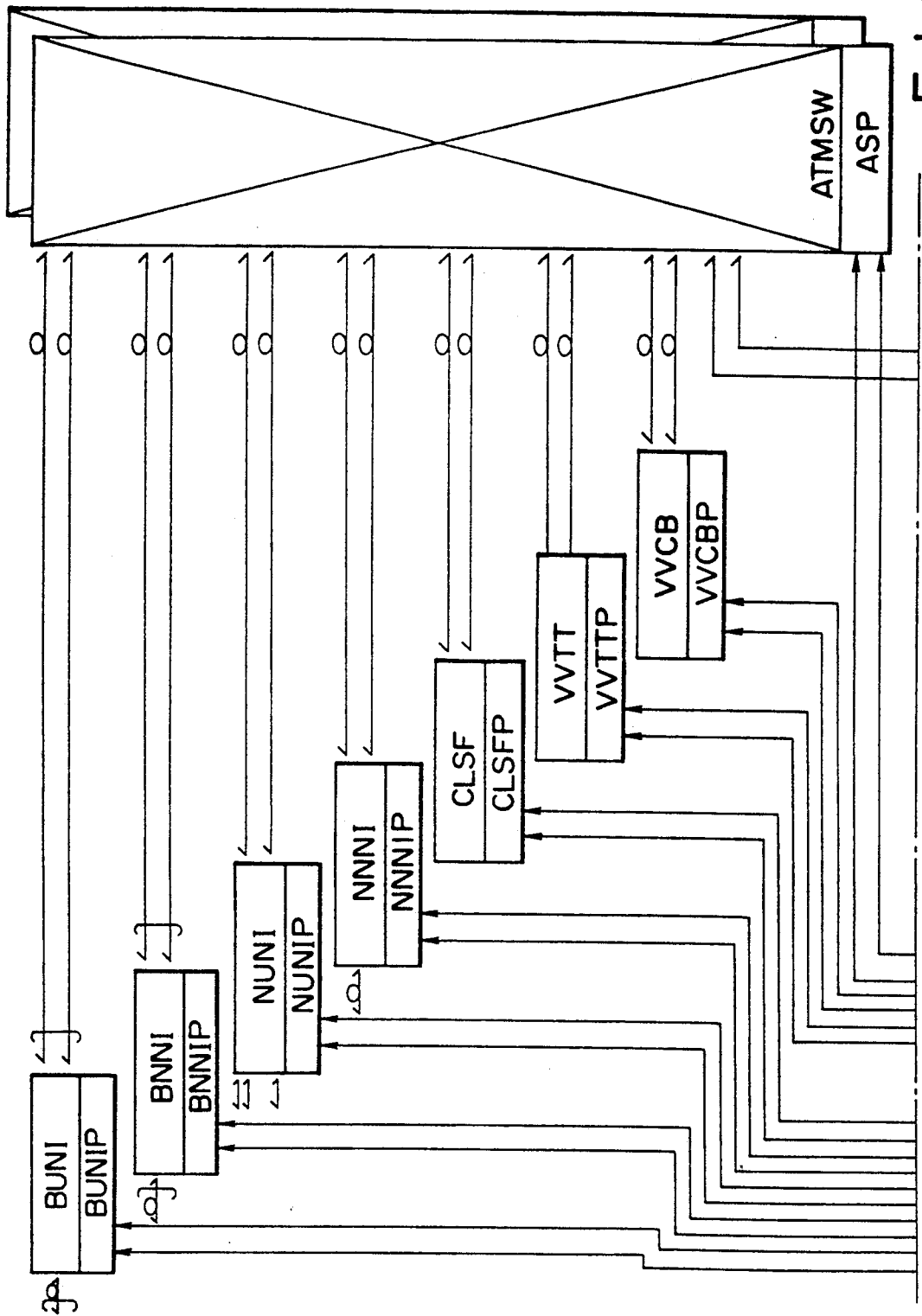

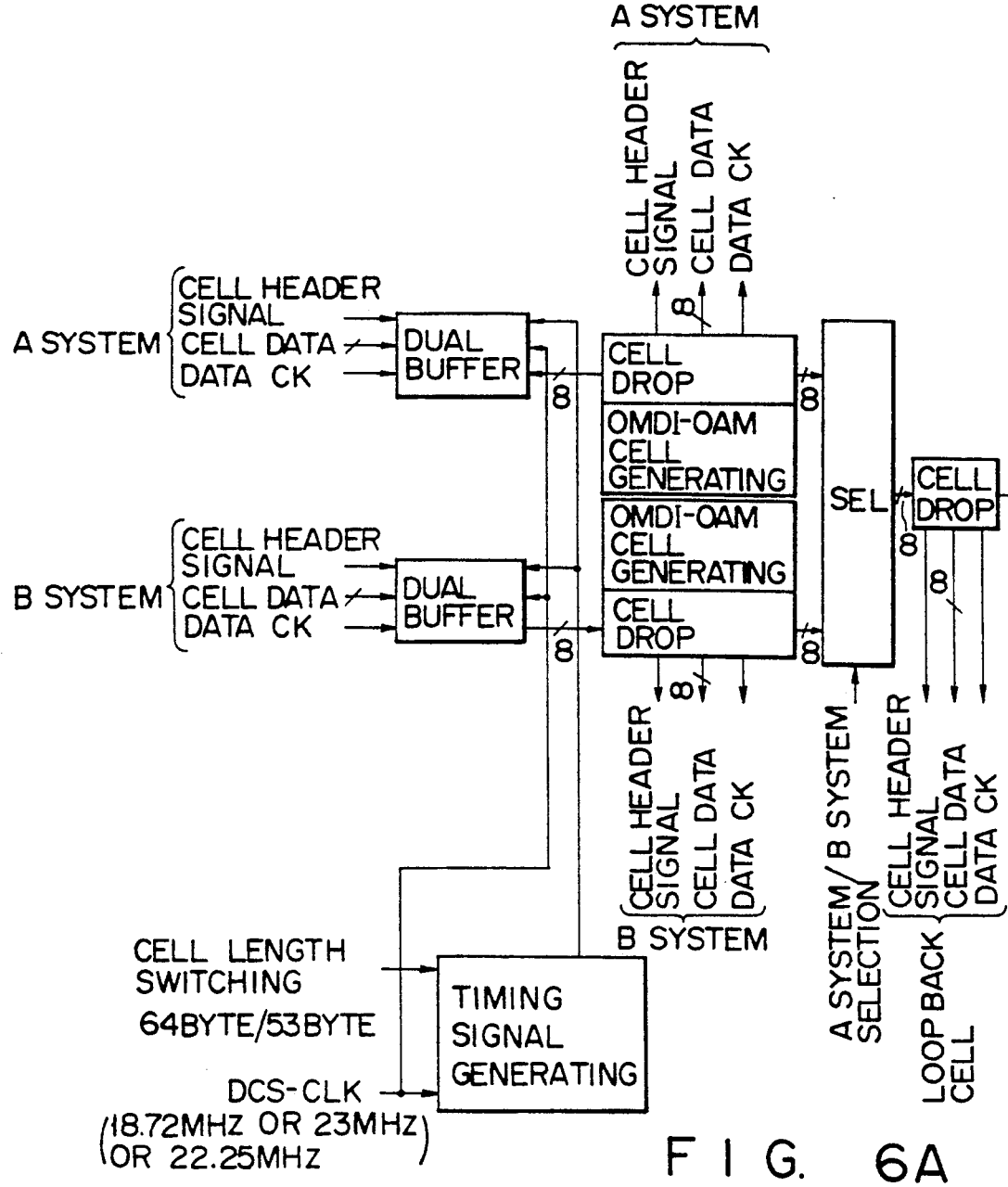

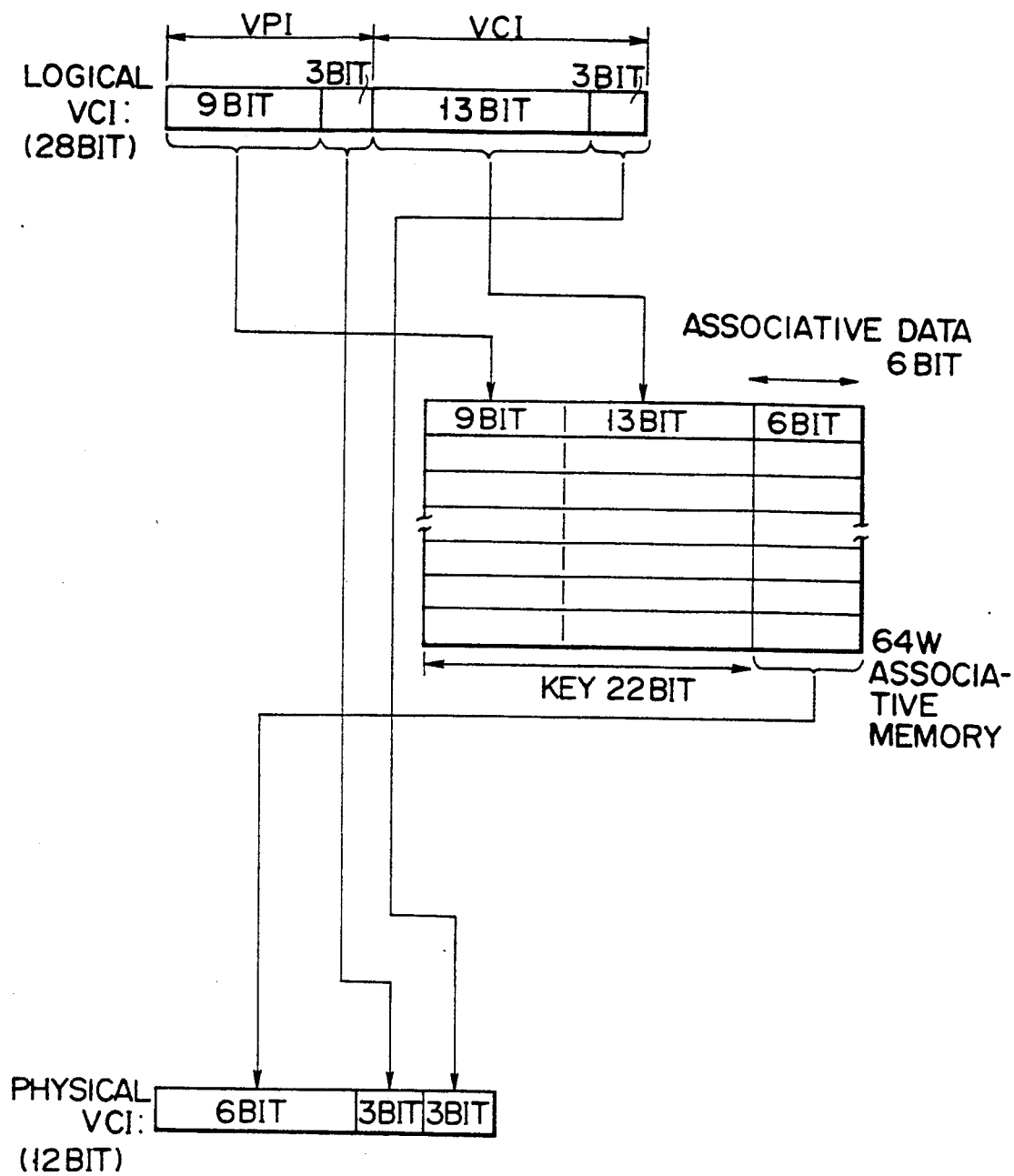
F I G. 8

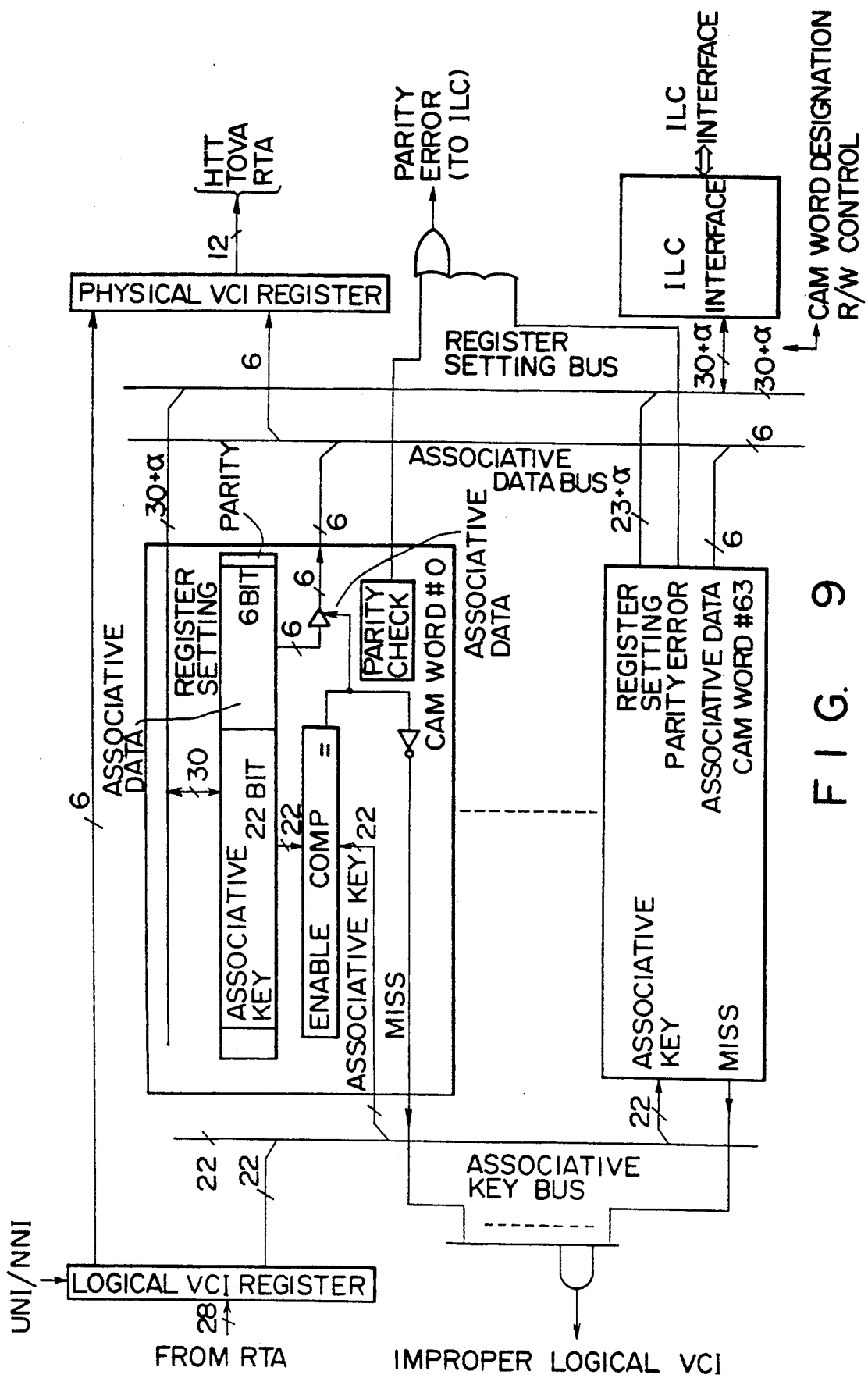
F I G. 9

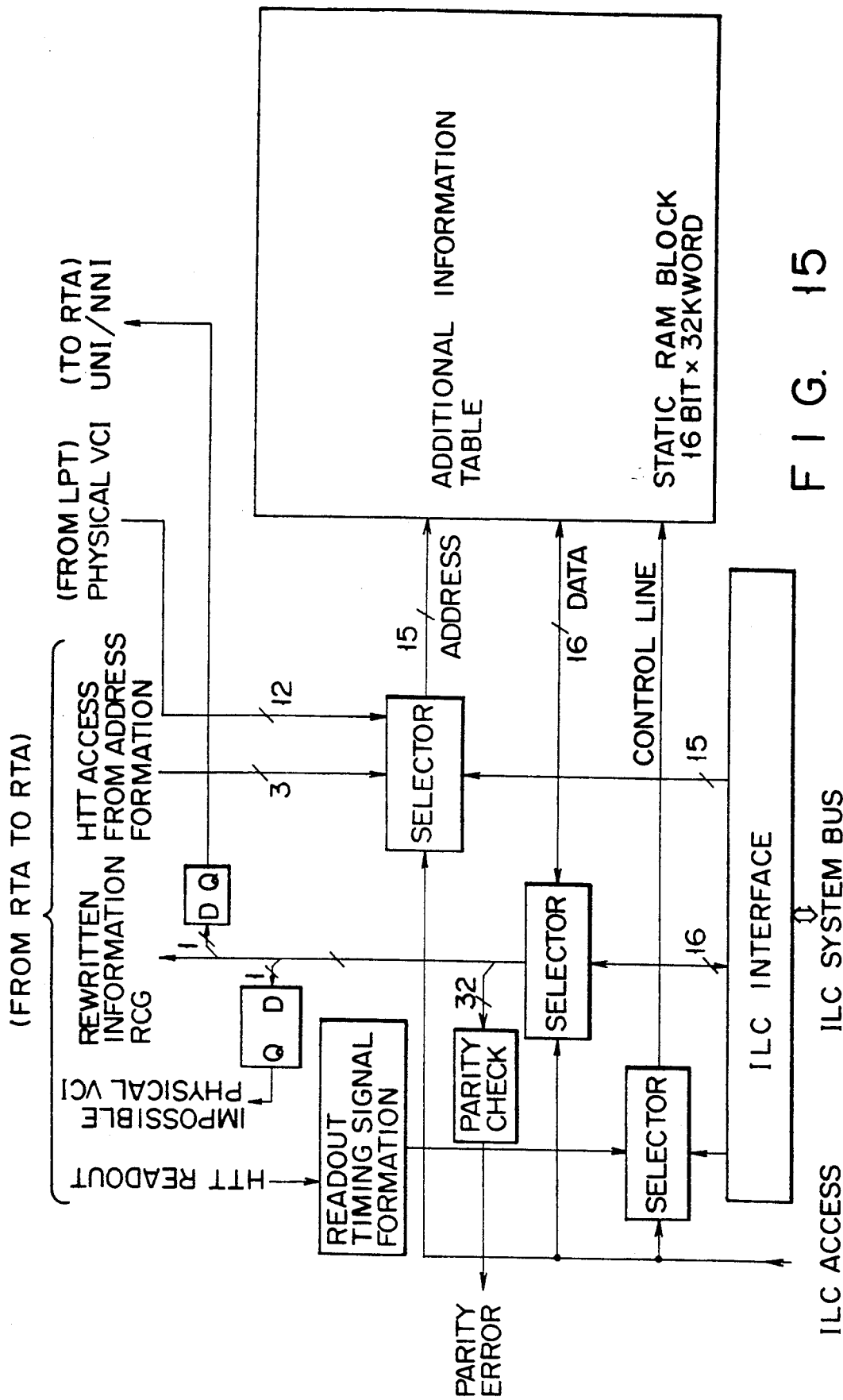
F I G. 15

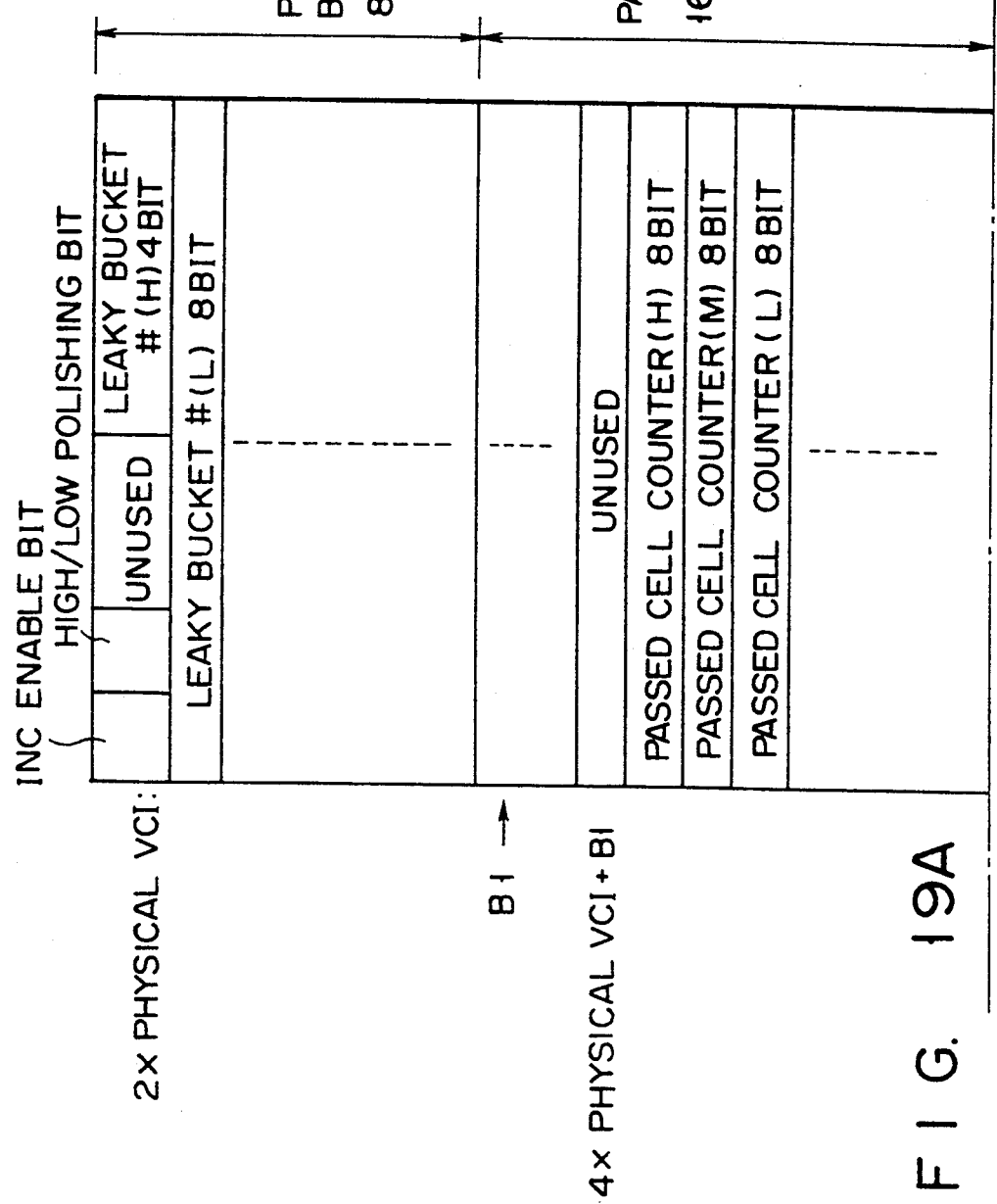

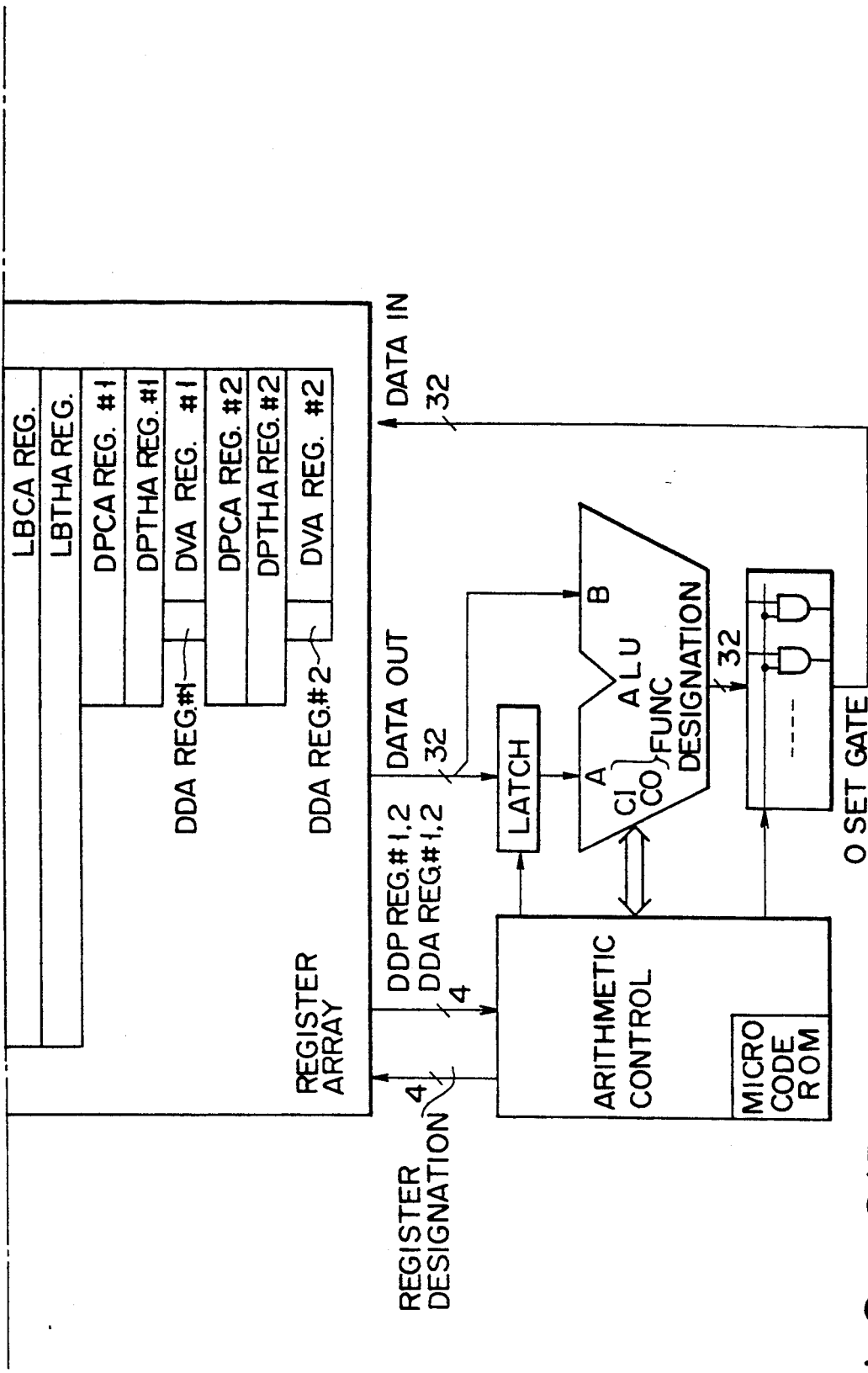
F I G. 21B

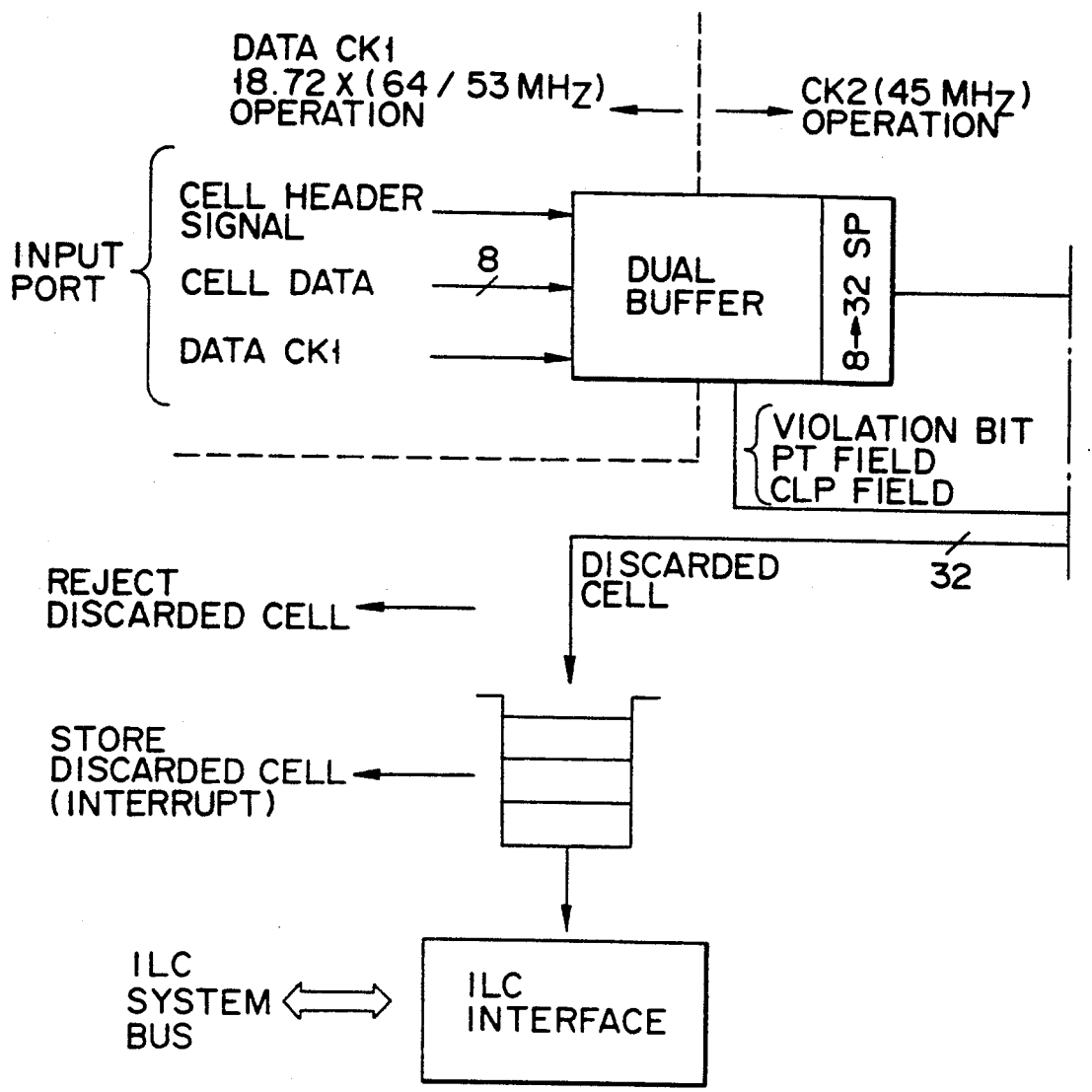
F I G. 24A

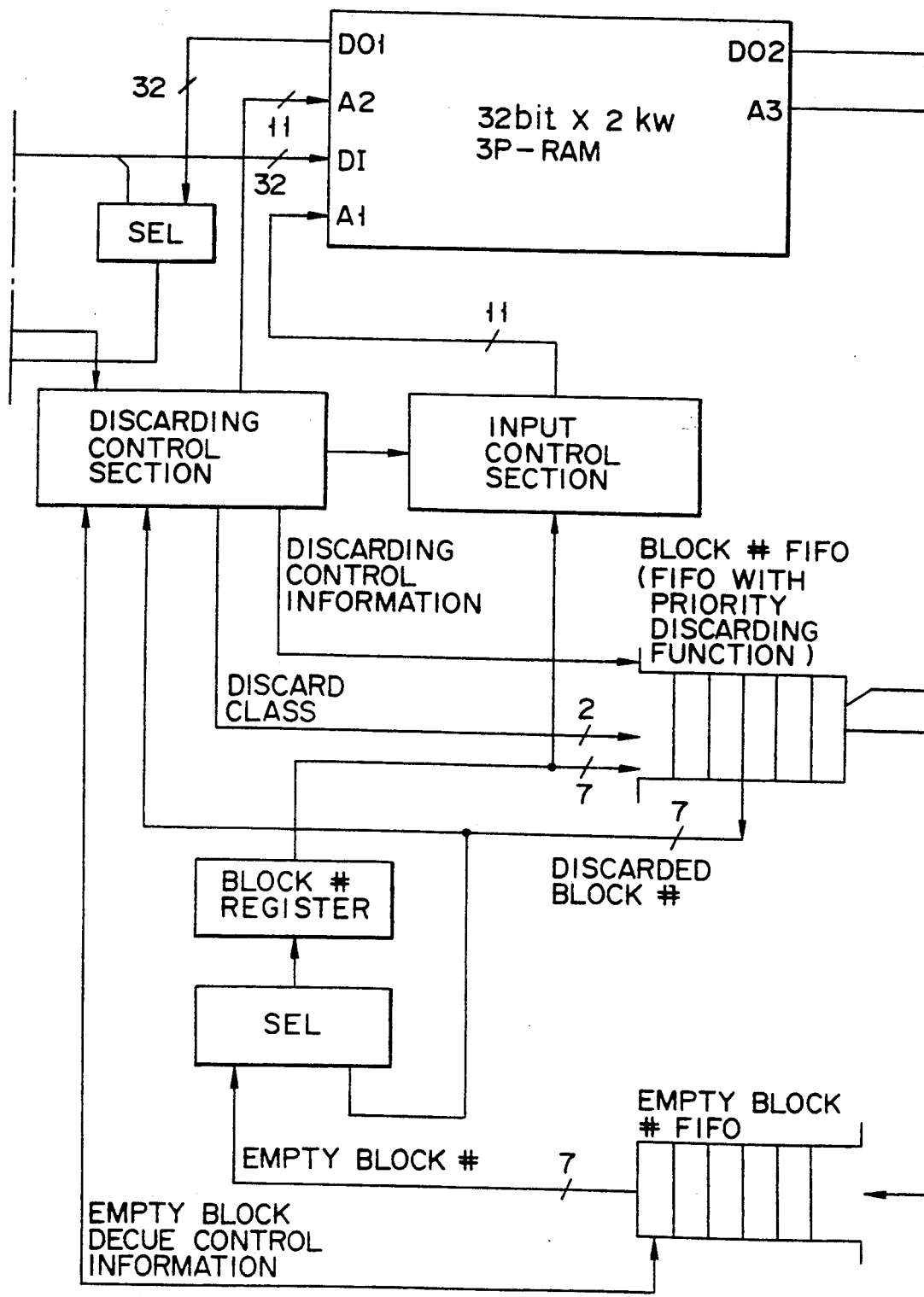
F I G. 24B

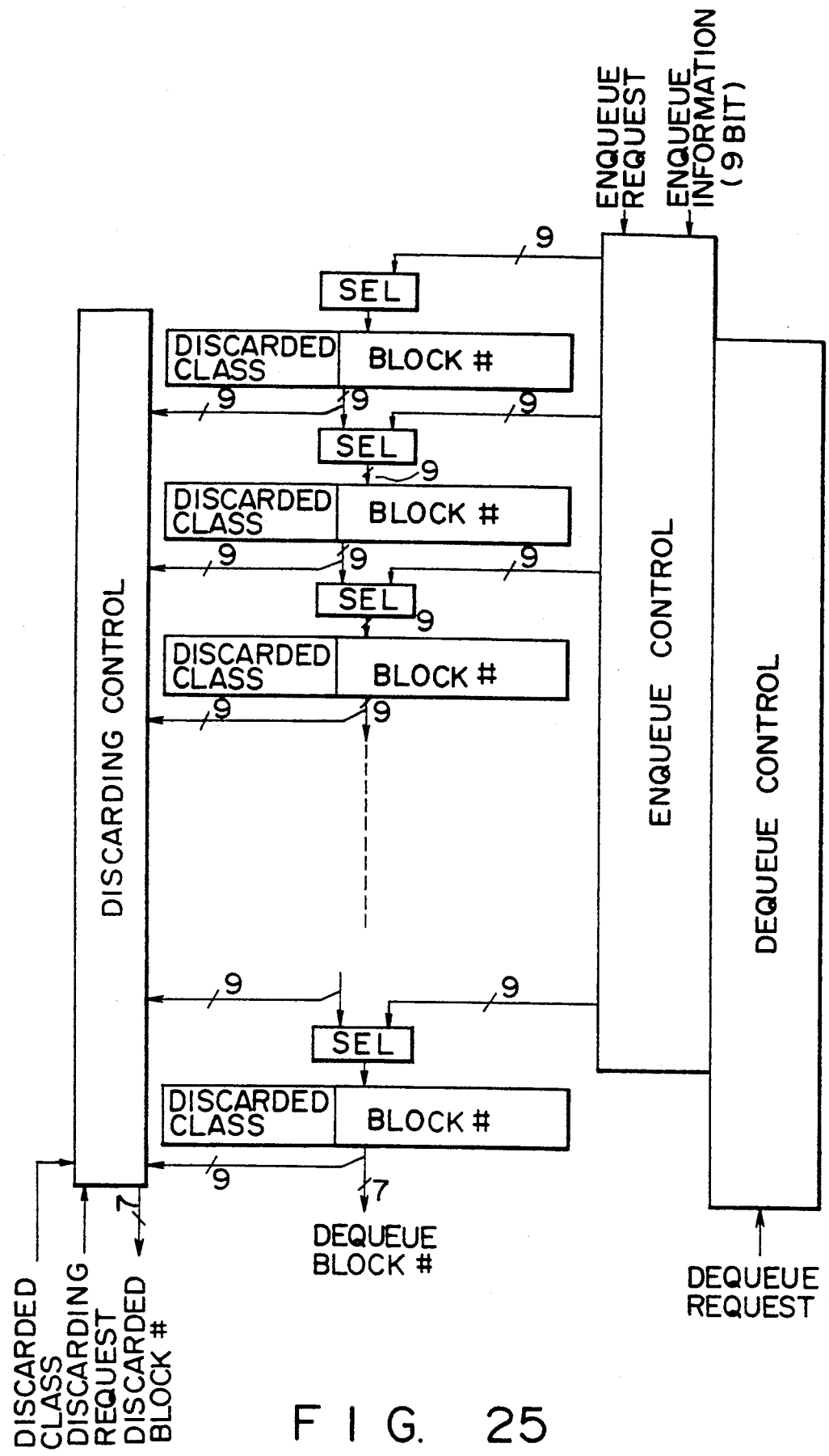
F I G. 25

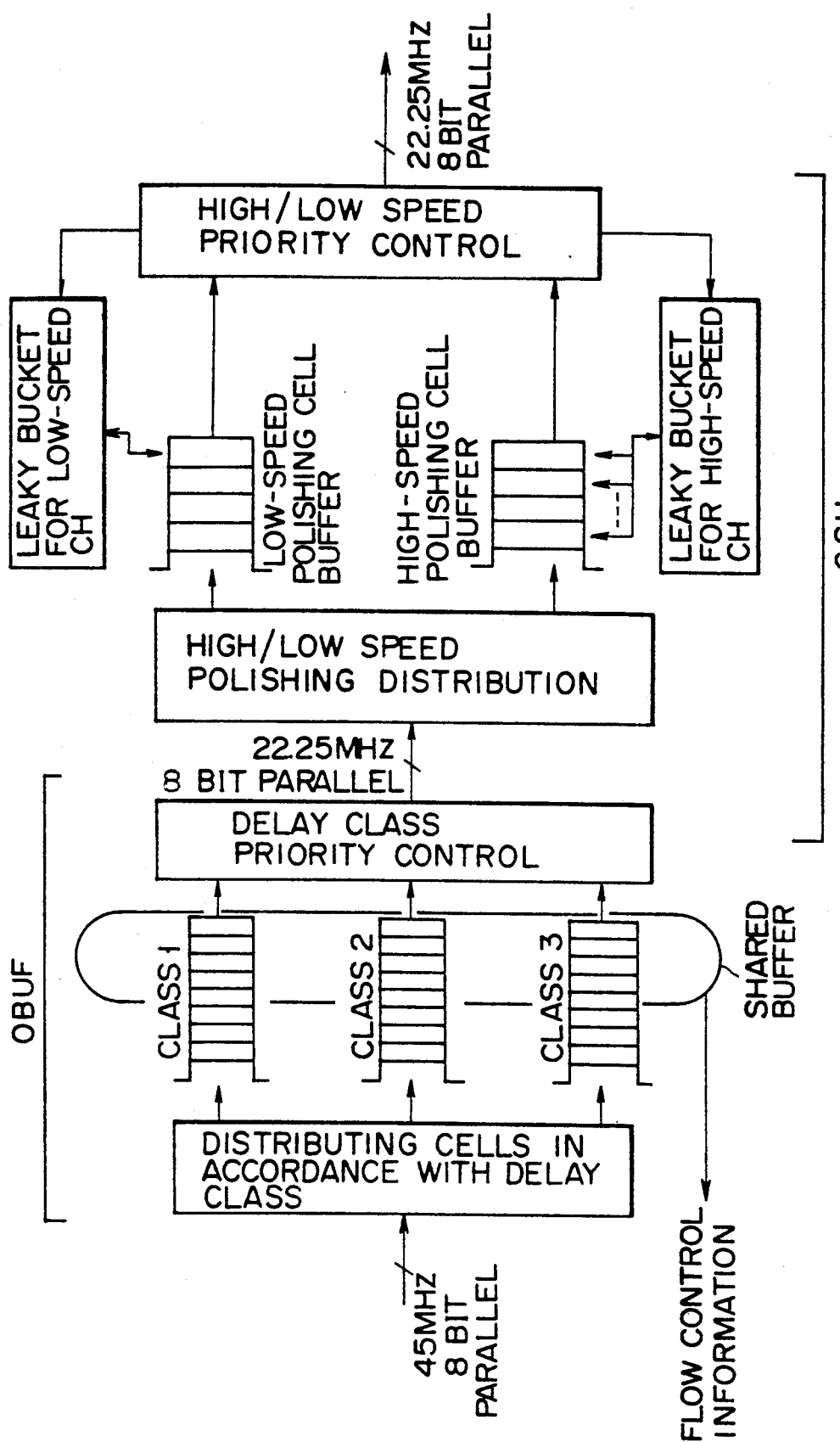
F I G. 26

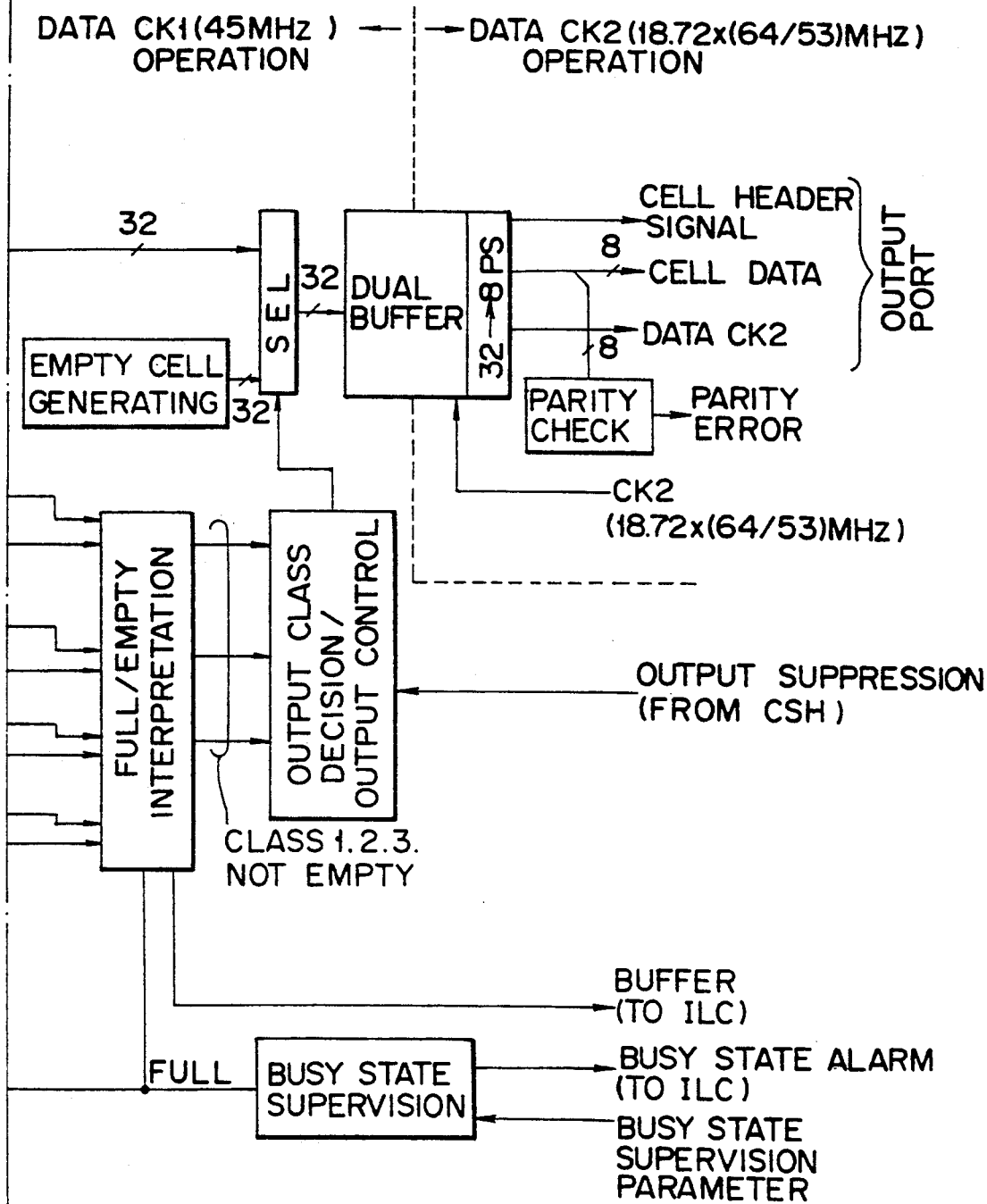
F I G. 27B

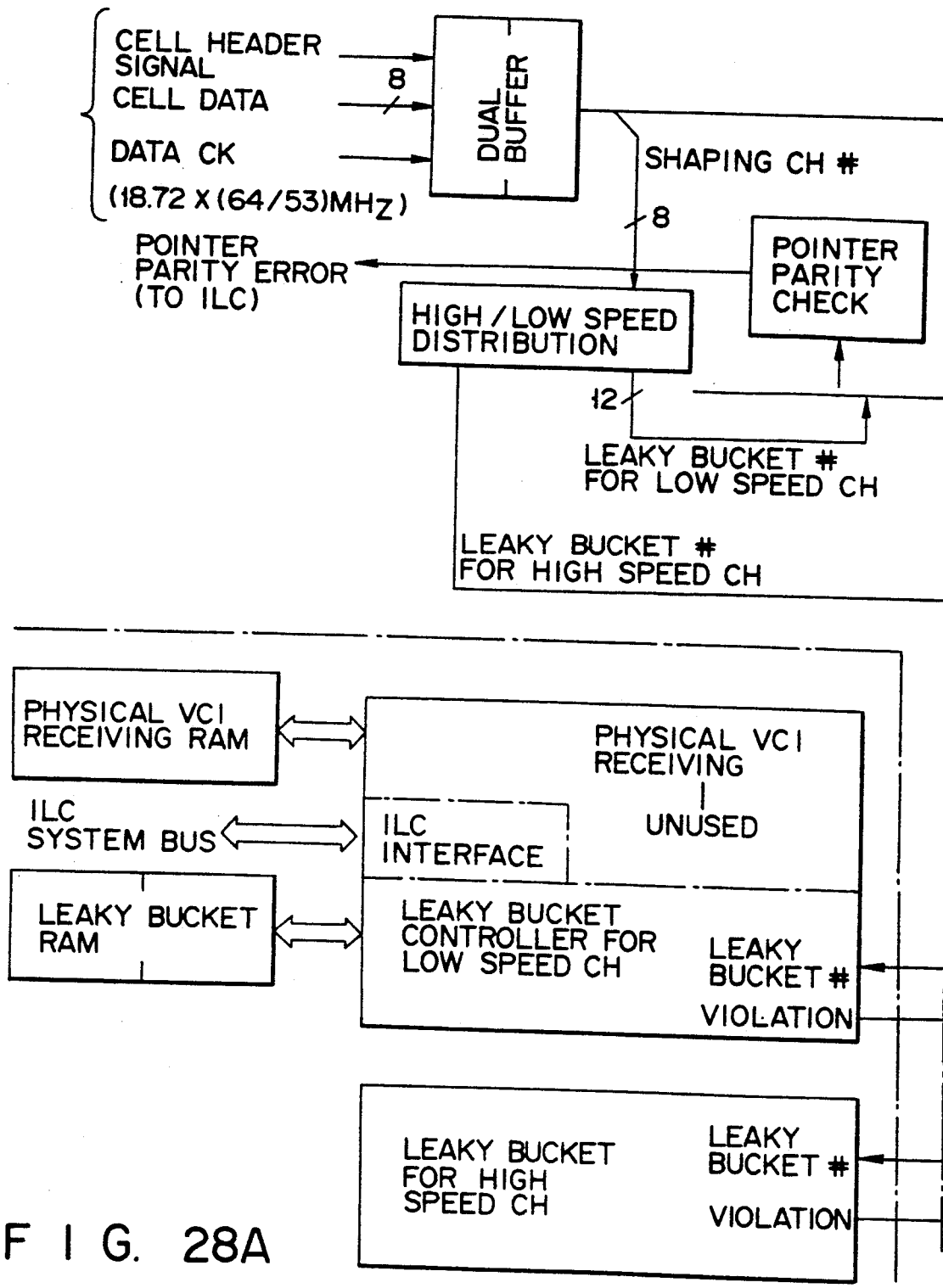
F I G. 28A

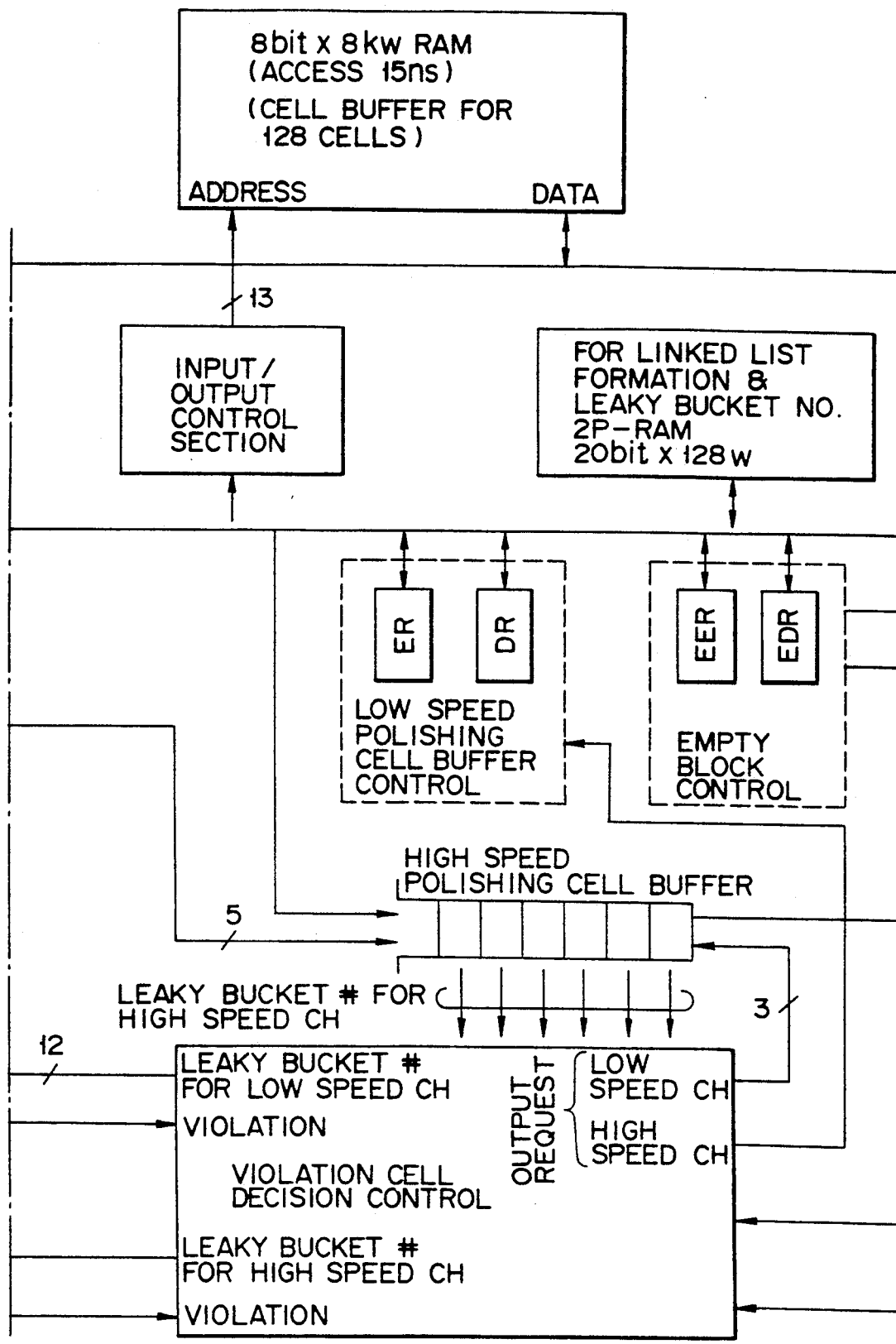
F I G. 28B

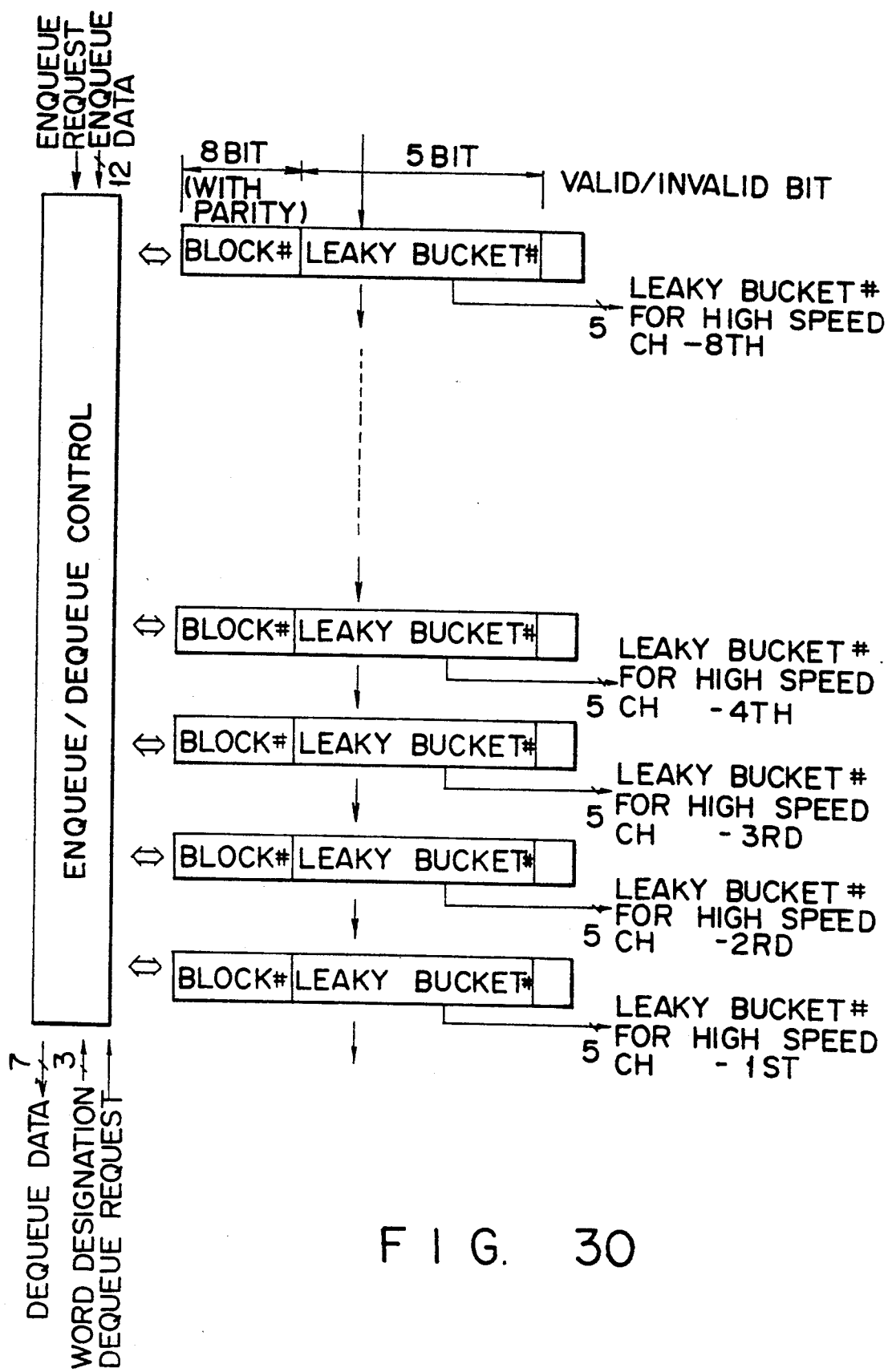
F I G. 30

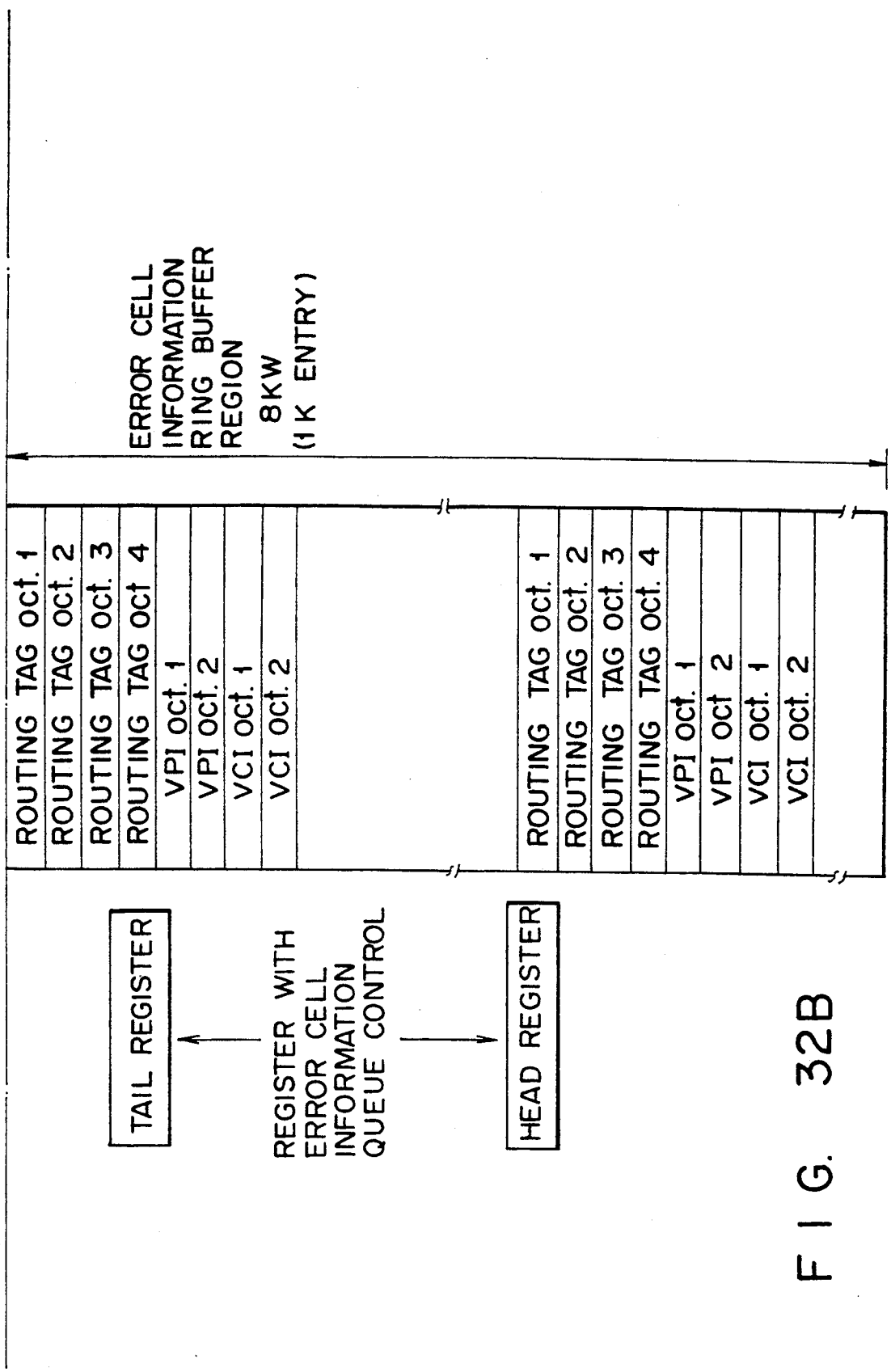
F I G. 32B

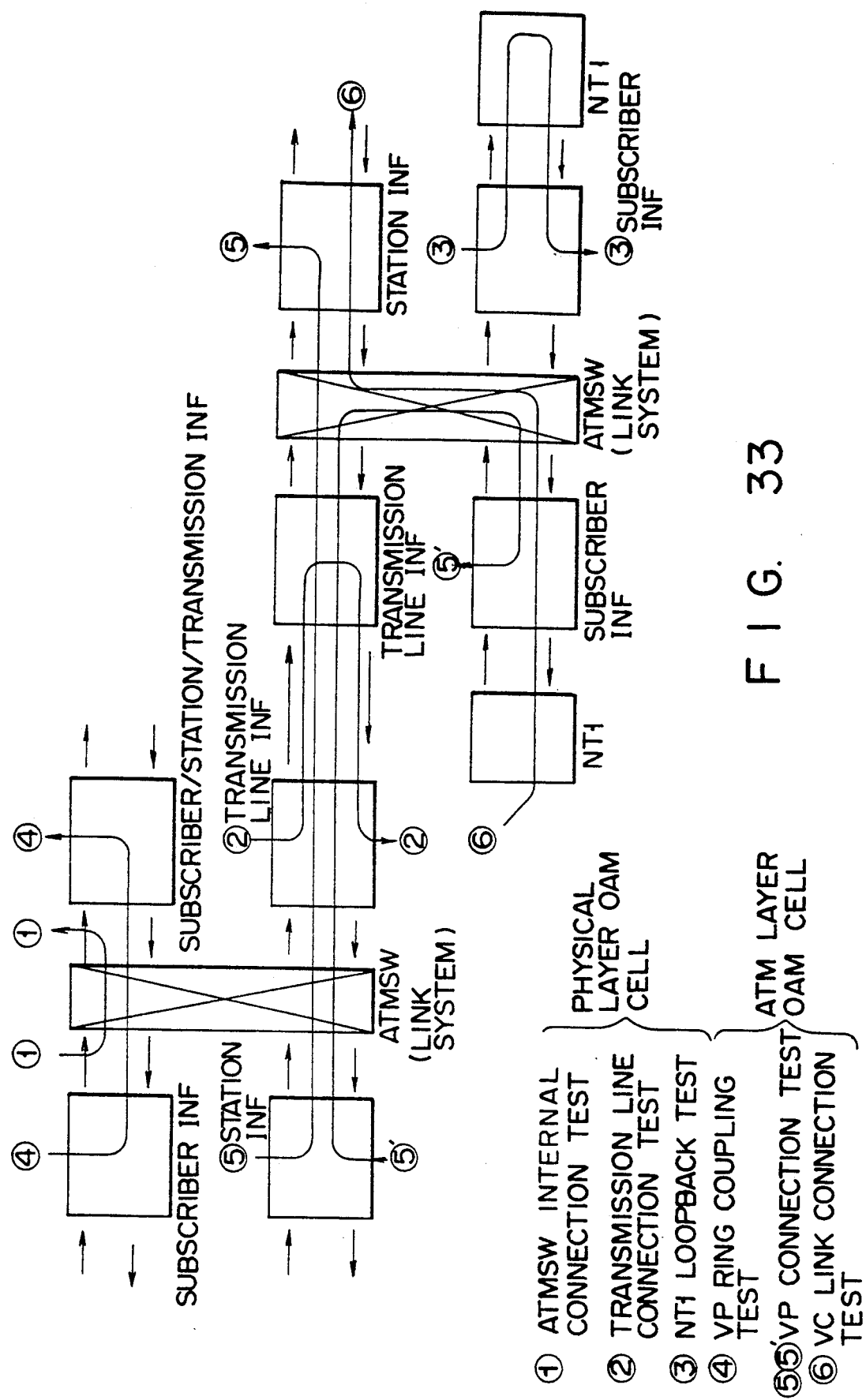

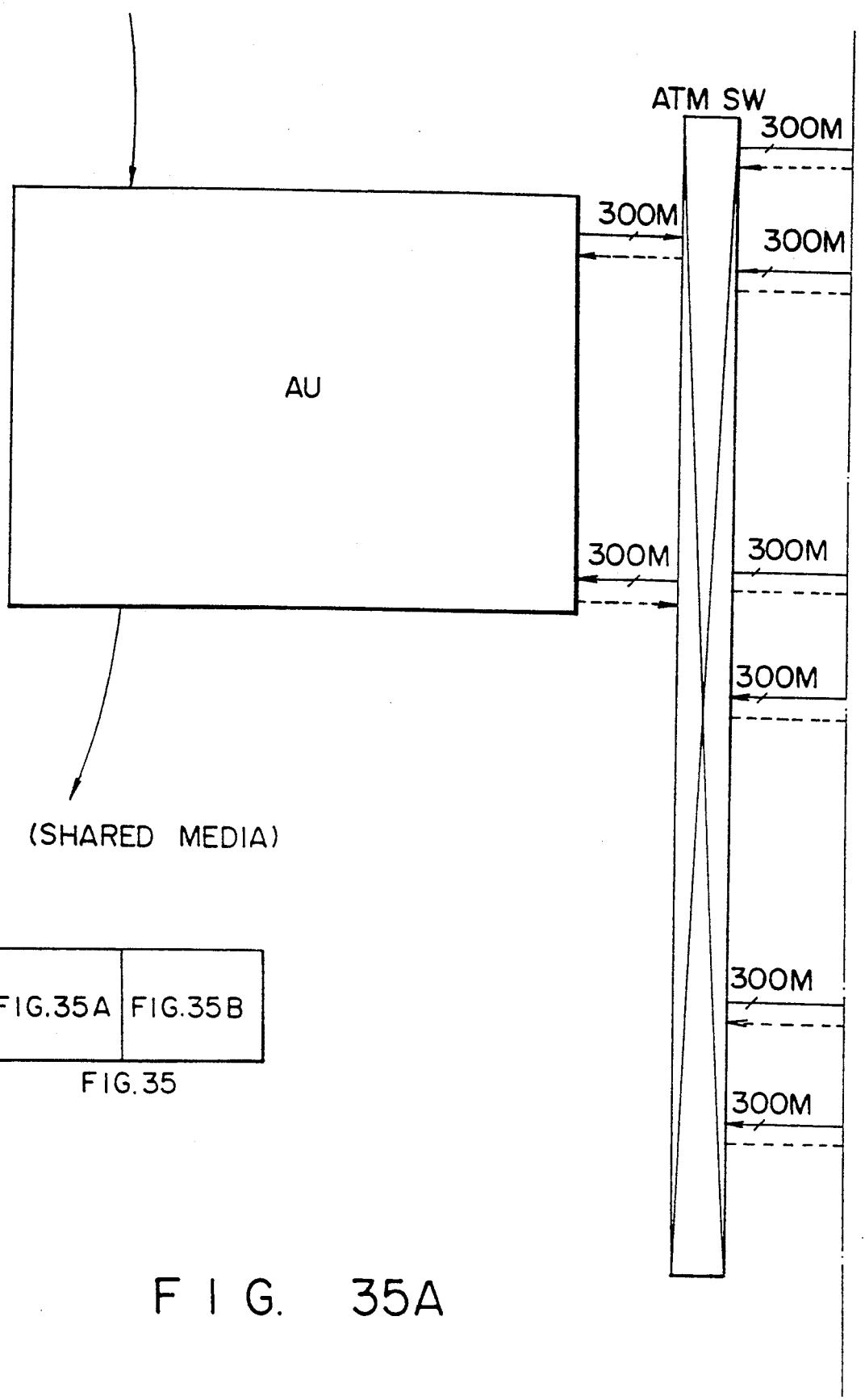
F I G. 35A

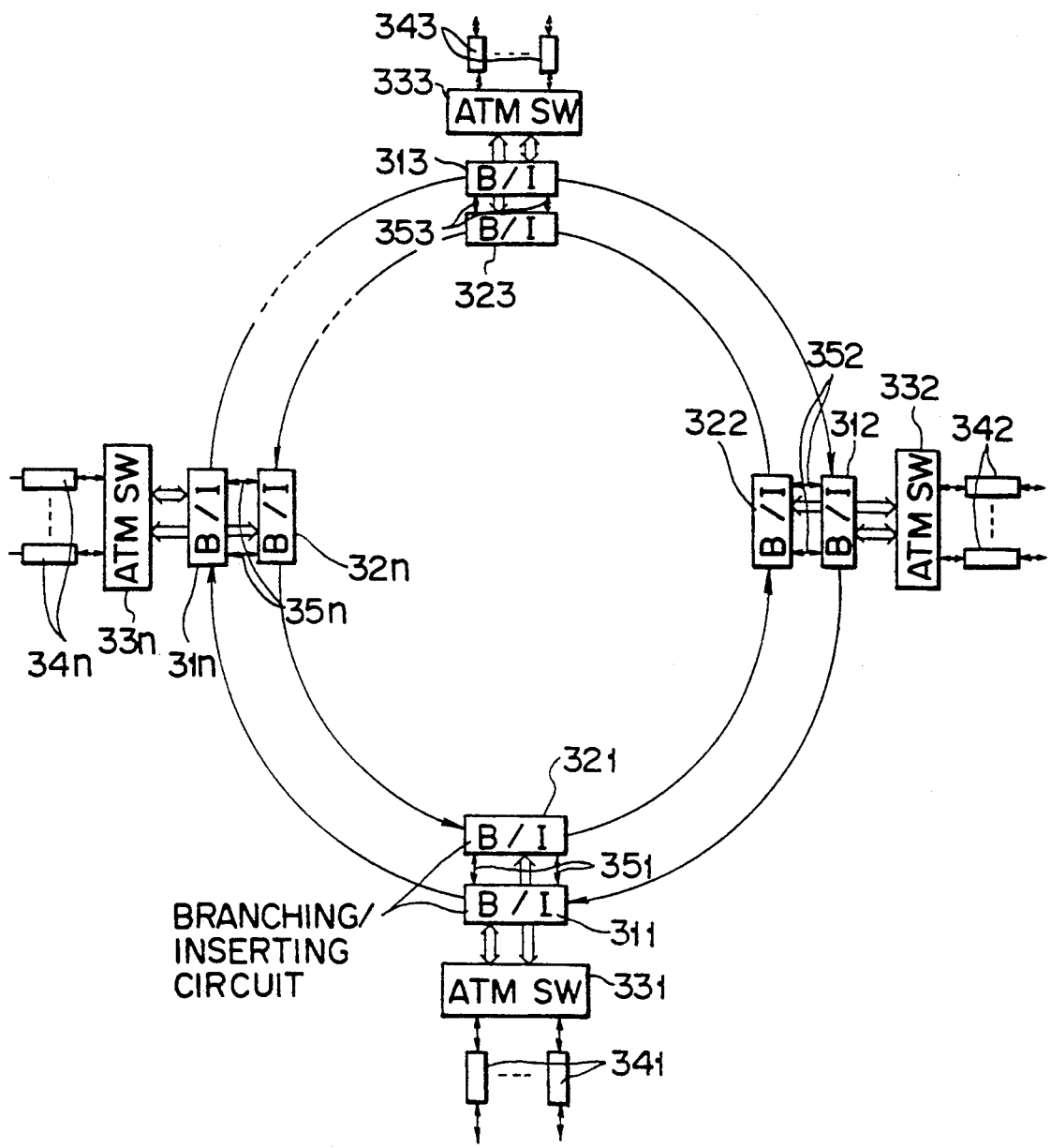
F I G. 36

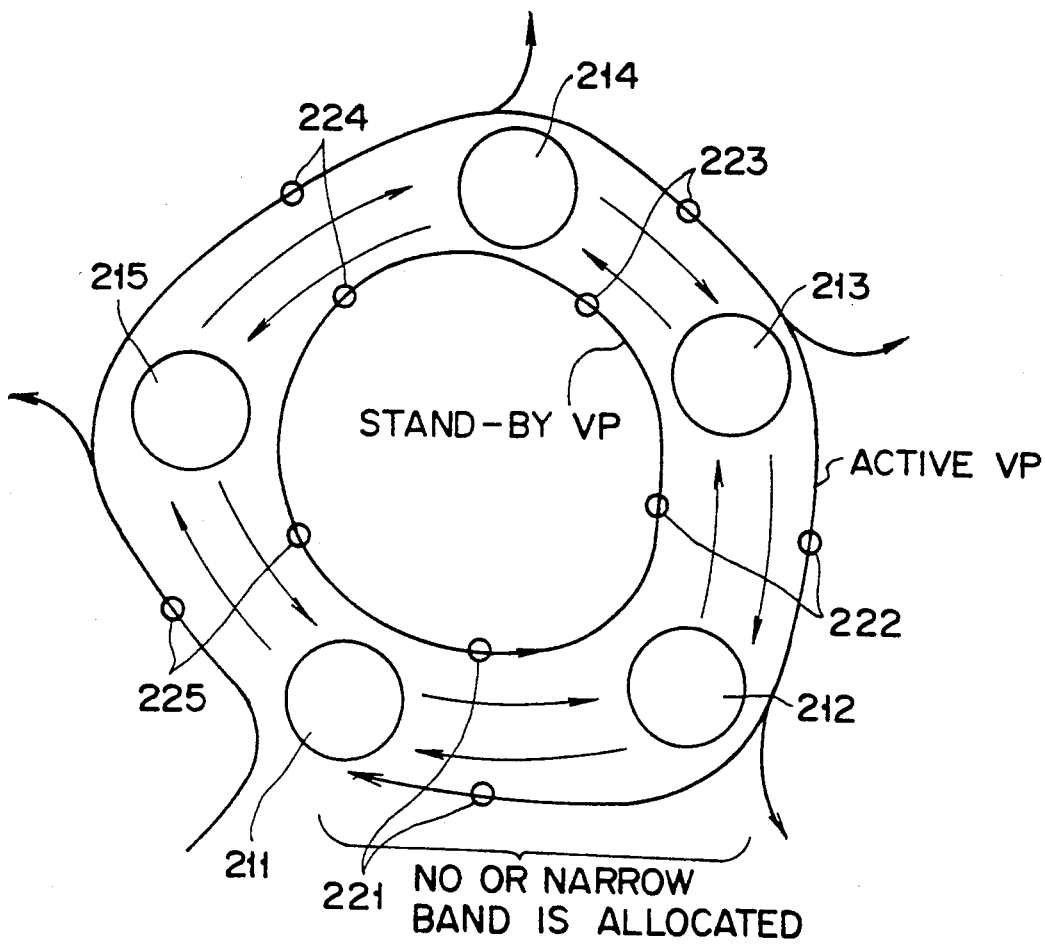
F I G. 38

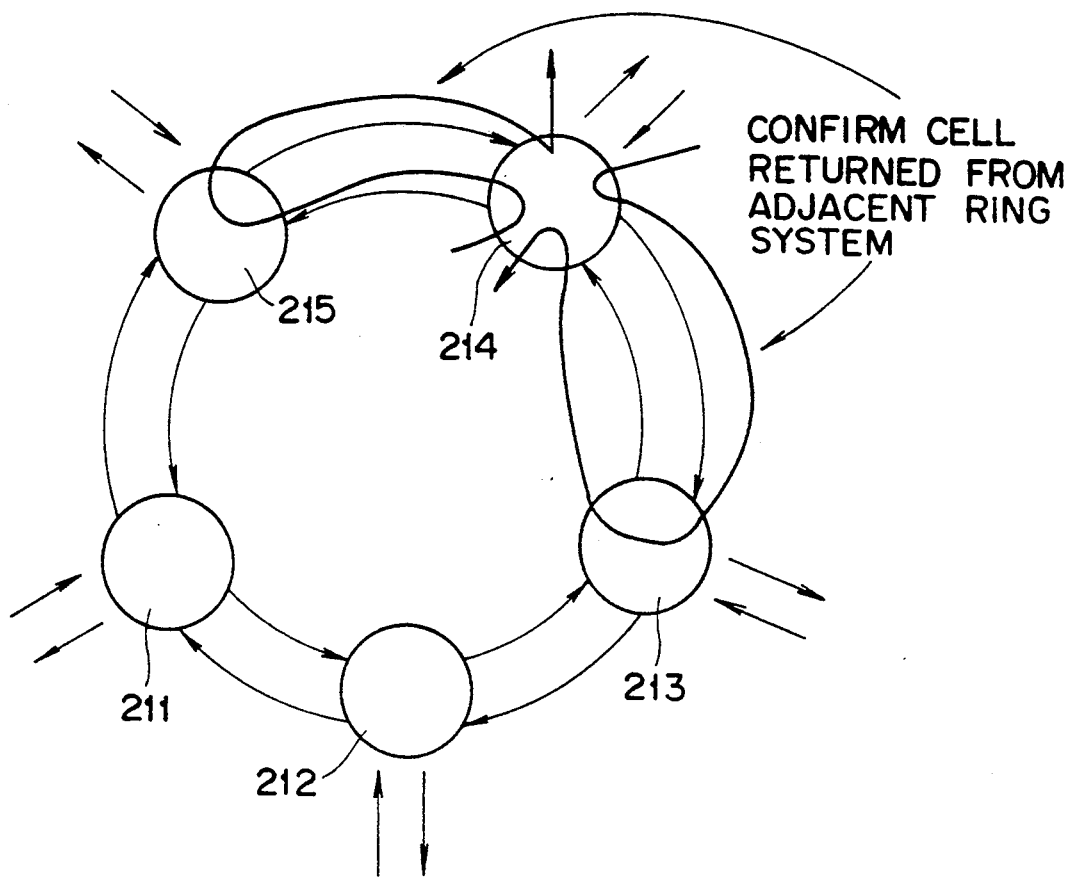
F I G. 40

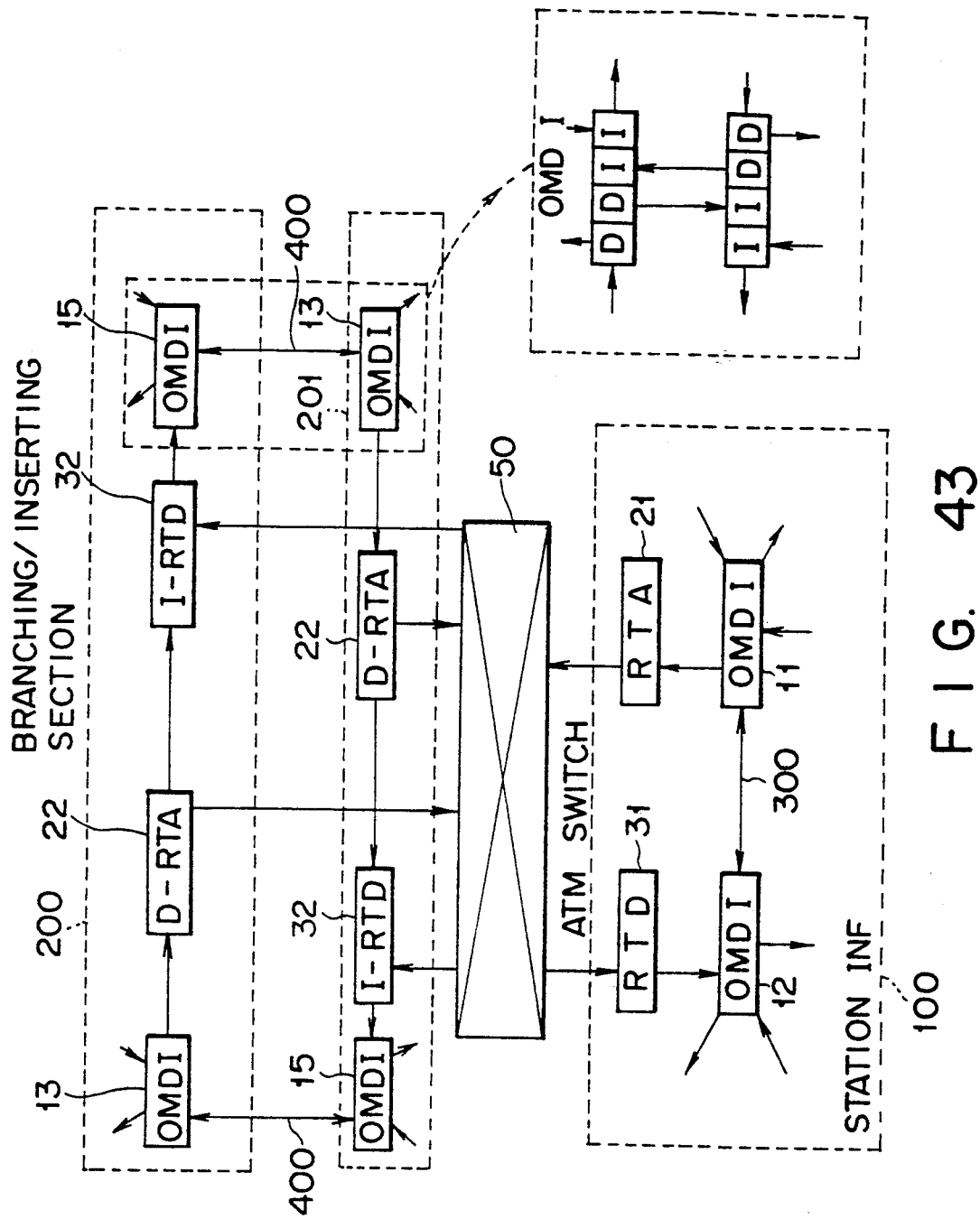
F I G. 43

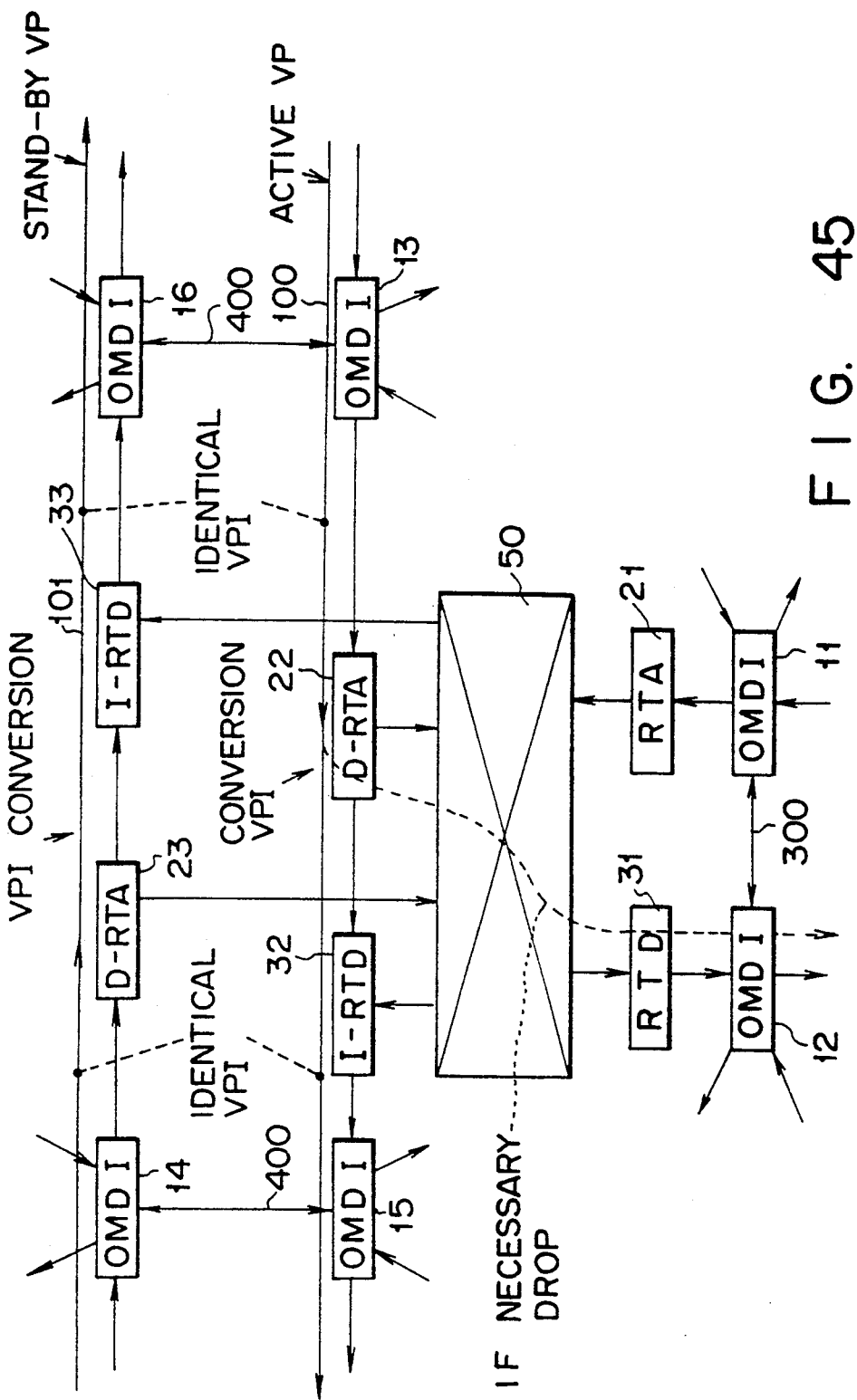

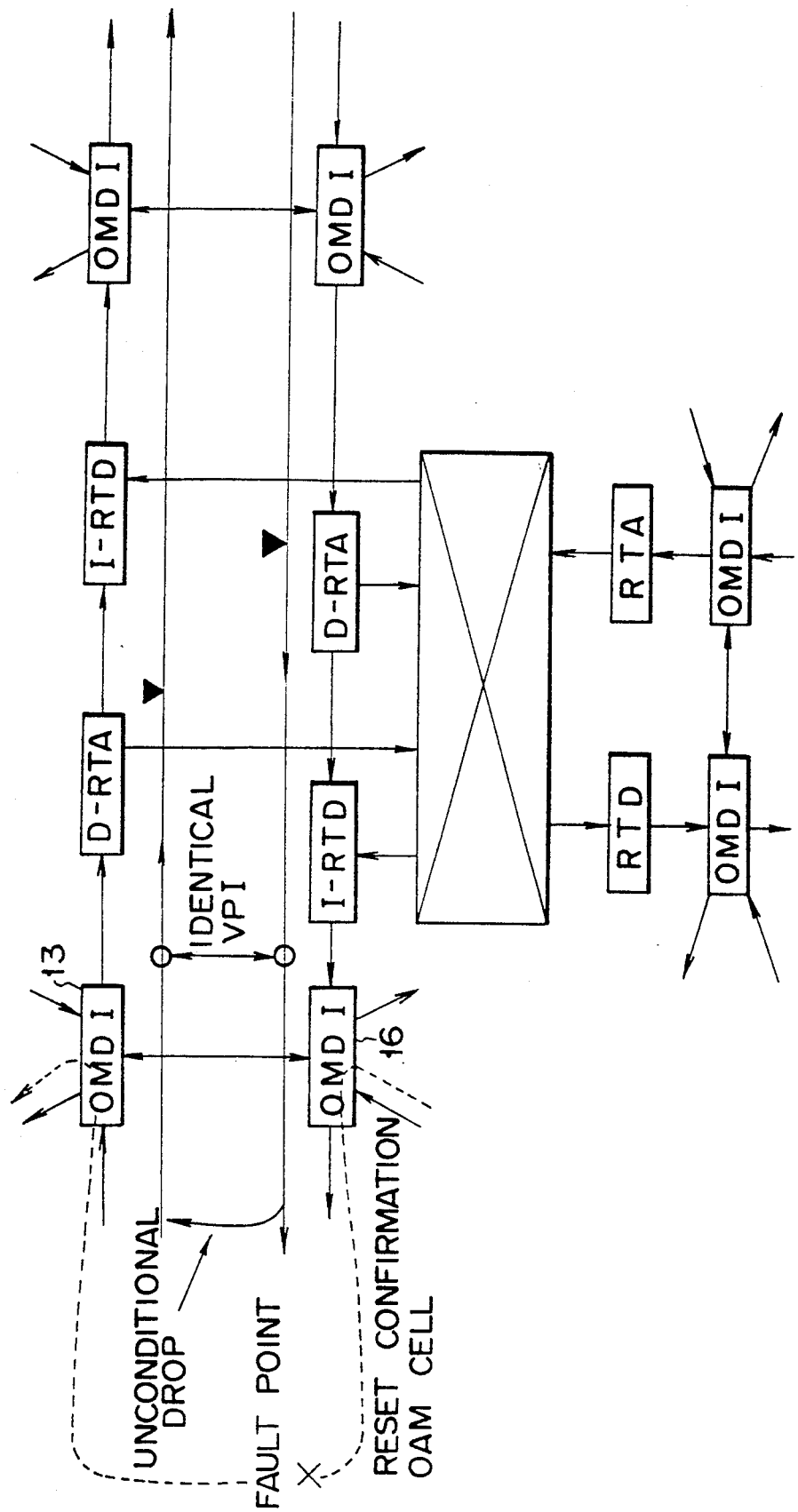
F I G. 46B

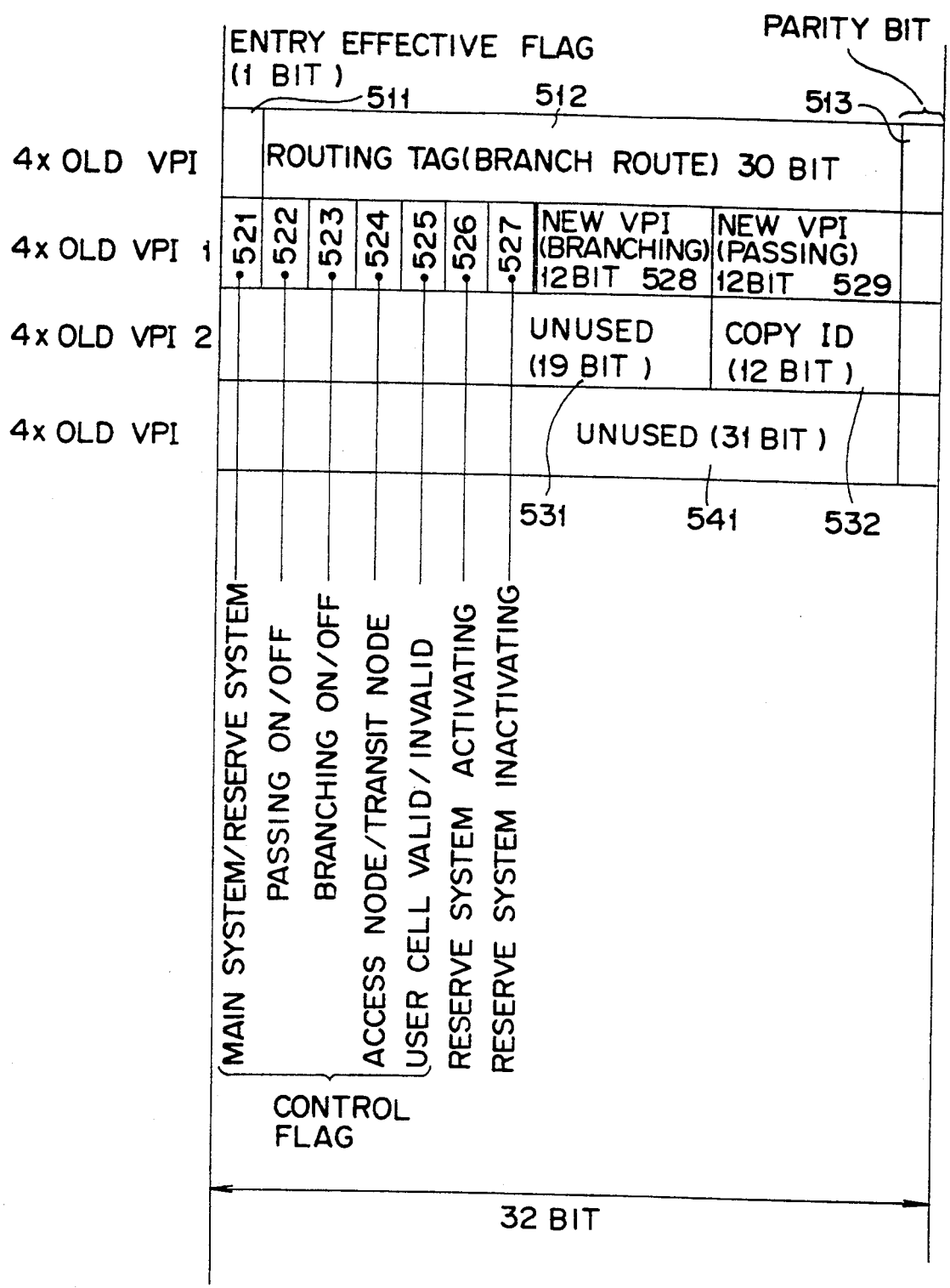
F I G. 49

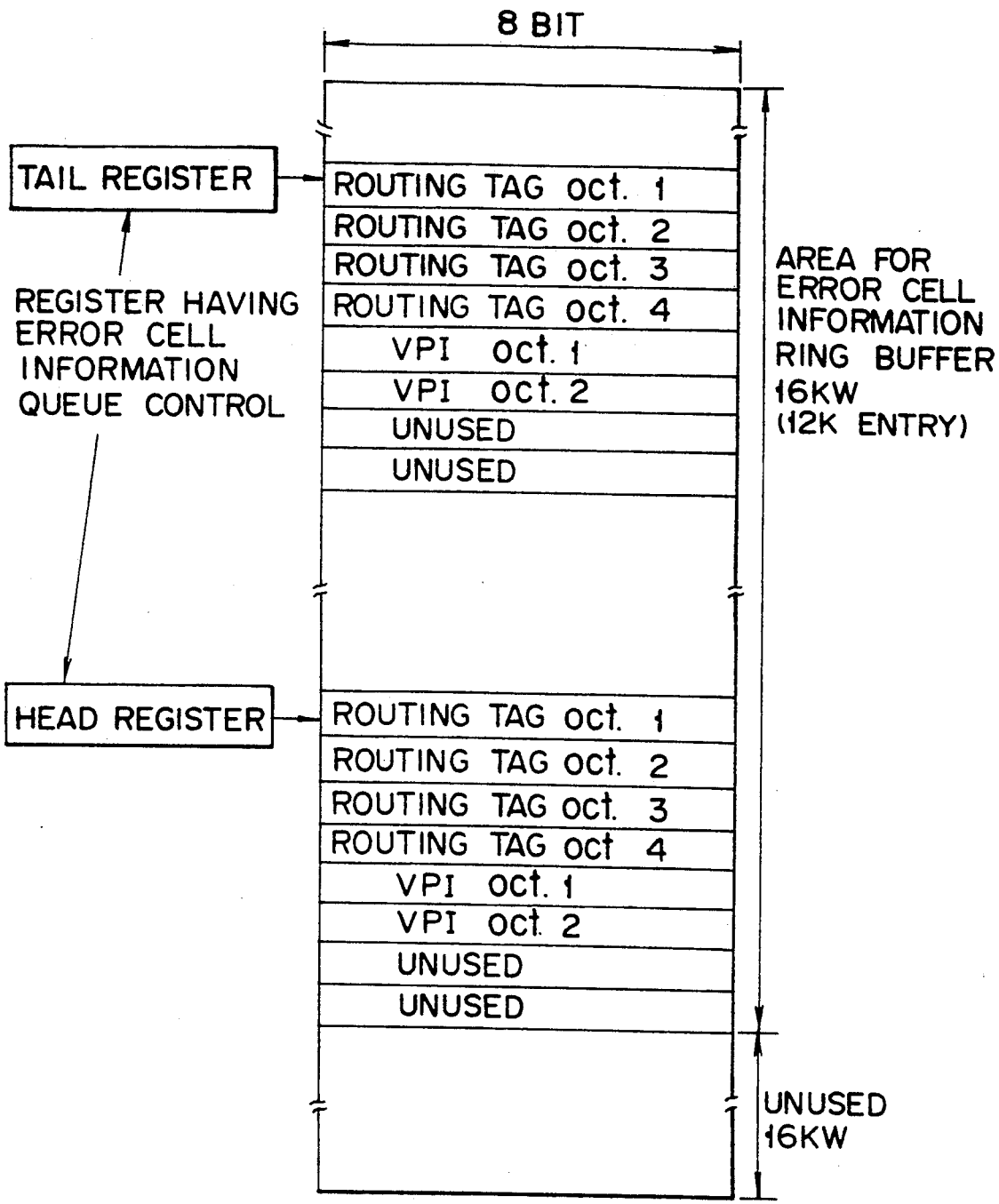
F I G. 51

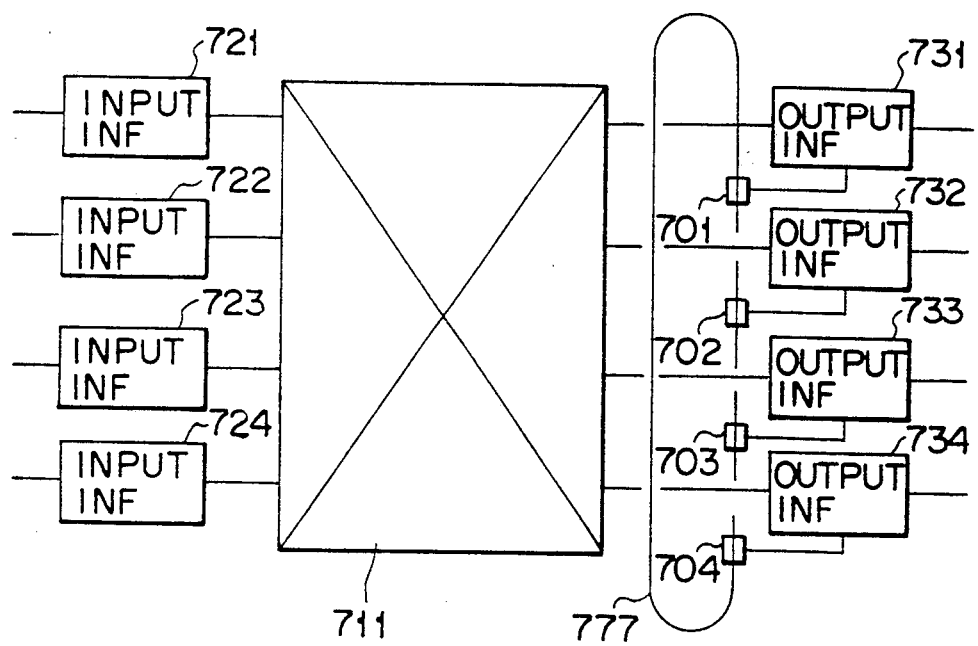
F I G. 52

ATM COMMUNICATION SYSTEM

BACKGROUND OF THE INVENTION

1. Field of the Invention

The present invention relates to an ATM (Asynchronous Transfer Mode) communication system for communicating and switching user information and, more particularly, to an ATM communication system having a cell processing function of effectively performing various processing operations of a cell communicated through an ATM network.

2. Description of the Related Art

In recent years, techniques of ATM (Asynchronous Transfer Mode) communication systems for performing a switching communication of information in an ATM have been developed. The ATM communication system has a variable band feature, and can systematically handle all the communication media having various traffic and service characteristics. In addition, the ATM communication system has been receiving a lot of attention since it can realize high-grade communication services and can customize the communication services in an intelligent network.

In an ATM communication, information is input/output to/from a terminal via a virtual channel (VC), and switching information between nodes or links are performed in units of virtual passes (VPs) each bundling some VCs. Standard specifications of the VCs and VPs are predetermined by the CCITT (International Telegraph and Telephone Consultative Committee), and when an ATM communication system is realized, information communications must be controlled to meet these specifications. For example, a cell flow is observed so that a flow of cells carrying information falls within a bandwidth determined as a VP, and various processing control operations for cells such as control for discarding an overflow cell, must be performed. The standard format of a cell is defined to some extent by the CCITT. However, how to reliably seize asynchronously transmitted cells and how to perform this processing control pose problems.

In particular, problems of how to realize a processing function for a cell flow as hardware, and how to efficiently reduce the hardware scale to a practicable level are left unsolved.

In this manner, when an ATM communication system is realized, various problems associated with hardware remain unsolved, and a strong demand has arisen for solutions to these problems. In particular, serious problems remain unsolved about how to realize, as hardware, cell processing functions, e.g., a function of supplying a cell sent through a transmission line such as an optical fiber to an ATM switch, and a function of sending a cell switched by the ATM switch onto the transmission line.

In case of discussing how to realize the cell processing functions as hardware, the followings are important.

As well known, the ATM communication system is realized by the following architecture.

A node system for switching a VC (Virtual Channel) set between terminal stations, and a link system for switching a VP (Virtual Path) bundling a lot of VCs are defined.

A transmission network is constructed by connecting the link systems by means of the transmission line. The topology of the transmission network may be, for example, a star topology or a ring topology. The topology of the transmission network is determined by a trade-off between an traffic on the transmission network and a cost required for constructing a transmission network.

The node system is connected to the transmission network for multiplexing the VC from the terminal station to the VP set on the transmission network or for separating the VCs within the VP and transiting those to another VP.

Generally, the VP used in the link system is semi-fixedly set in accordance with instruction from an operation center. In contrast, the VC used in the node system is dynamically set-up and released by call setup/release request from the terminal station.

In the node system, there are a node system for a public network being an arrangement for carriers and a node system for a private network used when a subscriber constructs another communication network, using a public network.

As described above, the ATM network is constructed by a link system, a node system for a public network, and a node system for a private network. It is required for realizing the ATM network with a low cost that an architecture for cell processing function is constructed so as to be able to flexibly accommodate an arrangement of different polishing/shaping functions for each of the above node systems, reliability request, etc.

SUMMARY OF THE INVENTION

It is an object of the present invention to provide an ATM communication system which can effectively realize cell processing functions of executing various processing control operations of cells flowing through an ATM communication network while avoiding various hardware problems such as a problem in that the number of hardware components becomes huge, it is very difficult to constitute the hardware, and a cost for constructing an ATM communication network increases if cell processing functions are prepared for a link system, a node system for a public network and a node system for a private network, and which can be easily put into practical applications, and can be easily realized.

The feature of the present invention is to be able to select a function wherein an ATM communication system performs, as a cell processing function in an ATM network, shaping of a cell flow output from a cell processing function unit in units of VCs so as to satisfy predetermined traffic characteristics, and the other function wherein the cell shaping is independently executed for the VC and a VP as a bundle of VCs.

In each cell processing function in the ATM network, delay control for a cell is executed by only an output buffer for an ATM switch, and discard control for the cell is executed by only an input buffer for the ATM switch. In addition, transformation processing for transforming a logical identifier into a physical identifier can be easily and efficiently performed using an associative memory.

Furthermore, as still another feature of the present invention, each cell processing function in the ATM network has a function of inserting a management cell having a preset level in the ATM network, and a function for discriminating the level of the management cell communicated through the ATM network, and dropping or looping back the management cell in accordance with the level of the corresponding cell processing function in the ATM network. When the management cell having the preset level is properly used, various functions in the ATM network can be tested.

As still another characteristic feature of the present invention, each cell processing function in the ATM network has a function of generating an alarm cell according to a malfunction position. For example, when a malfunction occurs in a former-stage section of the cell processing function, a tagging function of the corresponding cell processing function is used to generate an alarm cell. When a malfunction occurs in the entire cell processing function, a tagging function of another cell processing function to which a cell is transferred from the corresponding cell processing function via an ATM exchanger is used to generate an alarm cell. When a malfunction occurs in a node system of the ATM network, a tagging function of a cell processing function opposing the corresponding node system is used to generate an alarm cell.

Further, as still another characteristic feature of the present invention, polishing for a cell flow is divided into low-speed polishing and high-speed polishing, and these polishing operations are executed independently of each other.

Furthermore, this invention has a feature capable of avoiding quickly a malfunction, using the loop-back function.

Accordingly, the present invention can be select a shaping for a cell flow output from a given cell processing function in units of VCs or an independent shaping for VCs and VPs, to satisfy predetermined traffic characteristics. Therefore, even if the traffic of a plurality of cells passing through the various points of the ATM network is abruptly increased accidentally due to some cause, the traffic is averaged by shaping. As a result, even when polishing control for observing a cell flow at the corresponding ATM exchanger and discarding a cell which violates the predetermined traffic characteristics is performed, the cells of the cell flow can be prevented from being unexpectedly discharged partially.

Delay control for controlling shaping of a cell flow is performed by an output buffer for the ATM switch, and discharge control of a cell flow is executed by an input buffer for the ATM switch. Therefore, the hardware arrangement can be simplified significantly.

Furthermore, a logical identifier for a VC or VP necessary for ATM switching a cell flow is transformed into a physical identifier using an associative memory. Therefore, the number of hardware components for the logical/physical transformation can be sufficiently decreased, and the transformation processing can be easily performed.

A management cell having a preset level is sent onto the ATM network, and each cell processing function in the ATM network has a function of dropping/looping back the management cell according to its position. Therefore, various functions in the ATM network can be effectively tested according to the level of the management cell. Each cell processing function has a function of generating an alarm cell according to a malfunction position in the ATM network. Therefore, a malfunction condition can be effectively informed to the respective sections in the ATM network.

Further, this invention provides a cell processing function capable of applying to a link system to be have a high reliability, by virtue of a quick avoidance of malfunction using the loop back function.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 8 is a chart showing an algorithm for transforming a logical VCI to a physical VCI in an LPT;

FIG. 9 is a diagram showing an arrangement of the LPT;

FIG. 15 is a diagram showing an arrangement of the HTT;

FIGS. 24A to 24C show a diagram showing an arrangement of an IBUF;

FIG. 25 is a diagram showing an arrangement of a FIFO with a priority discard function;

FIG. 26 is a diagram showing a method of realizing delay class control and shaping processing;

FIGS. 28A to 28C show a diagram showing an arrangement of a CSH;

FIG. 30 is a diagram showing an arrangement of a high-speed polishing cell buffer;

FIG. 33 is a diagram showing an OAM function supported by an OMDI for a function test over a node system and a link system;

FIG. 36 is a diagram showing the overall arrangement of an example of an ATM link system applying the present invention;

FIG. 38 is a view for explaining a VP setting method in a 1-to-N drop connection mode;

FIG. 40 is a view showing a method of detecting a transmission path trouble;

FIG. 43 is a block diagram relative to an ATM layer of a pass handling system applying the present invention;

FIG. 45 is a diagram showing a VP link setting method in a pass handling system at a transit point and a destination;

FIGS. 46A and 46B are diagrams showing an operation of a pass handling system when a trouble is avoided;

FIG. 49 shows an address map of an HTT (Header Transformation Table);

FIG. 51 shows an address map of an RTD-RAM; and

FIG. 52 is a diagram showing an arrangement of an ATM switch having a copy function as an application of the present invention.

DETAILED DESCRIPTION OF THE PREFERRED EMBODIMENTS

Figure 1B:
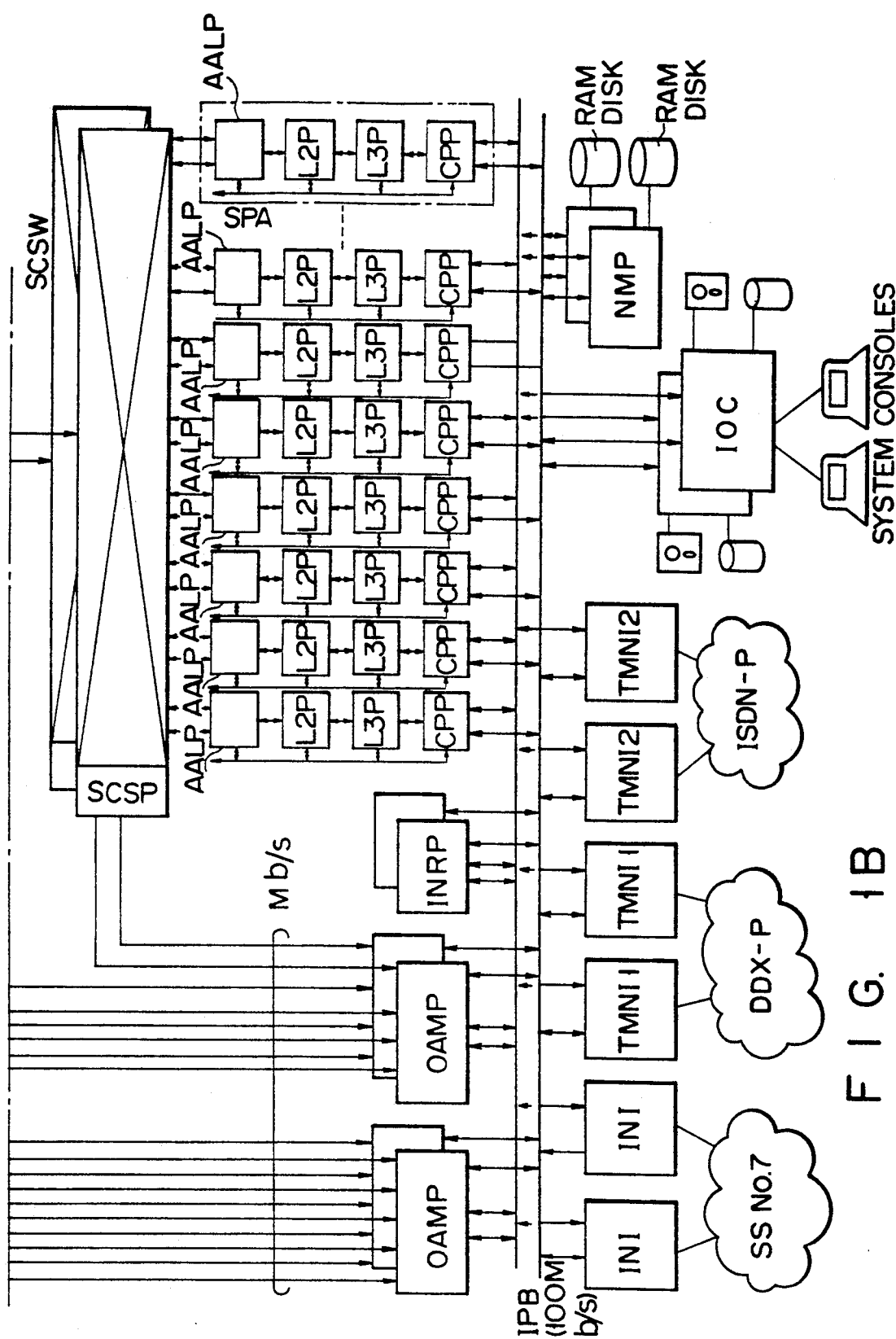
FIG. 1 includes FIGS. 1A and 1B positioned as shown and represents a diagram showing an arrangement of a node system for a public network, which embodies the present invention.

FIGS. 1A and 1B show a block diagram showing an arrangement of a node system for a public network which applies the present invention. An ATM switch (ATMSW; Asynchronous Transfer Mode Switch) executes switching cells, which are short and fix length pocket via an ATM network. As well known, the cell switching processing is executed by the ATMSW subjecting the cell to a self-routing in accordance with the routing tag attached to the cell. The cell switching processing is observed by an ASP (ATMSW Processor). The ATMSW is connected to a user-network interface (BUNI; Boardband User-Network Interface), a network interface (BNNI; Broadband Network-Network Interface), and the like. In addition, the ATMSW is connected to an NUNI (Narrowband User Network Interface), an NNNI (Narrowband Network-Network Interface), a VLFS (Connectionless Support Facility), a VVTT (Voice/Video Talkie Trunk), and a VVCB (Voice/Video Conference Bridge). Operations of circuit functions of these interfaces are controlled by corresponding special-purpose processors.

A signaling cell input to a cell processing function of, e.g., the BUNI or BNNI is modified into an SW cell, and a routing tag necessary for reaching an output port connected to a signaling cell switch SCSW, and a number corresponding to a signaling processor array (SPA) for processing the signaling cell are added to the SW cell.

The ATMSW refers to routing tags added by the cell processing functions, and temporarily concentrates the signaling cells transferred from the cell processing functions to the output port connected to the SCSW. Upon reception of these cells, the SCSW refers to the SPA numbers added to the respective signaling cells, and switches the cells to the SPAs for processing the corresponding signaling cells.

On the other hand, a signaling cell output from each SPA is added with a routing tag necessary for reaching an output port of the ATMSW from which the signaling cell is to be output, and is concentrated by the SCSW. The concentrated cells are transferred to the ATMSW. In this case, a signaling VC is identified by a VPI, a VCI, and a routing tag.

The ATMSW refers to the routing tags added to the respective signaling cells, and outputs the cells to the corresponding output ports from which these cells are to be output. Thereafter, cells output from the ATMSW are subjected to predetermined processing by the cell processing function, and are output to a link.

The cell processing function according to the present invention is a function corresponding to the above-mentioned BUNI or BNNI, and is a function of efficiently executing various processing operations for cells subjected to switching communications by the ATMSW by a simple hardware arrangement.

Figure 2:
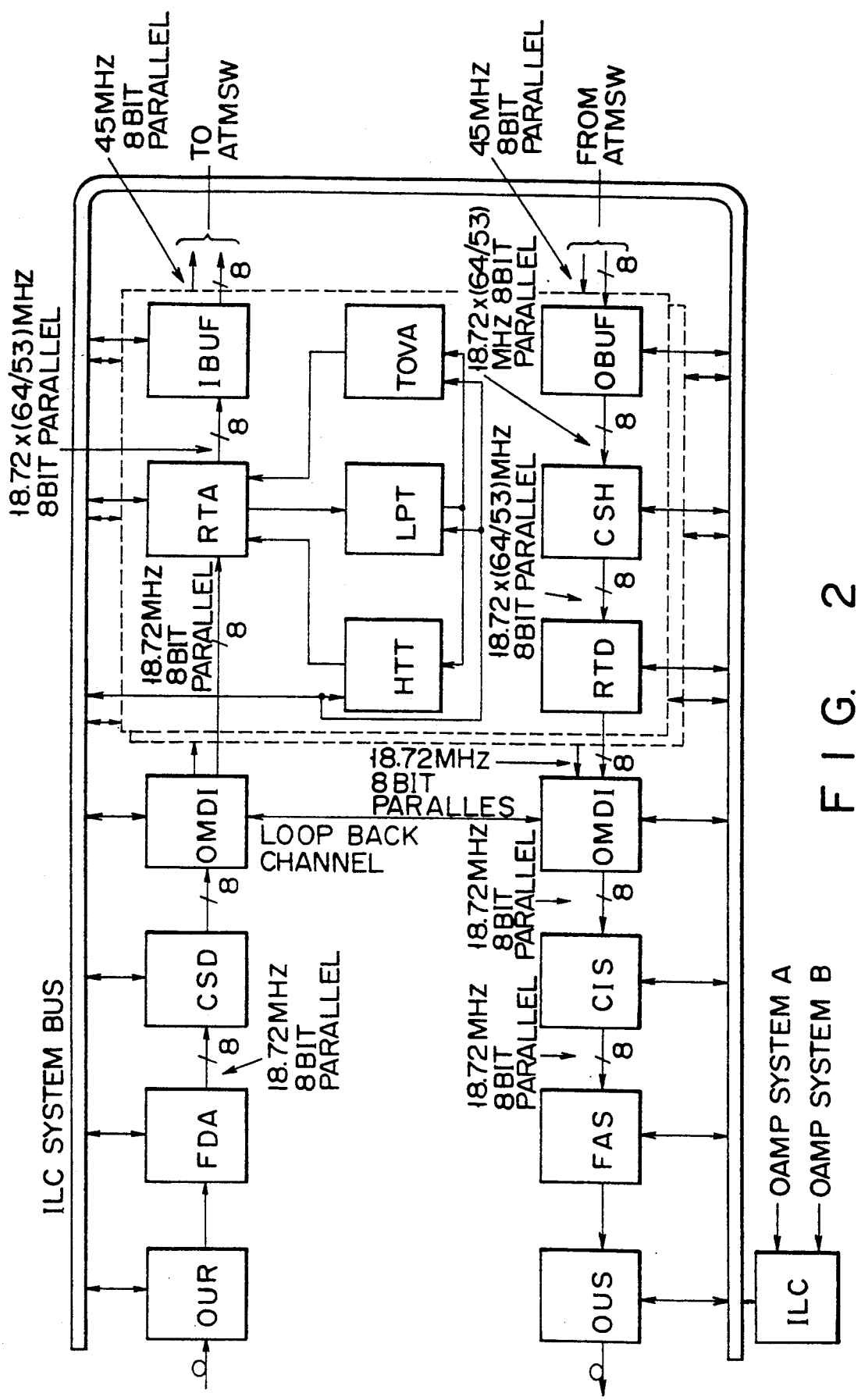
FIG. 2 is a diagram showing a basic arrangement of a cell processing function.

FIG. 2 shows the overall arrangement of a typical cell processing function represented by the BUNI or BNNI.

The BUNI or BNNI is realized on the basis of the arrangement shown in FIG. 2. However, in the above-mentioned NUNI, NNNI, CLSF, VVTT, and VVCB, information to be processed is temporarily adapted to a 150-Mbps cell flow, and thereafter, is interfaced with the ATMSW on the basis of the arrangement shown in FIG. 2.

Optical data input to the cell processing function via a transmission path consisting of an optical fiber is converted into electrical data by an OUR (Optical Unit Receiver). At this time, a bit clock is simultaneously reproduced. Note that data output from the OUR is 155.52-Mbps serial data.

An electrical signal output from the OUR is input to an FDA (Frame Disassembler) to achieve frame synchronization. The frame-synchronized data is serial/parallel-converted, and an 8-bit parallel signal is output as an ATM cell region signal. In this case, data output from the FDA is converted to 8-bit parallel data of 18.72 Mbyte/Sec in accordance with the capacity of VC-4 in an STM (Synchronous Transfer Mode)-n.

Data is transmitted from the OUR in synchronism with the bit clock reproduced by the OUR. However, data is output from the FDA in synchronism with an 18.72-MHz clock generated by a timing supply unit. For this reason, the FDA also has a bitrate changing function.

The FDA also has a function of forming transmission path alarm signal by referring to an SOH (Section Over Head) or POH (Path Over Head), and informing it to an ILC (INF Local Controller) in addition to the frame synchronization and serial/parallel conversion functions. In this case, information sent through a DCC (Data Communication Channel) is also informed to the ILC. Note that the ILC is a generic name for controllers (processors) such as a BUNIP, BNNIP, and the like, which perform local control of the cell processing function.

8-bit parallel data output from the FDA is input to a CSD (Cell Synchronizer/Information Descrambler), and cell synchronization is achieved by an HEC (Header Error Control) calculation. As a result of the cell synchronization, a header display signal is added to the 8-bit parallel data flow. When the header display signal is active, a cell header octet is displayed.

The cell-synchronized parallel data is input to an RTA (Routing Tag Adder) via an OMDI (OAM Cell Drop/Insert). The RTA temporarily stores an input cell, and transforms a VPI/VCI in accordance with the content of an HTT (Header Transformation Table). Furthermore, the RTA adds additional information such as information (routing tag) used in routing inside the ATMSW to the cell, and outputs the cell to an IBUF (Input Buffer). At this time, transformation from the VPI/VCI into a physical VCI actually used as an entry number of the HTT is performed by an LPT (Logical VCI/Physical VCI transformer), as will be described later. The content of the additional information to be added to a cell will also be described later.

Note that the additional information has a 74-bit length. However, the length of the additional data added by the RTA is set to be, e.g., 88 bits in consideration of future expansion. As a result, a cell to be processed in this system has a 64-byte length.

The OMDI drops/inserts OAM cells. An OAM cell dropped by the OMDI is transferred to the ILC in the form of a cell. Similarly, an OAM cell to be inserted is also transferred from the ILC to the OMDI in the form of a cell.

The OMDI and the RTA are periodically operated with a cycle of the cell length. On the other hand, the operation of the CSD does not always have a cycle of the cell length. That is, a HUNT state may be inserted in a cell synchronization establishment sequence by the HEC calculation. For this reason, cell synchronization must be established between the operation cycle of the CSD and the operation cycle of the OMDI/RTA. This cell synchronization is realized by arranging a buffer corresponding to two cell lengths to an output unit of the CSD. Note that the CSD keeps outputting empty cells to the OMDI during a period in which cell synchronization is not established.

A cell transfer operation and cell input/output operation in the CSD/OMDI/RTA are assumed to be performed in an 8-bit parallel format. A cell output operation from the RTA is assumed to be performed at 149.76 Mbps×(64/53) since the cell length is increased. As a result, the cell input/output operation of the CSD, the cell input/output operation of the OMDI, and the cell input operation of the RTA are performed in synchronism with a clock of, e.g., 18.72 MHz (2.83 μsec per cell), and the cell output operation of the RTA is performed in synchronism with a clock of, e.g., 18.72×(64/53) MHz.

A traffic of a cell flow is observed as follows when a routing tag is added by the RTA.

A traffic carried by each VC is observed by a TOVA (Traffic Observer/Violation Tag Adder). Basically, this traffic measurement is performed by observing an access to the HTT for the purpose of VPI/VCI transformation. As a result of the traffic measurement, the TOVA instructs the RTA to add a violation tag to a cell which is determined to exceed a capacity assigned to a given VC. Thus, VC polishing for each VC is performed. The position of the violation tag is set, e.g., inside the additional information of a cell.

A newly generated VC is set in such a manner that a VPI/VCI at an input-side link of the VC, a physical VCI corresponding to the set of the VPI/VCI, a VPI/VCI at an output-side link, and a routing tag for designating a path for the VC in the ATMSW are informed from the ILC to the HTT and the LPT, and several parameters for setting the capacity of the VC are informed from the ILC to the TOVA. The HTT and TOVA which received the above-mentioned parameters from the ILC receive the parameters, and control a cell flow in accordance with the parameters. A cell output from the RTA is temporarily stored in the IBUF, and is output in correspondence with an operation speed of the ATMSW. Cell discard processing (to be described later) is performed by only the IBUF, and a cell with a violation tag is always discarded by the IBUF.

Cells with CLP processes as follows. In a situation wherein cells must be discarded, e.g., the buffer is full, the IBUF discards the oldest cell with CLP=1 stored in the IBUF. When a cell is discarded, information associated with the discarded cell is informed to the ILC. A cell output operation from the IBUF is performed at a rate almost twice a cell output rate from the RTA, e.g., 360 Mbps in an 8-bit parallel format.

A cell output from the IBUF is transferred to the ATMSW. The ATMSW refers to a routing tag of the additional information added to each cell by the RTA, and transfers the cell to an output port requesting it. In an inter-switch link inside the ATMSW, a cell transfer operation is performed at the same rate as the output rate of the IBUF.

A cell output from the output port of the ATMSW is input to an OBUF (Output Buffer), and is temporarily stored therein. The OBUF outputs the cell in correspondence with a rate in the next section. More specifically, a cell input operation to the OBUF is performed at the same rate as the cell output rate from the IBUF. In contrast to this, a cell transfer operation from the OBUF to an RTD (Routing Tag Deleter) is performed at 149.76 Mbps×(64/53), as will be described later. Therefore, a stay of cells inside a buffer due to conflicts associated with output ports mainly occurs in the OBUF.

It should be noted that it is very difficult for hardware to have a buffer amount of the OBUF corresponding to several thousands of cells. When there are many positions in the system where cells are discarded, it is very difficult to supply information associated with discarded cells to controllers of the system. In consideration of these respects, simple flow control from OBUFs to IBUFs via the interior of the ATMSW is executed in this embodiment. That is, if buffer as destination is full, cell output at source buffer is suppressed. With this flow control, buffers along an IBUF-ATMSW-OBUF path cooperate each other to avoid conflicts, and as a result, the buffer capacity can be reduced.

Since cells are discarded in only the IBUF, only information of cells discarded by the IBUF need only be supplied to the controllers of the system. Therefore, the hardware arrangement can be simplified.

The OBUF performs cell delay class control. The cell delay class control in the OBUF can be considered as a delay class control scheme executed on the basis of the concept in that if cells stay inside the system, most of the cells stay in the OBUF since the cell transfer rate of the ATMSW is increased, as described above.

A cell output from the OBUF is input to a CSH (Cell Sharer). In the CSH, an output cell flow is observed by a leaky bucket, and shaping processing for the cell flow is performed. With this shaping processing, an output operation of the cell is controlled so as not to be determined by a polishing function in the opposing cell processing function that a transmission output cell is a violation cell. The cell input/output rate in the CSH is equal to the cell output rate in the OBUF.

A cell output from the CSH is input to the RTD (Routing Tag Deleter). The cell is input to the RTD at a rate of 149.76 Mbps×(64/53), thereby preventing buffers for deleting the above-mentioned additional information included in the RTD from overflowing. Note that the cell is input to the RTD in an 8-bit parallel format.

A cell output from the RTD is input to a CIS (Cell Information Scrambler) via another OMDI. The CIS scrambles an information portion of the cell. As a result, a data input/output signal of the OMDI/CIS is processed as an 18.72-MHz 8-bit parallel signal.

The cell scrambled by the CIS is input to an FAS (Frame Assembler), and is added with an SOH and a POH to be transformed into an STM frame. Thereafter, the cell is parallel/serial-converted. In the STM frame transformation, a byte phase of a cell in an ATM region is aligned with an intra-payload position indicated by an AU-4 pointer. Furthermore, management information to be carried by the SOH and POH is informed from the ILC to the FAS, and at the same time, information to be carried in a DCC channel is informed from the ILC to the FAS. The FAS outputs the STM frame as a serial signal. Note that a cell header in a payload may be indicated by an H4 pointer of the VC-4 according to the consultation of the CCITT. If the cell header in the payload is indicated using the H4 pointer of the VC-4, a cell header signal can be in parallel provided to 8-bit parallel data like in other portions, and an interface among function elements can be standardized.

The STM frame output from the FAS is transferred to an OUS (OPT Unit Sender), is subjected to electro-optical conversion by the OUS, and an optical signal is then output onto an optical fiber.

On the other hand, fault detection in this system is performed as follows.

Of the function elements constituting the cell processing function, the OUR, OUS, FDA, CSD, and OBUF can supervise a receiving off (REC) signal based on their inputs. Furthermore, the FDA can supervise its own states associated with frame synchronization, i.e., HUNT, SYNCH, and PRESYNC states, and the CSD can supervise its own states associated with cell synchronization, i.e., HUNT, SYNCH, and PRESYNC states.

In consideration of an application that the above-mentioned cell processing function is used in a large-scale ATM switch, it is preferable to detect an increase in bit error rate of the IBUF-ATMSW-OBUF path. For this purpose, a parity bit of a cell is assigned in one byte in additional information to be added to the cell by the RTA. When the parity bit is checked by the RTD, a decrease in bit error characteristics of the IBUF-ATMSW-OBUF path can be supervised.

For the HTT/LPT, in addition to parity check of RAMs or registers in the HTT, fault detection is performed by the following scheme.

This fault detection is performed when a new VC is set, and is executed to confirm that a path for the VC is normal. More specifically, the fault detection is performed in such a manner that after necessary data is written in the HTT/LPT upon setting of a VC, an OAM cell is caused to pass from the ILC via the ODMI, and it is checked if the OAM cell is detected by the OMDI at the output side of the VC. The same operation is performed in an ATM link system accommodating subscribers, and between adjacent ATM node systems. For this reason, an OAM cell is looped back in the subscriber accommodating link system, and between the adjacent ATM node systems. Loop back control of the OAM cell can be realized by transferring a loop back OAM cell from the OMDI arranged between the CSD and the RTA in each cell processing function to another OMDI arranged between the RTD and the CIS.

Fault detection of the TOVA is realized by confirming, upon setting of a VC, if a polishing algorithm is operated correctly, as will be described later. Fault detection of the CSH is also realized by placing an output restriction on a cell using the polishing algorithm like in the fault detection of the TOVA, as will be described later. The fault detection of the CSH is performed by confirming, upon setting of a new VC, if the polishing algorithm is operated correctly, like in the TOVA, and confirming if an output restriction is placed. This fault detection will be described in detail later.

In a node system, discard class control and delay class control are performed. Fault detection in the discard class control is realized by analyzing a cell discarded by the IBUF in the ILC. When a cell is discarded, the IBUF informs, to the ILC, the discarded cell itself, and the numbers of cells in units of discard classes held in the IBUF when the cell is discarded. Every time a cell is discarded, the ILC confirms, on the basis of the numbers of cells in units of discard classes in the IBUF, and a discard class to which the discarded cell belongs, that the discard class control is normally operated.

Fault detection of the delay class control is autonomically executed by the OBUF by the following scheme. More specifically, the OBUF has counters for counting the numbers of cells held therein in correspondence with delay classes. Every time a cell is output, the OBUF compares the numbers of cells in units of classes, and a delay class of the cell actually output from the OBUF, thereby checking if a delay control algorithm is normally operated. If an abnormality is found in the checking processing, the OBUF informs this to the ILC.

Note that fault detection of the ILC is performed by a conventional scheme, e.g., ICL-down check using a watch-dog timer, and existence checking via periodical communications between the ILC and a supervision controller.

In the cell processing function applied to a system to have a high reliability, i.e., a node system for a public network, a node system for a large scale private network and a link system, in order to realize a system swapping function so as to discard no cell during system swapping, i.e., to realize a cell loss free system swapping function, the RTA, HTT, LPT, TOVA, IBUF, OBUF, CSH, and RTD are duplicated in addition to the ATMSW. A detailed cell loss free system swapping scheme will be described in detail below. Cell input-/output operations in the FDA/CSD/OMDI/R-TA/IBUF/OBUF/CSH/RTD/CIS/FAS are realized as a common interface for the purpose of allowing easy maintenance.

Each function relative to the cell processing will be described in detail.

At first, the function applied to the node system within the cell processing functions shown in FIG. 3 will be described. Since a function applied to the link system can be realized by changing the function of the node system a little, it will be described hereinafter.

FDA/FAS is a framer/deframer for STM-1. The construction method for this is well-known, therefore more detail description is not added here.

The cell synchronization function and the scramble/-descramble function are supported by the CSD (Cell Synchronizer/Information Descrambler) and the CIS (Cell Information Scrambler) in the general arrangement of the cell processing function shown in FIG. 2.

Figure 3:
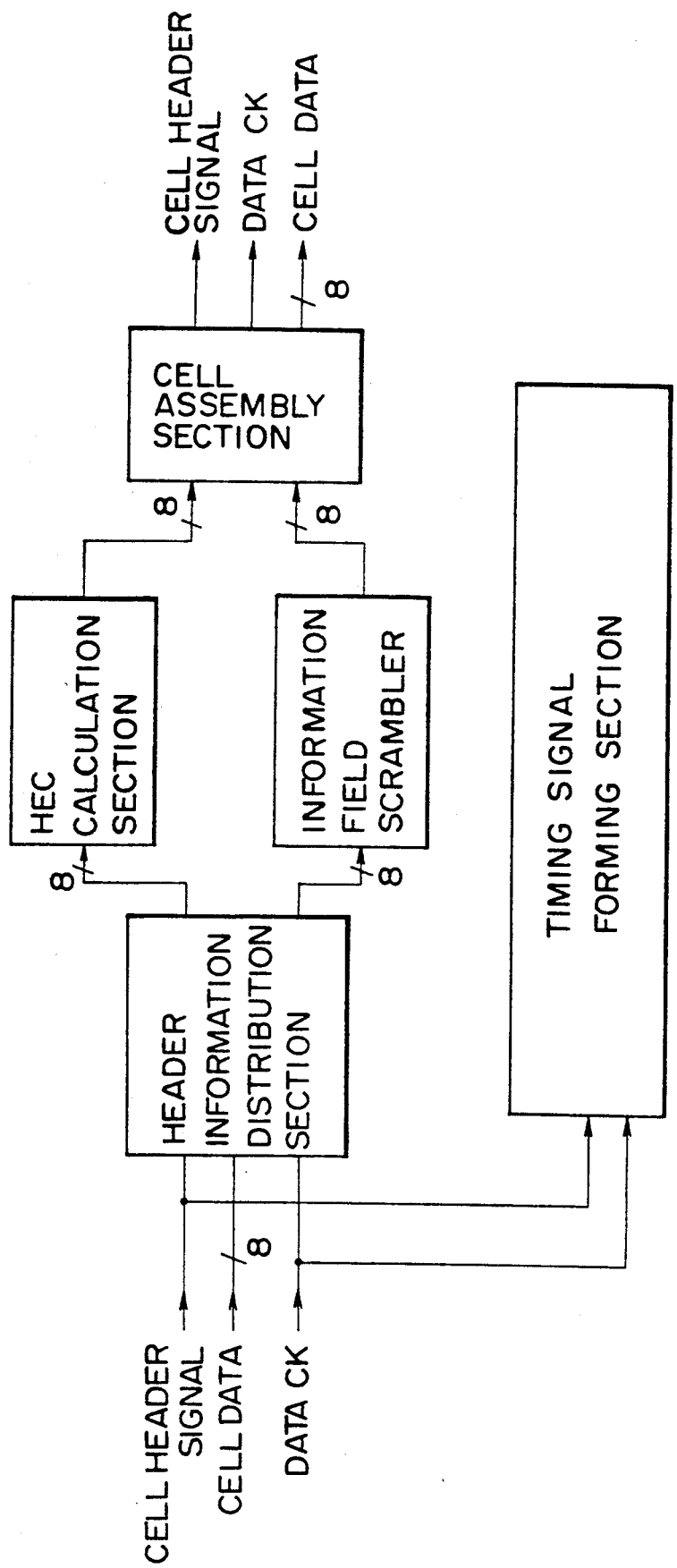
FIG. 3 is a diagram showing an arrangement of a CIS.

FIG. 3 shows the arrangement of the CIS. The arrangement and schematic operation of the CIS will be described below with reference to FIG. 3.

The CIS has a function of scrambling the information field of a cell transferred from the RTD via the OMDI, calculating an HEC in the header field, and writing the calculation result in an HEC field. The CIS receives a cell having a 53-byte length from the RTD in the format that a 1-bit header display signal is added to 18.72-MHz 8-bit parallel data.

The CIS includes an HEC calculation section, and an information field scrambler. Header information of an input cell is selectively input to the HEC calculation section, and its information field is also selectively input to the information field scrambler. This selection is controlled by a counter which is reset in response to the header display signal parallel to a data line. Note that the information field scrambler is realized by a 43rd-order self synchronization type scrambler.

Bit streams output from the HEC calculation section and the information field scrambler are mixed to reform a cell, and the cell is output. This output is 18.72-MHz 8-bit parallel data, and a header display signal of the cell is output parallel to the data. The header display signal is utilized when the FAS generates the H4 pointer of the VC-4.

Figure 4:
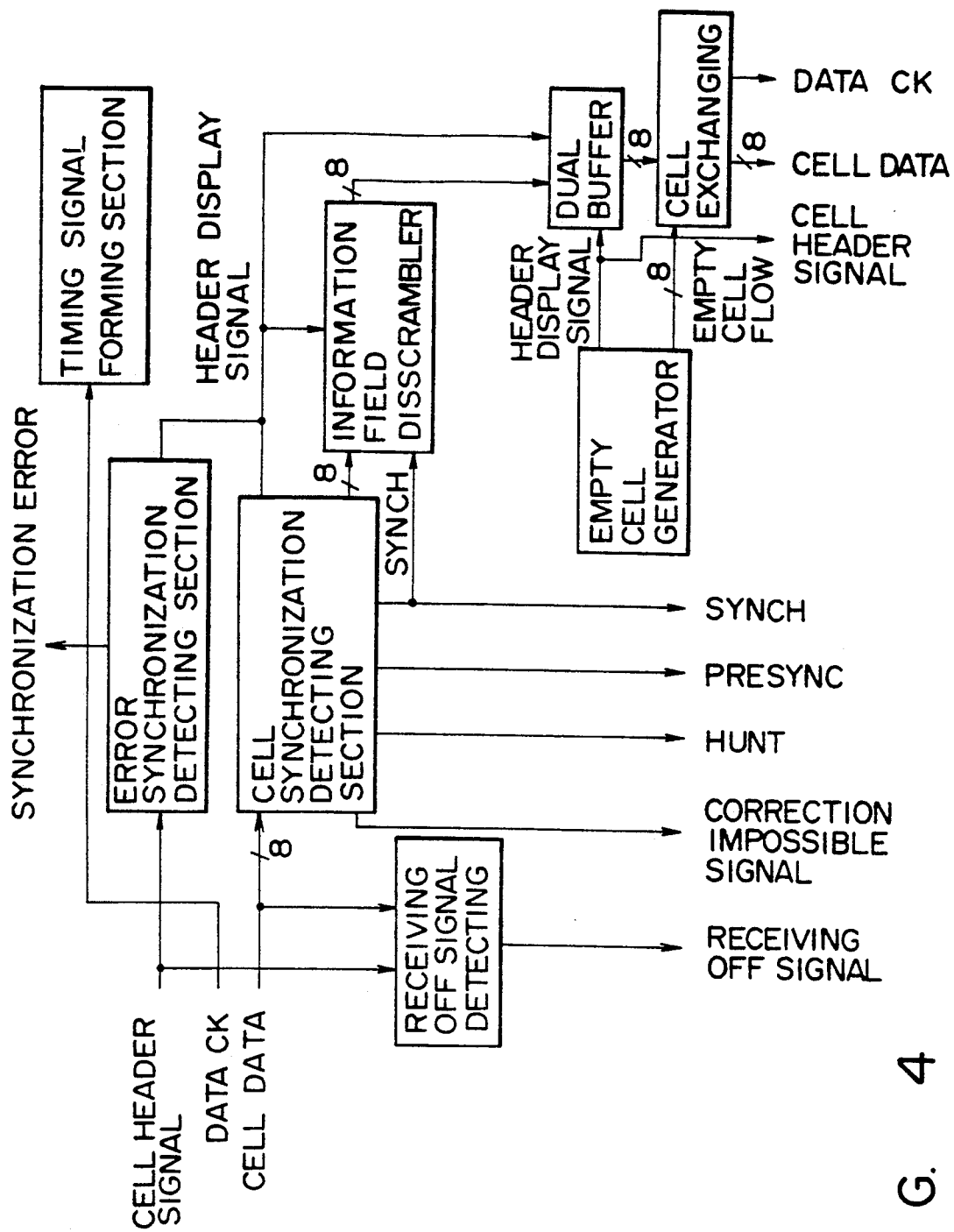
FIG. 4 is a diagram showing an arrangement of a CSD.

The CSD is arranged as shown in FIG. 4. The CSD has a role of searching a cell header from the bit stream of the 18.72-MHz 8-bit parallel data transferred from the FDA by a HEC calculation, and putting a predetermined mark on the start byte of the searched cell. In the 8-bit parallel data stream input from the FDA, it is basically assumed that byte phases of cells are aligned. In this case, the CSD searches a cell header under the above-mentioned assumption for the sake of reducing consumption power, and outputs the cell in the form that a 1-bit header display signal is added to the 18.72-MHz 8-bit parallel data.

The CSD is schematically operated as follows.

A bit stream input from the FDA is input to a cell synchronization section. The cell synchronization section achieves cell synchronization with the input bit stream, and performs bit error detection/correction of a header field of a cell. The cell synchronization procedure, and the header field error detection/correction procedure in the cell synchronization section are executed as follows according to the CCITT.

More specifically, the cell synchronization section has three different states depending on a state of the cell synchronization procedure. Assume that a state wherein no cell synchronization is attained is referred to as a HUNT state, a state wherein cell synchronization is about to be attained is referred to as a PRESYNC state, and a state wherein cell synchronization is attained is referred to as a SYNCH state. In the HUNT state, every time 1-byte data is input from the FDA, a syndrome of previously input 40 bits (5 bytes) is calculated. In this case, when the previously input 40 bits are assumed to be a header, if the header includes no error, the calculated syndrome has a value which can be predicted beforehand. Therefore, when the syndrome has the predicted value, the FDA assumes that a header input is completed, and the state transits to the PRESYNC state.

In the PRESYNC state, the CSD performs error detection of a header portion in units of cells. More specifically, the CSD calculates a syndrome of previously input 40 bits every time 53 bytes are input from when the HUNT state transits to the PRESYNC state. If the calculated syndrome has the above-mentioned predicted value for a successive DELTA number of times, it is determined that a portion presently assumed to be a header is surely the header, and the state transits to the SYNCH state. However, if the calculated syndrome does not have the predicted value, the state immediately returns to the HUNT state.

In the SYNCH state, the CSD performs error detection/correction of a header field in units of cells. In this process, since the position of a header field of a cell is correctly recognized, almost no error can occur. However, if an error is found in the header field for a successive ALPHA number of times, the state returns to the HUNT at that time.

In the HUNT state and the PRESYNC state, the CSD does not output valid cells, but always outputs empty cells. In the SYNCH state, if no bit error is found in the header field, or if a bit error is found but is corrected, the corresponding cell is output to a dual buffer as a valid cell. An invalid cell (some bit errors are found in the header field and are not corrected) cell is discarded. If there is no valid cell to be output to the OMDI, the CSD always outputs empty cells.

An information field of a cell output from the cell synchronization section when the cell synchronization section is in the SYNCH state is descrambled by the information field descrambler. The descramble processing is executed by using a 43rd-order self synchronization type descrambler.

A cell passing through the descrambler is temporarily stored in the dual buffer. An empty cell generator always generates empty cells to be output from the CSD. When cells are stored on the dual buffer, one empty cell on the empty cell flow is replaced with a cell on the dual buffer, thereby outputting a valid cell. With this processing, a cell synchronization operation is synchronized with a cell output operation.

As described above, the 8-bit parallel data output from the CSD is added with the 1-bit header display signal. In this case, if the cell header is displayed by a pointer H4 as described after, 8-bit parallel data input to the CSD may be added with the header display signal. When the header display signal is added, the CSD compares a cell header indicated by the header display signal, and a cell header calculated by itself by an HEC calculation, and if the two cell headers do not coincide with each other, the CSD generates an alarm to the ILC.

In the arrangement shown in FIG. 2, assuming that the FDA detects a cell header based on the H4 pointer of the VC-4, adds the detected header field to 8-bit parallel data to be output, and transfers the data to the CSD, when error frame synchronization or error cell synchronization occurs, the cell header indicated by the header display signal is different from a cell header calculated by the HEC calculation. As a result, it can be informed to the ILC that one of the error frame synchronization and error cell synchronization has occurred.

The comparison between the cell headers can be performed only when the header display signal is activated. Thus, when no header display signal is used, the signal is always fixed at inactive level to eliminate the influence on an operation of the CSD. If this signal is added to the CSD input interface, no problem is particularly posed.

Observation information output from the CSD includes a state of the cell synchronization section, i.e., the HUNT, PRESYNC, or SYNCH state, an error frame/cell synchronization display signal if detection is performed, and a receiving off signal from the FDA. The receiving off signal from the FDA can be detected by observing data transferred from the FDA to the CSD, and supervising that all the data are fixed to be "0"s or "1"s for one cell time or more, since both logic values "0" and "1" always appear in a cell according to, e.g., a cell format determined by the CCITT.

Note that no observation item is provided to the CIS.

An OAM cell insert/drop function in the cell processing function will be described below.

The OAM cell insert/drop function is supported by the OMDI (Operation and Management Cell Drop and Insert) of the general arrangement of the cell processing function shown in FIG. 2. The OAM function (in particular, an ATM layer) is an issue under discussion in the CCITT, and may drastically change in future. According to the present invention, the OAM function is realized as the following function to suppress a hardware scale as the primary object.

Figure 5:
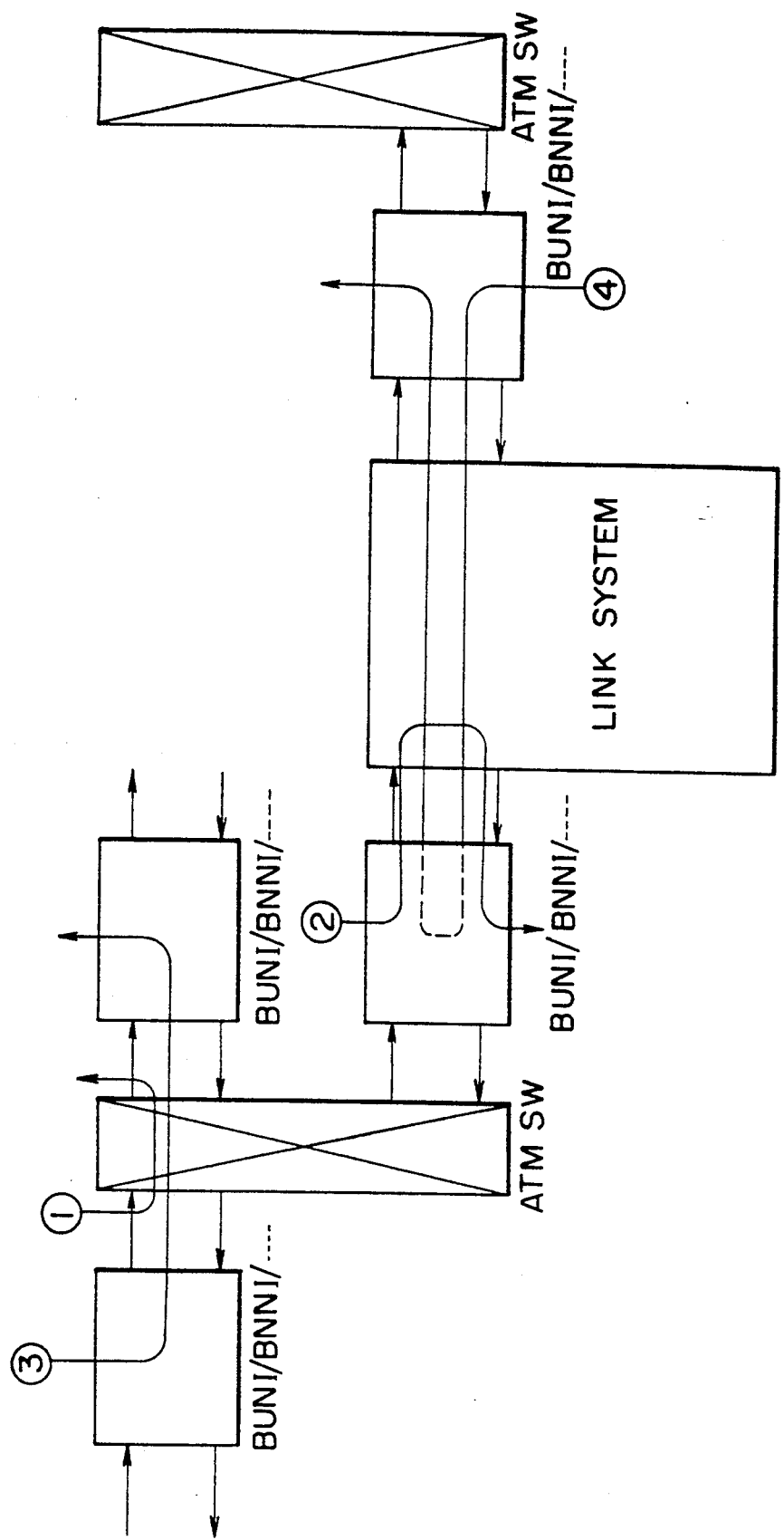
FIG. 5 is a diagram showing an OAM function supported by an OMDI.

The OAM function supported by the OMDI is realized, as shown in FIG. 5. The OMDI provides functions necessary for performing connection tests of a cell transfer path, and more particularly, provides functions for executing the following four tests.

(1) ATMSW internal connection test
(2) Transmission path connection test
(3) VC link coupling test
(4) Adjacent node loop back test (1) The ATMSW internal connection test is a test for checking if paths between input ports and output ports of the ATMSW are normally connected and if cells are normally switched upon expansion of the ATMSW, and the like. More specifically, this test is realized by checking if a cell inserted from each input port is output from the corresponding output port.

(2) The transmission path connection test is a test for checking if frame/cell synchronization is established with an opposing link system. This test is realized by checking if a cell output toward the opposing link system is looped back.

The above-mentioned two tests are tests for checking a physical layer function, and are conducted using a physical layer OAM cell. Note that the header format of the physical layer OAM cell complies with I.361, I.432. Furthermore, these tests are performed by setting a bit for designating, in an information field, whether at least the OAM cell is dropped or looped back, and a drop/loop back bit.

In contrast to this, the following two tests are tests for checking an ATM layer function.

(3) The VC link coupling test is a test for checking if an RTA-ATMSW-RTD path is normally operated, and in particular, is a test executed while placing an importance on the VPI/VCI transformation & routing tag addition function in the RTA. This test is performed by confirming a coupling operation between VC links realized by the RTA-ATMSW-RTD path by checking if a cell from an arbitrary cell processing function to another cell processing function is switched by the ATMSW while being normally subjected to VPI/VCI transformation.

Note that (4) the adjacent node loop back test is a cell loop back test executed between adjacent nodes via a link system.

The header format of the ATM layer OAM cell used for the above-mentioned ATM layer function tests is not standardized by the CCITT yet. For example, the above-mentioned tests can be executed in such a manner that a VPI for identifying a VP link/connection to be tested is added based on the analogy between the header formats of an empty cell and a physical layer OAM cell, and a format having a PT field set with [10] is set. In addition, these tests are performed by setting a bit for designating, in the information field of the ATM layer OAM cell, whether at least the OAM cell is dropped or looped back, and a drop/loop back bit.

Moreover, a field indicating a test level of the cell, i.e., a test level field is set in the information field of the physical/ATM layer OAM cell.

The format of the OAM cell/OAM function must be matched with the link system. Therefore, of the physical/ATM layer OAM cells, an OAM cell having a test level field set with a specific pattern is assumed to be switched by a VPI in the link system in the same manner as normal cells. In addition, assume that a physical layer OAM cell which is designated with a loop back operation by the drop/loop back bit must be looped back on the link system.

All the OMDIs in the node system have a function of dropping/looping back all the OAM cells according to their drop/loop back bits, and as a result, the above-mentioned four OAM functions can be realized. On a given transmission path, upstream/downstream VCs must be set using the same VPI/VCI. In this case, a loop back operation can be quickly performed. However, such setting need not always be made. If upstream/downstream VCs are set using different VPIs/VCIs, the OAM cell is temporarily transferred to the ILC, and after the VPI/VCI is rewritten by the ILC, the cell may be inserted in the opposite side, thereby realizing the loop back operation. Also, note that an OMDI of the link system used to be paired with this OMDI will be described later.

The arrangement and schematic operation of the OMDI will be described below.

Figure 6B:
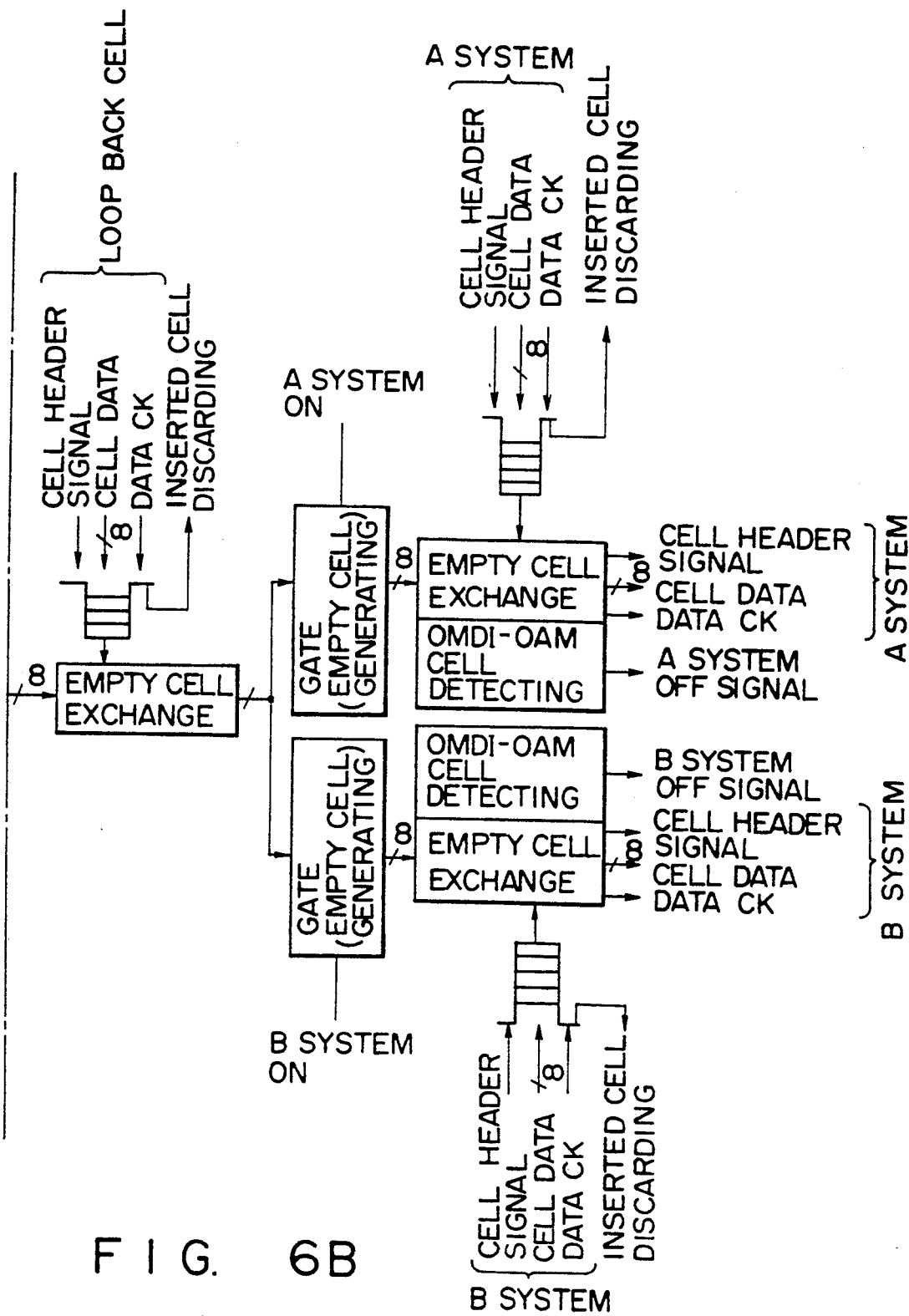
FIG. 6 includes FIGS. 6A and 6B positioned as shown and represents a diagram showing an arrangement of the OMDI.

This OMDI is arranged, as shown in, e.g., FIGS. 6A and 6B. This OMDI has a function of swapping an active system and stand-by system in addition to the OAM cell insert/drop function. The two functions of the OMDI are realized on the basis of the fact that it is natural to execute the OAM cell insert/drop function and the active/stand-by swapping function using the same function elements since a swapping system checking operation must be performed by OAM cells when systems are swapped due to, e.g., cell loss free expansion.

The OMDI is schematically operated as follows. OMDIs arranged in the respective sections of the system can be arranged by omitting unnecessary functions from this OMDI.

In other words, in a system wherein ATMSW is duplicated, when OMDI is inserted between CSD and RTA, the cell is transferred from the non-duplicated portion to the duplicated portion. Accordingly, the OMDI on the left side of the cell drop shown in FIG. 6A may not be duplicated. Also, in the system wherein ATMSW is duplicated, if OMDI is inserted between RTD and CIS, the cell is transferred from the duplicated portion to the non-duplicated portion. Therefore, the OMDI on the right side of the cell drop shown in FIG. 6A may not be duplicated. Further, in a system wherein ATMSW is not duplicated, all of OMDIs may not be duplicated.

In the system having a dual ATMSW, OMDI inserted between CSD and RTA and OMDI inserted between RTD and CIS may be constructed in common with the structure show in FIG. 6.

More specifically, a cell input from an A system/B system input port is temporarily stored in a dual buffer to be synchronized with the operation cycle in the OMDI. This processing is performed so as not to cause cell discard upon selection of an A system/B system. In this case, the A system/B system means one of two systems to be swapped. However, task allotment of two systems such as the active system/stand-by system is not defined by this OMDI but by software. Therefore, in this case, a description will be made using simply the A system/B system.

A cell passing through the dual buffer passes through a cell drop. The cell drop drops the cell when the following two conditions are established.

(1) A PT bit in a header portion of a cell is [10], and designates a physical/ATM layer OAM cell.

(2) A drop operation of a cell is designated by the drop/loop back bit in the information field.

Next, one of the A and B systems of a cell flow passing through the cell drop is selected via a selector. The system-selected cell flow passes through a cell drop-/empty cell exchanging section for realizing a loop back function. This cell drop drops the cell when the following two conditions are established.

(1) PT bits of the header portion of the cell represent "1 0", whereby physical/ATM layer OAM cell is designated.

(2) A loop back is designated by branch/loop back bit of information field.

A cell flow passing through the cell drop then passes through an empty cell exchanging section. In this case, when an empty cell (VPI=all [0]s, VCI=all [0]s, and PT=[00]) appears in the cell flow, the empty cell can be exchanged with a cell to be inserted. The cell to be inserted is prestored in a buffer connected to the empty cell exchanging section. Note that the empty cell exchanging function corresponds to a loop back cell insert function.

A cell flow passing through the empty cell exchanging section is copied to the A system/B system, and then passes through a gate. This gate determines whether or not the received cell is output to the A system/B system. If it is determined that the received cell is not output, an empty cell flow is output to the A system/B system.

In order to perform the above-mentioned cell flow control, the gate has an empty cell generating function. A cell flow is copied to provide the same cell flow, so that substantially the same internal states of ATMSWs can be maintained in the A system/B system to prepare for swapping between systems upon occurrence of a trouble.

The reason why the cell flow temporarily passes through the gate to select whether or not the cell flow is output to the A system/B system after it is copied is as follows. That is, selection is made so that a checking operation of a system which is not presently used as that for an cell loss free system swapping operation does not adversely influence a switched traffic.

The cell flow passing through the gate passes through an empty cell exchanging section, and is then output from the OMDI. In this case, the empty cell exchanging function realizes an insert operation of an OAM cell, and is realized as a function allowing to independently insert OAM cells in the A system/B system so as to swap between systems to discard no cell. Like in the empty cell exchanging function for realizing the loop back function described above, an empty cell is detected from a given cell flow, and a header cell in a cell string stored in a buffer is exchanged with the detected empty cell, thereby realizing the empty cell exchanging function. With this function, an OAM cell insert function can be realized.

In order to conduct the loop back test, the loop back cell drop must have a function of changing the drop-/loop back bit of an OAM cell from a loop back mode to a drop mode.

In the OMDI having the arrangement shown in FIG. 6, an OAM cell cannot pass through a path between the A system/B system cell drop to the A system/B system empty cell exchanging section. Therefore, in this case, as shown in FIG. 6, a special OAM cell, more specifically, an OMDI-OAM cell may be flowed between these sections to check the operation of the path. However, since another function element detects a receiving off signal, and as will be described later, since the TOVA counts the number of passing cells in units of VPs, a checking operation of the path using the OAM cell is not necessary in practice.

Observation information of the OMDI will be described below.

The observation information output from this OMDI consists of drop cell discard information and insert cell discard information in the empty cell exchanging sections arranged at a total of three portions, and their buffers, i.e., the cell insertion functions. The controller (ILC) detects that an OAM cell to be inserted is discarded, and changes an OAM procedure so as not to cause a contradiction.

Figure 7:
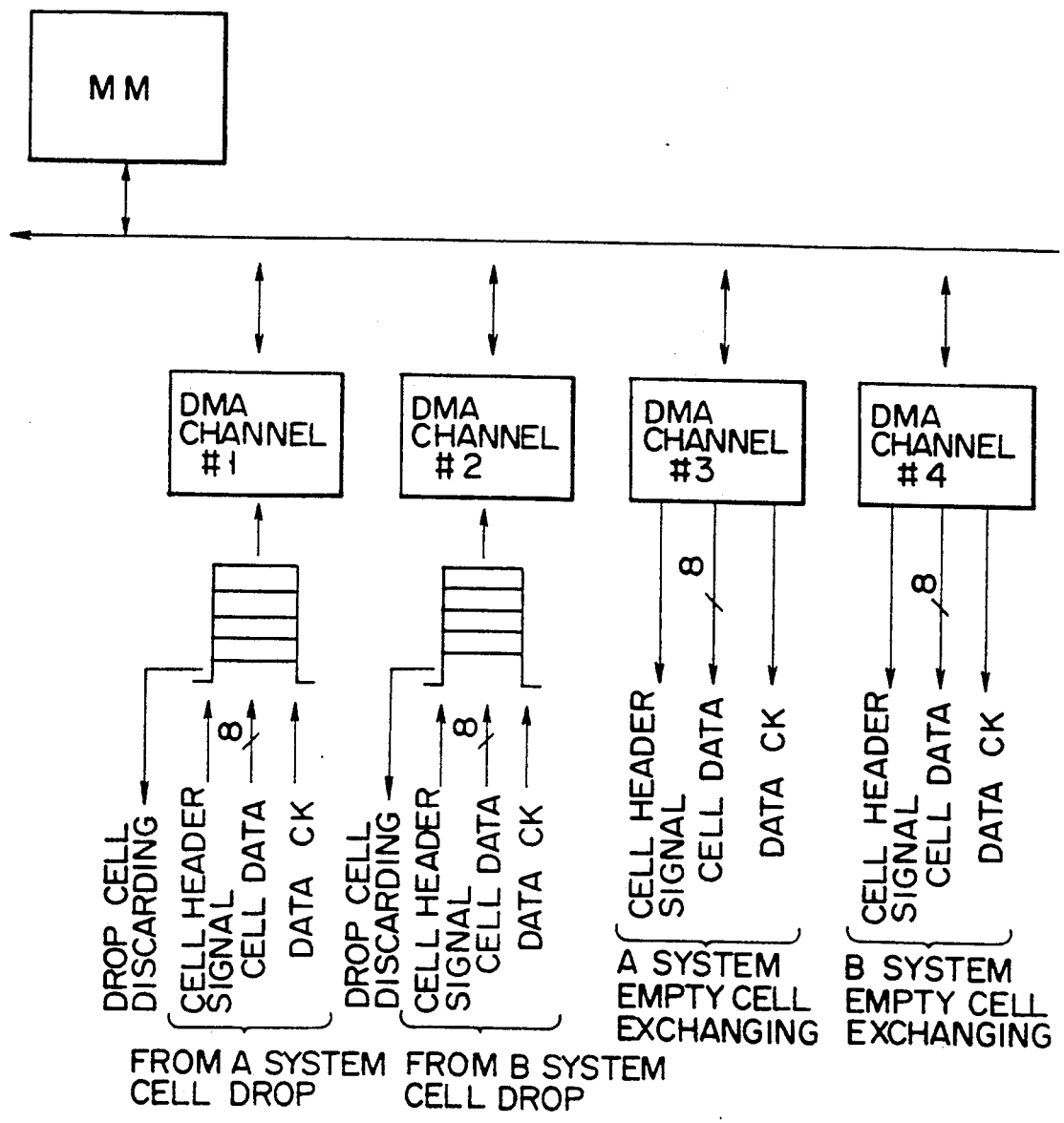
FIG. 7 is a diagram showing an interface between an OMDI and ILC in an OAM cell.

FIG. 7 illustrates an OAM cell interface method between the OMDI and the ILC. The OMDI has a total of four ports for inputting/outputting an OAM cell to/from the ILC. Basically, as shown in FIG. 7, a DMA transfer operation is performed between these ports and an MM (main memory) of the ILC, thereby interfacing between the ILC and the OMDI.

The ILC must recognize a port from which an OAM cell is dropped, or a port to which an OAM cell is to be inserted. Therefore, as shown in FIG. 7, DMA channels are provided to the respective OAM cell input/output ports of the OMDI, and the ILC identifies the DMA channel, thereby identifying a port to/from which an OAM cell is input/output.

The VPI/VCI transformation & routing tag addition function in the above-mentioned cell processing function will be described below. The VPI/VCI transformation & routing tag addition function is supported by the RTA (Routing Tag Adder), the LPT (Logical-/Physical VCI Transformer), and the HTT (Header Transformation Table).

A logical VCI and a physical VCI will be explained below.

According to the cell format standardized by the CCITT, the length of a VPI is 8 bits for a UNI, and 12 bits for an NNI, and a VCI has a 16-bit value. Therefore, a maximum of 4K×64K (=256M) VCs can be simultaneously set in a single BNNI. However, when 256M VCs are simultaneously set on a 155-Mbps link, an average speed par VC is 0.58 bps, and the B-ISDN is rarely used in this manner. In order to realize header transformation functions/polishing functions for 256M VCs, a system inevitably has a scale which cannot be allowed by the existing LSI technologies. Therefore, the number of simultaneously connected lines is calculated in the following manner.

More specifically, if all the VCs set on the 155-Mbps link are 64-Kbps audio channels, about 2,000 lines must be simultaneously connected. Therefore, the number of simultaneously connected lines is set to be a maximum of 4,096 in consideration of the presence of VCs having speeds lower than the 64-Kbps channels When the number of simultaneously connected lines is set to be 4K, as described above, mapping from a 256M (logical) VC space formed by VPIs/VCIs to a 4K (physical) VC space to be actually processed must be performed, and identifiers must be set for the respective mapping operations.

Assuming that VPI+VCI input to a node system while being carried by a cell is referred to as a logical VCI, and an identifier for identifying simultaneously connected VCs is referred to as a physical VCI, the LPT serves as a function element for performing identifier transformation from the logical VCI to the physical VCI.

A transformation algorithm from the logical VCI to the physical VCI in the LPT is expressed as shown in, e.g., FIG. 8.

In this case, in order to suppress a hardware scale to an allowable scale, for example, lower 3 bits of a VPI and lower 3 bits of a VCI in the logical VCI are used as lower 6 bits out of 12 bits of the physical VCI. Although other bit positions of the logical VCI may be used as 6 bits of the physical VCI, they do not influence the effectiveness of the present invention. An associative memory is accessed using the remaining 22 bits of the logical VCI as a key, thereby obtaining the remaining 6 bits of the physical VCI. The scale of the associative memory necessary for this associative processing is 64 words ([associative key]+[associative data]=28 bits), and can be sufficiently integrated on a single CMOS gate array which is available now. FIG. 9 shows an arrangement of the LPT. The schematic operation of the LPT will be described below. The logical VCI transferred from the RTA is temporarily stored in a logical VCI register. Of bits of the logical VCI, 6 bits which are set in the physical VCI without transformation are directly supplied to a physical VCI register. Of the bits of the logical VCI, 22 bits which are transformed to the physical VCI are transferred to all the 64 CAM words. Thus, each CAM word compares a 22-bit associative key stored therein with 22 bits transferred from the logical VCI register. If its own associative key coincides with the transferred 22 bits, the CAM word externally outputs 6-bit associative data stored therein. If a noncoincidence is found, the CAM word outputs no data.

The 6-bit associative data output in this manner is sent to the physical VCI register, thus obtaining the physical VCI at that time.

When a data effective bit allocated in a register of each CAM word is not set, the corresponding CAM word does not perform associative processing. When all the 64 CAM words fail to perform associative processing, a message indicating this is displayed on an external device as an improper logical VCI. When transformation from the logical VCI to the physical VCI is unsuccessful, the RTA discharges an input cell having the corresponding logical VCI, and at the same time, the logical VCI which fails to be transformed to the physical VCI is informed to the ILC Note that parity bits are added to the data effective flag, associative key, and associative data set in each CAM word If a parity error of, e.g., the data effective flag is found using the parity bit, a message indicating this is informed to the ILC by interrupt.

Figure 10A:
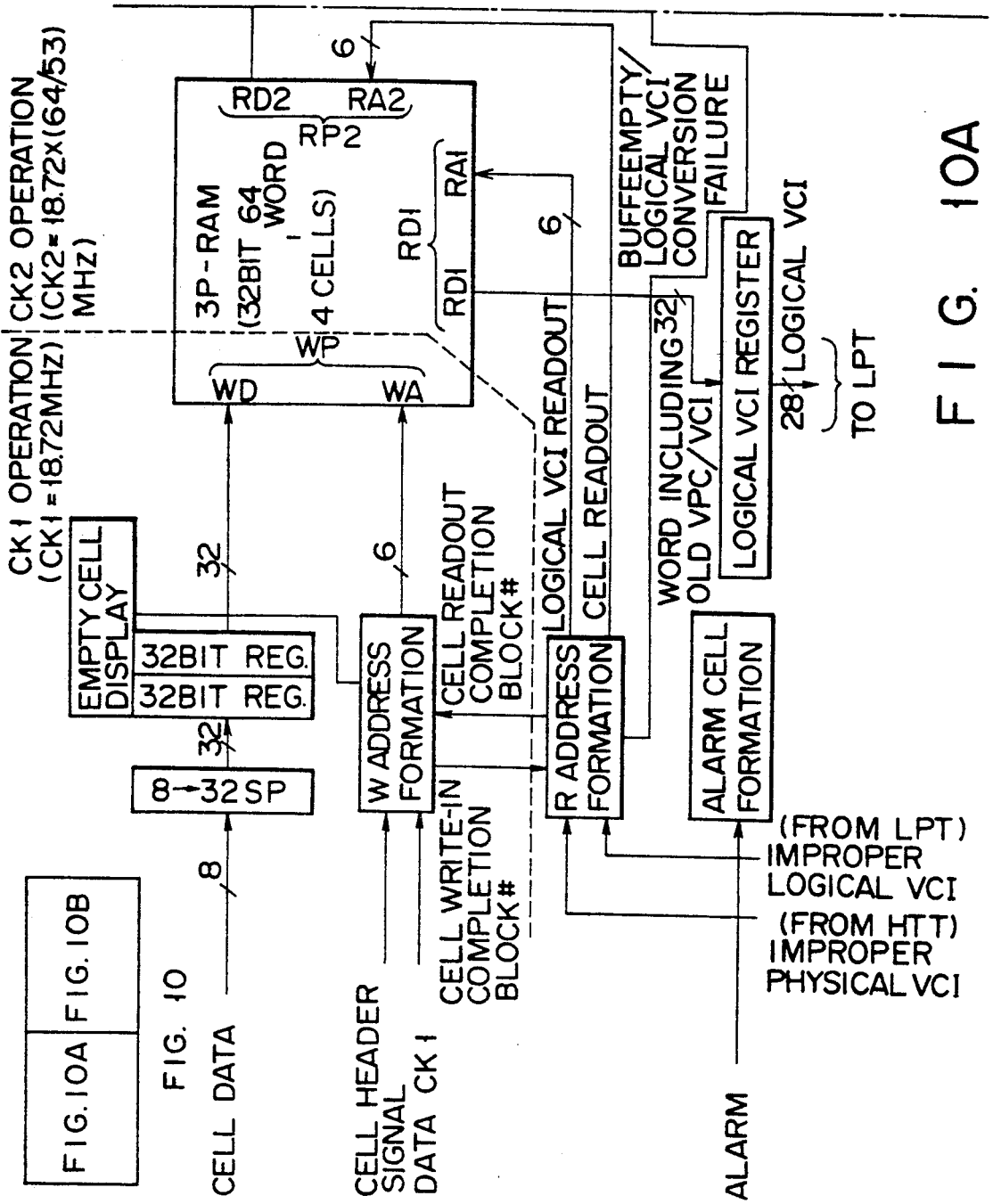
FIG. 10 includes FIGS. 10A and 10B positioned as shown and represents a diagram showing an arrangement of an RTA.
Figure 10B:
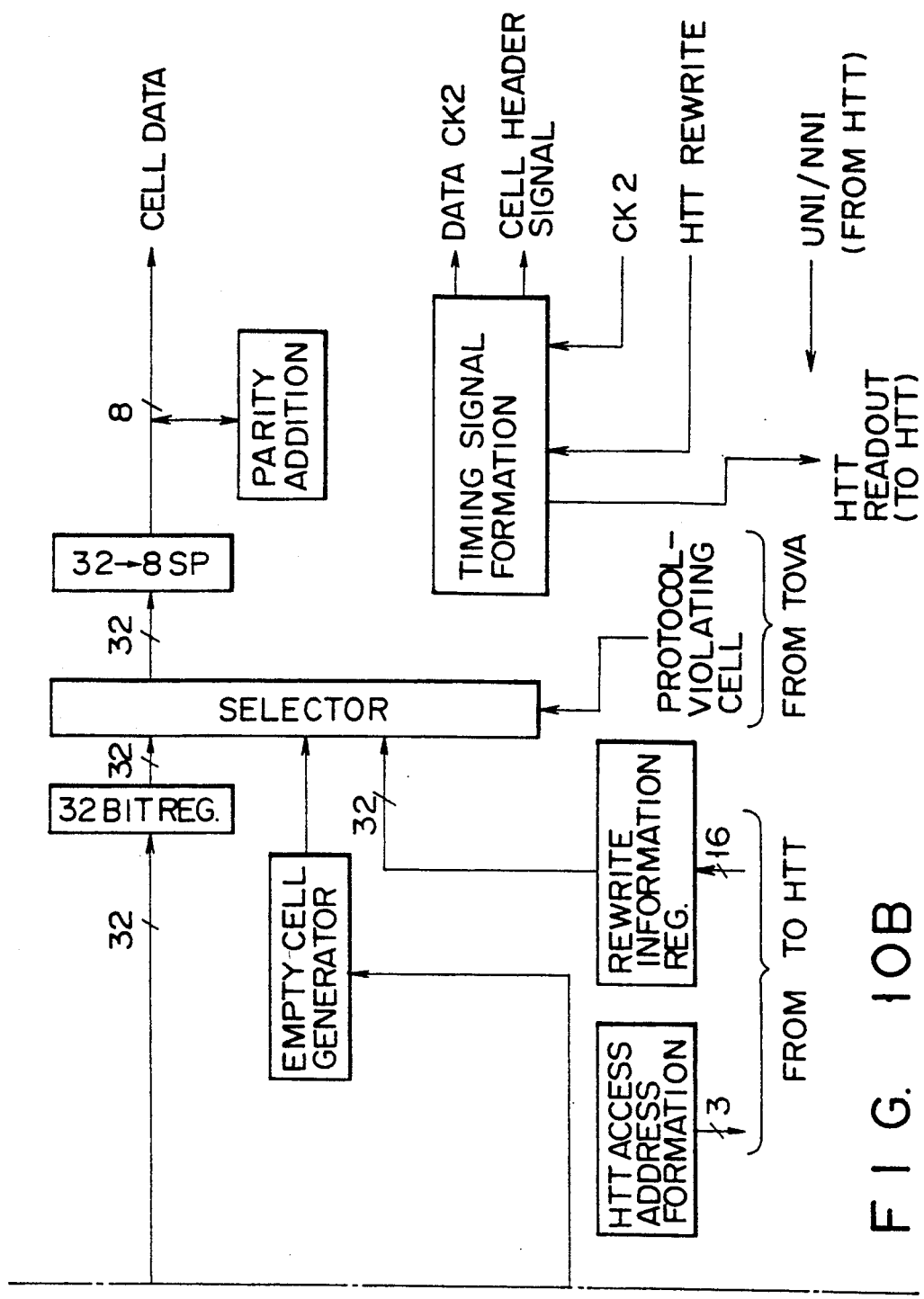

The RTA has an arrangement, as shown in FIGS. 10A and 10B.

As a storage area of a buffer necessary for cell length transformation as the most important function of the RTA, a 3P-RAM is used. The 3P-RAM is a 3-port RAM having one write port and two read ports, and has a storage capacity of 64 words (32 bits/word). These read/write ports can be asynchronously operated.

The storage area of the 3P-RAM is divided into four blocks each having one cell length, and block #. An operation between a cell input to the write port of the 3P-RAM is performed in synchronism with data CK1, and other operations are performed in synchronism with data CK2.

A cell input in synchronism with external data CK1 (18.72 MHz) is converted to have a 32-bit width by SP (serial/parallel conversion). The 32-bit data is written in the 3P-RAM from its write port (WP) via two 32-bit registers. A write block of the 3P-RAM is selected from an empty block list of a W address formation section, and write access is made in synchronism with the data CK1.

In this case, when an input cell is an empty cell, a cell write operation to the 3P-RAM is inhibited. In order to detect if an input cell is an empty cell, two 32-bit registers are arranged before the 3P-RAM. When a header portion of a cell is input to these two registers, it is checked based on the header portion if a cell which is being input is an empty cell, thereby determining whether or not the cell is input. After one cell is written, the block # of a block to which the cell is written is transferred to an R address formation section in a handshake manner.

The R address formation section which received the block # of the cell write-in completion block reads out a VPI/VCI of a cell stored in the block having the corresponding number (i.e., one work including it) using the read port 1 (RP1) of the 3P-RAM, and informs the VPI/VCI to the LPT as the logical VCI. In this manner, the LPT transforms the informed logical VCI into the physical VCI. Thereafter, the LPT informs the physical VCI to the HTT. The HTT makes a table access using the physical VCI, and informs, to the RTA, the following five pieces of information (1) to (5), which are exchanged when the corresponding cell is output.

(1) New VPI/new VCI; information for rewriting a VPI/VCI field of the cell (2) Routing tag; information for designating a path inside the ATMSW (3) SPA number; information indicating a number of an SPA which processes the corresponding signaling VC, and used in routing of a signaling cell in the SCSW (4) Delay class; information for designating a delay class of a cell (to be described layer), and used in delay class control in the OBUF (5) Shaping channel number (VP shaping, VC shaping); information indicating a number of a leaky bucket in the CSH (to be described later), and used in shaping in the CSH The R address generating function of the RTA is realized in such a manner that read access of a cell stored in a block having the next block # from the read port 2 (RP2) is started, and the five pieces of information informed from the HTT as described above are merged with data which is being read out from the RP2 using a selector, thereby format-converting data into a cell having a format which can be transferred to the following function elements.

In this case, a VPI rewrite position is changed in accordance with UNI/NNI informed from the HTT. More specifically, when the NNI is designated, 12 bits are rewritten as a VPI, and when the UNI is designated, 8 bits excluding a GFC field are rewritten. With this processing, a case wherein a UNI/NNI cell flow passes one RTA is coped with.

In this case, information indicating whether or not the corresponding cell is input while exceeding a predetermined VC capacity is informed from the TOVA, and a violation tag is added to the cell which is being output. When transformation from the logical VCI to the physical VCI is unsuccessful in the LPT, or when access to various kinds of information using the physical VCI is unsuccessful in the HTT, i.e., when a lookup operation is performed for an entry for which no information is set, information indicating an improper logical VCI is informed from the LPT, and information indicating an improper physical VCI is informed from the HTT. Upon reception of the improper logical or physical VCI message, an empty cell is output in place of a cell to be format-converted, and the cell is discarded from the RTA. In this case, the block # of the block which stores the corresponding cell is transferred to the W address formation section as a cell readout completion block #. Thereafter, a parity addition section adds a parity bit to a cell which is format-converted as described above, and the cell is output.

Note that the R address formation section transfers the block # of an empty block to the W address formation section in a handshake manner upon completion of the cell output operation. The VPI/VCI read operation from the RP1 and cell read/output operation from the RP2 are executed in a pipeline manner.

As for formation of an alarm cell, an alarm cell is formed based on routing tags registered in all the entries of the HTT and a new VPI/VCI upon an instruction from the ILC, and is externally output. The necessity of this function will be described in detail later.

Cell format for the RTA will be described below in detail. In the following description, a cell standardized as a UNI/NNI will be referred to as a UNI/NNI cell hereinafter, and a cell obtained by adding additional information to the UNI/NNI cell to enable switching by the ATMSW will be referred to as an SW cell hereinafter.

Figure 11:
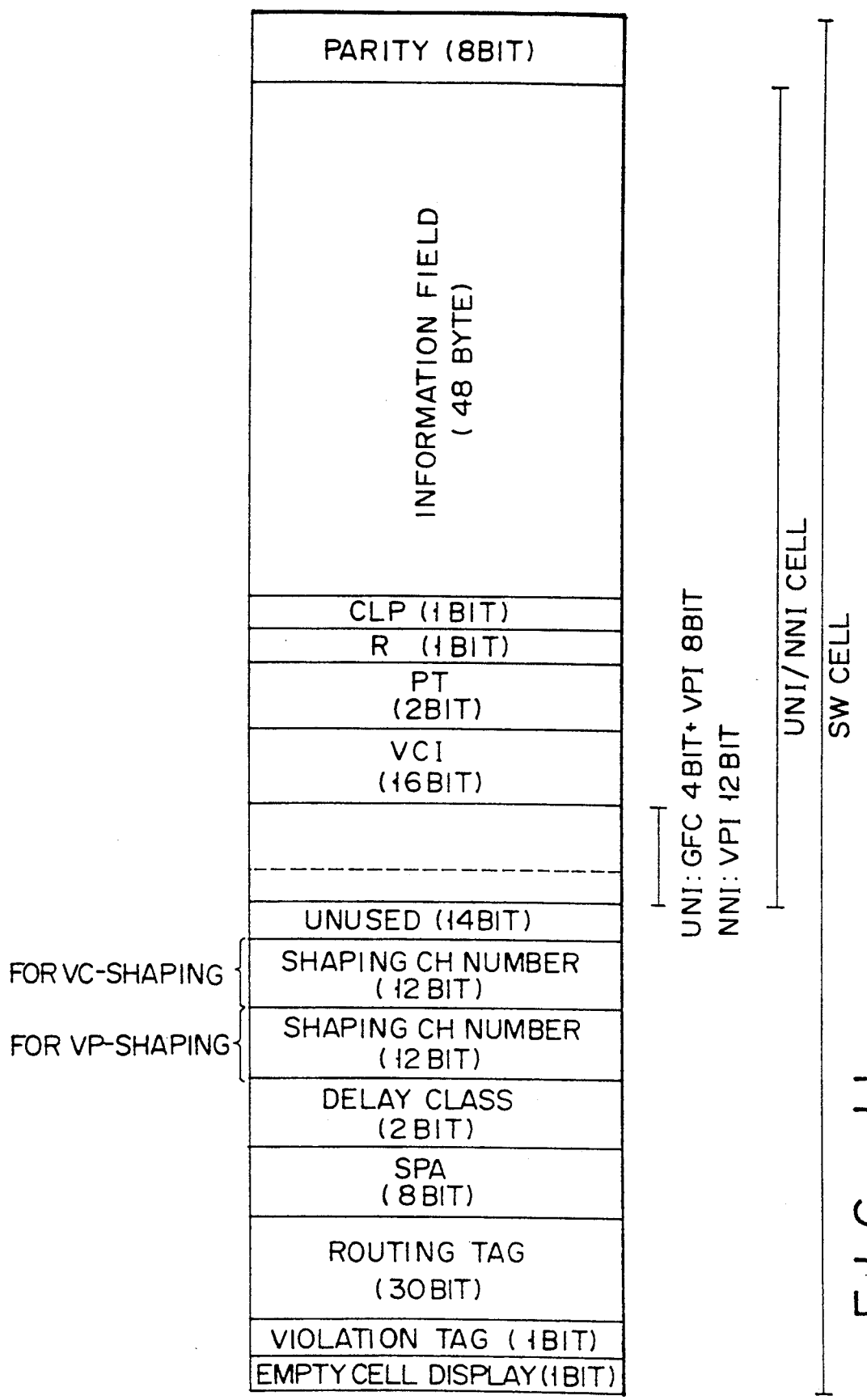
FIG. 11 shows formats of a UNI/NNI cell and an SW cell.

FIG. 11 shows formats of the UNI/NNI cell and the SW cell.

The SW cell is formed by adding a total of 11 bytes of additional information to the UNI/NNI cell, the SW cell being a cell having a format capable of switching by the ATMSW. The additional information includes:

(1) Empty cell display; This additional information is a bit indicating whether the following 511 bits correspond to an empty cell. Since an interface between function elements includes VPI/VCI/PT fields, this bit is not necessary in practice. However, in this case, the bit is added to facilitate the following empty cell detection.

(2) Violation tag; This additional information is a bit indicating whether or not the corresponding cell is input while exceeding the predetermined VC capacity. In this system, since a cell which is determined to exceed the predetermined capacity as a result of polishing is immediately discarded, this bit is not necessary in practice. However, in order to concentrate cell discard points to the IBUF, and to easily supply information associated with discarded cells to a control processor, the RTA does not discard cells. This bit is set for this particular purpose.

(3) Routing tag; This information is a field for designating a path of the corresponding cell in the ATMSW. In a 1024×1024 ATMSW, since one stage requires 3 bits, a necessary routing tag length is a total of 27 bits, and hence, 30 bits are prepared in this system.

(4) SPA#; This information is information for dispersing loads of call processing by passing the cell through the SCSW after it passes through the ATMSW when the corresponding cell is a signaling cell. The SPA# is the number of an SPA for processing the signaling cell, and is used in routing in the SCSW.

(5) Delay class; This information is a field for designating a delay class to which the corresponding cell belongs, and is used in delay class control in the OBUF.

(6) Shaping channel number (VP shaping/VC shaping); This information is information for designating the number of a leaky bucket which observes the corresponding cell when the cell is subjected to shaping.

(7) Unused field; This information is a field for storing information necessary when a certain cell unit protocol runs in the node system in future, e.g., when a cell is copied in the ATMSW. In this case, for example, 14 bits are assigned.

Figure 12:
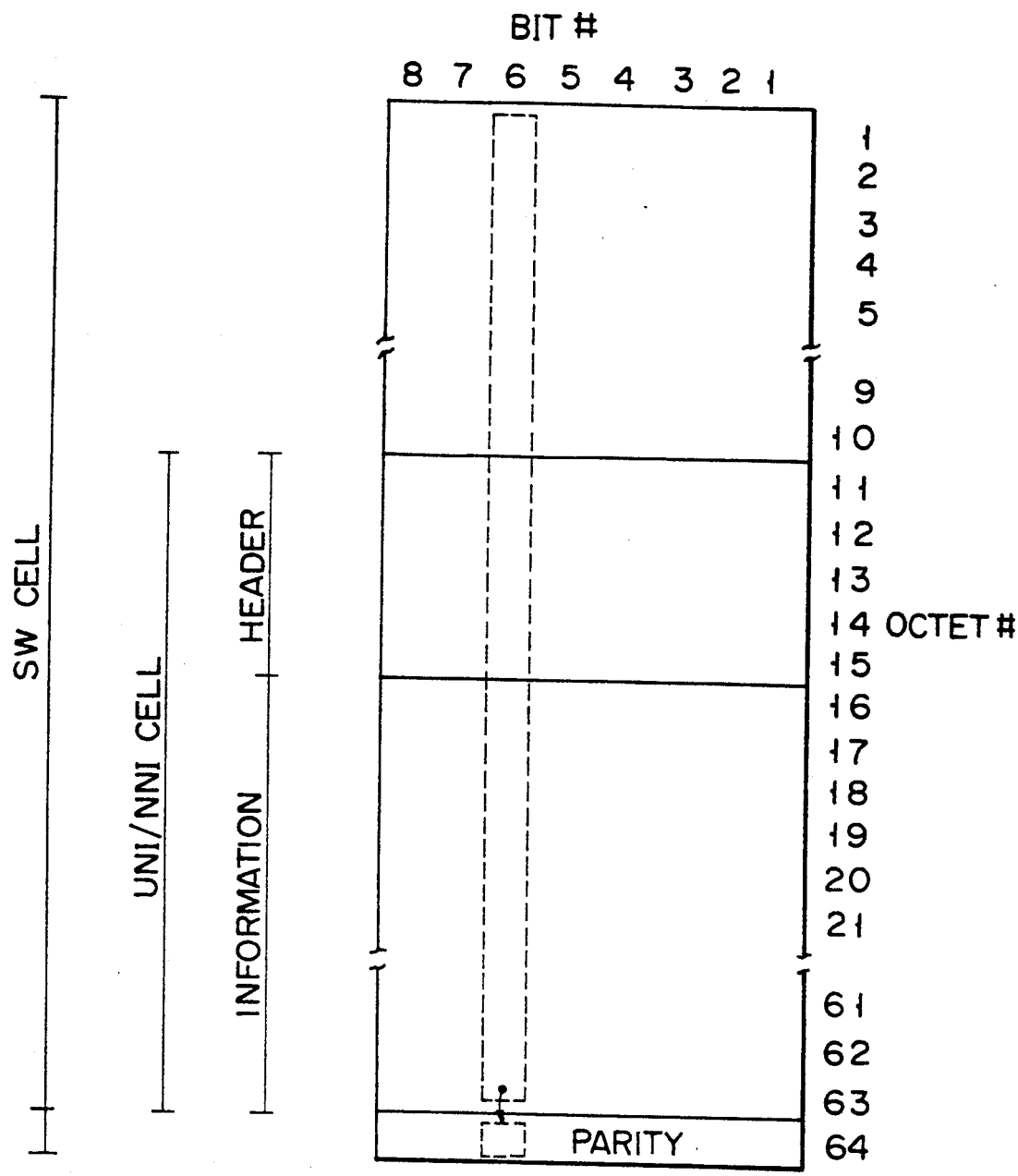
FIG. 12 shows parities in the SW cell.

(8) Parity; This parity is added to the last octet of the SW cell so as to detect an increase in bit error rate in a RTA-IBUF-ATMSW-OBUF-RTD path. As shown in, e.g., FIG. 12, this parity is formed by calculating an even parity for bits having the same bit number in the octets having octet #1 to #63 in the SW cell, and is added by assigning the parity calculated as described above in a bit having the same bit number in the octet #64.

An alarm cell automatic generating function provided to the VPI/VCI transformation & routing tag adding function will be described below.

For example, when an alarm cell is formed by, e.g., the ILC and is output through the OMDI to two end points of a VC connection passing through a cell processing function in trouble, a considerable time is inevitably required. For example, since a maximum of 4,096 VC connections pass through each cell processing function, even if the ILC can output an alarm cell at 256 Kbps, a maximum of about 8 seconds are required until the ILC outputs the alarm cell to one end point of each of all the VC connections. Therefore, an alarm cell must be automatically generated somewhere.

Since the RTA can easily recognize a VC connection passing therethrough by the HTT, an alarm cell automatic generating function can be assembled in the RTA. An alarm cell must be generated toward not only a VC connection terminal end point for outputting a cell but also a VC connection terminal end point for inputting a cell.

If an alarm cell generated toward the VC connection terminal end point for outputting a cell is input to the VC connection at a trouble-free point closest to a trouble point in the VC connection, it can be automatically transferred to the VC connection terminal end point for outputting a cell.

On the other hand, a VC connection does not have a cell transfer function toward its connection terminal end point for inputting a cell. Therefore, an alarm cell must be transferred via the same cell processing function as the VC connection in trouble using a VC connection having an opposite cell flow direction. For this reason, when VC connections are set, VC connections for transferring cells in the opposite direction must be set. In this case, even if VC connections having only one direction are to be set, those having the opposite flow direction must be set.

The alarm cell automatic generating function generates an alarm cell while setting the following three trouble levels.

Level 1; This level is set when a trouble such as an STM frame synchronization error or a cell synchronization error in the former stage (FDA, CSD, OMDI) in the RTA is detected.

Level 2; This level is set when a trouble of the entire cell processing function, e.g., ILC-down, disconnection of a power supply of the cell processing function, a receiving off state in the RTD, or the like occurs.

Level 3; This level expresses a trouble of the entire node, e.g., some problem in the supervision controller, disconnection of an intra-node communication optical link, or the like.

Figure 13:
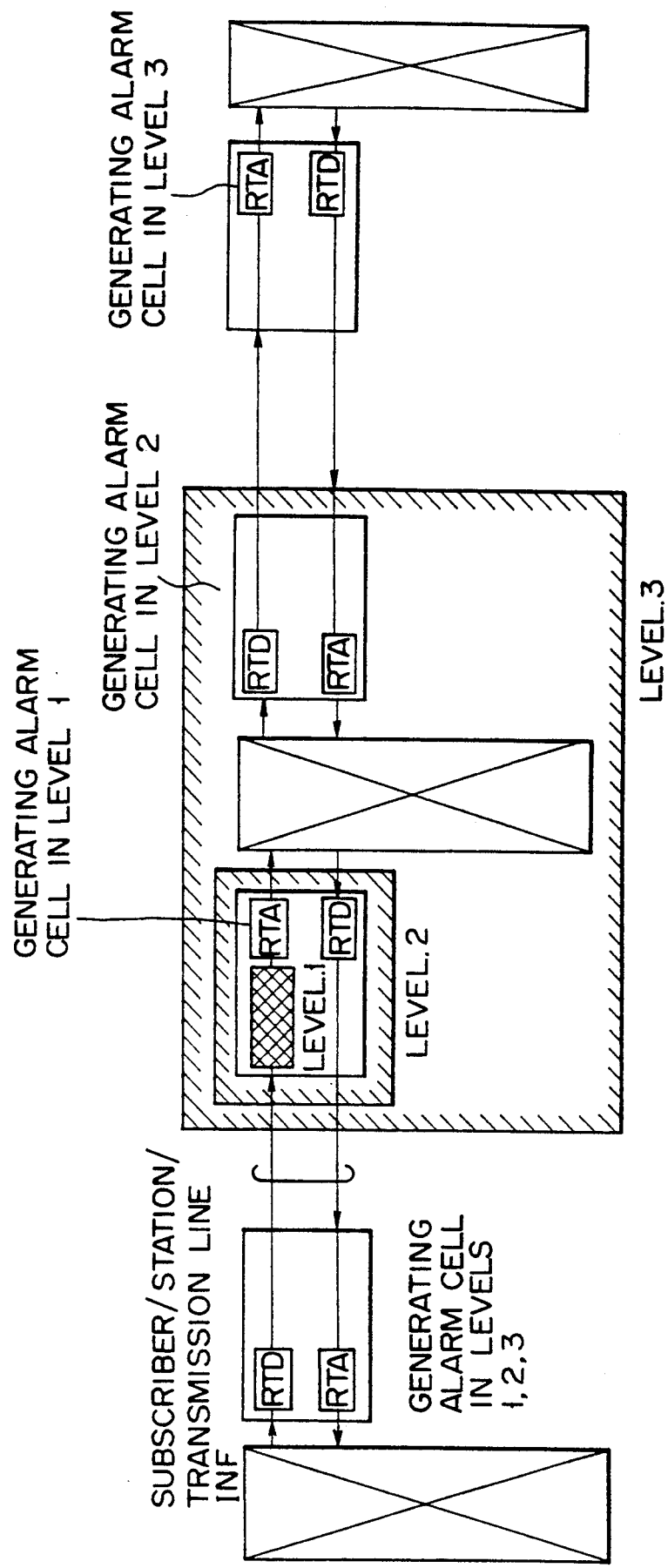
FIG. 13 is a view showing alarm cell generating portions according to trouble levels.

FIG. 13 is a view showing the relationship between troubles at the above-mentioned levels, and portions for automatically generating alarm cells according to the trouble levels.

As shown in FIG. 13, alarm cell generating portions toward VC connection terminal end points for outputting a cell vary depending on the trouble levels. More specifically, when a trouble at level 1 occurs, the RTA whose former stage malfunctions generates an alarm cell. When a trouble at level 2 occurs, an RTD in a cell processing function which receives a cell from the cell processing function in trouble via the ATMSW generates an alarm cell. When a trouble at level 3 occurs, an RTA in a cell processing function opposing a node system in trouble generates an alarm cell.

On the other hand, alarm cells toward VC connection terminal end points for inputting a cell are generated by an RTA in a cell processing function opposing the cell processing function in trouble via a communication path.

This RTA generates alarm cells as follows. More specifically, the RTA sequentially generates alarm cells having new VPIs/VCIs set in the HTT in their header field. Such generation of the alarm cells can be realized by sequentially reading out new VPIs/new VCIs, and routing tags from the HTT, and causing the RTA to form SW cells using these data On the other hand, the RTD generates alarm cells as follows. More specifically, module number, which is information indicating cell processing function from which cell flow is to be received, is stored in units of new VPI/new VCI. When a trouble occurs in a given cell processing function, the corresponding module number is informed to all the trouble-free cell processing functions. Each trouble-free cell processing function detects a VC connection to which alarm cells must flow on the basis of the informed module number, and flows alarm cells through the VC connection. This processing can be realized in such a manner that a table from which a cell processing function number can be searched based on new VPI/new VCI numbers is sequentially searched, and if the informed module number is written in the table, an alarm cell having a VPI/VCI number obtained from the table in its header portion is formed and output.

In order to decrease the number of hardware components, the VPI/VCI as the logical VCI is transformed into the physical VCI, and table look-up of the HTT is performed using the VCI, as described above. Therefore, the alarm cell generating function in the RTD also requires a transformation function from the logical VCI to the physical VCI.

However, as for a shaping channel number for VP shaping or VC shaping in the SW cell, since leaky buckets are prepared in correspondence with the number of simultaneously connected lines, they can be regarded as a kind of physical VCIs at the output port of the ATMSW. Therefore, when an alarm cell generation table is arranged to output a new VCI, a new VPI, and a module number on the basis of the shaping channel number, the above-mentioned alarm cell generating algorithm can be directly used.

Note that an alarm cell can be distinguished from other cells using, e.g., a PT field, or by using a VPI unique to the alarm cell. Similarly, when an alarm cell toward a VC connection terminal end point for outputting a cell must be distinguished from an alarm cell toward a VC connection terminal end point for inputting a cell, a bit for designating this can be set in an information field or a PT field of the cell.

The above-mentioned HTT is arranged and operated as follows.

Figure 14:
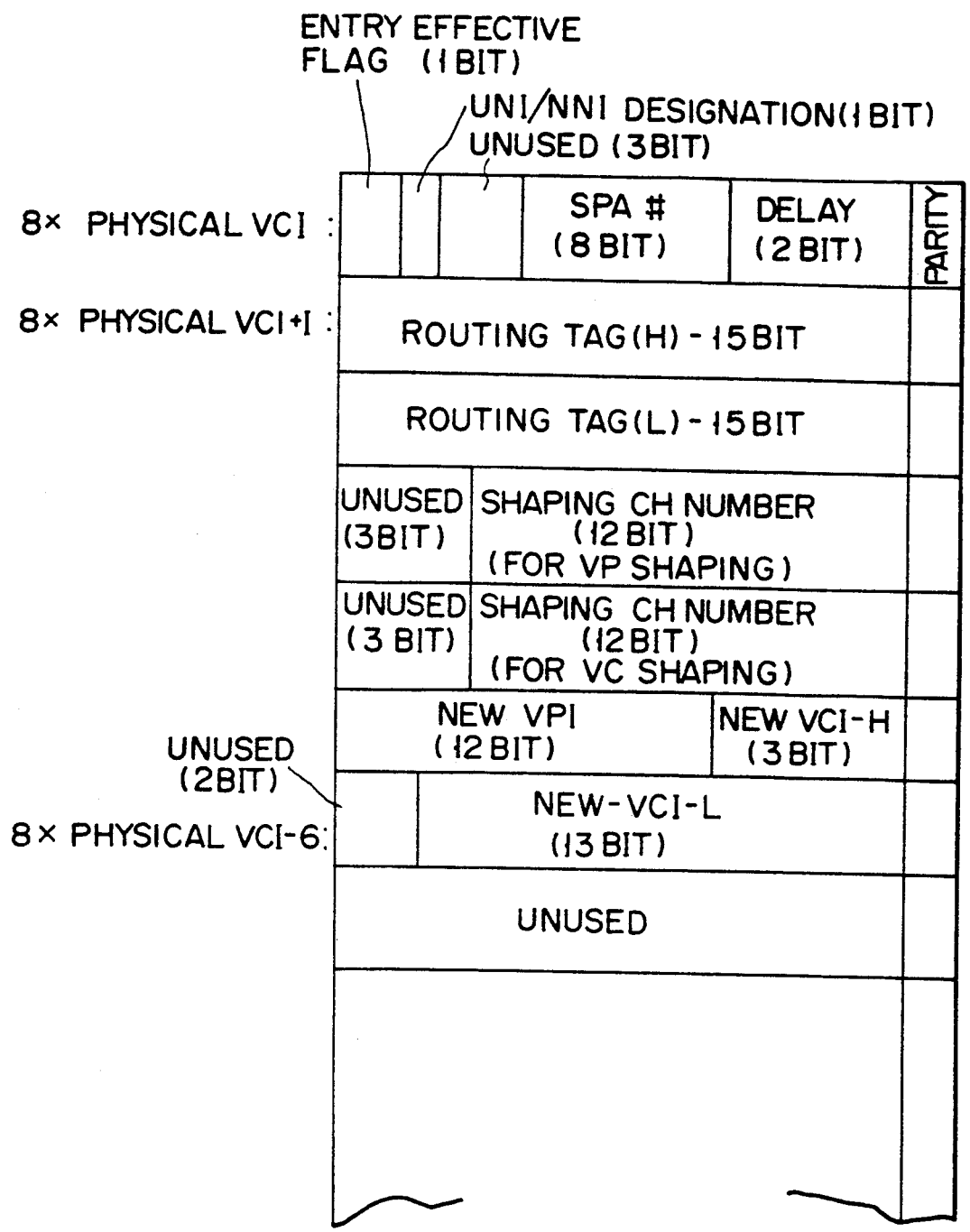
FIG. 14 shows an address map of an additional information table in an HTT.

The transformation tables from a physical VCI to a new VPI/new VCI and various kinds of additional information, and the additional information table in the HTT are realized by a 32-K word static RAM array (16 bits=1 word). FIG. 14 shows an address map of the additional information table. This additional information table is realized as a structure having an entry of 128-bit length for each of 4K physical VCIs, and the entry is divided into the following fields.

(1) Entry effective flag (1 bit); The flag in this field is set when a new VPI/new VCI/additional information effective for the corresponding entry is set, and is reset by the ILC when the system is reset.

(2) SPA number (8 bits); When the corresponding cell is a signaling cell, this field stores a number of an SPA for processing the corresponding cell. Whether this information corresponds to a signaling cell or a user cell is identified by a routing tag, and is used in routing of a signaling cell in the SCSW.

(3) Delay class (2 bits); This field stores a delay class to which the corresponding cell belongs, and is used in delay control in the OBUF.

(4) Routing tag field (30 bits, divided into 15 bits each); This field stores a routing tag added to a cell which is input to have an old VPI/VCI value corresponding to an entry.

(5) Shaping channel number (12 bits each for VP/VC shaping); This field is used in shaping in the CSH at the output port side of the ATMSW, and is also used in alarm cell generation by the RTD. Information in this field may be replaced with, e.g., a physical VCI at the output side of the ATMSW. However, in view of a decrease in the number of hardware components of the CSH and a decrease in the number of tables to be managed by the ILC, this information is set to have the above-mentioned additional information.

(6) New VPI field (12 bits; upper 4 bits are ignored when it corresponds to a UNI cell); This field stores a VPI (new VPI) on an output-side transmission path of a cell corresponding to an entry.

New VCI field (16 bits); This field stores a VCI (new VCI) on an output-side transmission path of a cell corresponding to an entry.

(7) UNI/NNI designation (1 bit); This field stores information for changing a VPI rewrite position for the RTA depending on the UNI/NNI.

Parity bits are assigned to the respective words of the additional information table having the above-mentioned architecture. These parity bits are even parity bits, are set by the ILC, and are checked when the corresponding words are read out from the static RAM array.

FIG. 15 shows a schematic arrangement of the HTT having the above-mentioned additional information table.

The HTT comprises the above-mentioned additional information table, and two access ports allowing accesses to the additional information table from the RTA and the ILC.

The access port for the RTA receives a physical VCI from the LPT, and a 3-bit address for designating a word in an entry from the RTA. The HTT reads out one word from the RAM array using the input information as an address, and supplies the readout word to the RTA. In addition, the HTT calculates an even parity of the word, and checks a coincidence with the parity bit. Furthermore, the HTT checks an entry effective flag in the entry corresponding to the physical VCI supplied from the RTA. In this case, if the entry effective flag is not set, the HTT determines an improper physical VCI, and informs this to the RTA. Moreover, the HTT supplies the physical VCI at that time to the ILC. At this time, the rewrite position of the RTA is designated according to the content of the UNI/NNI designation flag. Improper physical VCI information makes RTA discard the input cell as described above.

On the other hand, the access port for the ILC serves to make the RAM array look like the memory area of the ILC. The ILC executes read/write access of words using addresses assigned in units of words.

An access request from the ILC and an access request from the RTA must be arbitrated therebetween, so that HTT readout signal of RTA and ILC access signal are used.

Observation information in each of the RTA, LPT, and HTT is set as follows.

(1) Observation control information in the RTA; Based on this information, an alarm cell generation instruction, and an HTT rewriting display are made.

(2) LPT; This information instructs an associative key and associative data in a CAM word, and informs a parity error in the CAM word. In this case, a CAM word number causing the parity error is also informed to the ILC. In addition, improper logical VCI information is also informed to the ILC together with a logical VCI serving as an associative key. Improper logical VCI information makes RTA discard the input cell as described above.

(3) HTT; This information indicates information in each field in the additional information table, and an addition information table parity error. In this case, a physical VCI accessing the additional information table is also informed to the ILC. In addition, improper physical VCI information is also informed to the ILC together with a logical VCI accessing the additional information table.

Methods of using these pieces of information are as described above.

A cell flow observation/cell discard control/polishing function will be explained below.

The cell flow observation/cell discard control/polishing function is realized as a function supported by the TOVA (Traffic Observation/Violation Tag Adder) and the IBUF (Input Buffer) of the general arrangement of the above-mentioned cell processing function. Note that the IBUF executes speed conversion of a cell flow in addition to the cell flow observation/cell discard control/polishing function. The mounting position of the polishing function corresponds to an input-side terminal end point of a VC connection. More specifically, the polishing function is assembled in a subscriber's side input point of the cell processing function accommodating a $T_B$ point such as an input side from the transmission path of the BUNI.

The cell flow observation/cell discard control/polishing function can provide the following functions.

When the RTA is executing the cell format transformation, the LPT supplies a physical VCI to the TOVA simultaneously with the HTT. The TOVA observes a cell flow in accordance with the supplied physical VCI, and detects a passing traffic amount in units of VCs. When the passing traffic amount exceeds a preset value, this is informed to the RTA, and the corresponding cell is determined as a violation cell. Thus, [1] is set in a violation tag field of an SW cell. In order to confirm an operation of the TOVA, a cell which is designated as a physical layer/ATM layer OAM cell by a PT field also serves as an object in traffic observation.

The IBUF executes cell discard control according to a predetermined algorithm. Cell discard class is treated in only the IBUF. The cell discard control handles cells to be discarded when a new cell is input in an IBUF full state. Note that when a cell determined as a violation cell by the TOVA is discarded, the cell discard control serves as polishing control.

In this case, a problem of which of a cell determined as a violation cell by the TOVA, and a cell which is defined as a cell to be easily discarded by the CLP is preferentially discarded, is posed. However, a cell which is designated as a physical layer/ATM layer OAM cell by a PT field must be avoided from being discarded if possible. In this case, as described above, the violation cell is immediately discarded, and other cells are subjected to 3-class discard class control for gradually making it difficult to discharge cells in the order of, e.g., OAM cells, cells other than OAM cells and having CLP=0, and cells other than OAM cells and having CLP=1. If the violation cell to be immediately discarded is included, a total of four-class discard-class control is made.

The operation algorithm of the cell flow observation function is realized as follows.

As described above, the cell flow observation 5 function is supported by the TOVA, and the TOVA not only counts the number of passing cells in units of VCs as a network management parameter, but also observes the following polishing parameters. More specifically, traffic characteristics determined by VCs include a peak rate and an average rate. The detailed parameters of the traffic characteristics determined by the VCs are defined as follows, and these parameters can be set for each VC.

(1) Peak rate; defined as a minimum cell arrival time interval T0.

(2) Average rate; A predetermined time interval T1 (defined as a period for observing an average rate) is assumed to be longer than the minimum cell arrival time interval T0, and the maximum number of arrival cells within the time interval T1 is defined as N1.

These parameters are observed by the following algorithm based on leaky buckets. As for the peak rate, peak rate observation leaky bucket counter provided for each VC is incremented by one upon arrival of cells, and is decremented by one at the T0 period. When the value of the counter is 0 upon decrementing of the counter, no further decrement operation is performed. A cell arrived when the value of the counter exceeds Th is determined as a violation cell, and its peak rate is observed.

As for the average rate, average rate observation leaky bucket counter provided for each VC is incremented by one upon arrival of cells, and is decremented by one at a [T1/N1] period. However, when the value of the counter is 0, no further decrement operation is performed. When cells arrive with no violation against the traffic characteristics, the value of the counter may be maximized, for example, when N1 cells continuously arrive at a peak rate. In this case, the value of the counter becomes a maximum of: $N1(1 - T0N1/T1)$.

Therefore, when the value of the counter exceeds this value upon arrival of a cell, the arrived cell is detected as a violation cell, and an average rate is observed based on this cell.

When a violation is determined in either of peak rate observation or average rate observation, this is informed to the RTA. The RTA, which is informed that a presently passing cell is a violation cell, sets a violation tag field of the cell to be [1].

Figure 16A:
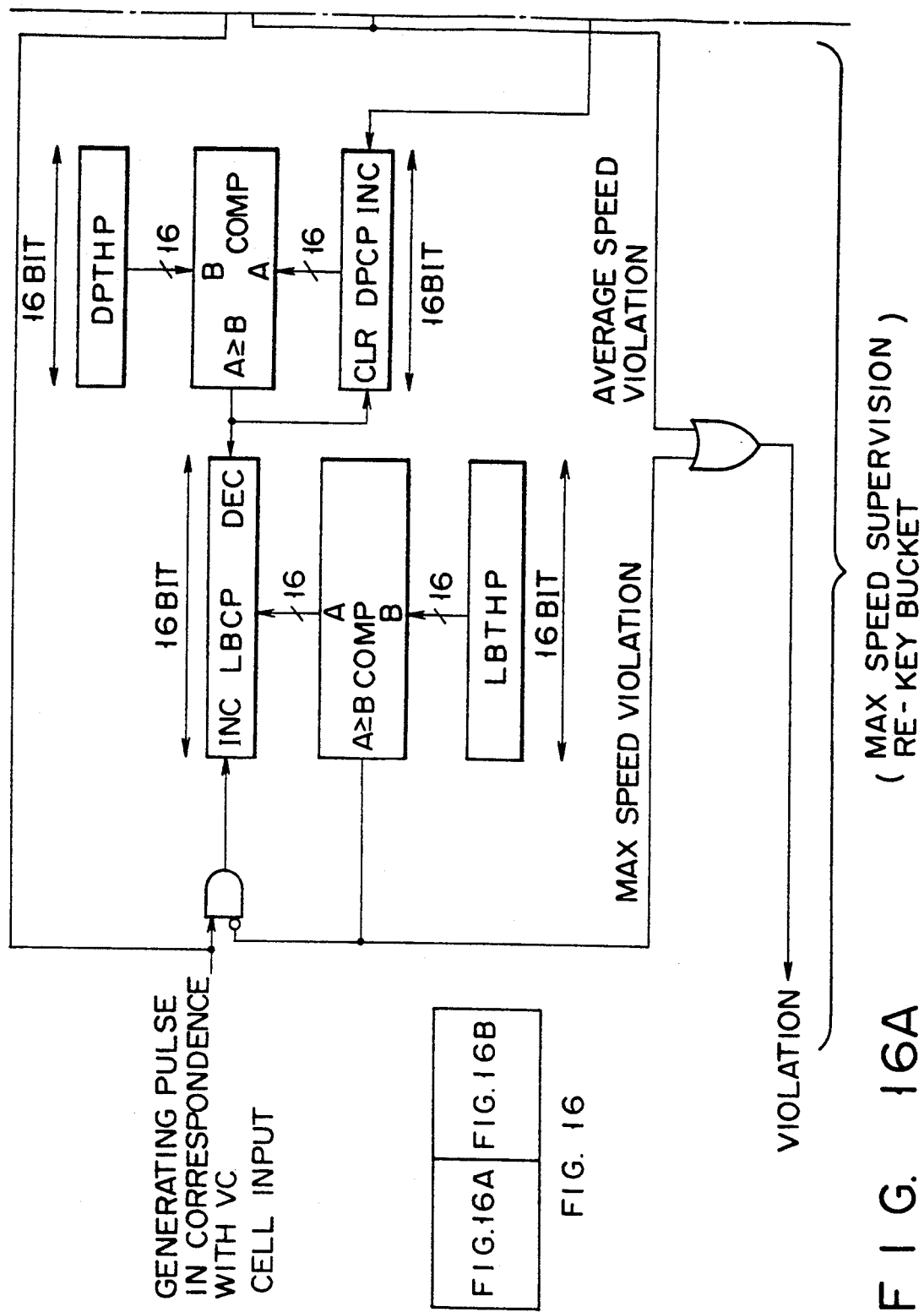
FIG. 16 includes FIGS. 16A and 16B positioned as shown and represents a diagram showing an arrangement of a polishing leaky bucket.
Figure 16B:
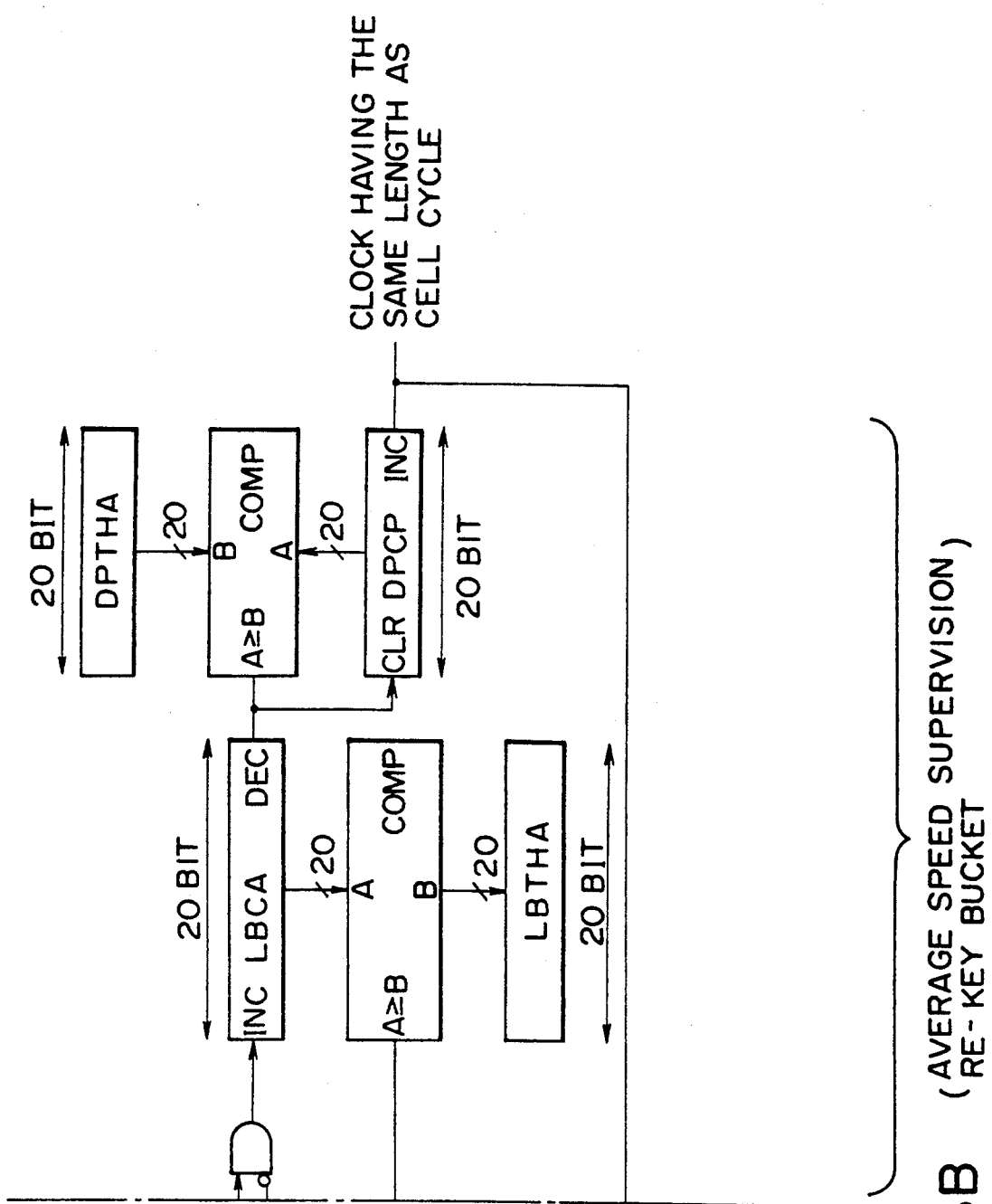

The above-mentioned cell flow observation algorithm is realized as a basic arrangement of leaky buckets used in observation of polishing parameters in the TOVA, as shown in, e.g., FIGS. 16A and 16B. This algorithm requires peak rate observation leaky buckets and average rate observation leaky bucket for each VC, and is realized by constituting these leaky buckets using the following four types of registers.

(1) LBC (Leaky bucket Counter); a counter capable of being incremented/decremented by one upon input of a cell and given time period (2) LBTH (Leaky bucket Threshold Register); a register for holding a threshold value for determining that a cell violating an observed parameter is input when the LBC value exceeds the threshold value (3) DPC (Decrement Period Counter); a counter for measuring a time period from when the LBC is decremented to the present time (4) DPTH (Decrement Period Threshold Register) a register for holding a value stored in the DPC when the LBC is decremented.

These registers are respectively arranged as registers (LBCP, LBTHP, DPCP, DPTHP) for observing a peak rate, and those (LBCA, LBTHA, DPCA, DPTHA) for observing an average rate.

A period, determined based on the minimum cell arrival time interval T0, for decrementing the LBCP by one is set in the DPTHP for every cell period. The DPCP is incremented by one for every cell period, and is cleared when its value reaches a value set in the DPTHP. Every time the DPCP is cleared, the LBCP is decremented by one.

The LBCP is incremented by one every time a cell arrives. The LBTHP is set with a threshold value for determining a violation cell determined by the above control strategy. Before the LBCP is incremented, the value of the LBCP is compared with a value held in the LBTHP. When the value of the LBCP is larger than the value of the LBTHP, a cell which is being input is determined as a violation cell. When it is determined that the cell which is being input is a violation cell, the LBCP is no longer incremented. When an increment operation of the LBCP collides against its decrement operation, the increment operation is performed first, and thereafter, the decrement operation is performed.

The DPTHA is set with a period, determined based on a predetermined value [T1/N1 T0], for decrementing the LBCA by one for every cell period. The DPCA is a counter incremented by one for every cell period, and is cleared when its value reaches a value set in the DPTHA. Every time the DPCA is cleared, the LBCA is decremented by one.

In contrast to this, the LBCA is incremented by one every time a cell arrives. The LBTHA is set with a threshold value for determining a violation cell determined by the control strategy like in the LBTHP. Before the LBCA is incremented, the value of the LBCA is compared with a value held in the LBTHA. When the value of the LBCA is equal to or larger than the value of the LBTHA, a cell which is being input is determined as a violation cell. When it is determined that the cell which is being input is a violation cell, the LBCA is no longer incremented. When an increment operation of the LBCA collides against its decrement operation, the increment operation is performed first, and thereafter, the decrement operation is performed.

The lengths of these registers used in observation of the UNI/NNI are basically determined based on the periods which define the peak rate and the average rate. In this system, since the peak rate is defined as a period of about 100 mSec, and the average rate is defined as a period of about 1 Sec, the length of each peak rate observation register is determined to be 16 bits, and the length of each average rate observation register is defined to be 20 bits. In this case, 144-bit flip-flops are required for each VC. In this system, since the maximum number of simultaneously connected lines per link is 4,096, about 590-Kbit information per link is required to observe the polishing parameters.

When the TOVA simply comprising 4,096 circuit functions shown in FIGS. 16A and 16B is to be realized, 590-Kbit information necessary per link must be stored in, e.g., D-FFs of a CMOS gate array. Assuming that 8 gates (calculated in terms of 2-input NAND gates) of D-FFs of the CMOS gate array are required, about 5M gates are required to simply store information necessary for observation.

However, the number of effective gates in a gate array which can be presently available is about 50K gates. Therefore, in order to realize the cell flow observation function by a proper number of LSIs (several LSIs or less per link), an improvement in the degree of integration of the LSIs by one hundred times or more from the present level must be waited when the above-mentioned arrangement is employed.

In this system, information necessary for polishing is stored in the RAM. When 4,096 VPs are faithfully observed according to their definitions, the existing access time of the RAM becomes a bottleneck, and it is very difficult to realize it. More specifically, the DPCP and DPCA as the counters for generating the decrement periods of the LBCP and LBCA must be incremented for every cell period. The cell period is a time period necessary for transferring one cell, and more specifically, is about 2.7 $\mu$sec. Therefore, even if the DPCP and DPCA are allocated on different RAMs, a total of 8,096 read and write accesses must be generated to these RAMs in only decrement operations of the DPCs. This requires an access time of about 250 pSec to the RAMs. Note that an access time of a RAM having a capacity on the order of 100 Kbit is about 20 nSec. Therefore, when such a method is employed, an improvement in an access time by one hundred times or more as compared to the present level must be waited.

Therefore, in order to realize the above-mentioned cell flow observation function on hardware, a tradeoff point must be found out between the above two methods. As described above, a bottleneck in mounting is control of the decrement periods of the LBCP and LBCA.

In contrast to this, a VC which must control the decrement operations of the LBCP and LBCA for every cell period has a relatively short minimum cell arrival time interval T0, i.e., has a relatively high peak rate. More specifically, the VC can be considered as a VP having a minimum cell arrival time T0 of up to several hundreds of $\mu$ Sec, i.e., a peak rate of several Mbits. However, it is practically impossible to accommodate 4,096 VCs having such a peak rate in a single physical interface.

In this system, a polishing parameter observation section of the TOVA in a single physical interface is arranged on the basis of the following viewpoints, and an LSI having an existing degree of integration/speed is realized using a proper number of chips.

(1) Leaky buckets for high- and low-speed channels are classified into two groups. The decrement operations of the LBCP and LBCA are controlled at the cell period for the high-speed channel leaky buckets. On the other hand, the decrement operations of the LBCP and LBCA are controlled at a considerably long period for the low-speed channel leaky buckets.

As for the high-speed channel leaky buckets, the above-mentioned four types of registers are realized by D-FFs on a CMOS gate array. For example, leaky buckets for 32 channels are accommodated in a single LSI chip. On the other hand, the low-speed channel leaky buckets are realized as a combination of a high-speed RAM, an ALU, and two microsequencer. Note that a period for controlling the decrement operations of the LBCP and LBCA is set to be, e.g., a 1024-cell period according to an access time of an existing high-speed CMOS-RAM, and a speed of an ALU.

(2) Each VC is assigned to one of the leaky buckets. As for VCs accommodated at the input-side terminal end points of VC connections, 31 VCs having short minimum cell arrival time intervals T0 are observed by the above-mentioned high-speed channel leaky buckets. VCs having longer minimum cell arrival time intervals T0 than those of the 31, VCs are observed using the low-speed channel leaky buckets. The remaining one high-speed channel leaky bucket systematically observes all the VCs observed by the low-speed channel leaky buckets.

(3) The high-speed channel leaky buckets are operated according to the above-mentioned algorithm.

(4) In an operation of the low-speed channel leaky buckets, the increment operations of the LBCP and LBCA of the low-speed channel leaky buckets are performed every time a cell is output from the RTA. On the other hand, as for the decrement operations of the LBCP and LBCA, if a decrement operation is performed once per 1,024-cell period according to the definition, the decrement operations are simultaneously performed during the 1,024-cell period. A violation cell is determined according to the above-mentioned algorithm before the LBCA and LBCP are incremented.

A peak rate observation register for holding the number of decrement operations executed during the 1,024-cell period is called a VPD (Decrement Value, Peak), and an average rate observation register is called a DVA (Decrement Value, Average). The lengths of these registers are 7 bits. In this case, the lengths of the DPCP and the DPTHP can be shortened to 6 bits, and the lengths of the DPCA and DPTHA can be shortened to 10 bits.

As for the VCs observed by the low-speed channel leaky buckets, when the low-speed channel leaky buckets for observing the VCs determine a violation cell, or when the high-speed channel leaky bucket for systematically observing these leaky buckets determines a violation cell, it is determined that a cell which is being input is a violation cell.

When the LBCA and the LBCP are decremented by one at the 1,024-cell period, cells may arrive at offset timings beyond the given traffic characteristics. However, the number of minimum cell arrival time intervals TO of VCs to be observed by the low-speed channel leaky buckets is at most 32 (normally, it is still larger than 32), and the high-speed channel leaky bucket independently observes all the VCs to be observed by the low-speed channel leaky buckets, resulting in no influence in practical applications.

The TOVA realized in consideration of the above-mentioned respects will be explained below.

Figure 17A:
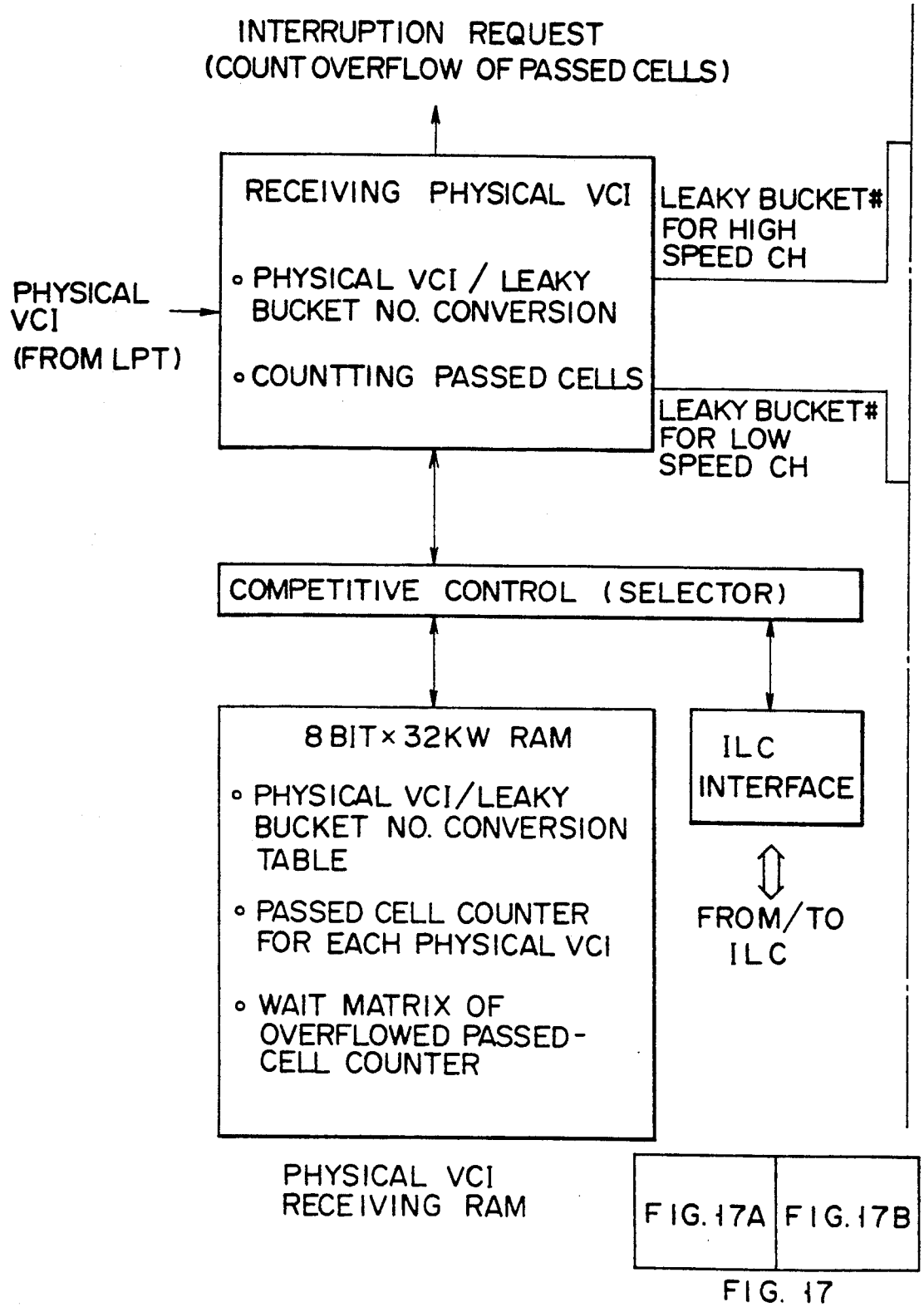
FIG. 17 includes FIGS. 17A and 17B positioned as shown and represents a diagram showing an arrangement of a TOVA.
Figure 17B:
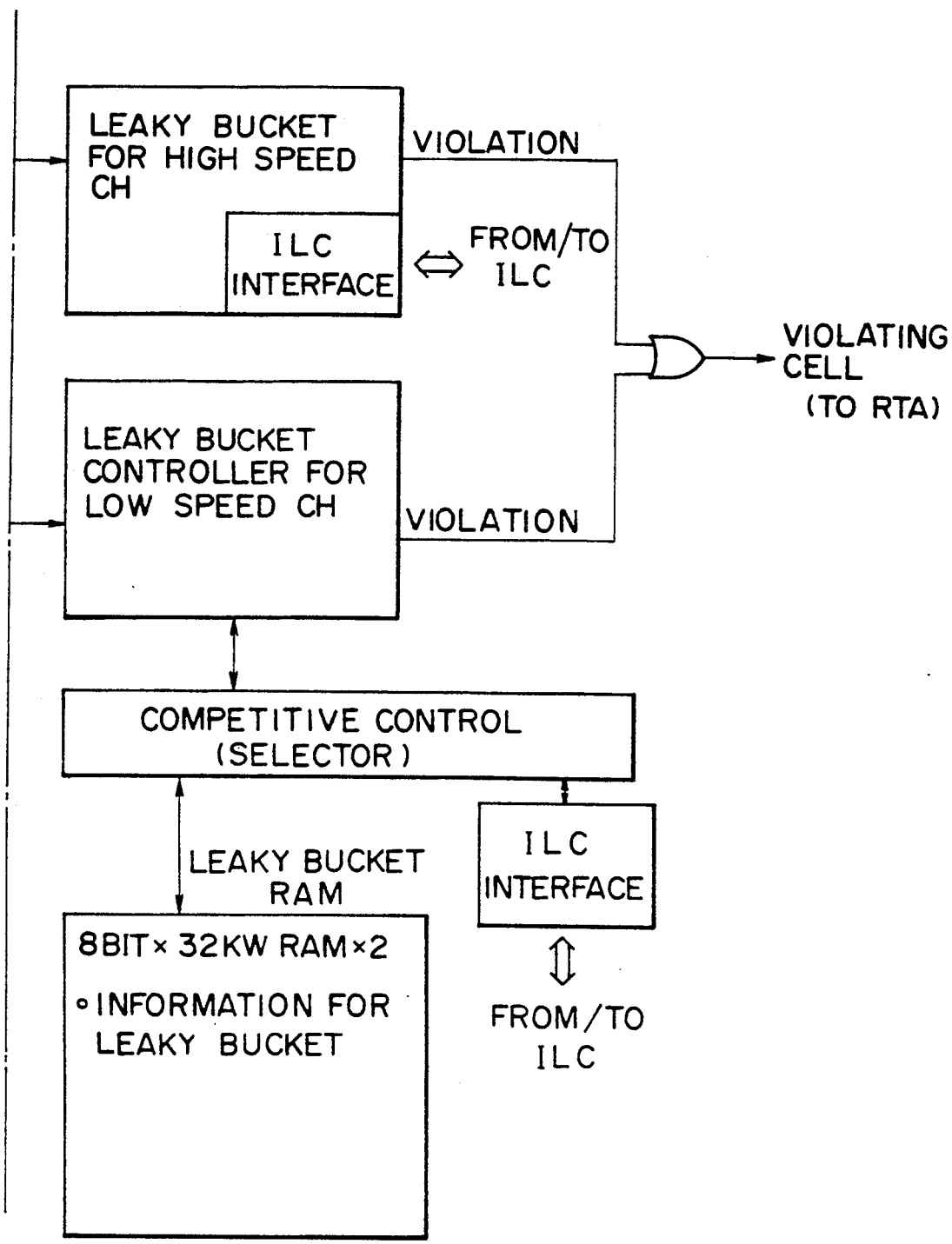

FIGS. 17A and 17B show the schematic arrangement of the TOVA. The TOVA shown in FIGS. 17A and 17B is realized to comprise a function of counting the number of passing cells for each VC in addition to the polishing parameter observation function. In this TOVA, a physical VCI supplied from the LPT is input to a physical VCI reception function. The physical VCI reception function obtains a number of a leaky bucket for observing the corresponding VC in accordance with information written in a RAM connected to the function element, and information written in a physical VCI reception RAM. At the same time, the value of a counter which holds the number of cells passing through the corresponding VC is read out from the physical VCI reception RAM, is incremented, and is written in the counter.

At this time, if the counter overflows, the received physical VCI is enqueued in an overflow physical VCI queue allocated in the physical VCI reception RAM in order to inform the overflow state to the ILC.

Leaky buckets respectively have leaky bucket numbers. Note that leaky bucket numbers [0] to [30] are assigned to high-speed channel leaky buckets, and leaky bucket numbers [31] to [4,095] are assigned to low-channel leaky buckets. Furthermore, a leaky bucket number [31] is assigned to a leaky bucket for systematically observing all the VCs to be observed by the low-speed leaky buckets. According to the leaky bucket assignment, the physical VCI reception function causes the high- or low-speed leaky bucket to increment its LBCP or LBCA by one according to the leaky bucket number as a result of table lookup. As a result of the increment operation, if a cell being output from the RTA is determined as a violation cell, a message indicating this is displayed on the RTA using a violation cell signal.

The high-speed channel leaky bucket is constituted by adding an ILC interface for performing accesses from the ILC to respective registers, and a decoder for selecting one of the 32 leaky buckets according to a leaky bucket number received from the physical VCI reception function to an arrangement obtained by simply connecting 32 circuit arrangements shown in FIG. 16. The low-speed channel leaky bucket is constituted by a leaky bucket RAM for holding information necessary for a leaky bucket operation, and a low-speed channel leaky bucket controller as a controller for realizing the leaky bucket operation on the RAM.

The physical VCI reception RAM and the leaky bucket RAM are realized to be seen from the ILC as if they were storage areas assigned to a memory area. For this reason, one of an access from the ILC interface, and an access from the physical VCI reception function or the low-speed channel leaky bucket controller is selected by a selector, and the selected access is supplied to these RAMs. When accesses from two directions collide or contend with each other, arbitration is made to cause, e.g., an access from the ILC side to wait.

Figure 18A:
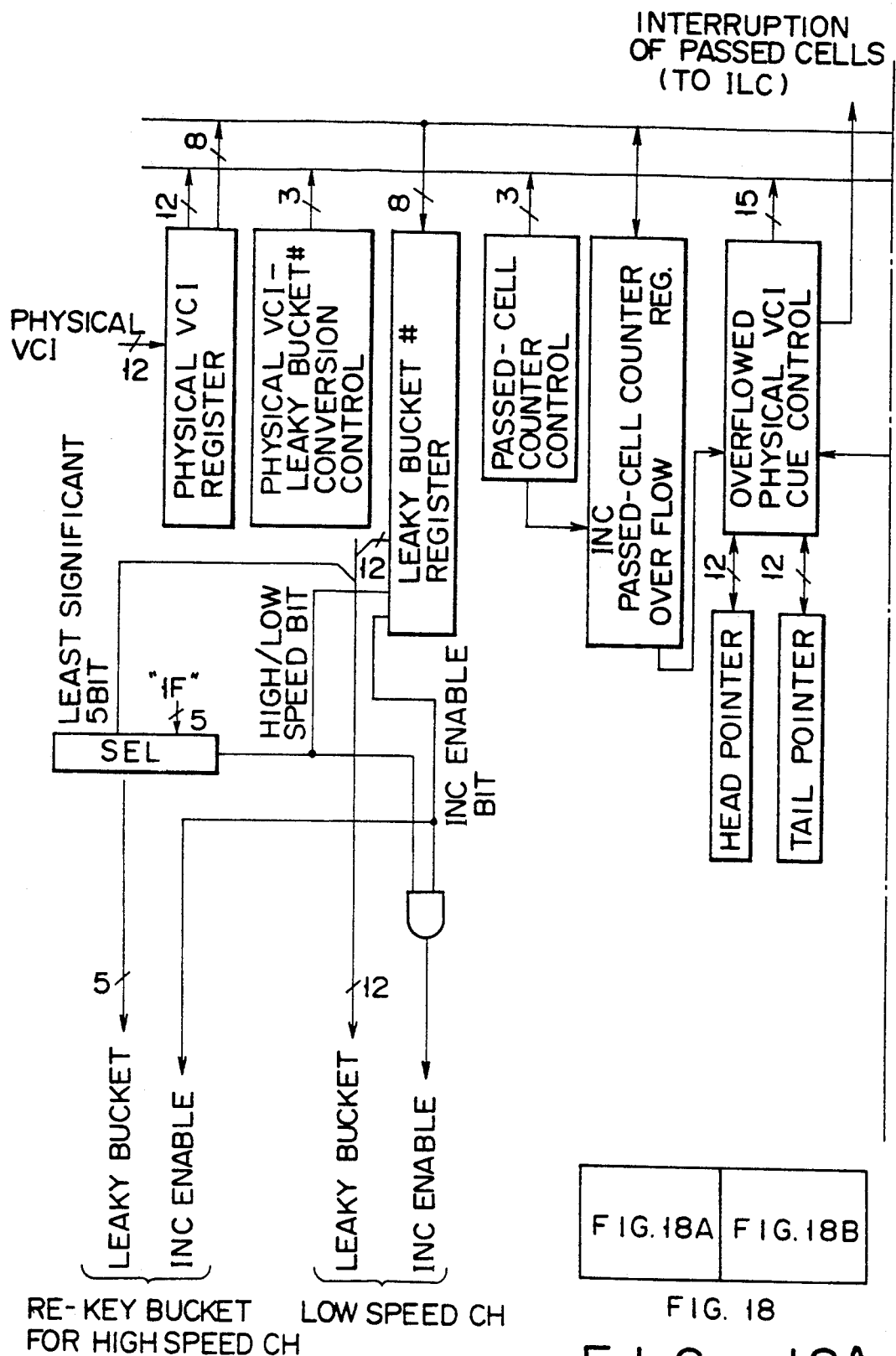
FIG. 18 includes FIGS. 18A and 18B positioned as shown and represents a diagram showing an arrangement of a physical VCI reception function.
Figure 18B:
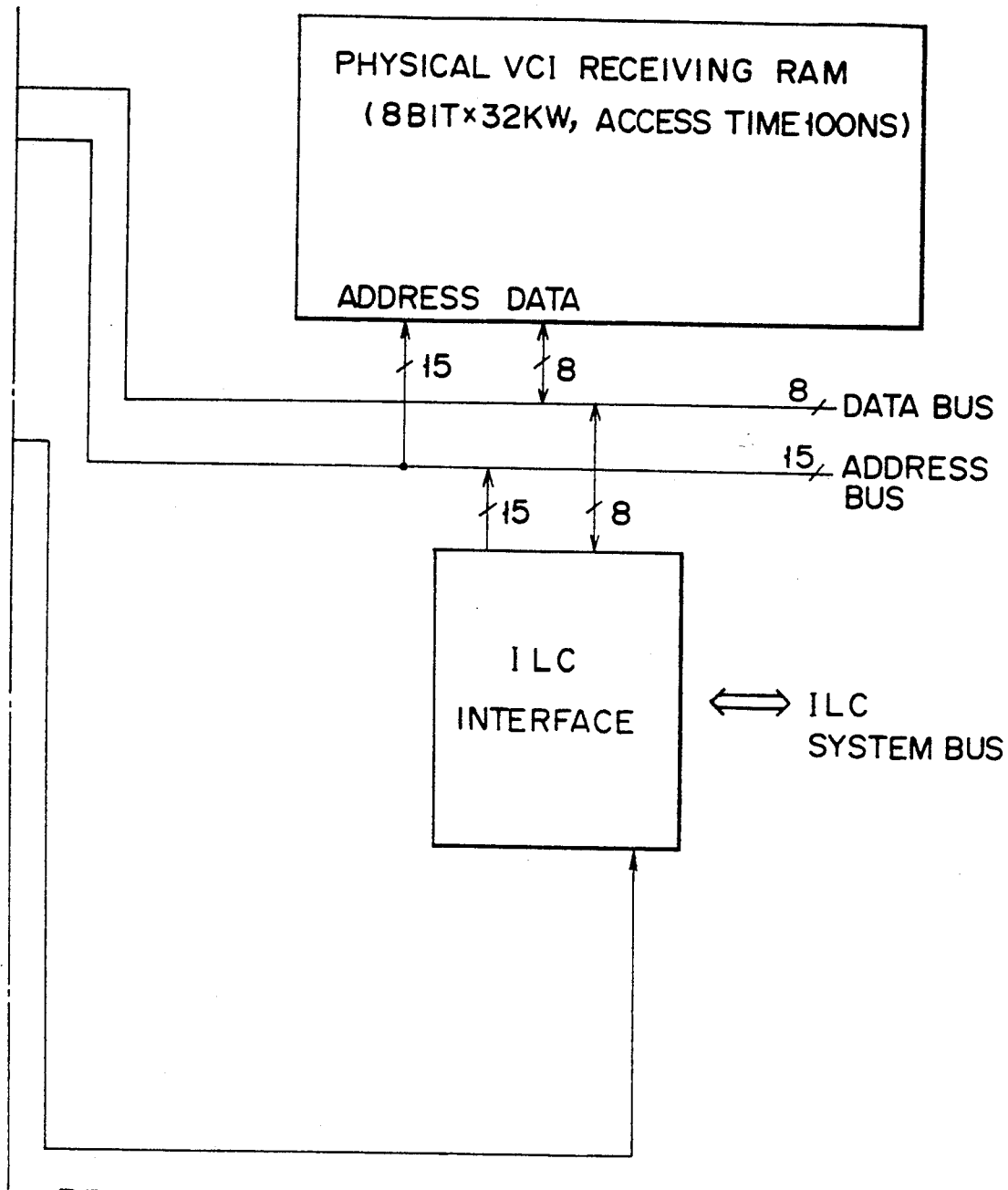

FIGS. 18A and 18B show an arrangement of the above-mentioned physical VCI reception function.

The physical VCI reception function executes four different operations, i.e., (1) an operation for obtaining a leaky bucket number for observing the corresponding VC from a physical VCI, (2) an increment operation of counters for counting the numbers of passing cells for each VC, (3) an operation for, when the passing cell counter overflows, enqueuing a physical VCI corresponding to the overflowing counter to an overflow physical VCI queue, and (4) an operation for arbitrating accesses from the ILC to the physical VCI reception RAM.

More specifically, the operation for obtaining the leaky bucket number for observing the corresponding VC from the physical VCI is executed as follows.

That is, a physical VCI input from the RTA is input to a physical VCI register. The physical VCI held in the physical VCI register is held until a series of processing operations for the physical VCI are completed. When the physical VCI is input to the physical VCI register, [physical VCI leaky bucket number transformation] control is enabled. The [physical VCI leaky bucket number transformation] control is executed by accessing a [physical VCI leaky bucket number transformation table] of the above-mentioned VCI reception RAM using the value held in the physical VCI register as an offset, thereby obtaining a leaky bucket number corresponding to the physical VCI. The leaky bucket number obtained from this table is held in a leaky bucket # register. Based on information held in the leaky bucket # register, a high- or low-speed channel leaky bucket is selected, and the corresponding leaky bucket number is incremented.

Systematic observation of all the VCs to be observed by the low-speed channel leaky buckets by the high-speed channel leaky bucket is performed by, e.g., the high-speed leaky bucket number [1F]. For this reason, when the leaky bucket numbers are output to the low-speed channel leaky bucket controller, the leaky bucket number [1F] is simultaneously output to the high-speed channel leaky bucket.

The passing cell counter corresponding to the passing cell VCI is then incremented by one. With this passing cell count control, processing for making a read access to a passing cell counter area in the physical VCI reception RAM using the value held in the physical VCI register as an offset, incrementing the readout data, and writing the incremented data at the same address is executed.

In this case, when the readout data is incremented, if the data overflows, overflow physical VCI queue control is enabled. Thus, the received physical VCI is enqueued in an overflow physical VCI queue allocated in the physical VCI reception RAM. With this overflow physical VCI queue control, a ring buffer is formed in the physical VCI reception RAM. For this purpose, a header pointer and a tail pointer are arranged. When the overflow physical VCI queue is not empty, the ILC is interrupted.

The above-mentioned operation is continuously performed when a physical VCI is input from the LPT. In contrast to this, an access from the ILC to the physical VCI reception RAM is performed when the above-mentioned operation is not performed. With this operation setting, contention control of accesses to the physical VCI reception RAM is performed. Note that accesses from the ILC to the physical VCI reception RAM include the following three patterns:
(1) Setting the leaky bucket # transformation table from a physical VCI
(2) Initializing the passing cell counters
(3) Initializing the overflow physical VCI queue, and reading out a physical VCI from the overflow physical VCI queue.

The accesses (1) and (2) are normal accesses for the memory. However, the access (3) is an access for dequeuing information from the ring buffer. This dequeuing is performed with the assistance of the overflow physical VCI queue control.

Figure 19B:
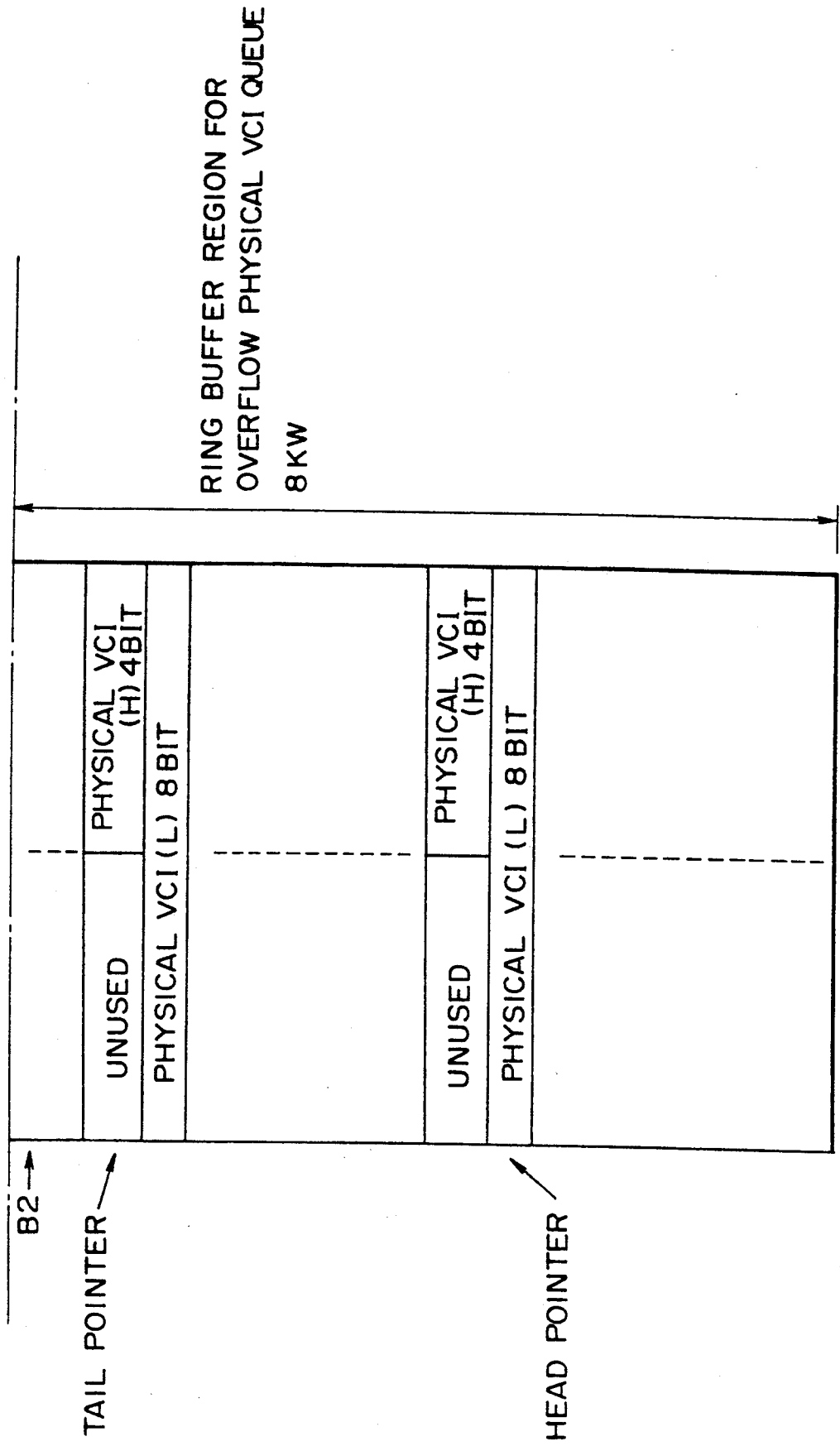
FIG. 19 includes FIGS. 19A and 19B positioned as shown and represents an address map of a physical VCI reception RAM.

FIGS. 19A and 19B show an address map of the above-mentioned physical VCI reception RAM.

In this address map, a physical VCI leaky bucket # transformation table area, a passing cell counter area, and an overflow physical VCI queue ring buffer area are assigned in turn from lower addresses.

An entry for each physical VCI in the physical VCI leaky bucket # transformation table has a 2-byte length. Of 2 bytes, 12 bits are assigned to a leaky bucket number. An Inc enable bit is bit information for, when a physical VCI corresponding to an entry of this bit is input, designating whether or not an increment operation of the leaky bucket is to be performed. This bit is checked before the beginning of use of the leaky bucket. Furthermore, this entry includes a high-speed polishing/low-speed polishing bit for designating a high- or low-speed leaky bucket for observing a VC corresponding to the entry for the purpose of reducing the number of hardware components. The remaining 2 bits are unused.

On the other hand, an entry corresponding to each physical VCI in the passing cell counter area has a 4-byte length. Of 4 bytes, 3 bytes constitute the passing cell counter. Since this counter is a 24-bit counter, it overflows once per about 30 seconds at 150 Mbps and 100% load. Note that the remaining 8 bits are unused.

The overflow physical VCI queue ring buffer area is designated by the head or tail pointer to have 2 bytes as one word. Of 2 bytes (one word), the above-mentioned physical VCI is stored using 12 bits. Note that the remaining 4 bits are unused.

Figure 20A:
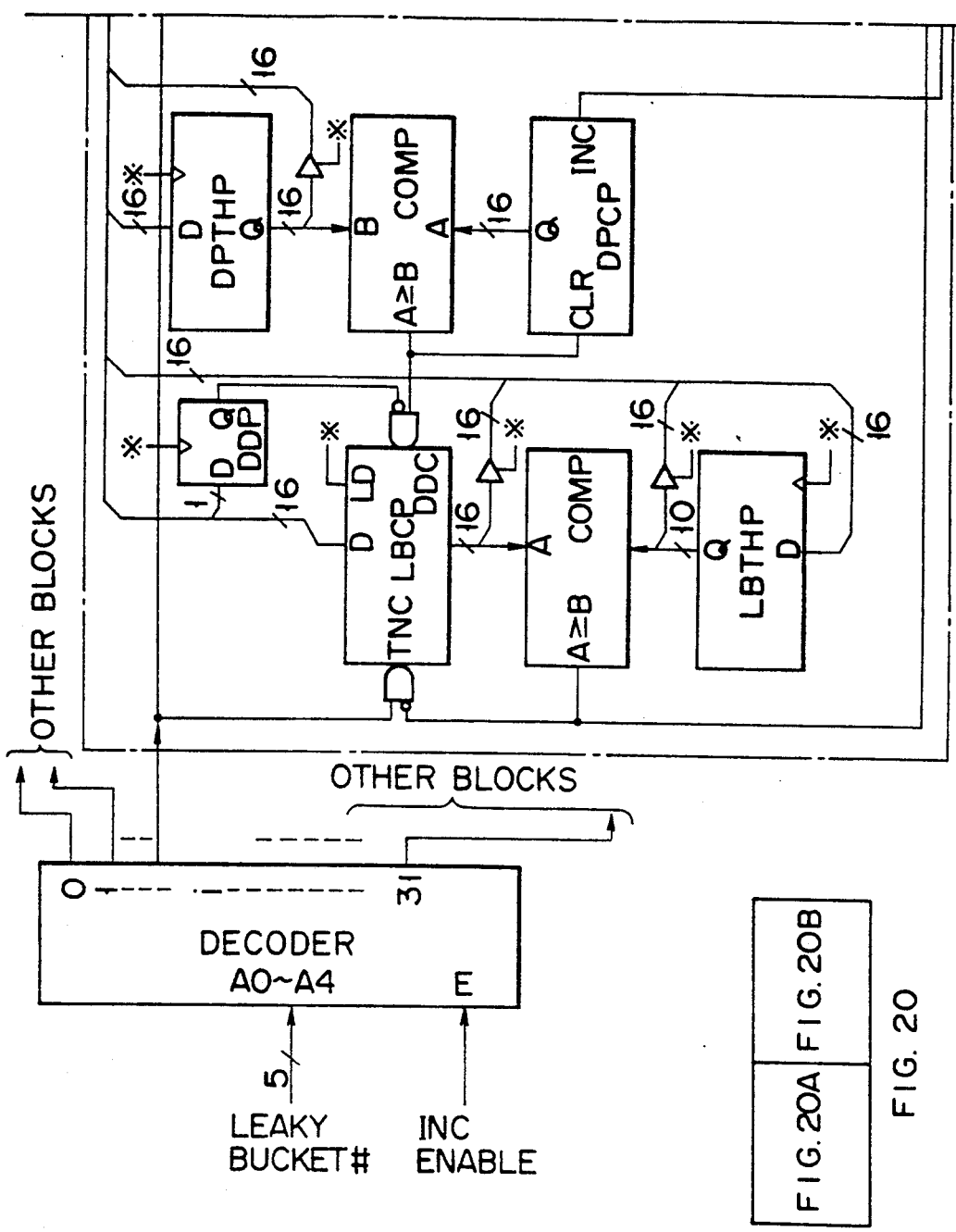
FIG. 20 includes FIGS. 20A and 20B positioned as shown and represents a diagram showing an arrangement of a high-speed channel leaky bucket.
Figure 20B:
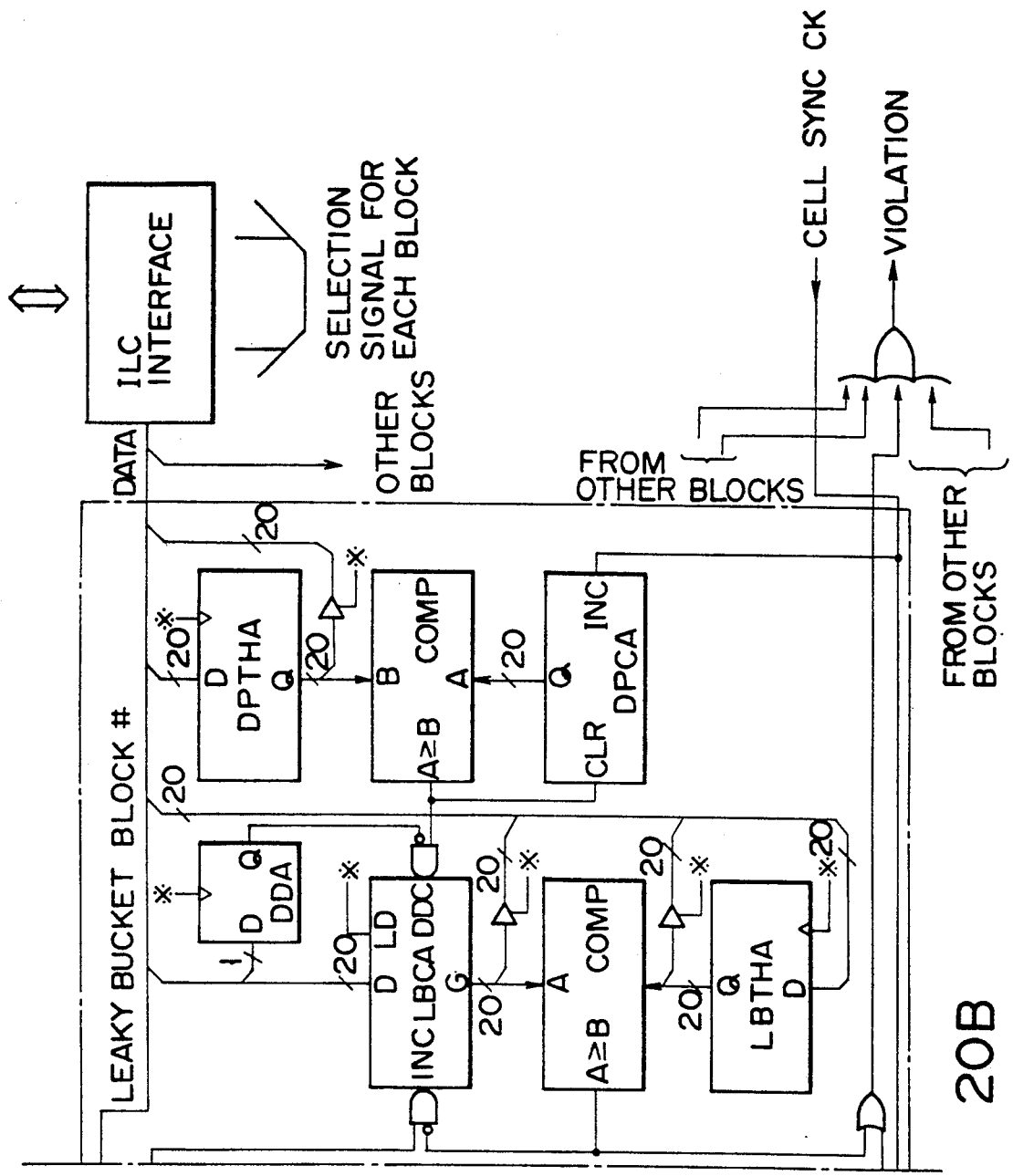

FIGS. 20A and 20B show a schematic arrangement of the high-speed channel leaky bucket. The high-speed channel leaky bucket is constituted by the 32 polishing leaky buckets shown in FIG. 16 described above, a decoder for supplying an increment request to one of these leaky buckets in accordance with an input leaky bucket number, and an ILC interface for allowing read and write accesses of LBCP, LBCA, LBTHP, LBTHA, DPTHP, and DPTHA from the ILC to registers. Of these components, flags called DDA and DDP are used for designating whether or not a decrement operation is performed in the leaky bucket. These flags can be set/reset under the control of the ILC, and are checked before the beginning of use of the leaky bucket.

Figure 21A:
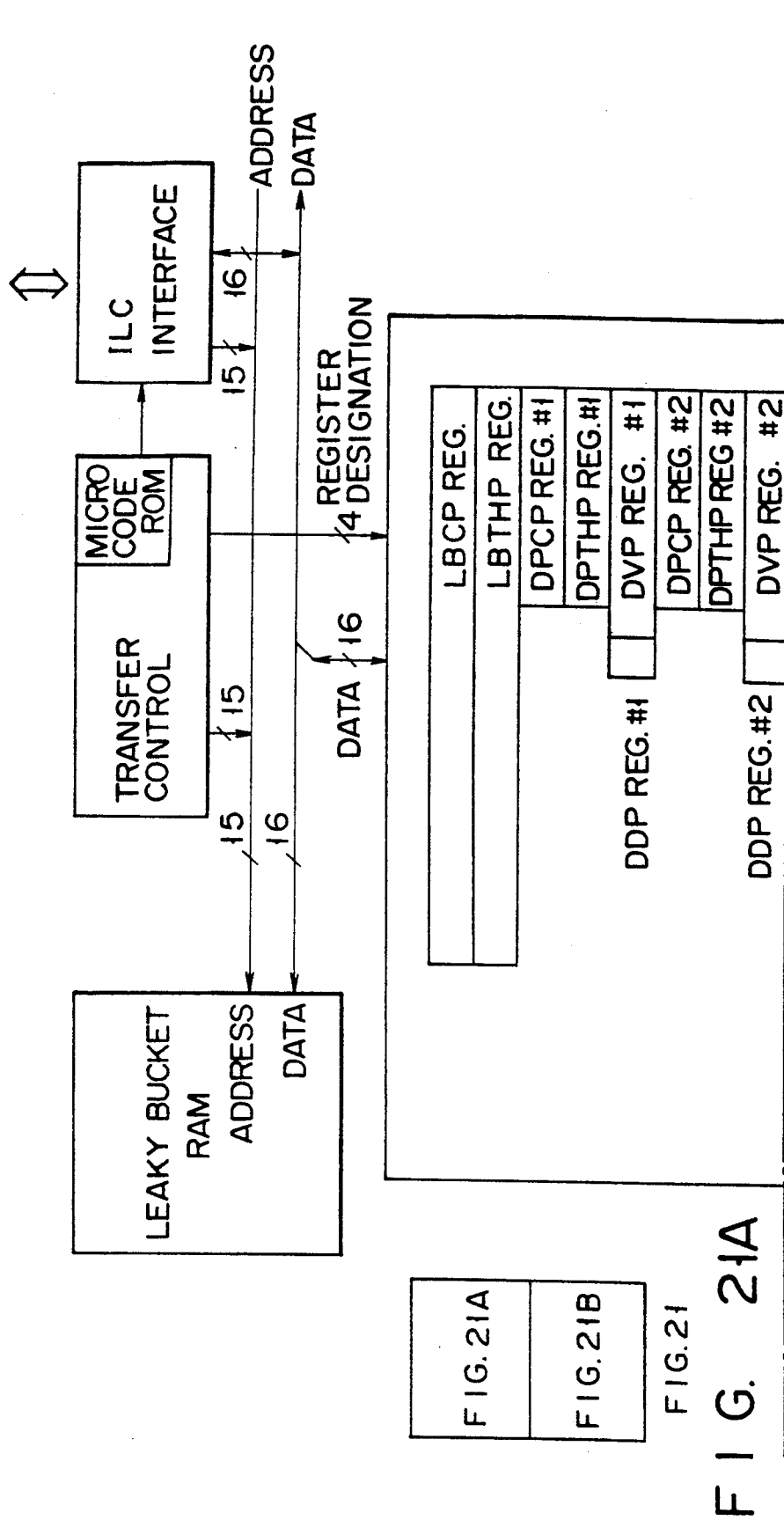
FIG. 21 includes FIGS. 21A and 21B positioned as shown and represents a diagram showing an arrangement of a low-speed channel leaky bucket controller.

FIGS. 21A and 21B show a schematic arrangement of the low-speed channel leaky bucket controller. The low-speed channel leaky bucket controller comprises a register array for temporarily storing data to be supplied to an ALU, the ALU for executing arithmetic operations for realizing the leaky buckets, and transfer and arithmetic control sections for controlling information transfer among these components. This ALU is realized by using, e.g., a 32-bit ALU of a mega cell function library for a CMOS gate array. Since the register array stores predetermined information, the number of hardware components necessary for the register array can be decreased accordingly.

Information transfer between the leaky bucket RAM and the register array, and information transfer between the ALU and the register array are performed through independent buses, so that pipeline processing for the ALU can be easily realized. With this arrangement, the throughput of the ALU, and the throughput of the leaky bucket RAM can be prevented from being decreased, and 4,096-channel polishing parameters can be observed. Information transfer between the leaky bucket RAM and the register array is controlled by the transfer control section, and control of the ALU and information transfer between the ALU and the register array are controlled by the arithmetic control section. These transfer and arithmetic control sections are realized as kinds of microsequencers. Micro codes of these sequencers are described in horizontal instructions (about 64 bits per word).

As a special function for the leaky bucket, a [0] clear AND gate array is added as a bus for transferring arithmetic results from the ALU to the register array. With this function, a high-speed programmable counter can be realized under the microprogram control.

Figure 22:
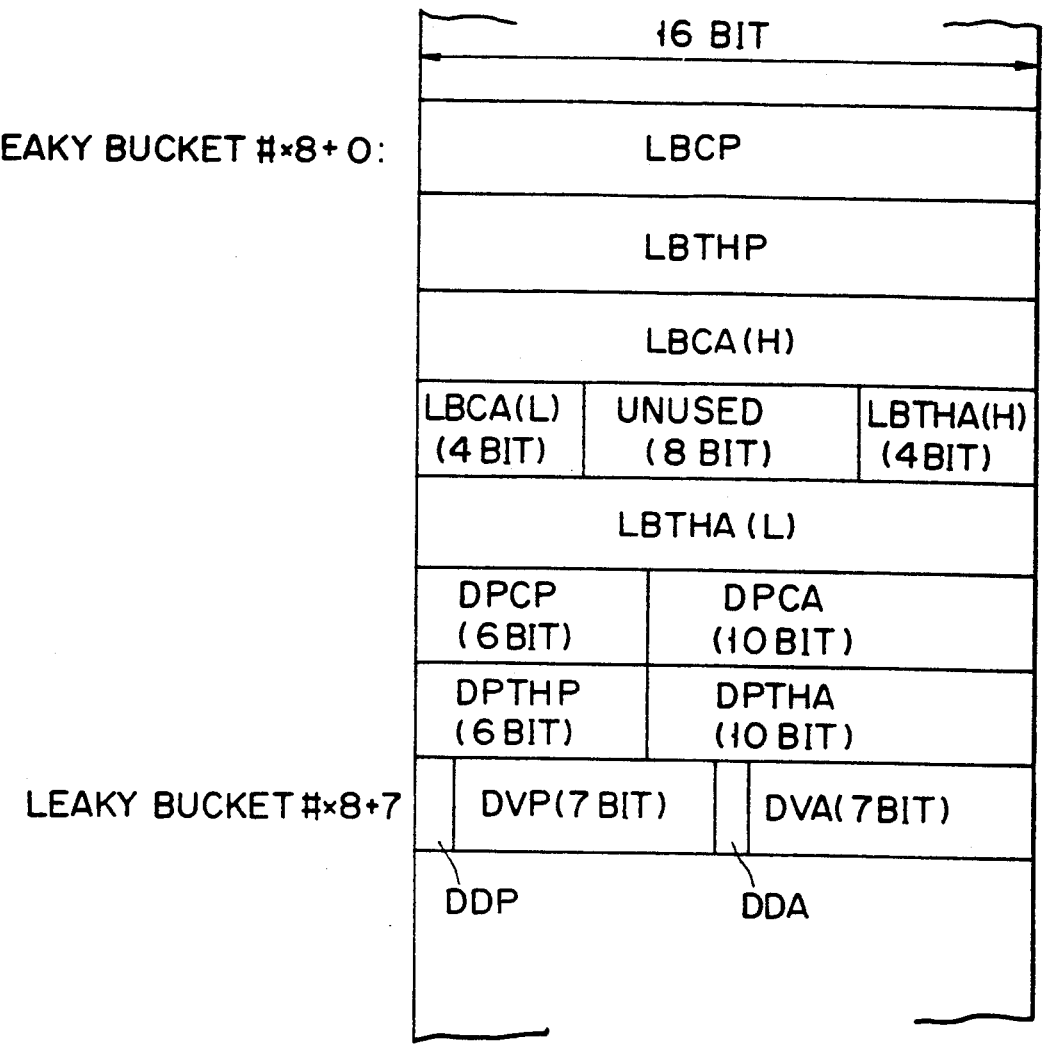
FIG. 22 shows an address map of a leaky bucket RAM.

An access from the ILC to the leaky bucket RAM is made in the intervals of information transfer operations between the leaky bucket RAM and the register array. Since it is assumed that the ILC does not directly access the register array, and the micro codes of the microsequencers are supplied from a ROM, a load operation from the ILC is particularly not taken into consideration. Note that the address map of the leaky bucket RAM is to store information necessary for performing the leaky bucket operation in a 16 bit×8 word RAM, as shown in FIG. 22. The above-mentioned transfer operation is performed according to this address map.

Figure 23A:
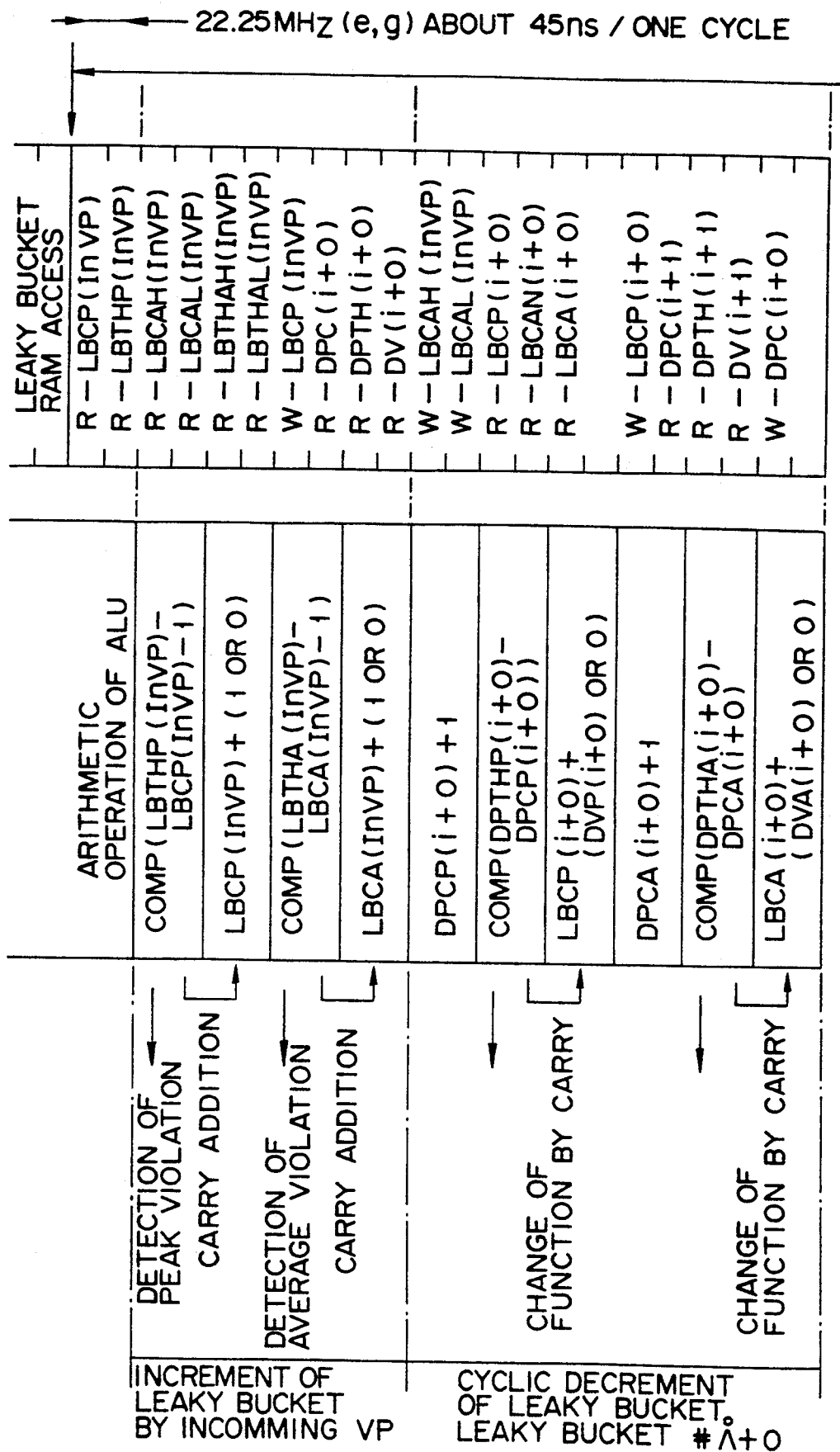
FIGS. 23A to 23C show a chart showing an operation of a low-speed leaky bucket controller.
Figure 23B:
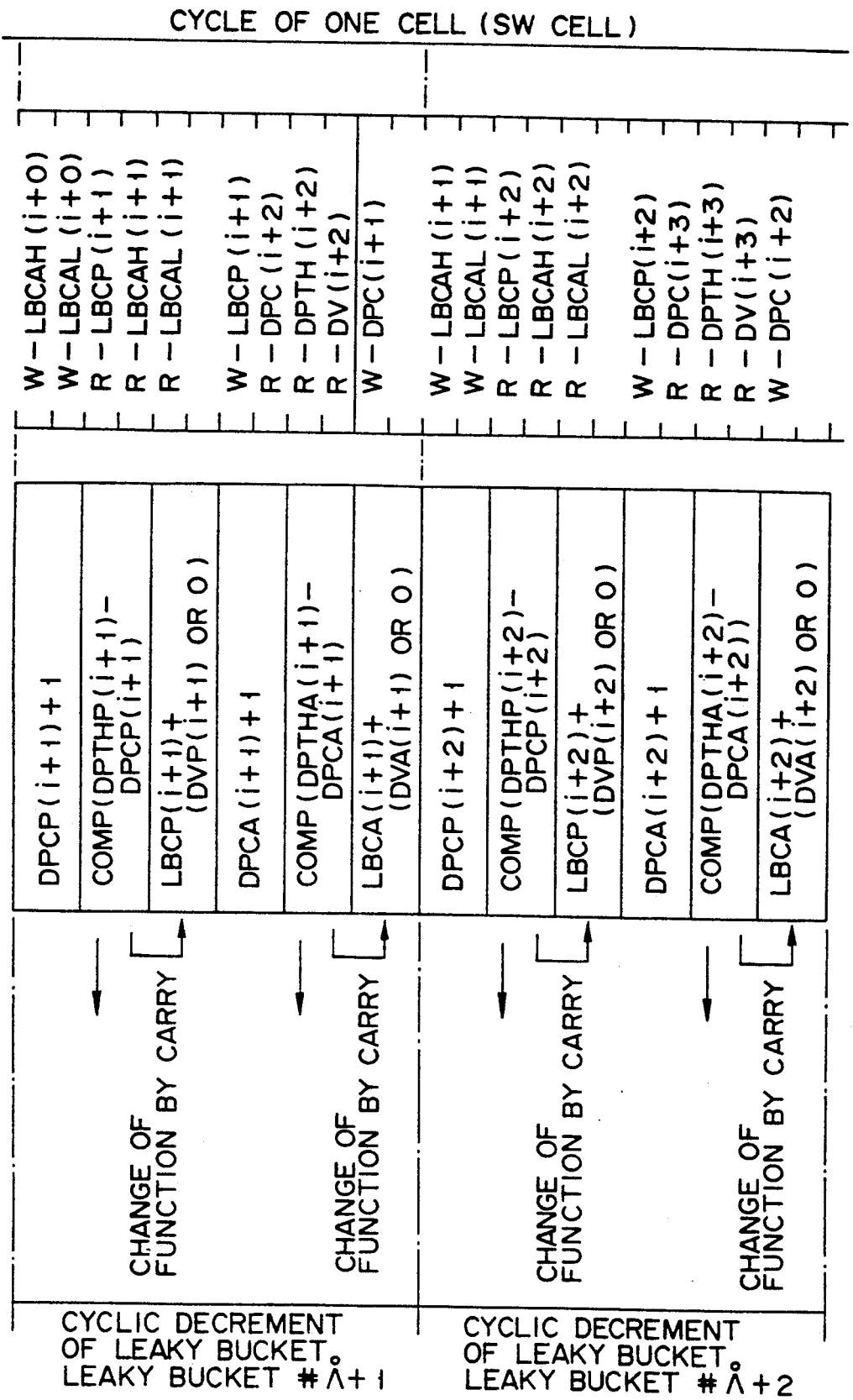
Figure 23C:
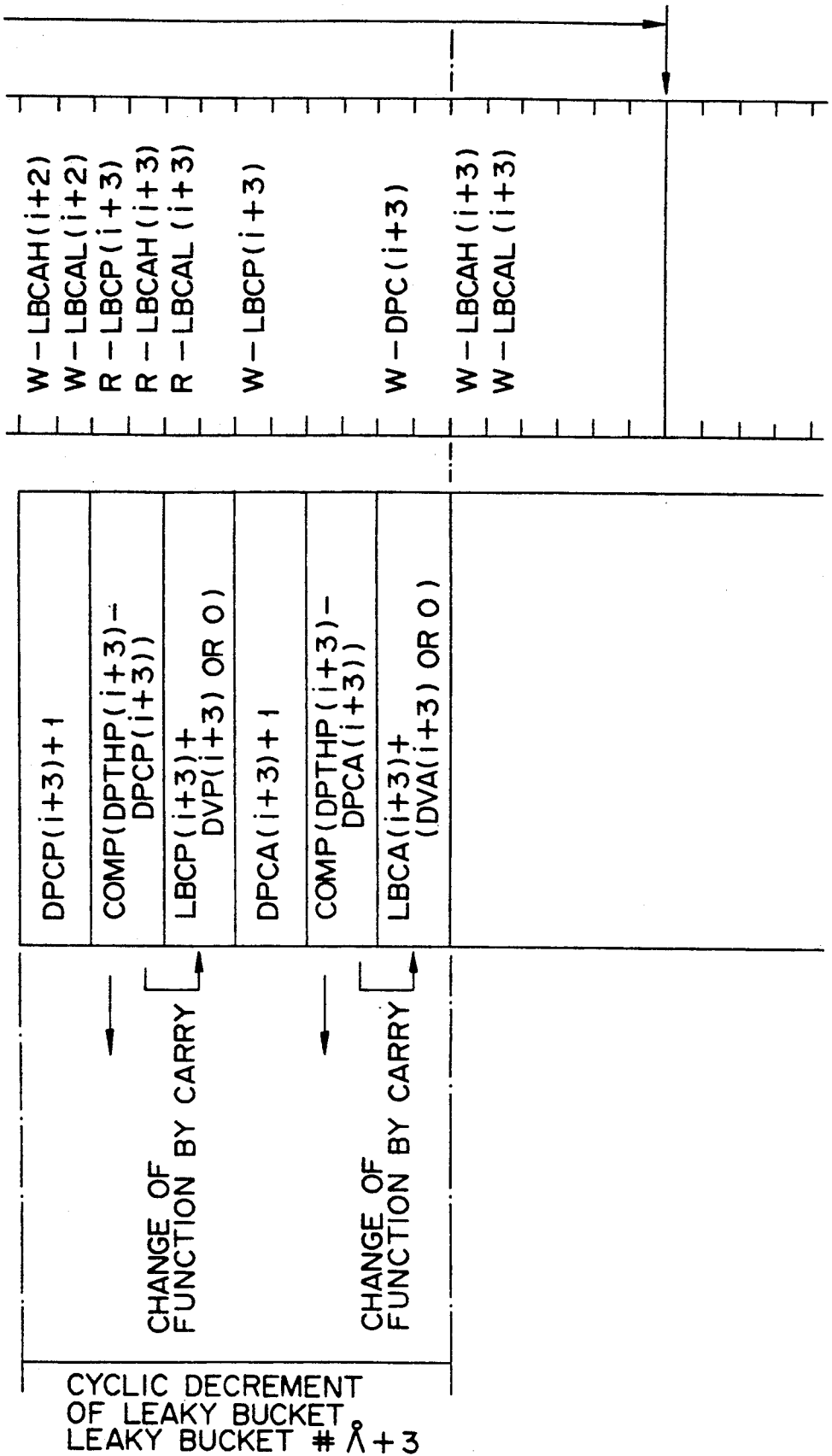

FIG. 23 shows an operation example of the above-mentioned transfer and arithmetic control sections. As shown in FIG. 23, when the above-mentioned registers for holding DPCP, DPCA, DPTHP, DPTHA, DVP, and DVA are duplexed, as shown in, e.g., FIGS. 21A and 21B, a blank time can be prevented from being formed in the ALU operation, and the ALU can be sufficiently efficiently used. This operation example demonstrates that only one ALU can sufficiently function in the low-speed channel leaky bucket controller.

As can also be seen from FIG. 23, the next arithmetic operation to be executed by the ALU must be changed in response to a carry output from the ALU.

The arithmetic control section can determine on the basis of DDP (LBCP decrement ON/OFF designation) bit and the DDA (LBCA decrement ON/OFF designation) bit in the leaky bucket RAM whether or not the decrement operations of the LBCP and LBCA are performed. This function is used in a checking operation before the beginning of use of the leaky buckets.

Observation information in this TOVA includes the following pieces of information.

More specifically, pieces of observation information of the TOVA for the physical VCI reception RAM, the high-speed channel leaky bucket, and the leaky bucket RAM are prepared as follows.

For the physical VCI reception RAM, mapping information from a physical VCI to a leaky bucket #, increment suppression information for each leaky bucket, high-speed channel leaky bucket/low-speed channel leaky bucket selection information, the passing cell counters in units of VCs, and passing cell counter overflow information in units of VCs are prepared. When the passing cell counter for each VC overflows, this is informed to the ILC by interrupt.

For the high-speed channel leaky bucket, various polishing parameters, a leaky bucket counter value, and leaky bucket decrement suppression information are prepared. Furthermore, for the leaky bucket RAM, various polishing parameters, a leaky bucket counter value, and leaky bucket decrement suppression information are prepared.

The leaky bucket is inspected using the observation information as follows upon setting of a VC.

A leaky bucket used in the VC suppresses a decrement operation, and causes an ATM layer OAM cell of the corresponding VC to pass through a plurality of RTAs. After the OAM cell passes, the leaky bucket confirms that the LBCA and LBCP are incremented in correspondence with the number of passed RTAs. The leaky bucket used in the VC suppresses an increment operation, and sets a proper value in the LBCA and LBCP. Thereafter, the leaky bucket starts the decrement operation as described above, and loads values of these counters at a timing at which the value becomes [0] when the counters are decremented at a preset decrement period. The leaky bucket confirms that the value becomes [0], thereby checking the leaky bucket.

The cell discard control/polishing function will be explained hereinafter.

As described above, the cell discard class control/polishing function is supported by the IBUF.

The IBUF has three functions, i.e., a function of inputting and storing SW cells, a function of outputting SW cells, and a function of discarding SW cells. In the ATM system which is premised on a hardware store-and-forward switching system of cells, a mounting method of a buffer of this type may pose an important technical subject.

In general, methods of realizing the FIFO function constituting a buffer such as the IBUF can be roughly classified into two types, and such classification is made on the basis of methods of holding a cell arrival order. More specifically, the FIFO function can be realized by:

(1) a method of holding an arrival order by utilizing a linear address space of a memory; and (2) a method of spatially holding an arrival order by utilizing a register array of a shift register (shift register method).

The method (1) can be further classified into the following two types according to the way of utilizing the linear address space:

(a) a method of directly mapping an arrival order to an order relationship of address numbers assigned to entries of a storage area (ring buffer method); and (b) a method of forming a list structure by a pointer (link), and mapping an arrival order to an order relationship of elements of the list structure (linked list method).

In order to realize the ATM system which is premised on the hardware store-and-forward switching system, the tradeoff between functional flexibility and an LSI area of a storage area realized by registers consisting of D-FFs, and of a storage area realized by a RAM must be taken into consideration.

As is well known, when relatively large-capacity (several hundreds of Kbits in the existing technique) storage areas having the same capacity are to be realized, the LSI area of a storage area realized by registers consisting of D-FFs is larger by one hundred times or more than that realized by an S-RAM. Therefore, selection of the buffer realization method poses an important technical subject depending on required functions.

The above-mentioned ring buffer method and the linked list method can use RAMs according to their realization algorithms. Therefore, when FIFO functions having the same capacity are to be constituted, these methods can be advantageously employed as compared to the above-mentioned shift register method. Which of these methods is to be employed is determined depending on additional functions other than the FIFO function. If a buffer of only the FIFO function is realized, the above-mentioned ring buffer method is more advantageous than the linked list method since it does not require an extra pointer area. However, when a buffer having a function of sharing one storage area among a plurality of processes to effectively utilize the storage area in addition to the FIFO function is realized, the linked list method is more advantageous. This is because, assuming that entry assignments of a storage area to the respective processes are performed by a requested driving method so as to improve utilization efficiency of the storage area, a pointer for forming a list structure can effectively function in the linked list method, and storage area assignments to the processes by requested driving can be easily realized.

As an example of a buffer for sharing one storage area among a plurality of processes to effectively utilize the storage area in the ATM system, a shared buffer ATM switch is known. In the shared buffer ATM switch, processes correspond to cell buffering operations units of output routes. Therefore, the shared buffer ATM switch can be advantageously realized by the linked list method.

In contrast to this, in the IBUF, cell discard class control is performed. To execute the cell discard class control in the IBUF means that the arrival order of cells is ignored, and cells are selectively discarded according to discard classes. In addition, selective discard of cells is constituted by two operations, i.e., a selection/discard operation of a cell to be discarded, and a reconstruction operation of the arrival order after the discard operation. When it is considered that the FIFO function added with these two functions is to be realized, both the linked list method and the ring buffer method are difficult to realize. This is because, the algorithms of the above-mentioned two methods realize the FIFO function itself by utilizing a linear address space of a RAM.

When cell discard regardless of the arrival order of cells is to be realized, the above-mentioned linked list method undesirably complicates a pointer rewrite procedure upon input, output, and discard operations of cells, resulting in a complicated control structure. In the ring buffer method, cells stored in the RAM must be refilled, and an ultra-high-speed RAM must be used, resulting in an undesirable compensation. Such a compensation makes the hardware arrangement very difficult when the IBUF which must perform cell input-/output and discard operations once per about 2 μsec is realized.

Thus, discard class division is performed based on an OAM cell/CLP. The discard class division means that cells belonging to a VC may have different discard classes. Therefore, a method of arranging independent buffers in units of classes cannot be directly used since a cell order may be reversed.

When the FIFO function is realized using the shift register method, since cells are spatially developed on D-FFs, cell discard regardless of the cell arrival order can be easily realized as compared to the above-mentioned linked list method and the ring buffer method. In addition, since the FIFO function based on the shift register method can easily extract low-level parallel characteristics of the selection/discard operation of cells to be discarded, and the reconstruction operation of the arrival order after the cell discard operation, by utilizing the fact that, for example, cells are spatially developed on D-FFs. Therefore, when this method is utilized, the cell input/output and discard operations once per about 2 μsec can be easily realized by the existing LSI techniques.

However, in consideration of the number of circuit/-process engineers for realizing large-capacity RAMs, it is not practical to realize a large-capacity FIFO based on the shift register method with the selective discard function in terms of a design period, versatility, and cost. Therefore, it is practical to use a RAM in a large-scale FIFO.

The above examination is the major reason for independently arranging a buffer (IBUF) for supporting discard classes in a proposed architecture, a buffer (ATM switch) for absorbing conflicts upon cell switching, and a buffer (OBUF) for supporting delay classes/-smoothing.

Figure 24C:
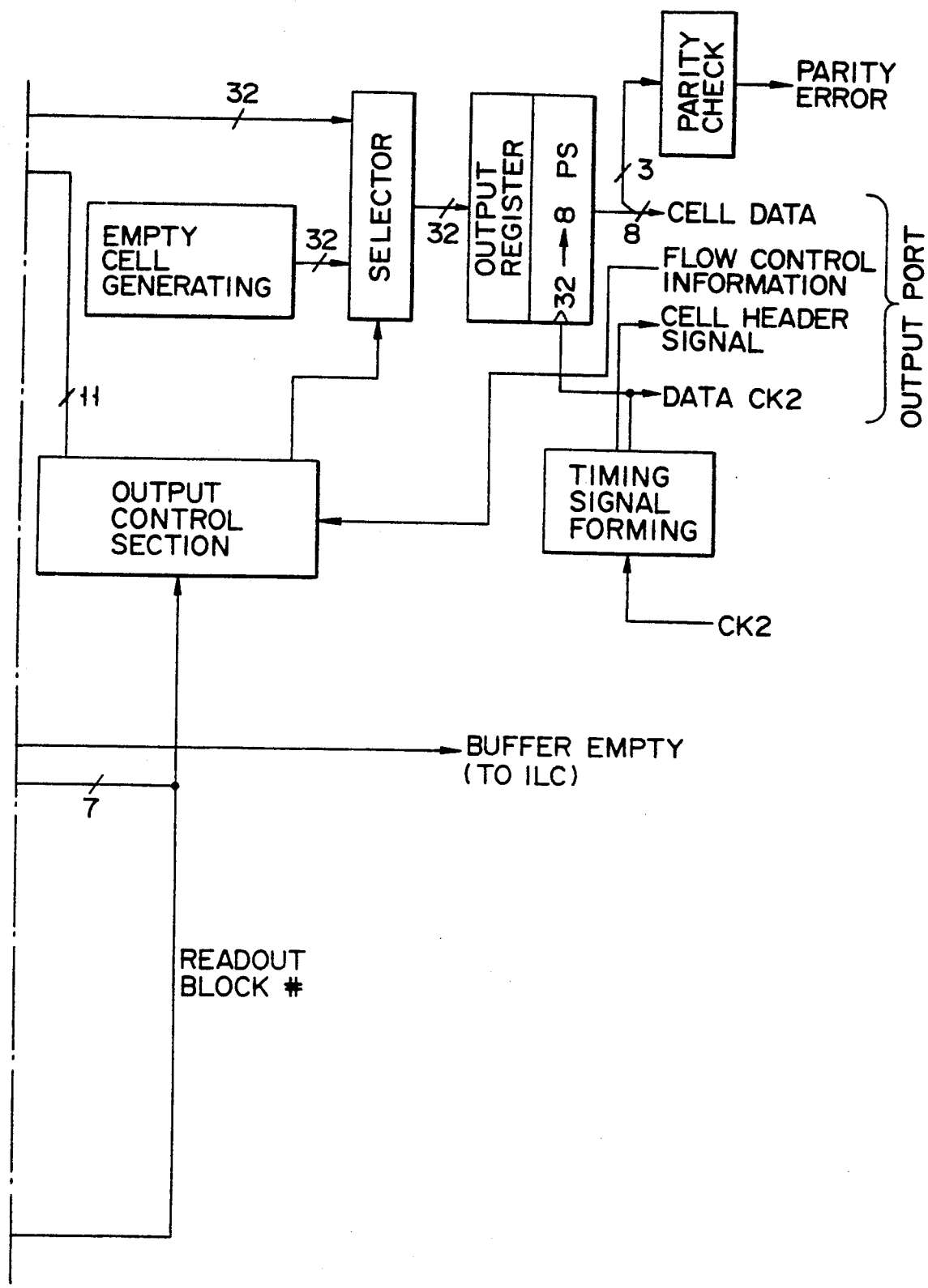

FIG. 24 shows an arrangement of the IBUF. In the IBUF shown in FIG. 24, cells input from an input port are temporarily input to a dual buffer, and are synchronized with an internal operation cycle of the IBUF. The cells are input from the input port at a timing of 18.27 (63/53) MHz in an 8-bit parallel format.

Prior to a cell output operation from the dual buffer, bit information necessary for determining a discard class of the corresponding cell, i.e., a violation bit, a PT field, and a CLP field are supplied to a discard control section. The discard control section detects the discard class of the cell using these pieces of information. A cell set with the violation bit is immediately discarded when it is output from the dual buffer. The cell to be discarded is stored in a FIFO connected to an ILC interface. If this FIFO is not empty, the ILC is interrupted at the corresponding level. The ILC fetches a discard cell via the ILC Interface when it is interrupted. At this time, a reception time of the discard cell is recorded based on an internal clock of the ILC, if necessary. Furthermore, the ILC may refer to a VPI/VCI of the cell, and may count the number of discarded cells for each VC. Assuming almost no cells are discarded in the ATMSW, the discard cell buffer need only have a length corresponding to one or two cells.

On the other hand, a cell set with no violation bit is temporarily written in a 3P-RAM. If the 3P-RAM is not empty, one cell is selected from the 3P-RAM, and is discarded. The discarded cell is similarly held in the FIFO of the ILC interface, and waits until it is fetched by the ILC. The address space of the 3P-RAM is divided into blocks each of which can store one cell. An empty block # FIFO is a FIFO for storing a number of a block which does not store a cell in the 3P-RAM. When this FIFO is not empty, the IBUF is not full.

When a cell is input, the discard control section causes the empty block # FIFO to dequeue one block #. The dequeued block # is supplied to an input control section, and is enqueued in the block # FIFO together with the discard class of the cell which is being input. When the empty block # FIFO is empty, the IBUF is full. When a cell is input in this state, the discard control section informs the block # FIFO to discard one block # while presenting the discard class of the cell presently being input. Upon reception of the information for discarding the block # from the discard control section, the block # FIFO selects a block which stores a cell whose discard class is equal to or smaller than the simultaneously informed discard class, and discards the block #.

The block # discarded from the block # FIFO in this manner is informed to the discard control section first. The discard control section reads out the cell stored in the block having the informed block #, and transfers it to the buffer of the ILC interface. Thereafter, the block # of the empty block is informed to the input control section.

When the block # is informed, the input control section generates a write address of the cell which is being input, supplies it to the 3P-RAM, and controls the write operation of the 3P-RAM. At the same time, the block # for receiving the cell is enqueued in the block # FIFO together with the discard class of the cell.

In contrast to this, when the block # FIFO is not empty, the IBUF is not empty. In this case, the output control section dequeues one block # from the block # FIFO, reads out the cell held at the readout block # from the 3P-RAM, and outputs it from the output port. In this case, flow control information is referred to, and the output operation of the cell is controlled so as not to discard the cell in a buffer after the output port When the block # FIFO is empty, empty cells are output from the output port. At the same time, a message indicating that the IBUF is empty is displayed on the ILC. This information is used in the cell loss free system swapping function Note that a cell is output as 8-bit parallel data from the output port at 45 MHz.

At this output port, parity bits in the last octet of an SW cell are checked. A cell having a parity error is caused to pass the output port, so that only a cell having a parity error is discarded by the RTD after it passes through the ATMSW and the OBUF.

FIG. 25 shows an arrangement of a FIFO with a priority discard function.

The FIFO with the priority discard function is realized by 128 parallel registers each for holding a total of 9 bits, i.e., 2-bit discard class information, and 7-bit block # information.

The block # output operation from the FIFO is performed by shifting information in one register downward in FIG. 25 under the control of a dequeue control section. A data enqueue operation is performed by selecting the lowermost register in FIG. 25 from registers which hold neither of the discard class and the block #, and causing the selected register to hold the enqueued data.

A data discard operation is performed by causing a discard control section to recognize the smallest class of discard classes equal to or smaller than the informed discard class, and assigned to the block # data stored in the FIFO. The discard control section then recognizes the lowermost register in FIG. 25 which holds the recognized discard class. With this recognition processing, a selection operation of a cell to be discarded is performed.

The block # held in the above-mentioned register is read out. Thereafter, information held in blocks located above (FIG. 25) the register from which the block # is read out is shifted downward each by one register. With this shift control, the reconstruction operation of the arrival order after the discard operation is performed. Since the FIFO is constituted by sets of D-FFs, the above-mentioned FIFO with the priority discard function inevitably has a considerably large area. In order to avoid this, empty blocks may be managed by registers which do not hold the block # information of blocks which hold cells. In this case, the discard control section is added with an empty block # dequeue function, and the enqueue control section is added with an empty block # enqueue function. When an increase in hardware scale by the FIFO based on the shift register method is not permitted, discard rates of respective discard classes may be differed by, e.g., the following method. That is, the number of cells for each discard class held in a buffer formed by the ring buffer method may be counted, and a discard threshold value of cells of each discard class may be set. When the FIFO is realized in this manner, an LSI area necessary for it is decreased. However, although discard classes are statistically formed, the discard classes are ignored in individual events causing discard operations.

Observation information of the IBUF includes discard cell information, discard cell loss information, SW cell parity error information, and IBUF empty information. When a discard cell is held in the IBUF, this is informed to the ILC by interrupt. In this case, the number of cells for each discard class held in the IBUF is informed to the ILC, so that a discard class control operation can be confirmed by the ILC. The discard cell loss information consists of information to be informed to the ILC when a buffer for holding a discard cell is full, and the discard cell is discarded. The IBUF empty information is used in the cell loss free system swapping function.

The delay class control/shaping function of the cell processing function described above will be described below.

The delay class control/shaping function is realized by the OBUF (Output Buffer) and the CSH (Cell Shaper) in the above-mentioned cell processing function. The OBUF mainly executes delay class control. The CSH executes shaping processing of a cell flow, thereby outputting a cell to an output link while maintaining traffic characteristics regulated in each VP/VC.

As described above, the shaping function is a function of controlling an output operation of a cell so as to prevent the cell from being determined as a violation cell in a polishing function in the opposing cell processing function, and is arranged to execute the shaping processing using the same functional elements as in the TOVA.

In order to realize the shaping function in the CSH using the same functional elements as those used in the TOVA, the following features of these functional elements must be considered.

The low-speed channel leaky bucket realizes a leaky bucket using a memory LSI so as to minimize an actual LSI area. Therefore, the leaky bucket can check only one cell during one cell period due to the throughput limitation of the memory LSI so as to determine whether or not the cell is a violation cell.

In contrast to this, the high-speed channel leaky bucket is constituted by simply integrating 32 leaky buckets comprising D-FFs in an LSI so as to faithfully realize the leaky bucket algorithm. Therefore, the high-speed channel leaky bucket can check a plurality of cells during one cell period to determine if the cell is a violation cell.

Furthermore, in the low-speed channel leaky bucket, a decrement operation of a leaky bucket counter can only be controlled in units of 1,024-cell periods due to the throughput limitation of the memory LSI. For this reason, an output operation of a cell which is determined as a violation cell in the low-speed channel leaky bucket may be suppressed over, e.g., a period of several thousand cells.

In consideration of these features, the delay class processing and the shaping processing in the OBUF and CSH are realized as follows.

FIG. 26 shows an arrangement of the OBUF and the CSH for realizing the delay class processing and the shaping processing.

SW cells supplied from the ATMSW as 45-MHz, 8-bit parallel data are subjected to delay class processing by the OBUF. For this delay class control, the SW cells are selected based on delay class information in their additional information, and are temporarily stored in buffers arranged in units of delay classes.

Delay class priority control is executed while supporting a delay class in such a manner that one of the plurality of buffers arranged in units of delay classes is selected, and cells are output as 8-bit parallel data at $18.72 \times (64/53)$ MHz from the selected buffer. Therefore, a cell storage operation due to collision of output links mainly occurs corresponding to delay classes.

A buffer for outputting cells is selected from the plurality of buffers provided for a delay class for the outputting cells as follows. More specifically, if cells are present in a buffer in the strictest delay request class, cells are output from this buffer. If cells are present in a buffer in the second strictest delay request class, cells are output from this buffer only when no cell is stored in the above-mentioned buffer in the strictest delay request class. A buffer in the loosest delay request class outputs cells only when no cell is stored in the buffer in the strictest delay request class and the buffer in the second strictest delay request class.

Cells output from the OBUF in this manner are subjected to shaping processing by the CSH. The shaping processing function is realized by regulating an output operation of cells, if necessary, so as to prevent a cell from being determined as a violation cell in the opposing polishing function. The shaping processing includes a VC shaping mode as a shaping mode associated with VCs, and a VP shaping mode as a shaping mode associated with VPs. When both the VC and VP shaping modes are executed, two stages of CSHs are cascade-connected, thereby executing these shaping modes.

SW cells are input to the CSH to have shaping ch numbers for both VC and VP polishing modes. The shaping ch number is the number of the leaky bucket for observing a VP or VC to which the corresponding cell belongs. Each CSH selects one of the shaping ch numbers, and determines based on the selected shaping ch number whether the corresponding cell is observed by a low- or high-speed channel leaky bucket. The cell is selectively supplied to one of two special-purpose buffers, i.e., high- and low-speed polishing cell buffers according to the determination result.

High-speed polishing/low-speed polishing priority control is performed to cause a low-speed channel leaky bucket to check if a header cell of the low-speed polishing cell buffer is a violation cell at the beginning of one cell period given as 8-bit parallel data at $18.72 \times (64/53)$ MHz. If the cell is not a violation cell, then it is determined that the cell is to be output.

In contrast to this, if the low-speed polishing cell buffer is empty or the header cell of the low-speed polishing cell buffer is a violation cell, the high-speed polishing/low-speed polishing priority control then accesses the high-speed polishing cell buffer. A high-speed channel leaky bucket checks whether or not cells in the buffer are violation cells from the header cell in turn until one cell period is completed. If a cell which is not a violation cell is found for the first time in this sequence, it is determined that the cell is to be output.

In this case, the high-speed channel leaky bucket performs violation cell judgment a plurality of times, thereby preventing a decrease in throughput of the OBUF caused when an output operation of a cell determined as a violation cell is stopped. When the high-speed polishing/low-speed polishing priority control cannot find a cell to be output, empty cells are output. An actual cell output operation is performed in a cell period next to a period in which a cell to be output is determined. The buffer provided for each delay class is constituted by one of buffers for sharing one area (shared buffer), thereby effectively utilizing a buffer area.

Figure 27A:
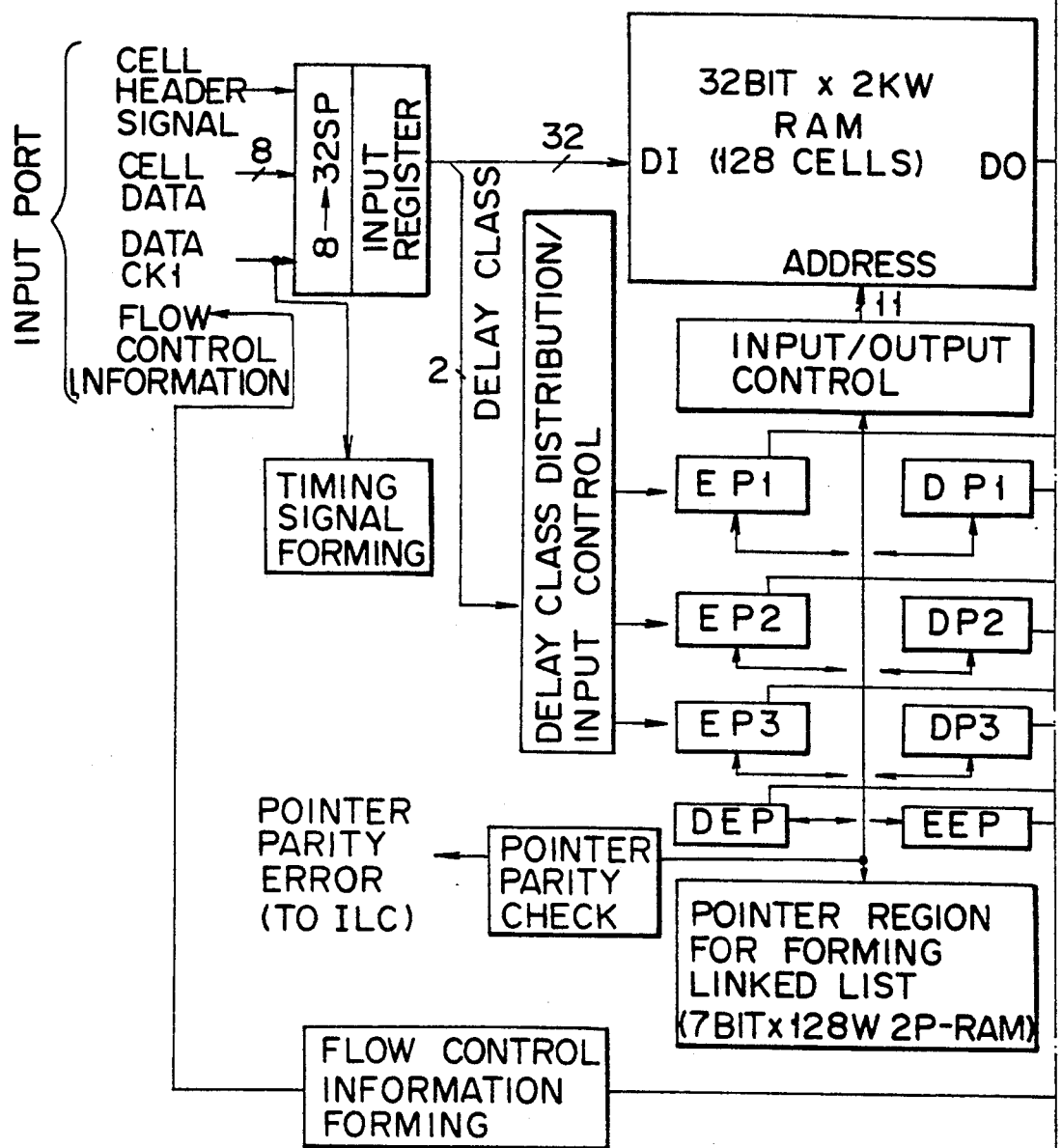
FIG. 27 includes FIGS. 27A and 27B as positioned as shown and represents a diagram showing an arrangement of an OBUF.

The OBUF having functions as described above has an arrangement shown in, e.g., FIGS. 27A and 27B.

The OBUF is realized by a FIFO having a length corresponding to 128 cells, and has a role of rate transformation from an ATMSW system to an INF system, and a role of delay class control. The OBUF controls cell flows by executing flow control (applying a back pressure) toward the ATMSW in terms of conflicts of cells at its output port and a decrease in throughput of the buffer caused by an output operation suppressed by the CSH. A RAM shown in the central portion of FIGS. 27A and 27B has a capacity corresponding to 128 cells, and serves as a storage area of cells which are being subjected to delay class control. The address space of the RAM is divided into blocks each having a capacity corresponding to one cell, and cell write/read-/empty area management is performed in units of blocks. Note that cell read/write accesses to this RAM are controlled by an input/output control section connected to the RAM.

A cell input from the input port is written in a block selected from empty blocks which do not hold cells. A cell output from the output port is temporarily transferred from the RAM to a dual buffer, and is subjected to rate transformation by the dual buffer. Thereafter, the cell is output. When an SW cell is output, parity bits in the last octet of the SW cell are checked. When the OBUF is empty, empty cells are output.

One of the buffers provided for a delay class is constituted as shared buffer on the above-mentioned RAM. In the shared buffer, a FIFO structure for forming each buffer structure corresponding delay class is formed by the linked list method. For this reason, in the linked list structure buffer for each class, a register EPx for holding an enqueue position, and a register DPx for holding a dequeue position are allocated. Furthermore, as a tag area for the respective blocks on the RAM, a 7 bit $\times$ 128 word 2P-RAM is separately prepared. Pointers, corresponding to the respective blocks, for forming the linked list structure are allocated on the 2P-RAM. A parity bit is assigned to the pointer area on the 2P-RAM like in the unit switch LSI of the ATMSW. This parity is checked when a pointer is written in the 2P-RAM. If a parity error is detected, a link disconnection is determined, and a message indicating this is informed to the ILC.

Empty area management is performed using the linked list structure by utilizing the pointers on the 2P-RAM like in one of the buffers provided for a delay class in view of a decrease in the number of hardware components. For this purpose, registers EEP and DEP for holding enqueue and dequeue positions of the linked list structure buffers are arranged.

Whether or not the linked list structure buffer of each class is empty is determined by comparing values in the registers EPx and DPx. Similarly, whether or not the OBUF is full is determined by comparing values in the register EEP for holding the enqueue position of the empty area management buffer, and in the register DEP for holding its dequeue position.

The 2P-RAM and the registers for holding the enqueue and dequeue positions of the linked list structure buffers are connected via a bus. With this bus structure, a sequence operation need not be performed by enqueuing/dequeuing data from the linked list structure buffers, and the shared buffer can be realized by an algorithm suitable for a high-speed hardware arrangement. This technique has been proposed by the present inventors in U.S. Pat. No. 5,083,269, and the like.

A block number of a block for receiving a newly input cell is obtained by dequeuing one block number from the empty area management buffer. A linked list structure buffer to which the block number of the block which stores the input cell is to be enqueued is determined by referring to a delay class bit in additional information of an SW cell under the delay class selection/input control.

On the other hand, output class determination/output control is executed as follows. That is, a buffer from which a cell is to be output is determined according to the above-mentioned algorithm on the basis of a judgment result of whether or not each linked list structure buffer is empty by a Full/Empty judgment section. Thereafter, the block number is dequeued from the buffer, a cell is read out from the block, and the readout cell is output. In addition, the block number is enqueued in the empty area management buffer.

Busy state supervision is performed by displaying a busy state alarm on the ILC when the OBUF is in a FULL state for a predetermined time during a predetermined period, and a back pressure is applied to the ATMSW. More specifically, the number of cell periods during which the OBUF is in a FULL state is counted during a given period, e.g., a 10,000 cell-period, and when the count value exceeds a threshold value, a busy state is determined, and a busy state alarm is informed to the ILC. With this busy state supervision, an average use rate of links can be estimated by the ILC. Note that the observation periods of the busy state and the threshold value can be appropriately set by, e.g., the ILC.

When the OBUF is empty, a message indicating this is informed to the ILC, and, for example, cell loss free swapping processing is performed using this information.

Figure 28C:
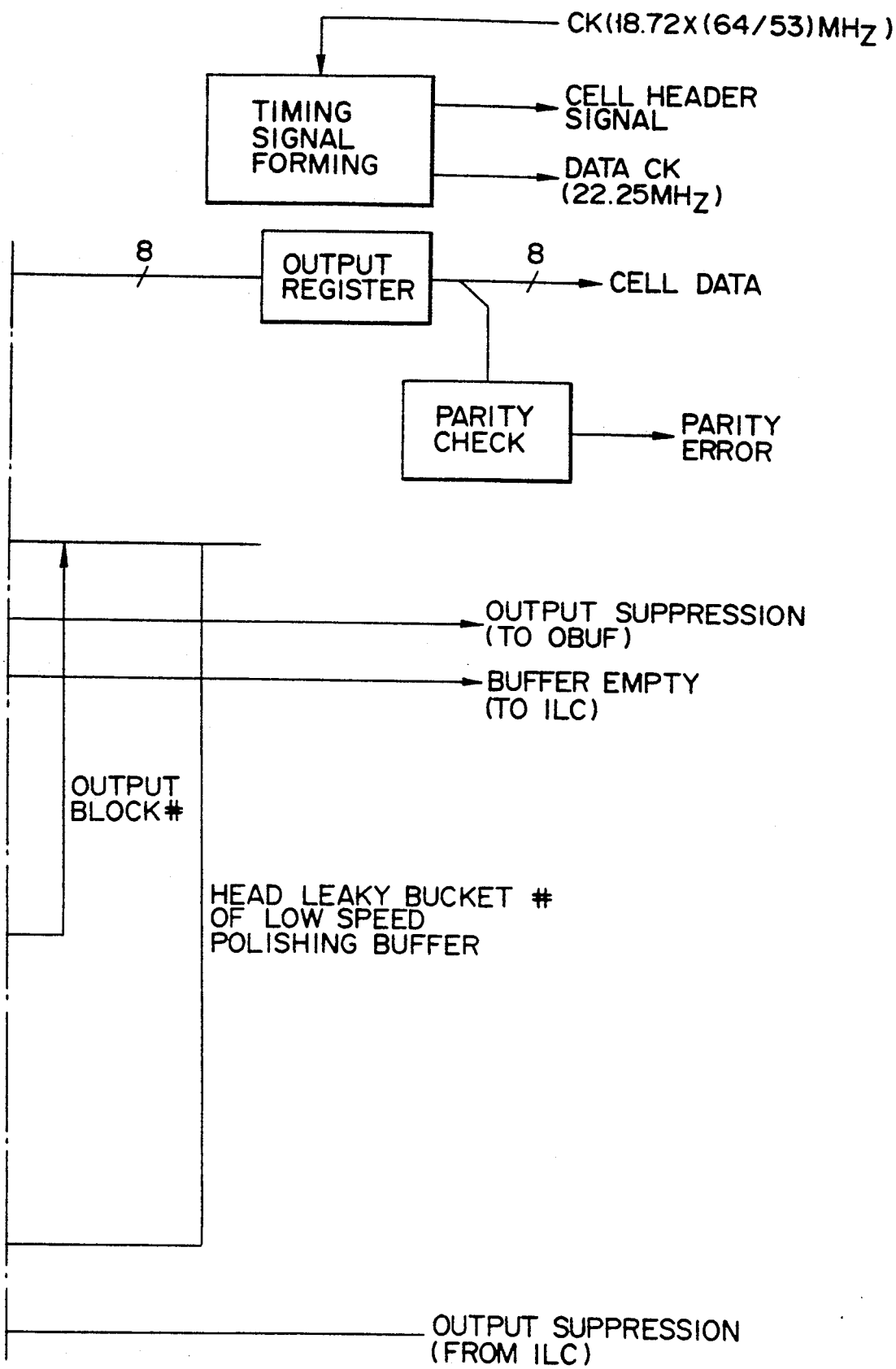

In contrast to the OBUF described above, the CSH is arranged as shown in, e.g., FIG. 28.

The CSH observes an output cell flow by the leaky buckets, and executes shaping processing. This CSH observes an output cell flow using the same leaky buckets as those used in the TOVA described above.

A RAM shown in the central portion of FIGS. 27A and 27B has a capacity corresponding to 128 cells, and serves as a storage area of cells which are being subjected to shaping. The address space of the RAM is divided into blocks each having a capacity corresponding to one cell, and cell write/read/empty area management is performed in units of blocks. Cell read/write accesses to this RAM are controlled by an input/output control section connected to the RAM.

A cell input from an input port is written in a block selected from empty blocks which do not hold cells. If VP shaping processing is performed for the cell being input simultaneously with this cell write operation, a shaping ch number for VP shaping is extracted; if VC shaping is performed, a shaping ch number for VC shaping is extracted. Low-speed polishing/high-speed polishing selection is performed in accordance with the extracted shaping ch number, and the cell being input is enqueued in a low-speed polishing buffer/high-speed polishing buffer together with a block # of a block which holds the cell. The processing of the TOVA described above and the processing of the CSH are different from each other in this respect. When VP and VC shaping processing operations are simultaneously performed, CSHs can be cascade-connected.

In the TOVA, the physical VCI reception function performs table access for obtaining a leaky bucket number. Even when the TOVA LSI is modified in this manner, an LSI which can be used for both the TOVA/CSH can be easily constituted. Therefore, a TOVA LSI and a CSH LSI can be realized as common hardware.

Figure 29:
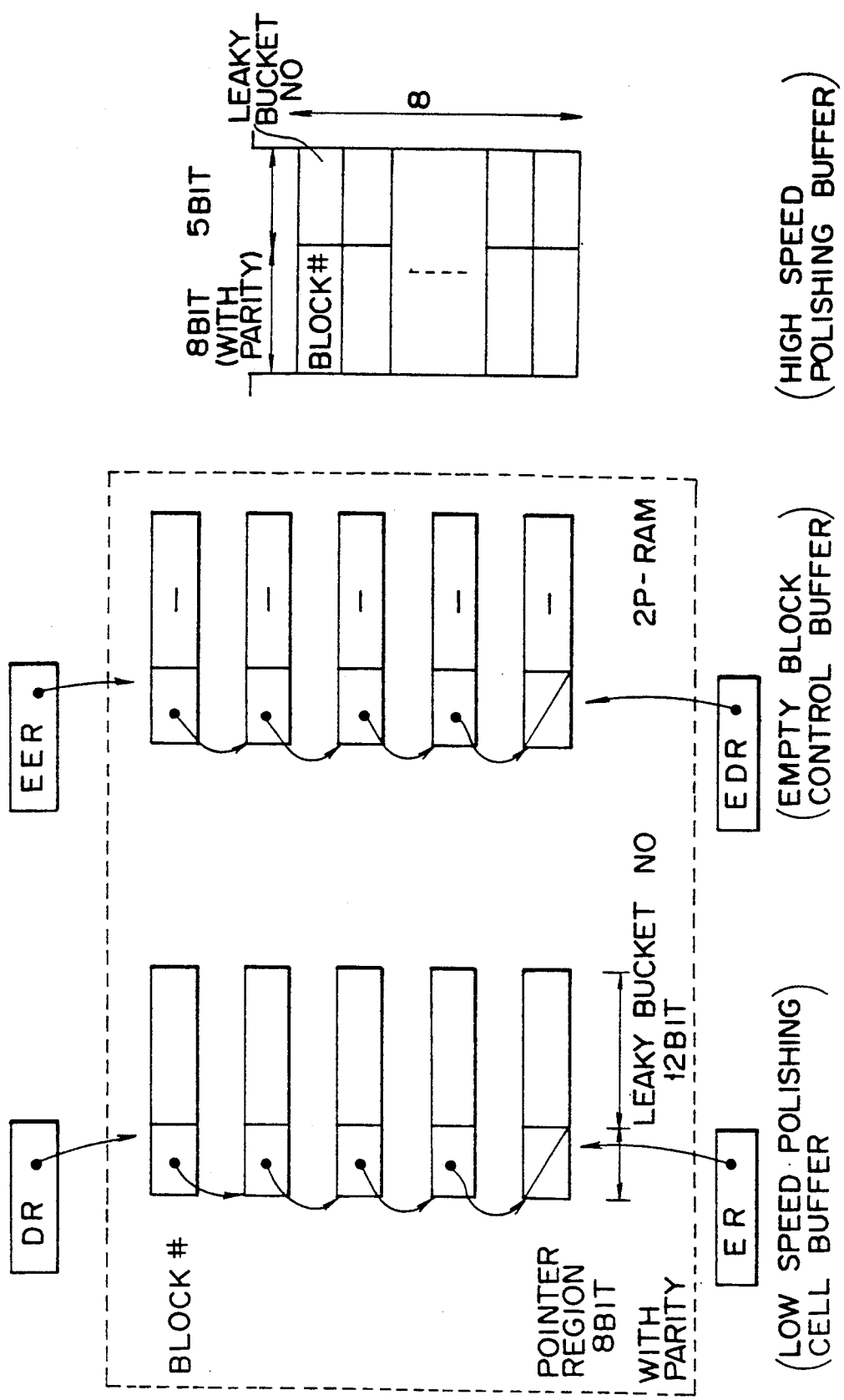
FIG. 29 shows a data architecture of a polishing buffer.

FIG. 29 shows data architectures of the low-speed polishing cell buffer and the high-speed polishing cell buffer in the CSH. As shown in FIG. 29, both the low-speed polishing cell buffer and the RAM empty area management buffer are realized as buffers based on the linked list method formed on the linked list formation/leaky bucket number 2P-RAM. On the other hand, the high-speed polishing cell buffer must be looked up from data stored at its header position in turn in accordance with the above-mentioned shaping processing algorithm. For this reason, the high-speed polishing cell buffer is realized as shift register type 8-bit buffers independently of the low-speed polishing cell buffer/empty area management buffer.

Empty block detection upon input of a cell can be realized by dequeuing one information from the RAM empty area management buffer described above, and using a block number included in the dequeued information. A cell is output in synchronism with a cell period generated by a timing generating section. A cell to be output in a given cell period is determined by violation cell judgment control in a period before the given cell period according to the following procedure.

More specifically, a leaky bucket # at the header position of the low-speed polishing cell buffer is looked up, and the look-up result is informed to the low-speed channel leaky bucket controller, thereby determining whether or not the corresponding cell is a violation cell. If the cell is not a violation cell, information at the header position of the low-speed polishing cell buffer is dequeued, and a block number included in the dequeued information is determined as a block which holds a cell to be output next, thus ending an output cell determination sequence. When an output cell is a violation cell, or when the low-speed polishing cell buffer is empty, processing advances to the next procedure.

It is then checked if the high-speed polishing cell buffer is empty. If the high-speed polishing cell buffer is empty, an empty cell is output, and the output cell determination sequence is ended. On the contrary, if the high-speed polishing buffer is not empty, leaky bucket numbers are informed to the high-speed channel leaky bucket in turn from the number at the header position, thereby determining whether or not corresponding cells are violation cells. If it is determined in this sequence that an input cell is not a violation cell for the first time, information including the leaky bucket number is dequeued from the buffer, and a block number included in the dequeued information is determined as a block which holds a cell to be output next, thus ending the output cell determination sequence.

If all the cells corresponding to eight leaky bucket numbers held in the high-speed polishing cell buffer are determined as violation cells, empty cells are output in this case, and the output cell determination sequence is ended.

When cells corresponding to both the low- and high-speed channel leaky buckets are determined as violation cells, increment operations of the leaky buckets designated by the leaky bucket numbers are suppressed. Therefore, traffic characteristics of a cell flow output from the CSH can be observed by the leaky buckets.

A cell output operation is realized by reading out a cell from the RAM by the input/output control section in accordance with the block number determined by the output cell determination sequence, and outputting the readout cell from the CSH. When the cell is output, parity bits in the last octet of an SW cell are checked, and simultaneously with this checking operation, the number of the block from which the cell is read out is enqueued in the RAM empty area management buffer.

When the RAM has no empty block, output suppression is performed toward the OBUF so as not to discard cells. When no cells are stored in the RAM and the high-speed polishing cell buffer, a buffer empty signal indicating this is supplied to the ILC. The buffer empty signal is used in the cell loss free system swapping function. Furthermore, the output operation of the CSH is suppressed by the ILC, and this output suppression is also used in the cell loss free system switching function.

A parity is assigned to the pointer area for constituting the linked list buffer allocated on the 2P-RAM. This parity is checked when a pointer is written in the 2P-RAM. When a parity error is detected upon this checking operation, it is determined that link disconnection has occurred, and a message indicating this is informed to the ILC.

The high-speed polishing cell buffer is arranged, as shown in FIG. 30.

As described above, in the high-speed polishing cell buffer, information other than header information of cells is looked up/dequeued. Therefore, the high-speed polishing cell buffer is realized as a shift register type buffer. Valid/invalid bits of registers constituting this buffer are bits indicating whether or not the corresponding registers hold information. Information is enqueued by writing information in the lowermost register (FIG. 29) which does not hold information. Information is dequeued by outputting information to be dequeued outside the buffer, and shifting information stored in registers above the dequeued register (FIG. 29) to the left each by one register. A register from which information is to be dequeued is designated by word designation.

Observation information in the OBUF and the CSH will be described below.

The observation information in the OBUF includes buffer empty information, busy state alarm information, a busy state observation parameter, pointer parity error information, and parity error information. The ILC determines link disconnection based on the pointer parity error information. The parity error information indicates a checking result of parity bits in the last octet of an SW cell.

Note that the OBUF may comprise a counter for counting the number of cells held therein in units of classes, and may compare a delay class of a cell to be output with the counter value, thereby checking contradiction from the delay control algorithm, and supervising the delay control algorithm.

The observation information of the CSH includes various polishing parameters, pointer parity error information, parity error information, output suppression information, and buffer empty information described in reference to the TOVA. The ILC determines link disconnection based on the pointer parity error information. The parity error information indicates a checking result of parity bits in the last octet of an SW cell. Based on the output suppression information, the ILC inhibits a cell output operation from the CSH in, e.g., the cell loss free system swapping procedure described below. The buffer empty information is also used in the cell loss free system swapping procedure.

An operation confirmation operation in the CSH is performed as follows upon setting of a VC.

In the operation confirmation operation, whether or not an increment/decrement operation of a counter of a leaky bucket used in smoothing of the corresponding VC can be normally performed is checked in the same procedure as that of the TOVA described above. The decrement operation is stopped, and the counter is set to be a value determined as a violation cell. Thereafter, an ATM layer OAM cell of a newly set VC is input from the OMDI, and it is then checked if the output operation of the OAM cell is suppressed by the CSH until the counter is reset to be a value which is not determined as a violation cell.

The routing tag deleting function in the above-mentioned cell processing function will be described below. The routing tag deleting function is realized by the RTD (Routing Tag Deleter).

Figure 31A:
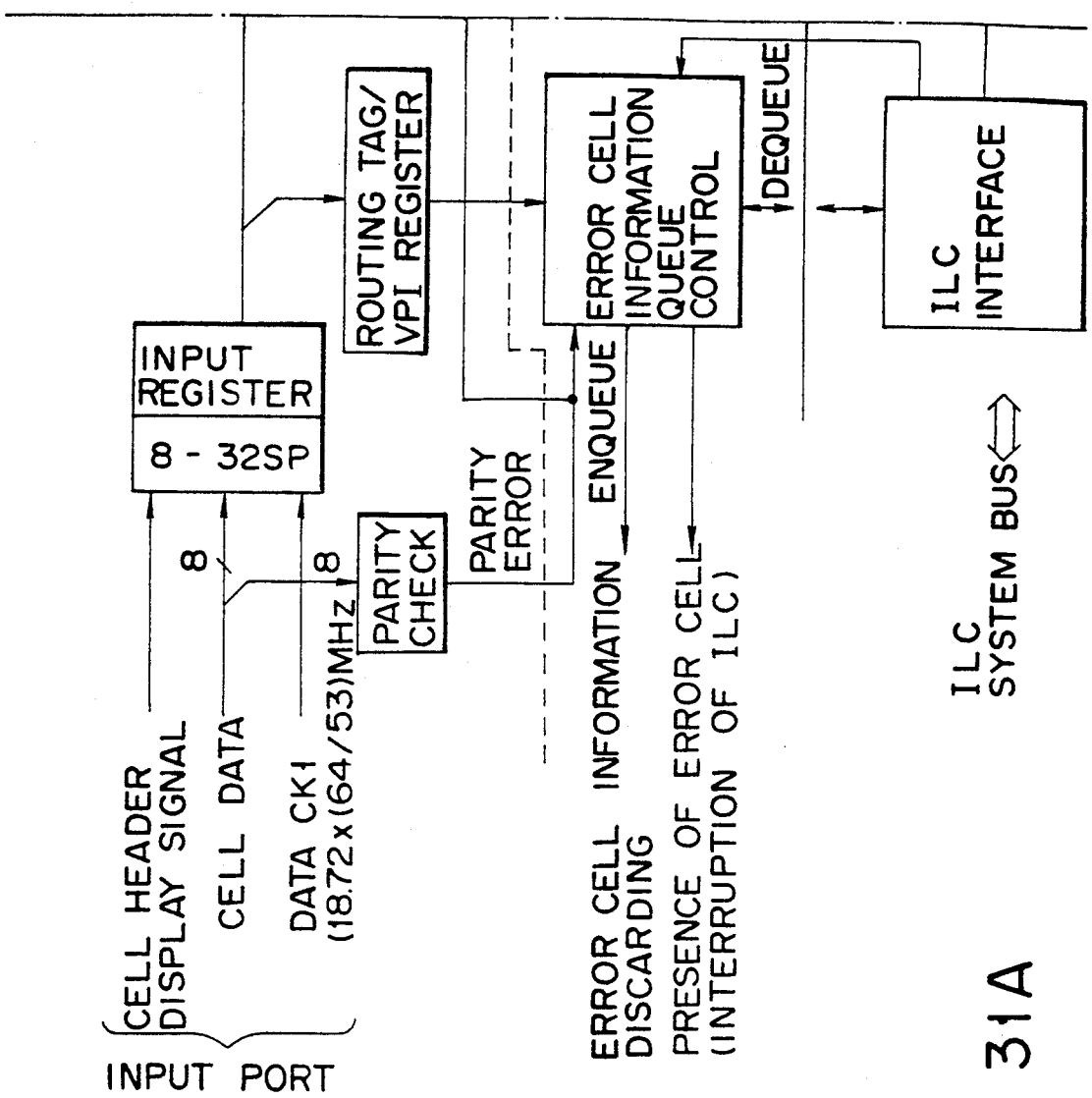
FIG. 31 includes FIGS. 31A and 31B positioned as shown and represents a diagram showing an arrangement of an RTD.
Figure 31B:
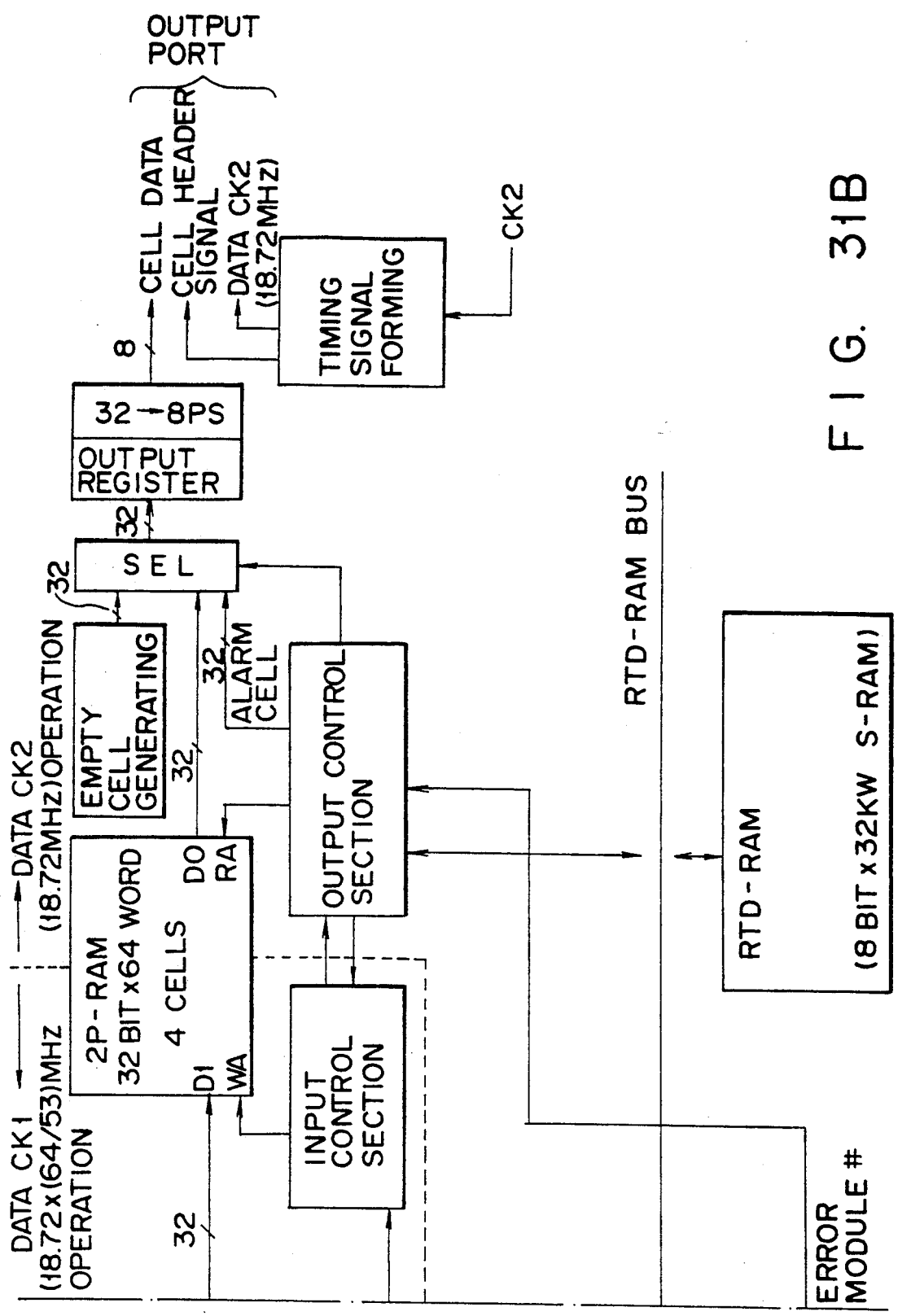

FIGS. 31A and 31B show a schematic arrangement of the RTD. This RTD basically performs format transformation from an SW cell to a UNI/NNI cell. At this time, parity bits as the last octet of the SW cell are checked, and a cell having a parity error is discarded. A routing tag and a VPI of a discarded cell are informed to the ILC, and at the same time, an alarm cell in the UNI/NNI cell format is automatically generated upon an instruction from the ILC.

The address space of a 2P-RAM in the RTD is divided into blocks each of which can store one cell. Cell input control is performed by receiving a block number of a block written with no cell, and writing an input cell in the empty block. On the other hand, cell output control is performed by receiving a block number of a block written with a cell, and reading out a cell from the block. When a cell is read out from the 2P-RAM, unnecessary octets are skipped, thereby performing format transformation to the UNI/NNI cell. The number of a block from which a cell is read out is supplied to the input control section as an empty block number. When no cell to be output is stored in the 2P-RAM, empty cells are output from the output port.

When the SW cell is written in the 2P-RAM, a parity check of the last octet of the SW cell is simultaneously performed. A cell having a parity error is discarded. This processing can be executed in such a manner that the input control section does not supply the number of the block in which a cell having a parity error to the output control section, and overwrites the next input cell in the block. A routing tag and a VPI/VCI of a cell having a parity error are temporarily held as error cell information in an error cell information queue in an RTD-RAM under the error cell information queue control. When this queue is not empty, a message indicating this is informed to the ILC by interrupt processing. The ILC dequeues and fetches error cell information from the queue in an interrupt routine.

The automatic generation of an alarm cell in the UNI/NNI format is performed as follows. In the RTD-RAM, a table which allows retrieval of, based on, e.g., a shaping ch number added by the RTA, a VPI/VCI of a cell subjected to shaping by a corresponding shaping channel, and a module number of a module which outputs the corresponding cell to the RTD through the ATMSW is prepared. When the ILC supplies a module number having an error, and an alarm cell generating instruction is supplied to the output control section, the output control section looks up the shaping number VPI/VCI/module number transformation table in turn from shaping ch number [0], and compares the input error module number, and module numbers written in the transformation table. When a coincidence between two module numbers is found, the output control section generates an alarm cell having a VPI/VCI in the same entry, detects an empty cell output timing, and outputs the alarm cell in place of the empty cell. Upon completion of a series of operations, the shaping ch number is incremented, and the same operations are repeated.

The shaping ch number is used as an identifier for simply recognizing a VC at the output side of the ATMSW. Therefore, either of two shaping ch numbers, i.e., VP and VC shaping numbers in the SW cell may be used. For example, the ATMSW may generate a physical VCI, and the physical VCI may be used as another identifier. The reason why the shaping number is utilized in this system is to reduce a load for a control processor necessary for setting a physical VCI.

Figure 32A:
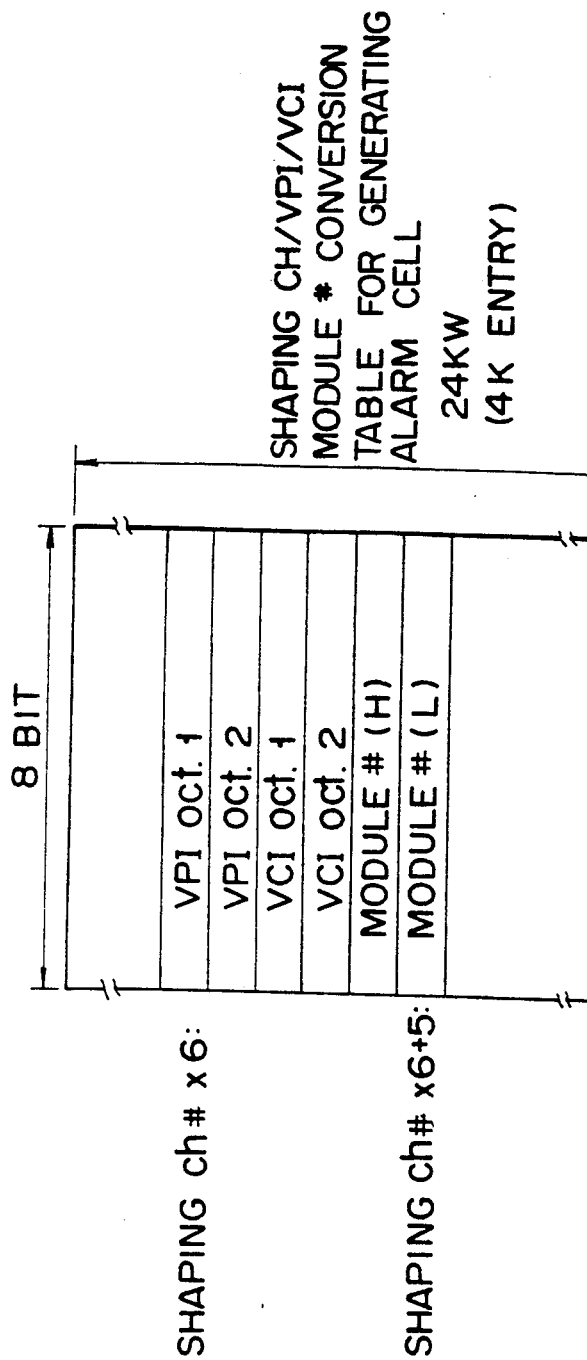
FIG. 32 includes FIGS. 32A and 32B positioned as shown and represents an address map of an RTD-RAM.

FIGS. 32A and 32B show an address map of the above-mentioned RTD-RAM.

The shaping number VPI/VCI/module number transformation table used for automatically generating an alarm cell, and an error cell information ring buffer area are allocated on this RTD-RAM, and are assigned as shown in FIGS. 32A and 32B.

As observation control information in the RTD, error cell information, error cell information discard information, and an alarm cell generation VPI module # transformation table are prepared.

The error cell information is information associated with a cell having an SW cell parity error. When this information is held in the RTD-RAM, a message indicating this is informed to the ILC by interrupt processing. The error cell information discard information is used as follows. That is, when pieces of error cell information are generated in a burst-like manner due to some constant errors, and the processing in the ILC cannot catch up with these errors, the error cell information is discarded, and the error cell information discard information is used to inform to the ILC that the error cell information is discarded.

The detail explanation of each function of the cell functions for the node system shown in FIG. 2 was ended by the above description.

The cell function applied to a star type link system will be described hereinafter.

The difference between the cell functions of the link system and the node system is as follows.

The first difference is a method for determining a physical VCI. In case of the link system, since the cell is switched in accordance with the observation of VPI, so that the VPI field of 12 bits of the input cell may be used as physical VCI. In VPI/VCI rewriting operation in RTA, VPI only may be rewritten. Such the change can be easily realized on a hardware. For example, it is possible to make identical LSIs correspond to both of VPI and VCI by a mode change.

The second difference is a function of OMDI. The OAM cell insertion/drop function will be described hereinafter.

An OAM function supported by the OMDI is realized as shown in, e.g., FIG. 33. The OMDI especially provides functions necessary for performing connection tests of cell transfer paths of the various OAM functions. More specifically, OMDI realizes the function capable of performing the following six tests.

ATMSW internal connection test
Transfer path connection test
NT1 loop back test
VP link coupling test
VP connection test
VC link connection test The ATMSW internal connection test is a test for checking if paths between input and output ports of the ATMSW are normally connected, and cells can be normally switched upon expansion of the ATMSW. Therefore, the object of this test can be attained by confirming that cells inserted from the respective input ports are output from the corresponding output ports.

The transfer path connection test is a test for checking if frame synchronization/cell synchronization is established between opposing INFs. This test can be attained by confirming that a cell output toward the opposing INF is returned by loop back.

Furthermore, the NT1 loop back test is a test for checking if frame synchronization/cell synchronization is established by an NT1 from a subscriber INF. This test is attained by confirming that a cell output toward the NT1 is returned by loop back.

The above-mentioned three tests are physical layer function checking tests, and are executed using a physical layer OAM cell. The header format of the physical layer OAM cell is determined according to, e.g., I.361, I.432 regulated by the CCITT. Furthermore, a drop/loop back bit is set in an information field of the physical layer OAM cell as bit information for designating whether at least the OAM cell is dropped or looped back.

The remaining three tests are ATM layer function checking tests.

The VP link coupling test is a test for checking if an RTA-ATMSW-RTD path is normally operated, and in particular, is a test paying attention to the VPI transformation function and the routing tag adding function of the RTA. This test can be attained by checking a coupling operation among VP links realized by the RTA-ATMSW-RTD path by checking if cells from a given INF to another INF are switched by the ATMSW while being normally subjected to VPI transformation.

The VP connection test is a test for checking if a cell can be normally transmitted between end points of a VP connection. This test can be attained by confirming that an OAM cell input from one end point of a VP connection is normally output to the other end point.

Furthermore, the VC link connection test is a service provided by a link system for a host system so as to execute some OAM functions among systems in ATM layers above the link system, i.e., among host systems.

The header format of the ATM layer OAM cell used for the above-mentioned tests is not standardized by the CCITT yet. For example, the header format may be set in such a manner that a VPI for identifying a VP link/connection to be tested is added in accordance with the analogy between an empty cell and the physical layer OAM cell, and [10] is set in a PT field. In addition, a drop/loop back bit can be set in an information field of the ATM layer OAM cell as bit information for designating whether at least the OAM cell is dropped or looped back.

Note that information of a field indicating a test level of a cell, i.e., a test level field is set in the information field of the physical layer/ATM layer OAM cell.

The physical layer OAM cell and a cell for the VP link coupling test may be dropped by OMDIs other than the OMDI arranged for the ATMSW internal connection test. Therefore, these cells will be referred to as level-1 OAM cells hereinafter. In order to perform the VP connection test, the ATM layer OAM cell must be caused to pass a VP link end point while being subjected to VPI transformation, and must be caused to reach a VP connection end point. Therefore, in order to realize this test function, each OMDI must recognize whether or not a VP connection test cell is allowed to pass. A cell which has information for such recognition, and is used in this test will be referred to as a level-2 OAM cell hereinafter.

Furthermore, for the VC link connection test, the ATM layer OAM cell must be caused to pass a link system. A cell used in this test will be referred to as a level-3 OAM cell hereinafter. In order to cause such OAM cells to selectively pass or loop back, each OMDI must have a function of identifying an OAM cell to be dropped/looped back by itself, dropping/looping back the identified cell, and allowing cells having other levels to pass therethrough.

No VP connection end point is present on a transmission path INF, and VP links are always connected on the transmission path INF. On an intra-office INF which is not connected to a link system, VP connection end points presented by a link system are always present. In contrast to this, on an intra-office INF connected to a link system, VP links are always connected like on the transmission path INF, and there is no VP connection end point. Furthermore, on a subscriber INF, VP connections are not always terminated, but serve as one end point in terms of a VP connection service presented by a link system. Therefore, in terms of the VP connection test executed by the link system, it can be regarded that a VP connection end point is present on the subscriber INF.

Note that the level-3 OAM cell must pass through all the OMDIs in the link system.

In this manner, operations performed for OAM cells of respective classes by OMDIs of the respective INFs, and the OMDI for the ATMSW internal connection test can be summarized as follows.

Level-1 OAM cell
    ATMSW . . . pass
    NT1 . . . drop/loop back
    Subscriber INF ...drop/loop back
    Transmission line INF ...drop/loop back
    Intra-office INF opposite to a node system . . . drop/loop back
    Intra-office INF opposite to a link system . . . drop/loop back Level-2 OAM cell
    ATMSW . . . pass
    Subscriber INF . . . drop/loop back
    Transmission line INF . . . pass
    Intra-office INF opposite to a node system . . . drop/loop back
    Intra-office INF opposite to a link system . . . pass Level-3 OAM cell
    ATMSW . . . pass
    NT1 . . . pass
    Subscriber INF . . . pass
    Transmission line INF . . . pass
    Intra-office INF opposite to a node system . . . pass
    Intra-office INF opposite to a link system . . . pass Level-0 OAM cell
    ATMSW . . . drop
    NT1 . . . drop/loop back
    Subscriber INF . . . drop/loop back
    Transmission line INF . . . drop/loop back
    Intra-office INF opposite to a node system . . . drop/loop back
    Intra-office INF opposite to a link system . . . drop/loop back As can be understood from this summary, whether the level-2 OAM cells are caused to pass through the OMDI or to be dropped/looped back cannot be simply regulated, and whether these cells are caused to pass through the OMDI or dropped/looped back must be able to be selected according to the kind of INFs.

With this test function, the functions of the overall system can be effectively tested in addition to the functional tests shown in FIG. 5 described above.

The ATMSW internal connection test, transmission line connection test, and VC link coupling test which are defined in the node system can be realized by a structure similar to that for the ATMSW internal connection test, transmission line connection test, and VP link coupling test within the above described test terms. Accordingly, the OMDIs of the link system and node system can be realized by the identical kind of LSIs.

The cell loss free system swapping function which is supported by the system to have a high reliability will be described below. This function has a so-called buffer state output function with which when a buffer in the ATMSW is empty, the ATMSW outputs information indicating this outside the switch, and is a function of realizing a system switching operation without discarding cells by utilizing the buffer state output function when a system is switched from a currently operating system (active system) to a reserved system (stand-by system) in a duplex-structure switch.

More specifically, when the number of transmission lines is enlarged/reduced, or when VPs/VCs are rearranged upon generation of, e.g., blocking, switch plane must be swapped not to degrading the service quality. In a conventional circuit exchanger, when an address control memory for designating connection destinations of lines to be set, and a switch section are duplicated, and a selector for switching between these systems is arranged, the system of the address control memory is switched at a given timing, thereby swapping switch plane without instantaneous disconnection.

The above conventional instantaneous disconnection-free system swapping function will operate with no trouble because pieces of information input using the same time slot are present on the same time slot when they are output.

Figure 34:
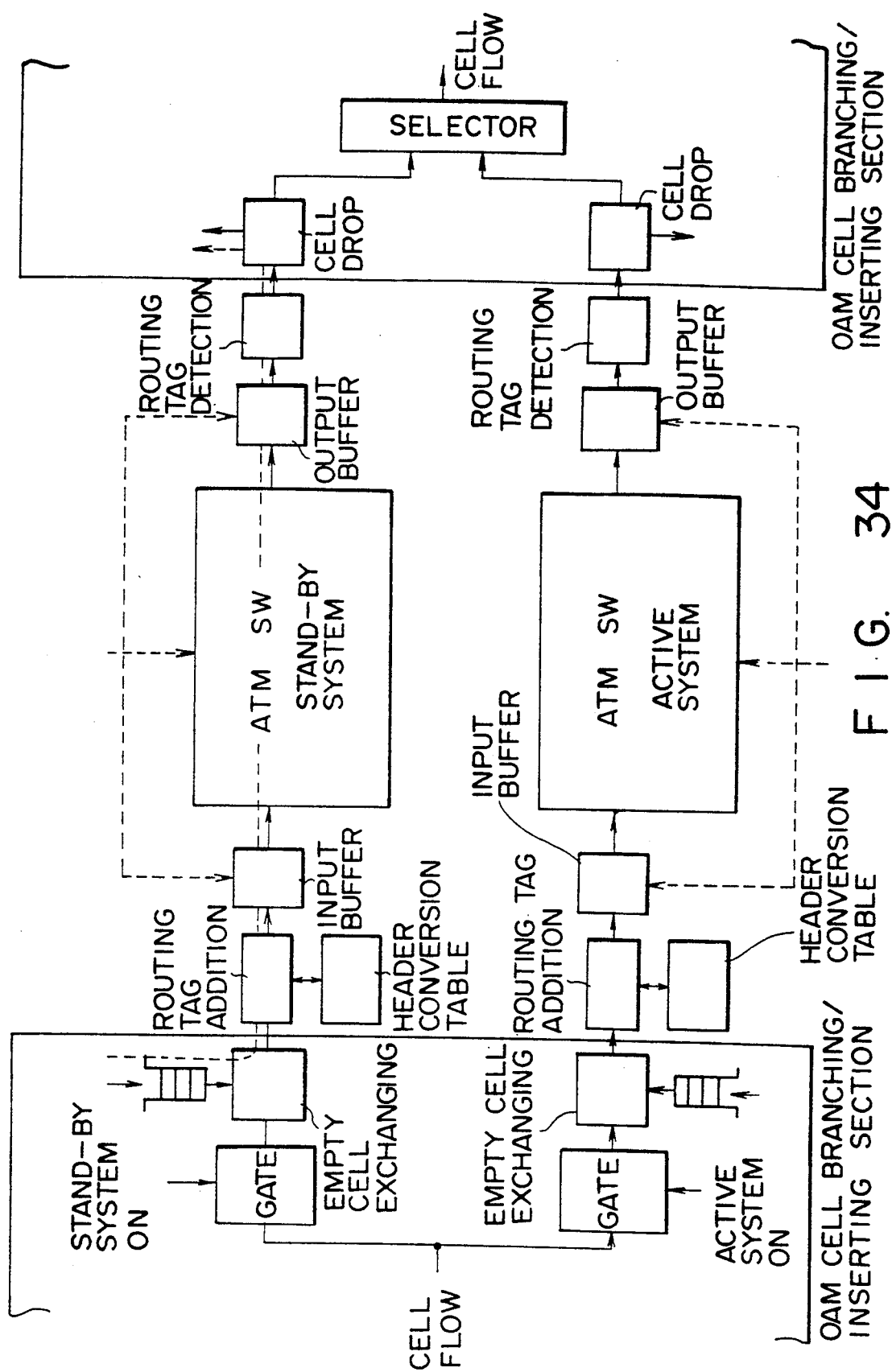
FIG. 34 is a diagram for explaining an instantaneous disconnection-free system swapping operation of an ATMSW.

However, when an ATM switching communication is performed, since the ATMSW includes a buffer, input information is stored in the buffer for a while. Therefore, cells stored in the buffer are discarded unless the system switching operation is performed after all the cells stored in the buffer are passed through, and it is confirmed that the buffer is empty. This system has the function of outputting information indicating whether or not the buffer in the ATMSW is empty, and realizes the cell loss free system swapping control as follows. More specifically, in this system, a switch section, and a header transformation table are duplicated, as shown in FIG. 34 showing a principal arrangement. That is, one system continues to provide the present service, while the content of the other table can be changed to be matched with that after the system is swapped.

After the content of the table is changed, the inputs of the transformation table and the switch are swapped at a given timing, and when it is confirmed that the buffer in the switch is completely empty, the output of the switch is swapped. With this procedure, the system swapping function can be can be realized without causing cell discard.

The detailed system swapping procedure will be described below with reference to FIG. 34.

In the OAM cell flow insert/drop section, a gate of the stand-by system is set to be [OFF], thus cutting a cell flow to the stand-by ATMSW. At this time, the gate keeps outputting empty cells.

In this state, it is checked if the input buffer, the output buffer, and the buffer in the ATMSW in the stand-by system are completely empty, and thereafter, the header transformation table of the stand-by system is changed.

Thereafter, the changed content of the header transformation table of the stand-by system is confirmed. More specifically, the empty cell exchanging section of the stand-by system inserts an OAM cell having an old VPI, and is actually added with a routing tag to pass through the stand-by ATMSW. This cell is then fetched in the control section by the cell drop function, and is checked.

Upon completion of the checking operation, a cell output operation from the output buffer of the stand-by system is inhibited, and when the gate of the currently active system is set to be [OFF], the gate of the stand-by system is set to be [ON], so that a cell flow can flow through only the stand-by system. In this state, it is checked if the input buffer, the output buffer, and the buffer in the ATMSW in the currently operating system are completely empty, and when it is determined that these buffers are empty, selection of the selector is switched from the currently active system to the stand-by system. Thus, a cell output operation from the output buffer of the stand-by system is permitted.

In this manner, after it is confirmed that the buffer in the ATMSW is empty, the system switching operation is controlled. Thus, even when the ATM switching communication is performed, an cell loss free system swapping operation can be effectively performed.

The combination of the function elements described above is an architecture of the cell processing function relating to the present invention. The cell processing functions having different required conditions such as a function for a link system for a star topology, a function for a node system for a public network and a function for a node system for a private network can be realized by the architecture.

In view of arrangement of polishing/shaping function, the cell processing function architecture relative to the present invention can flexibly satisfy various required conditions by arranging TOVA on a location to be subjected polished and arranging CSH on a location to be shaped. This cell processing function architecture will be described referring to FIGS. 35A to 35F.

The figures show an arrangement structure of cell processing functions for a node system for a private network, a large scale node system for a private network and a node system for a public network, which are connected by a transmission network constructed by link systems.

The polishing device is located on the terminal of VC connection, that is, if it is a node system for a private, on a point $S_B$ or a (public) point $T_B$ being an interface point between the private network and the public network, and arranged, if it is a node system for a public network, on a point UNI. On the other hand, the shaping is performed on a point on which CSH is located.

Prior to the description of the traffic shaping control function arrangement, necessity of this shaping control will be explained below.

An ATM communication system comprising individual cell processing functions is constituted as a whole by connecting link systems.

In FIGS. 35A to 35F, AU is a function for performing an access control to shared media which is one of the important construction elements of the node system.

A given traffic amount regulated in advance by a contract with the public network is set between a given node system for a private network and a subscriber accommodating node of the public network, or between a plurality of node systems sandwiching the public network therebetween. For this reason, a cell flow is controlled to fall within the traffic amount basically regulated for VPs because of the admission control and polishing control for VCs which are bandled into one VP.

However, cells may violate the traffic amount regulated by the VP and flow out onto the transmission network for a certain short period due to deformation of a cell flow of each VC output from a given terminal, or due to overlapping a burst state of VCs or phases of arrived cells. This is because cell flows of a plurality of VCs are bundled to one VP at an exit to the transmission network.

The transmission network observes these VPs to check whether or not actual cell flows are maintained in a contracted VP capacity, and when a cell flow violates the contract, cells are discarded. This function is the above-mentioned polishing function. However, users who utilize the node system are not responsible for such cell discard, and the node system itself must take a countermeasure for preventing cell discard due to the above-mentioned causes.

Therefore, the node system must perform shaping control of cell flows flowing out onto the transmission network for each contracted VP so as to keep traffic characteristics regulated for the VP, thereby preventing cell discard by VP polishing. Such shaping control must be individually performed for cell flows of VPs output from, e.g., the node system to the transmission network.

On the other hand, cell flows for each of VC flowing from a terminal to the node system basically keep their own stated traffic characteristics. Even if a cell flow violates the traffic characteristics, it is controlled by polishing control in each VC.

However, even when control for cell flows in each VC is performed at the entrance of the node system, traffic characteristics of the cell flows of each VC output from a terminal may be considerably deformed due to the influence of collision among burst phases of VCs when the cell flows pass through, e.g., the ATMSW. The traffic characteristics of the deformed cell flows may become inferior to original traffic characteristics, and these cells may be discarded as violation cells by VC polishing on the node system of the public network.

It is very difficult to generally and quantitatively evaluate a degree of traffic deformation of VCs. However, such evaluation can be made as follows. Due to the natures of shared media, each AU can only insert a cell in an empty slot when the empty slot is supplied from the upstream side. In a given time duration, for example, when window control is performed, throughput for each of AU or VCs can be guaranteed, but a VC peak rate cannot be guaranteed since it is influenced by whether an empty slot is supplied from the upstream side. This can be almost ignored if loads of shared media have a sufficient margin. However, the above-mentioned influence may pose a problem if the loads are increased. In the worst case, a number of cells having an original minimum cell interval larger than [1], and a VC minimum cell interval =[1] may continuously appear. In consideration of this problem, shaping control of VCs passing through a node system is required so as to correct deformation of their peak rates.

On the other hand, the ATMSW has at least a function of suppressing cell storage in the internal buffer of the ATMSW, and a function of performing shaping control for cell flows at cell output stages of individual cell processing functions although a degree of deformation depends on a switch architecture.

Figure 35B:
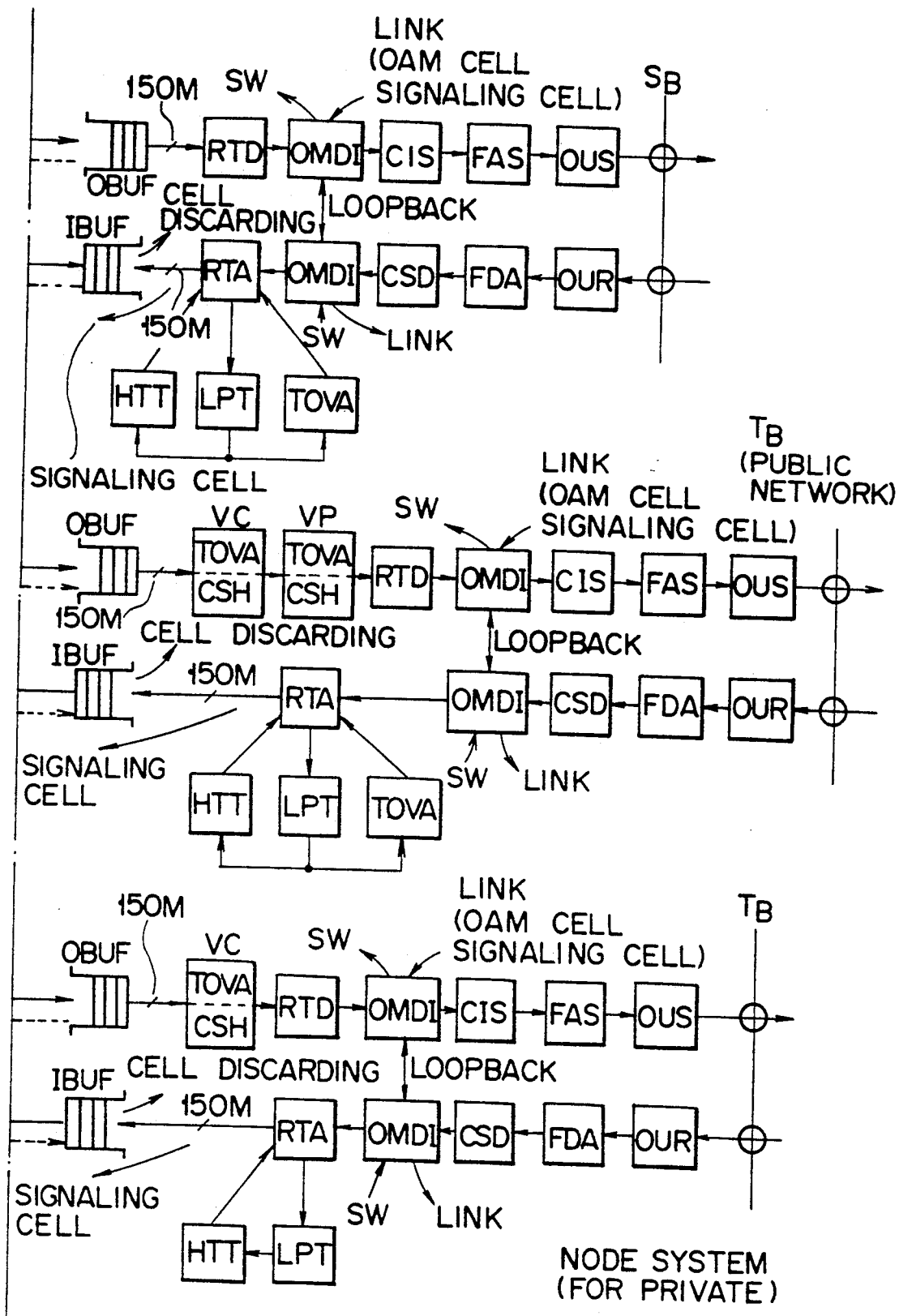
FIG. 35 includes FIGS. 35A to 35F positioned as shown and represents diagrams showing the overall arrangement of an node system for a private network, a node system (large scale) for a private network, and a node system for a public network which are constructed by individual cell processing functions
Figure 35C:
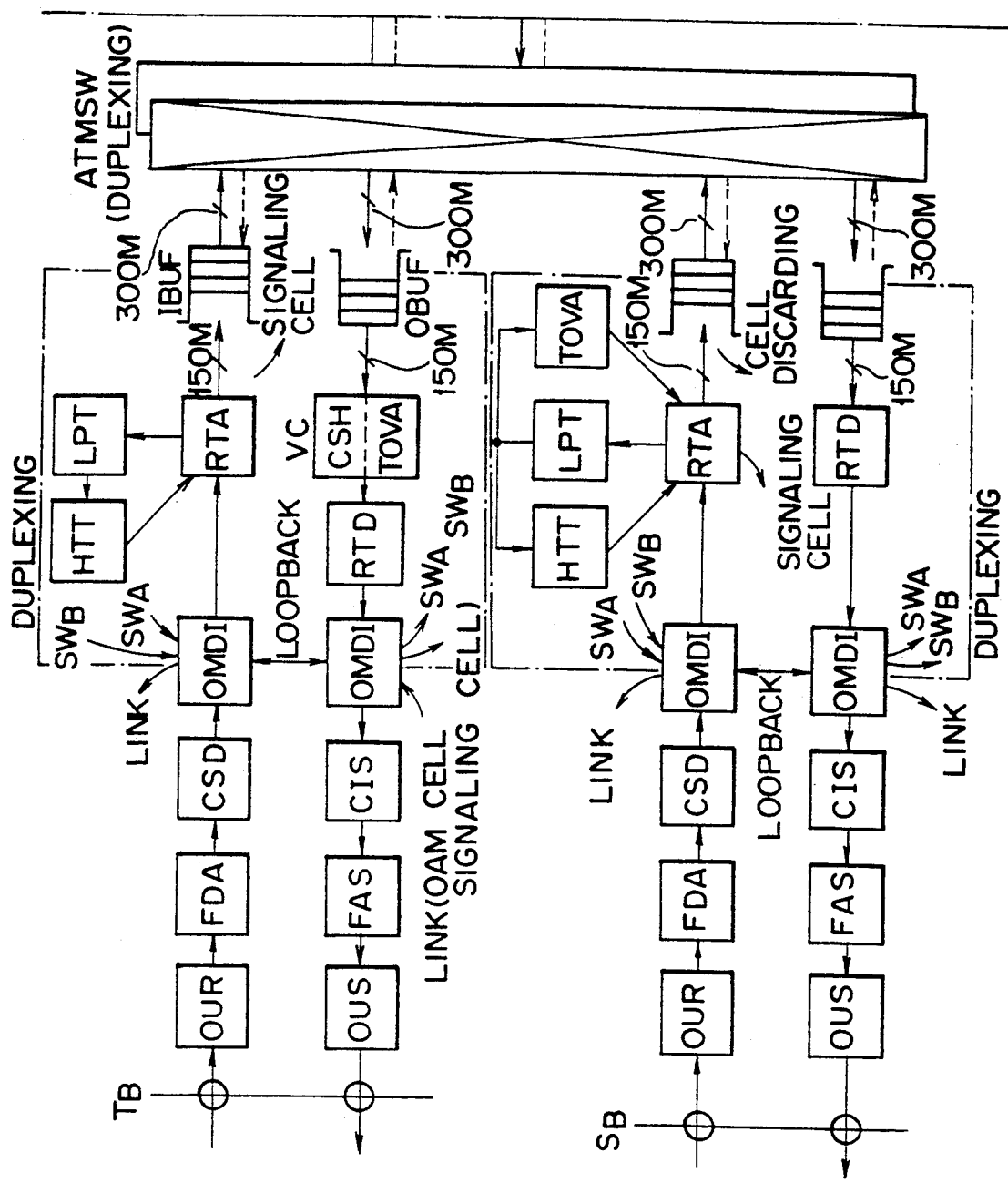
Figure 35D:
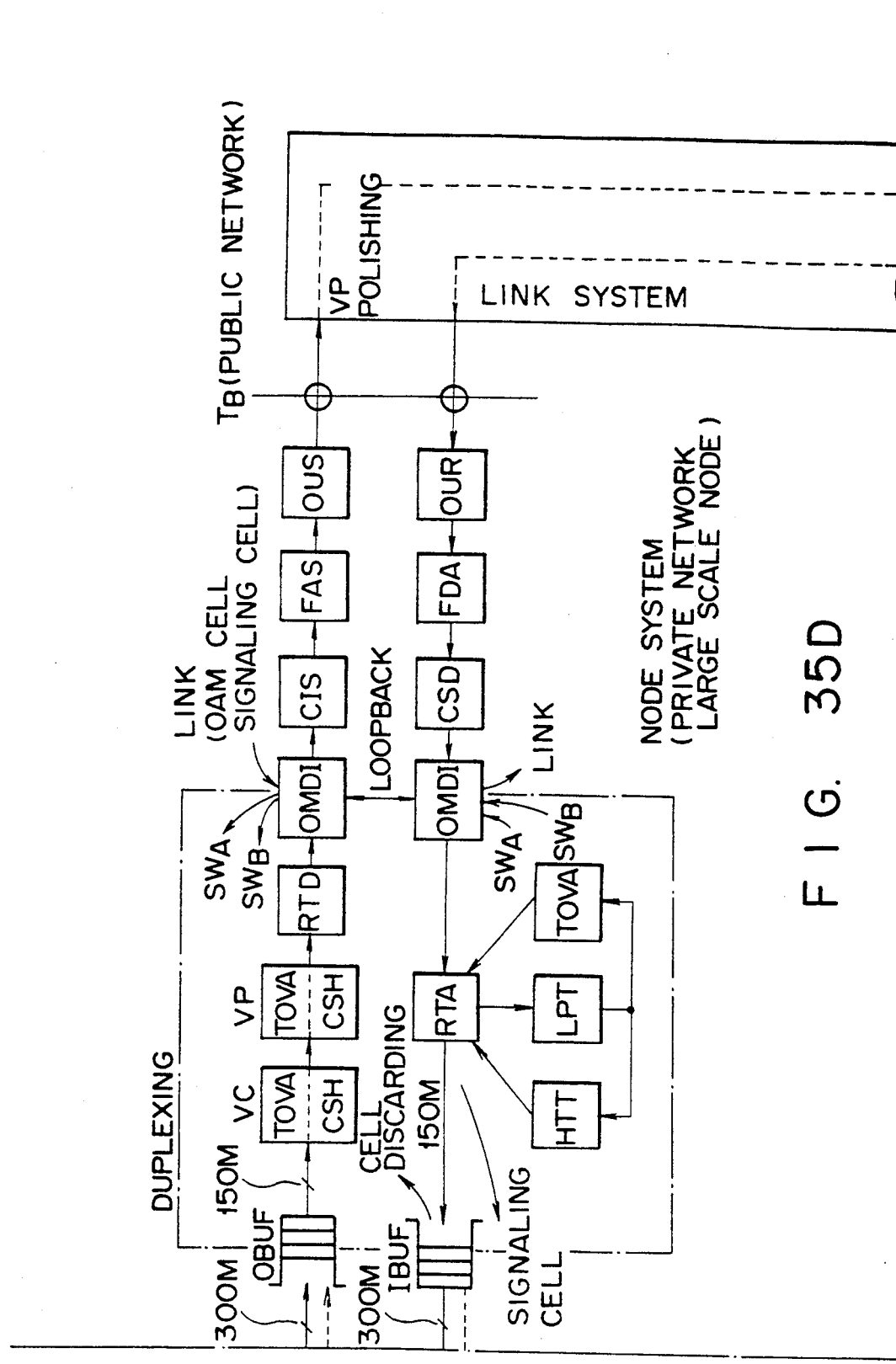
Figure 35E:
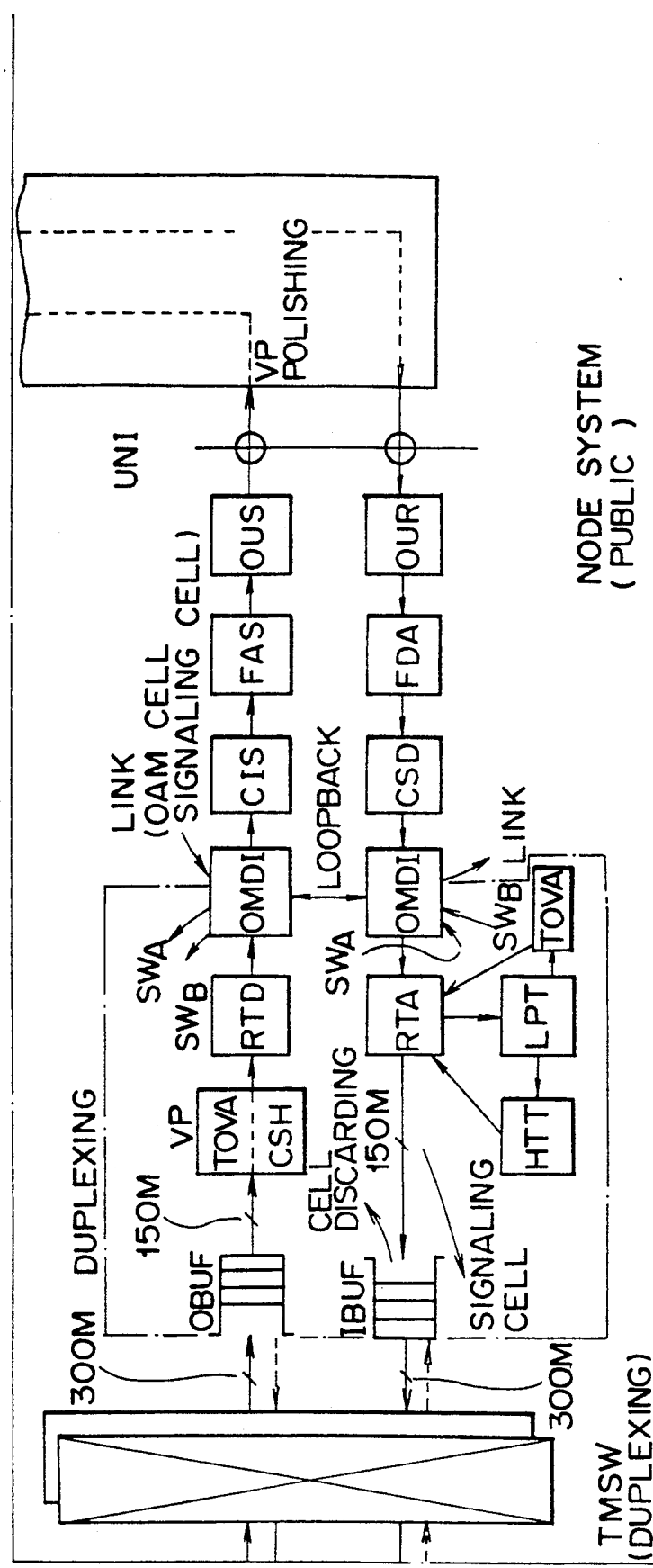
Figure 35F:
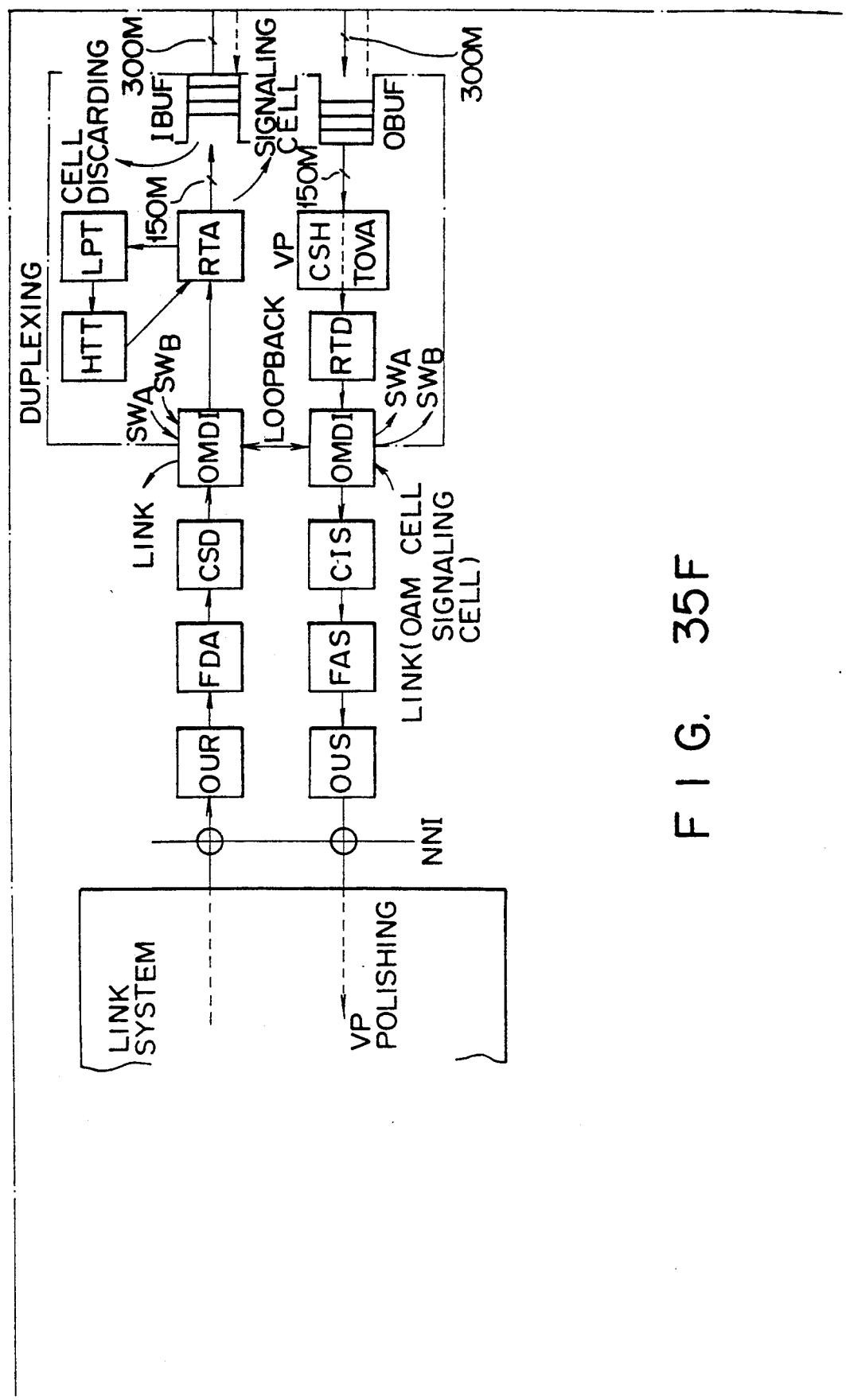

Therefore, the cell processing functions of the respective sections constituting the ATM system have the shaping functions in units of VPs and VCs at positions where CSHs are arranged, as shown in FIGS. 35(a) and 35(b), and control is made to satisfy traffic characteristics of the corresponding cell flow, thereby preventing unexpected cell discard by polishing.

The embodiments in which the present invention is applied to the star topology node/link system were described hereinbefore.

At last, an embodiment wherein the present invention is applied to a ring topology link system will be described. The link system described hereinafter has a feature for quickly avoiding a fault, using a loopback based on OMDI of the present invention.

FIG. 36 is a diagram showing the overall arrangement of the ATM link system. This link system is constructed from plural path handling systems which connected each other in ring shape. The path handling system is constructed from two drop/insert circuits, ATMSW, and plural inter-office INFs. Drop/insert circuits 31*l* to 31*n* are arranged along a clockwise ring-shaped transmission path, and drop/insert circuits 32*l* to 32*n* are arranged along a counterclockwise ring-shaped transmission path. Lines 35*l* to 35*n* each connecting two drop/insert circuits are used in loop back operations when troubles occur in the ring-like transmission paths. When a cell arrives from an input-side transmission path, each drop/insert circuit searches its internal header transformation table using a VPI of the cell as an index, and adds to the cell a routing tag for instructing routing of the cell (i.e., for instructing whether or not the cell is relayed to the next path handling system, whether or not the cell is dropped to the ATMSW, whether or not the cell is dropped to the next path handling system, and its copy is simultaneously dropped to the ATMSW, from which one of a plurality of intra-office INFs the cell is to be output if the cell is dropped by the drop/insert circuit, and so on). Thereafter, in the path handling system, the cell is transferred in accordance with the added routing tag. When the cell is a cell to be transferred to the next path handling system, the cell is output to an output-side transmission path to have priority over other cells (without being delayed). When the cell is to be dropped by the drop/insert circuit, the cell is dropped to one of ATM switches 33*l* to 33*n*, and is then transferred to a target one of intra-office INFs 34*l* to 34*n* by the corresponding one of the ATM switches 33*l* to 33*n*. The corresponding intra-office INF deletes the routing tag, and then outputs the cell. When the cell is transferred from the intra-office INF onto the ring-like transmission path, the following means is taken. That is, in the intra-office INF, a header transformation table in the intra-office INF is searched using a VPI of the cell as an index, thereby adding a routing tag to the cell. Thereafter, the cell is transferred in the path handling system in accordance with the added routing tag. More specifically, one of the clockwise and counterclockwise ring-like transmission paths is selected in accordance with the routing tag. Thereafter, the cell is inserted in the transmission path by the drop/insert circuit. This insert operation is performed by catching a time slot having no cell to be relayed from the input-side transmission path to the output-side transmission path. The drop/insert circuit deletes the routing tag before it outputs the cell onto the output-side transmission path.

The bit rate of the intra-office INF, the number of intra-office INFs, and the bit rate of the transmission path depend on applications. For example, as an example, an intra-office INF bit rate = 155.52 Mb/s, the number of intra-office INFs = 32, and the transmission path bit rate = 2.4 Gb/s may be employed. Each one ring-like transmission path need not always be arranged in each direction. For example, sixteen 155.52 Mb/s transmission paths may be arranged in each direction.

In this case, 16 drop/insert circuits must be arranged in each direction. Furthermore, in this case, the sixteen 155.52 Mb/s transmission paths can be physically multiplexed to a 2.4 Gb/s transmission path to transmit data.

Figure 37:
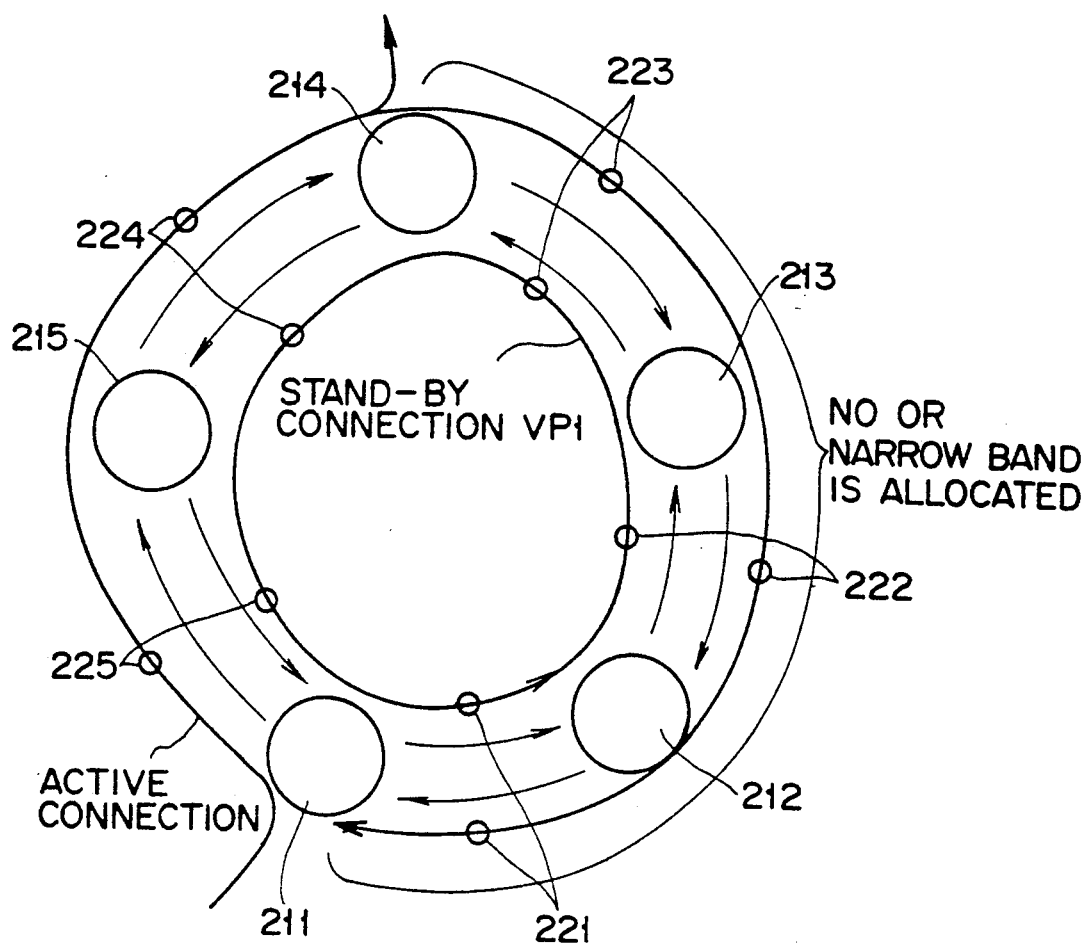
FIG. 37 is a view for explaining a VP setting method in a point-to-point connection mode.

A VP setting method in a point-to-point connection mode as the characteristic feature of the present invention will be described below with reference to FIG. 37.

A VP (VP0) for active connection is set in a direction of the shortest route from an intra-office INF of a path handling system 211 as a starting point toward an intra-office INF of a destination path handling system 214. At the same time, the VP0 is dropped at the destination path handling system 214, and is extended to go round until it reaches the starting path handling system 211. This drop condition is set as follows.

More specifically, the drop condition of the destination path handling system 214 is set so that a user's cell is dropped at the destination path handling system 214 but an ATM layer OAM cell is returned to the starting path handling system 211. In this manner, after the VP0 is set, the ATM layer OAM cell is flowed, and it is checked if this cell is returned to the starting path handling system 211, thereby easily confirming whether or not a VP connection is normally set. Since only a test OAM cell flows through the extended portion, a very narrow bandwidth need only be assured. Of course, an originally required portion between the starting path handling system 211 and the destination path handling system 214 is set to have a bandwidth originally necessary for the VP. Therefore, the originally required portion and the extended portion have different bandwidths to be assured even in an identical VP. In addition to the VP0, a VP (VP1) of a loop-like stand-by connection in the opposite direction is set. As will be described later, the VP for the stand-by connection is used in a loop back operation when a trouble occurs in a transmission path used by the VP for the active connection. The VP for active connection and the VP1 of the stand-by connection are set to have the same VPIs at points 221 to 225, as shown in FIG. 37.

A VP setting method in a 1-to-N drop connection mode will be described below with reference to FIG. 38.

A VP for active connection is set in a ring-like transmission path to go round it. In each of path handling systems 211 to 215, one copy of a cell of the VP for active connection is formed at a drop point for dropping the VP for active connection, and is relayed to the next path handling system. At the same time, the copy of the cell is dropped to an intra-office INF of the corresponding path handling system. In addition to the VP for the active connection, a VP of a loop-like stand-by connection in the opposite direction is set. As will be described later, the VP for stand-by connection is used in a loop back operation when a trouble occurs in a transmission path used by the VP for active connection. The VP for active connection and the VPI for stand-by connection are set to have the same VPIs at points 221 to 225, as shown in FIG. 38.

Figure 39:
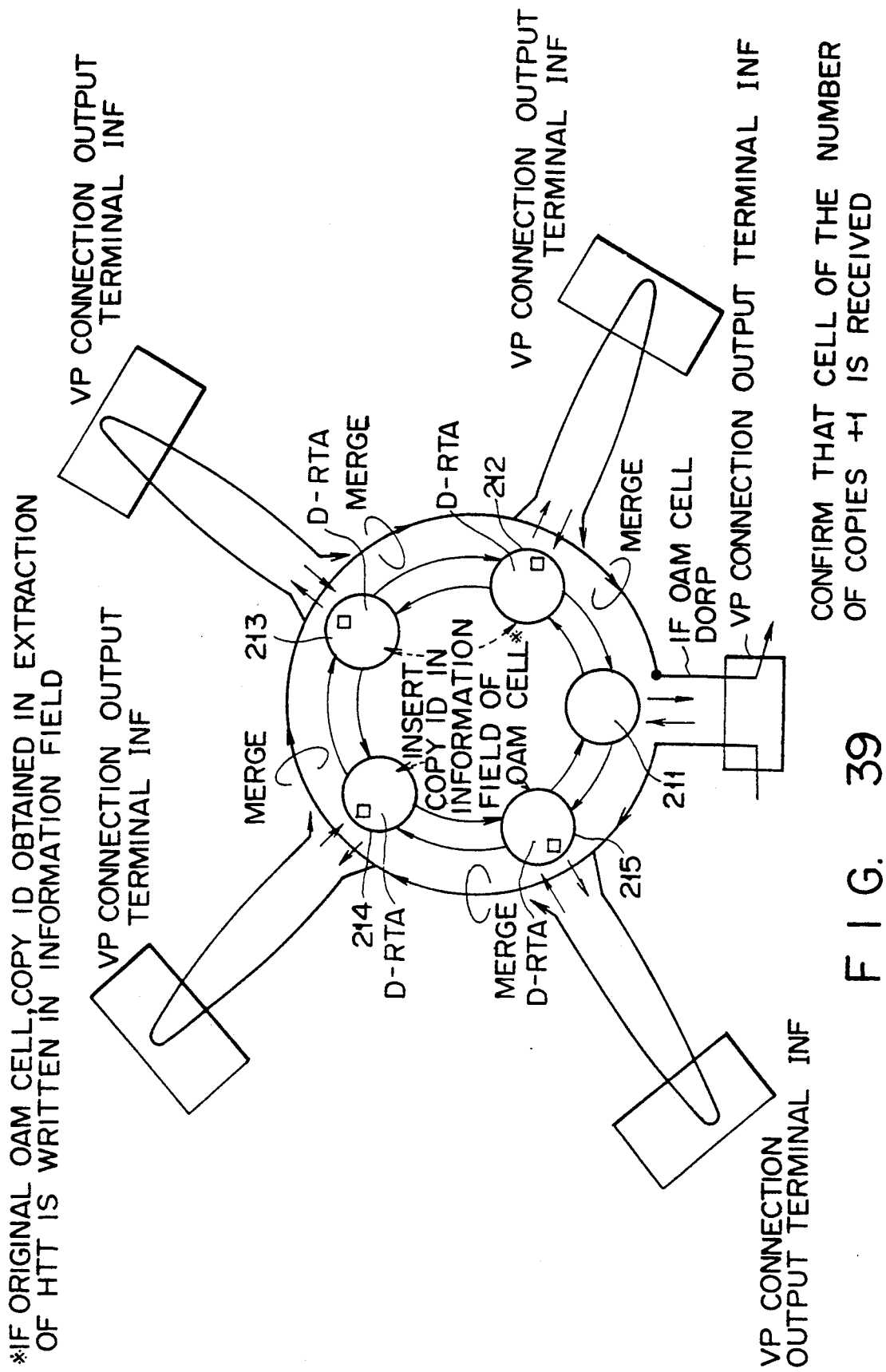
FIG. 39 is a view for explaining a VP connection test in the 1-to-N drop connection mode.

When the VP for active connection is set as described above, a VP connection test can be easily performed in the same manner as in the point-to-point connection mode. This test will be described below with reference to FIG. 39. In the starting path handling system 211, an ATM layer OAM cell is inserted from an intra-office INF. This OAM cell is copied and dropped to the intra-office INFs of the respective path handling systems 212 to 215 in accordance with a condition set in the VP. In this case, a copy ID is written in an information field of the copied OAM cell. When the intra-office INF has an ATM layer OAM cell, it loops back the corresponding OAM cell, and transfers it onto the transmission path again. The starting pass handling system 211 can check a VP connection when it confirms that "the number of copies+1" OAM cells are returned. When all the OAM cell are not returned, the system 211 can check copy IDs to estimate which path handling system is abnormal. Note that the copy ID is written in the information field of the OAM cell by a D-RTA in the corresponding drop/insert circuit. This circuit will be described in detail later.

A countermeasure against a transmission path trouble will be explained below. A method of detecting a transmission path trouble will be described below with reference to FIG. 40.

A drop/insert circuit observes to stop the received signal or cells of an input-side transmission path. Each of the path handling systems 211 to 215 periodically sends a physical layer OAM cell to the adjacent path handling system, and checks if the sent cell is looped back. If an abnormality is found in these observing and checking operations, it is determined that a transmission path trouble has occurred.

Figure 41:
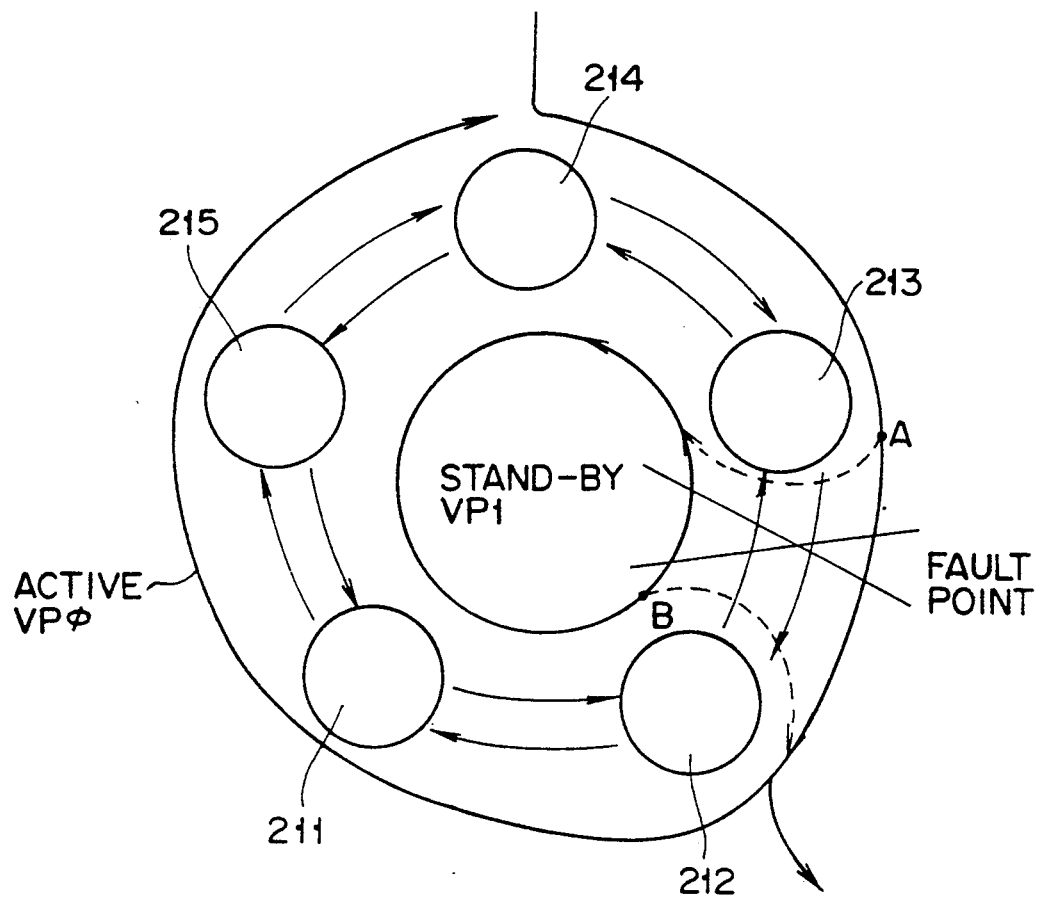
FIG. 41 is a view for explaining a dealing method of a pass handling system after the transmission path trouble detection.

When a transmission path trouble is detected by the above-mentioned method, the path handling system which detects the trouble forcibly loops back all the cell flows flowing toward a trouble point. With this operation, the path handling systems on two sides of the transmission path trouble point can detect the transmission path trouble point, and loop back cells, as shown in FIG. 41. Cells belonging to the VP (VP0) for active connection are also looped back at a point A. However, as described above, since the VP for active connection and the VP (VP1) for stand-by connection are set to have the same VPIs at the respective points 221 to 225, as shown in FIG. 41, a cell of the VP for active connection is automatically interpreted as one of the VP for stand-by connection on the return transmission path, and is transferred to the path handling system 212 at a point B. When the cell is looped back at the point B, the cell of the VP for stand-by connection is returned to one of the VP for active connection, and is transferred to the destination path handling system 212. In a conventional system, when a transmission path trouble occurs, a VP must be set again. However, according to the system of the present invention, a VP need not be set again. The nearest path handling systems on two sides of the transmission path trouble point need only loop back the cell flow. Thus, a countermeasure can be quickly taken against the transmission path trouble. In this case, when a trouble occurs, and cells must be looped back, the path handling system 212 at the point A flows an OAM cell for stating that a cell begins to flow through the stand-by connection, thereby activating this connection. In a normal state, the stand-by VP is inactivated so as to immediately discard cells if cell are input on the stand-by VP. Since the stand-by VP connection goes round the ring, if cells are inserted in the VP connection (due to, e.g., a header error), the cells permanently turn around the ring, and may hinder a traffic of the active VP set on the same ring.

When cells are looped back, the transmission path is set in a busy state, and transmission quality may be degraded from desired characteristics. In the link system, since the transmission quality is very important, the transmission quality is not permitted from being degraded from desired characteristics even in a trouble state. In order to prevent degradation of the transmission quality, the same bandwidth as that of the active VP may be assigned to the stand-by VP. However, when the bandwidth is assigned to all the stand-by VPs, the usage rate of the transmission path in a normal state may be extremely decreased. Thus, a method of efficiently assigning a bandwidth to the stand-by VPs will be described below with reference to FIGS. 42A and 42B.

Figure 42A:
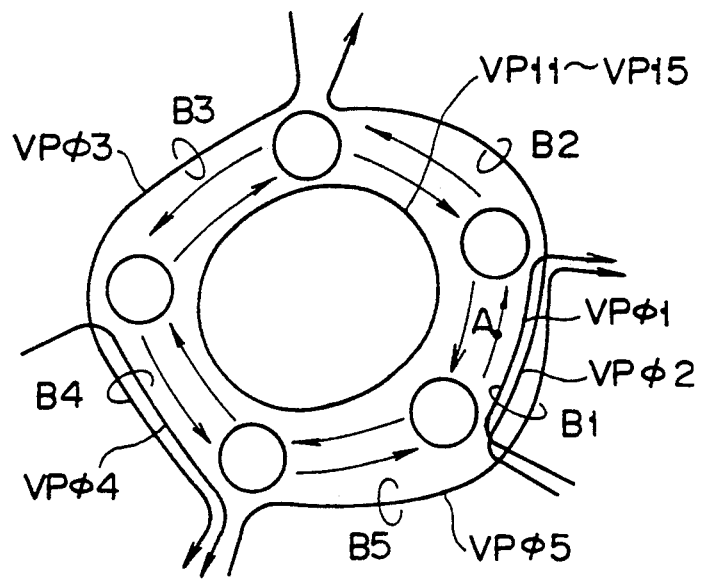
FIGS. 42A and 42B are views for explaining a band assignment method of a stand-by system VP.
Figure 42B:
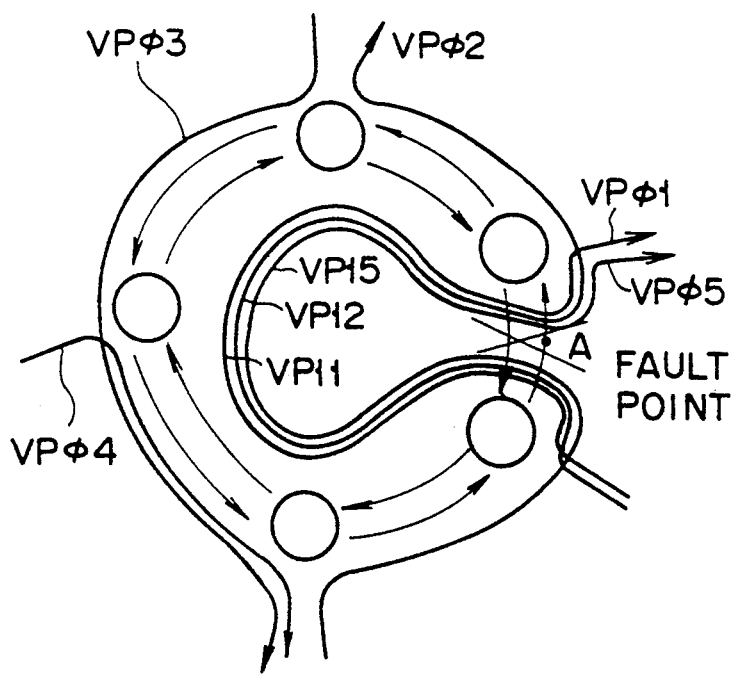

In FIG. 42A, VP01 to VP05 are assumed to be active VPs (portions extended for a VP connection test are omitted from FIGS. 42A and 42B). As described above stand-by, VPs, i.e., VP11 to VP15 are set for the respective VPs. The bandwidth of the stand-by VPs is not assured for each of the VP11 to VP15, but the following capacity is assured for the VP11 to VP15 as a whole. A total sum of bandwidths of the active VPs accommodated in each transmission path between adjacent pass handling system is obtained. For example, in a transmission path at the point A, this total sum is given by the bandwidth of the VP01+ the bandwidth of the VP02+ the bandwidth of the VP05. As the bandwidth of the stand-by VPs, a maximum value BMAX of total sums B1, B2, . . . , Bn of the bandwidths of the active VPs obtained in units of transmission paths is assigned. FIG. 42B shows a case wherein a transmission path trouble occurs at the point A. In this case, the VP01, VP02, and VP05 must loop back, and the VP11, VP12, and VP15 of the stand-by VPs are actually used. Therefore, B1=the bandwidth of the VP01+ the bandwidth of the VP02+ the bandwidth of the VP05 is necessary for a loop back bandwidth. However, since the BMAX is assured as the bandwidth of the stand-by VPs, the bandwidth is sufficient. As can be seen from the above description, a sufficient bandwidth can be obtained when the BMAX is similarly assured as the bandwidth of the stand-by VPs for troubles occurring at points other than the point A.

The detailed arrangement of the path handling system will be described below with reference to FIG. 43.

An OMDI (Operation and Management cell Drop and Insertion) 11 for inserting and dropping an OAM cell, and an RTA (Routing Tag Adder) 21 for performing VPI transformation and adding a routing tag are arranged on the upstream side of an intra-office INF 100. An RTD (Routing Tag Deleter) 31 for deleting a routing tag, and an OMDI 12 for inserting and dropping an OAM cell are arranged on the downstream side of the intra-office INF 100. The OMDIs 11 and 12 of the intra-office INF 100 are connected through a loop back line 300. In each of drop/insert circuits 200 and 201, OMDIs 13 and 15 are arranged at two ends, and a D-RTA (Routing Tag Adder with cell Drop) 22 and an I-RTD (Routing Tag Deleter with cell Insertion) 32 are arranged between the two OMDIs. The D-RTA 22 performs VPI transformation and routing tag addition to a cell on the transmission path, and then performs an operation for outputting a cell to the I-RTD 32, an operation for outputting a cell to an ATMSW (ATM Switch) 50, or an operation for outputting a cell to both the I-RTD 32 and the ATMSW 50 according to an instruction of the added routing tag. VPIs of a maximum of two cells output from the D-RTA 22 are assumed to have been transformed by the D-RTA 22. A cell output onto a path to the ATMSW 50 is subjected to switching according to the routing tag added thereto by the ATMSW 50, and is then guided to a desired intra-office INF 100. On the other hand, the I-RTD 32 inserts a cell going up from the ATMSW 50 to the I-RTD 32 into a cell flow from the D-RTA 22. In this case, a cell flow from the D-RTA 22 is preferentially transmitted without being delayed, and a cell flow from the ATMSW 50 is inserted in an empty time slot of the cell flow from the D-RTA 22. After this insertion operation, the routing tag is deleted, and a cell is sent onto the transmission path via the OMDI 15. The OMDIs 13 and 15 of the drop/insert circuits in the two directions are connected through loop back lines 400. In a lower right portion of FIG. 43, a block arrangement of the OMDI is illustrated. Reference symbol D denotes a cell drop circuit for, when a cell satisfies a predetermined condition (e.g., a physical layer OAM cell), dropping the cell. Reference symbol I denotes a cell insert circuit for detecting an empty time slot, and inserting a cell in the transmission path.

Figure 44:
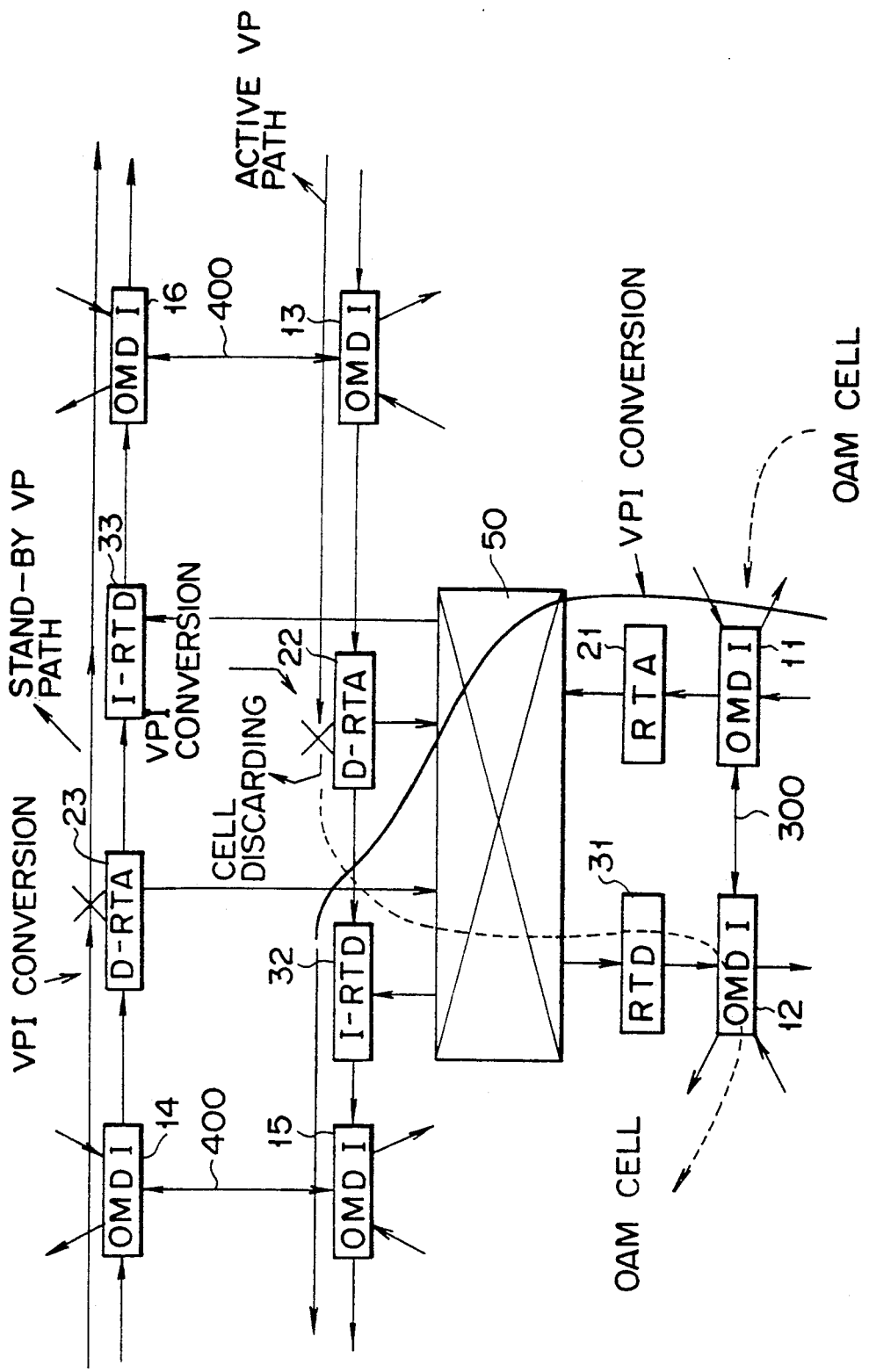
FIG. 44 is a diagram showing a VP link setting method in a currently operating (hot) system.

A VP link setting method of the path handling system will be described below. FIG. 44 shows the VP link setting method of the path handling system serving as a starting point an active VP. The active VP enters the ring from the ATMSW 50, goes round the ring once, and is then terminated at the D-RTA 22. In this D-RTA 22, a user cell of cells upon going round the ring once is discarded, and an OAM cell is output after it is header-transformed. Note that the user cell may be guided to another section by the ATMSW 50 without being discarded. However, it is assumed to be not preferable in general since the VP connection is prolonged. The OAM cell which is not discarded by the D-RTA 22 is guided to a desired output port of the ATMSW 50, is then guided to an INF where an input-side terminating point of the VP is present, and is dropped there. Furthermore, a stand-by VP is set on a ring opposite to the ring where the active VP is set. In order to facilitate switching in the OMDIs 13 to 16 in a trouble state, as described above, cells after they pass through the I-RTD 32 of the active VP have the same VPIs as those before they pass through the D-RTA 23 of the stand-by VP, and cells before they pass through the D-RTA 22 of the active VP have the same VPIs as those after they pass through the I-RTD 33 of the stand-by VP. In addition, a VPI of an OAM cell after it passes through the D-RTA 22 of the active VP is the same as that before the OAM cell passes through the RTA 21.

FIG. 45 shows a VP link setting method in the pass handling systems at a relay point and a destination. An active VP, and a stand-by VP are respectively set on two rings 100 and 101. In order to facilitate switching of the OMDIs 13 to 16 in a trouble state, cells before they pass through the D-RTA 22 of the active VP have the same VPIs as those after they pass through the I-RTD 33 of the stand-by VP, and cells after they pass through the I-RTD 32 of the active VP have the same VPIs as those before they pass through the D-RTA 23 of the stand-by VP. Furthermore, in the D-RTA 22 through which the VP of the currently operating system passes, a header transformation table HTT is set to copy a cell, if necessary. In a path handling system at an original end point, a header transformation table HTT is set to drop a user cell to a desired intra-office INF, but to transfer an ATM layer OAM cell to the next path handling system.

Figure 46A:
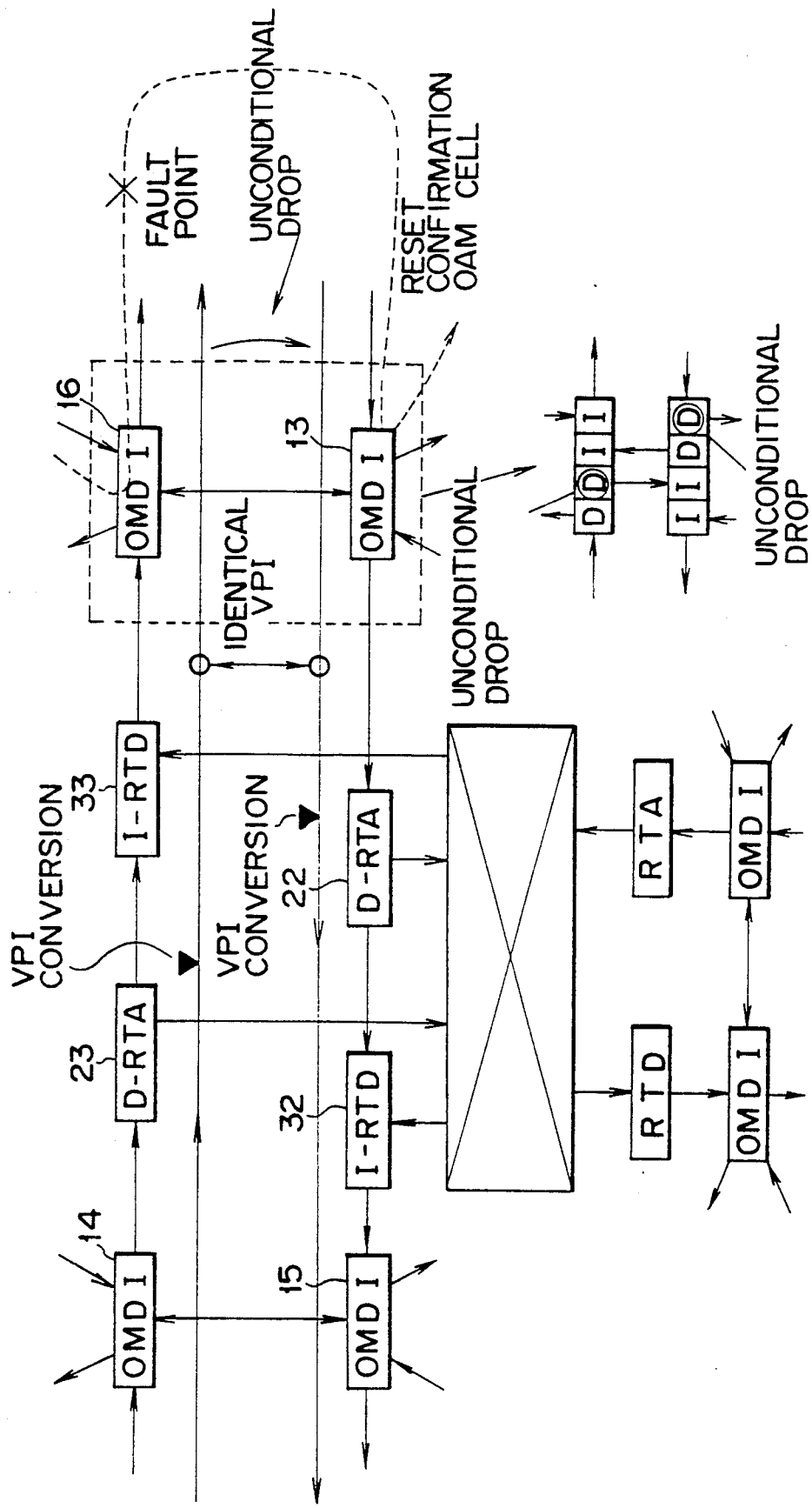

FIGS. 46A and 46B show an operation of the path handling system when a trouble is avoided. The OMDI 16 which outputs cells toward a trouble point forcibly loops back all the cells. The OMDI 13 which receives cells from the trouble point unconditionally drops all the cells. User cells present on the transmission path upon switching of systems are discarded.

In order to automatically restore a system when a trouble is removed, a physical layer OAM cell is flowed through a loop toward a trouble point so as to check if the system is restored, and if the cell is looped back and returned, the forcible loop back operation of the OMDI 16 may be stopped. When an operator repares the trouble point, the restoration checking physical layer OAM cell can be stably returned. Thereafter, two path handling systems sandwiching the trouble point communicate with each other using the OMDIs 13 and 16 in a given protocol. First, these systems stop an unconditional cell drop operation at the OMDI 13 which has been receiving cells from the trouble point, and check completion of this operation. Thereafter, the OMDI 16 which has been outputting cells to the trouble point stops the unconditional cell drop operation. Thus, the systems are restored to operations in a normal state. In this case, cells present on the stand-by VP are discarded. For this reason, the OMDI 13 which has been receiving cells from the trouble point flows an OAM cell stating inactivation of the stand-by VP connection. Each D-RTA recognizes this OAM cell, and begins to discard input cells having VPIs of the stand-by VP. The OAM cell stating inactivation of the VP connection is discarded by the D-RTA 22 which is discarding cells on the stand-by VP. Thus, this OAM cell is removed from the ring when it just goes round the ring once.

Figure 47:
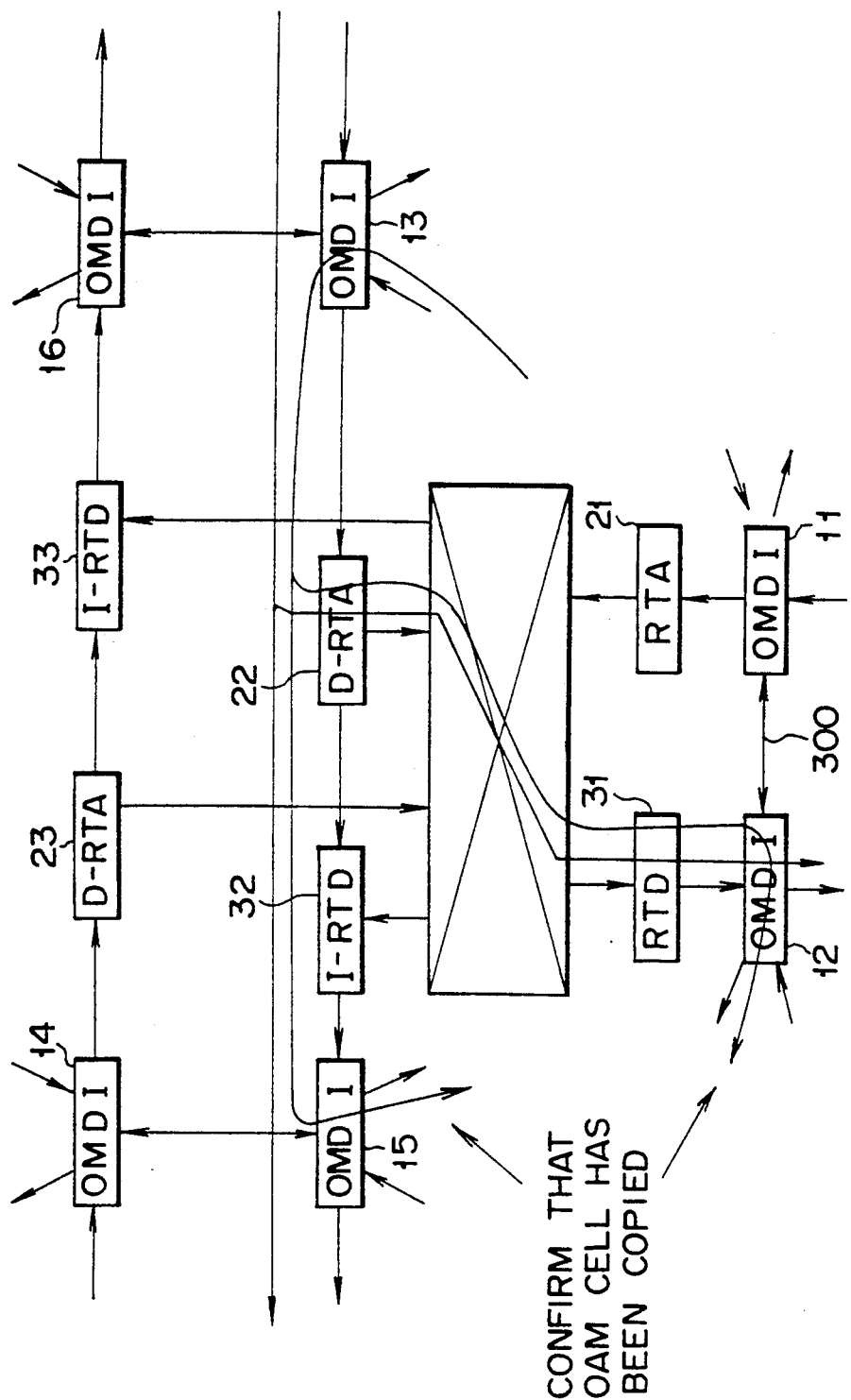
FIG. 47 is a diagram for explaining a VP link coupling test.

Whether or not the VP connection is normally set is checked by the VP connection test, as described above. In some applications, whether or not VPI transformation is normally performed must be checked at individual path handling system levels before the VP connection test. A test method at the individual path handling system levels (to be referred to as a VP link coupling test) in the case of a copy connection will be described below with reference to FIG. 47. An ATM layer OAM cell having a VPI for identifying a copy connection to be tested is inserted before the D-RTA 22 in which a cell is copied, and it is confirmed if the inserted cell is dropped from the OMDIs 15 and 12 respectively after the I-RTD 32 and the RTD 31.

Since the OMDIs 11 to 15, the RTA 21 and the RTD 31 shown in FIG. 44 are similar to those already explained. Also, the ATMSW 50 can be constituted by the conventional technique, and are not characteristic portion of the present invention, a further description thereof will be omitted. Since the D-RTA 22 and the I-RTD 32 have arrangements as the characteristic features of the present invention, they will be described in detail below. The D-RTA will be described below with reference to FIG. 48.

Figure 48A:
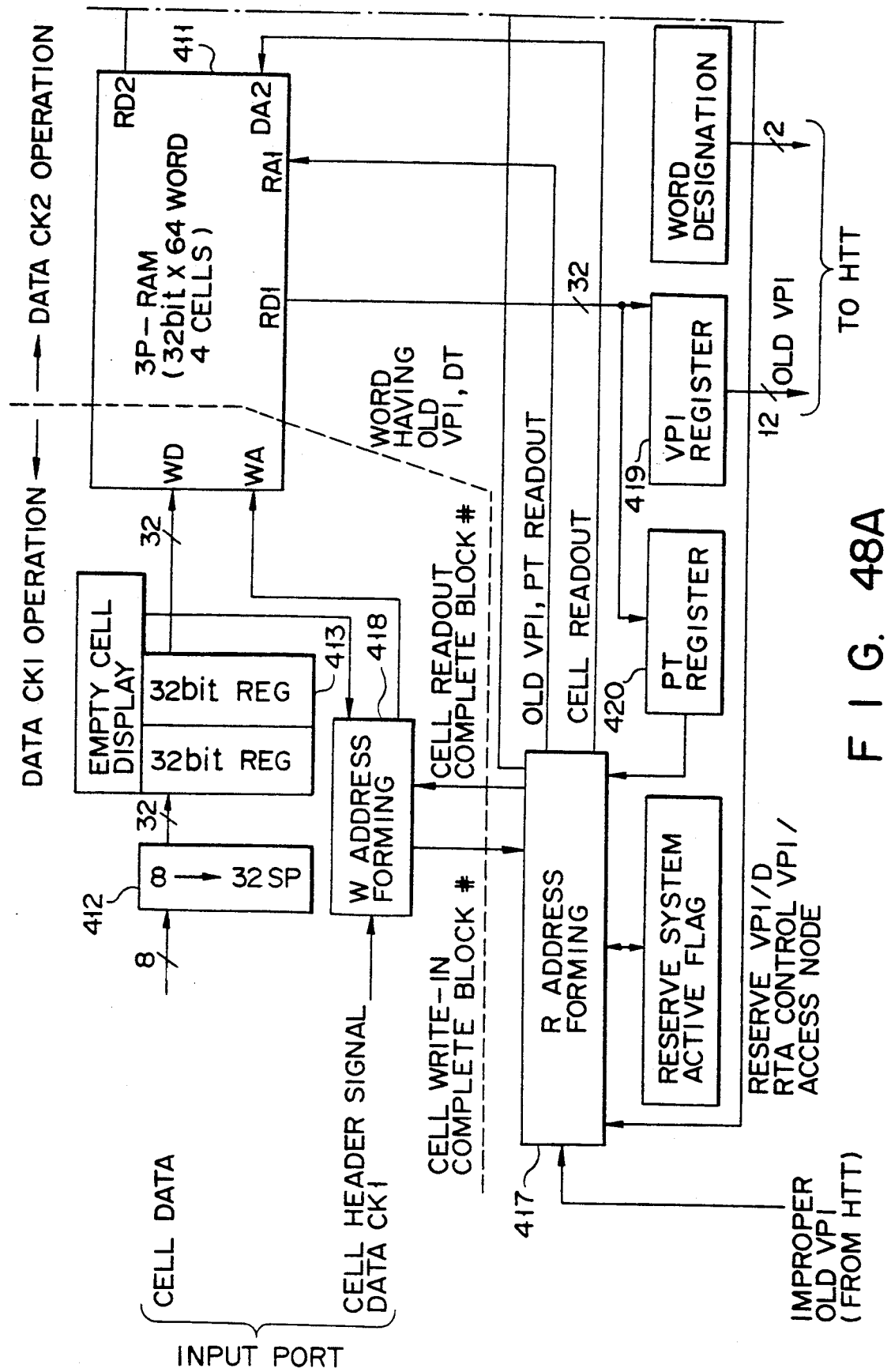
FIGS. 48A and 48B are diagrams showing an arrangement of a D-RTA.
Figure 48B:
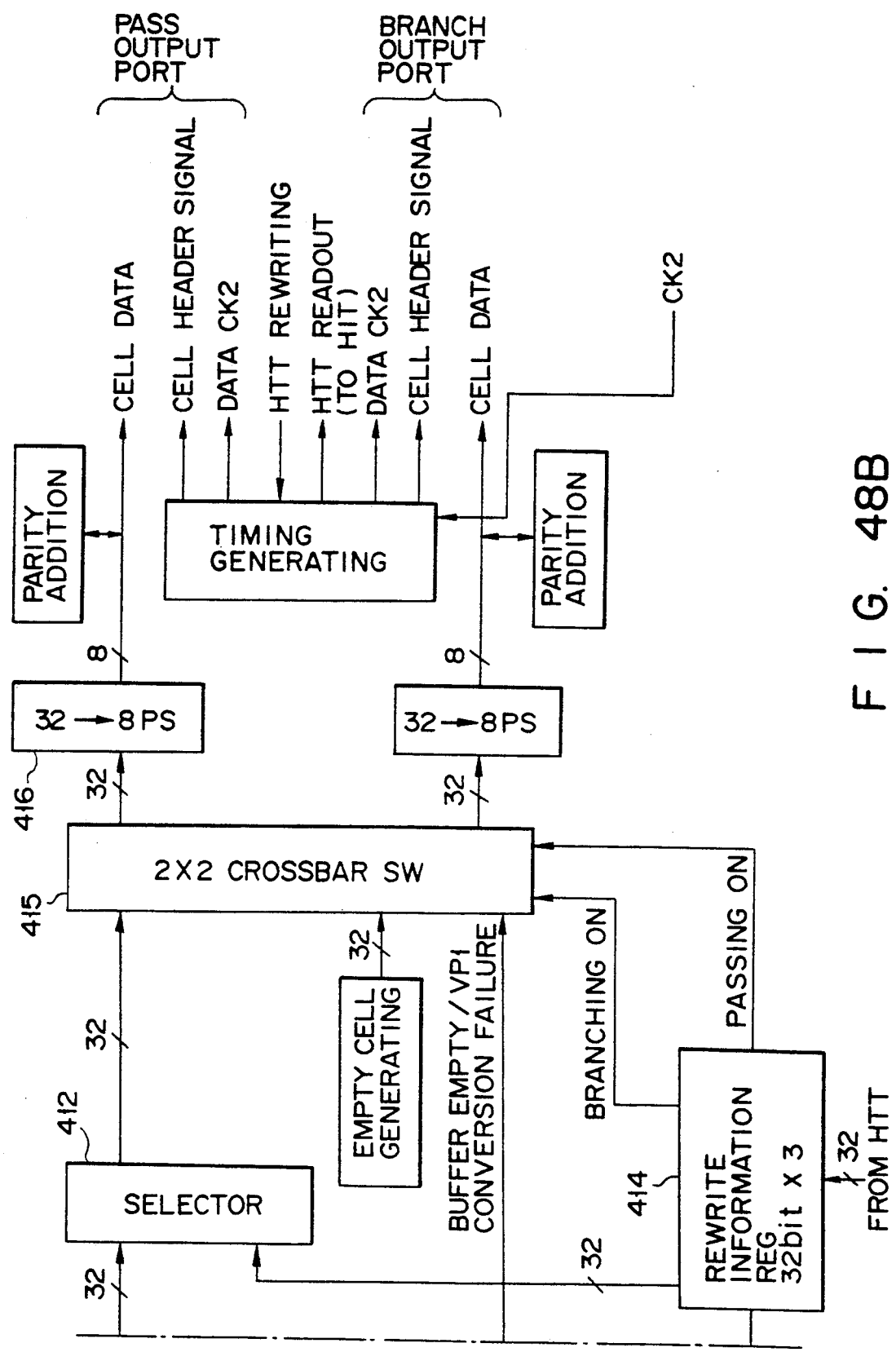

In FIG. 48, a 3P-RAM 411 is a RAM having one write port, and two read ports, and these ports can be asynchronously operated. A cell input as, e.g., 8-bit parallel data is converted into 32-bit parallel data by an 8-32SP 412, and the converted data passes through two 32-bit registers. Thereafter, the data is temporarily written in the 3P-RAM. 411. When an empty cell is input, it is recognized by referring to a header pattern of a header portion of a cell when the header portion is present in a second 32-bit register 413. The empty cell is not written in the 3P-RAM 411.

Thereafter, a VPI (old VPI) of the stored cell is read out from the 3P-RAM 411, and the header transformation table HTT is looked up using the readout VPI as a key. As a result, additional information (e.g., a routing tag) necessary for transformation to an internal cell format (to be referred to as an SW cell hereinafter), and a VPI (new VPI) to be newly added to the cell are read out, and are stored in a rewrite information register 414. Thereafter, format transformation from a cell format determined by the CCITT to an SW cell is performed. More specifically, the additional information for forming the SW cell format and the new VPI which are read out from the rewrite information register 414, and information of the remaining portion (excluding the last octet of the SW cell) which is read out from the 3P-RAM 411 are selected by a selector, thereby forming the SW cell.

The SW cell read out from the 3P-RAM 411 is written in the HTT in units of VPs, and is then transferred toward a drop output port and/or a pass output port by a 2×2-cross bus switch 415 which is controlled by a flag for determining whether a cell belonging to the VP is to be dropped or to be allowed to pass. The drop output port is connected to an input section of the ATMSW, and the pass output port is connected to the I-RTD. In this case, the output port which has no output cell outputs empty cells generated by an empty cell generating section.

The SW cell output from the 2×2 crossbar switch 415 is converted into 8-bit parallel data by a 32-8PS 416 independently for the two output ports, and thereafter, parity bits are added to the last octet of the SW cell. Thus, the SW cell is output.

Since the format transformation from a CCITT format cell to an SW cell is performed, the frequency of data CK at the output port is higher than that of data CK at the input port. For this reason, a clock must be changed. In this case, the clock is changed using an asynchronous operation of the 3P-RAM 411. An operation is performed based on data CK1 (a clock of the input port) up to the write port, and thereafter, an operation is performed based on data CK2.

The address space of the 3P-RAM 411 is divided into blocks each of which can store one cell. An input cell is written in one of blocks written with no cells and held by a W address formation section 418. The W address formation section 418 generates a write address of a cell based on a selected block number, and supplies it to the 3P-RAM- 411. The number of the block in which a cell is written is supplied to an R address formation section 417 in a handshake manner.

Upon reception of the block number from the W address formation section 418, the R address formation section 417 reads out an old VPI for accessing the HTT from the corresponding block, and transfers it to a VPI register 419. At the same time, the section 417 reads out a PT field, and transfers it to a PT register 420. This is because the D-RTA must perform an operation different from that for a user cell when an ATM layer OAM cell is input.

After the additional information and the new VPI are transferred from the HTT to the rewrite information register, the R address formation section 417 reads out the corresponding cell from the 3P-RAM 411, and transfers it to a selector 421, thus performing cell format transformation. The number of the block from which the cell is read out is supplied to the W address formation section 418 as a block written with no cell in a handshake manner.

The HTT comprises a selector for arbitrating HTT accesses between a processor for managing data in the HTT and the D-RTA, and a RAM. FIG. 49 shows an address map of the HTT. In the HTT, 32 bit×2 word entries are assigned in units of old VPIs. In the HTT, control flags for controlling an operation of the D-RTA, and a field for holding a new VPI for a passing cell are set. The meanings of information to be written in respective fields in each entry will be summarized below.

a) Entry valid flag 511 (1 bit)

This flag indicates that valid information is set in the corresponding entry. A cell which is input to carry a VPI of an entry invalidated by this flag is discarded by the D-RTA.

b) Routing tag (drop routing) 512 (30 bits)

This field holds a routing tag to be added to an SW cell which is dropped toward the ATMSW.

c) New VPI (drop) 528 (12 bits)

This field holds a new VPI to be added to an SW cell which is dropped toward the ATMSW.

d) New VPI (pass) 529 (12 bits)

This field holds a new VPI to be added to an SW cell which is allowed to pass toward the I-RTD.

e) Active stand-by connection flag 521 (1 bit)

This flag indicates whether a VPI is assured for the active connection or the stand-by connection. A stand-by connection activating flag is present in the D-RTA, and indicates if the stand-by connection is currently activated to avoid a trouble. If the stand-by connection activating flag indicates that the stand-by connection is activated, a cell which is input carrying a VPI assured for the stand-by connection, as indicated by the flag 521, is subjected to normal format transformation, and is output. When the stand-by connection activating flag indicates that the stand-by connection is not activated, a cell which is input carrying a VPI which is not assured for the stand-by connection, as indicated by the flag 521, is discarded.

Pass ON/OFF flag 522 (1 bit)

This flag indicates whether or not a cell which is input carrying a VPI is allowed to pass. If this flag indicates that the cell is not allowed to pass, the pass output port outputs an empty cell.

g) Drop ON/OFF flag 523 (1 bit)

This flag indicates whether or not a cell which is input carrying a VPI is dropped. If this flag indicates that the cell is not dropped, the drop output port outputs an empty cell. When the drop ON/OFF flag is set to drop a cell, the 2×2 crossbar switch forms a copy of a cell. When an input cell is a VP connection test OAM cell, an original flag in an information field is looked up, and the cell set with the original flag is subjected to both the drop and pass operations. In this case, the original flag of the OAM cell to be dropped is reset (the original flag is set when an OAM cell is input from a starting pass handling system). A cell whose original flag is reset is subjected to only a pass operation without a drop operation, thus preventing an OAM cell looped back at the VP connection terminating point from being copied. When the pass ON/OFF flag is set not to pass a cell, and the drop ON/OFF flag is set not to drop a cell, a user cell which is input carrying a VPI is discarded. However, an ATM layer OAM cell is subjected to format transformation, and is allowed to pass. Thus, the OAM cell is transferred to the D-RTD.

h) Access node/transit node flag 524 (1 bit)

When a VPI is assured for the currently operating system, an operation for a user cell/ATM layer OAM cell varies depending on whether a node is an access node (a path handling system as a VP starting point) or a transit node (a path handling system as a VP relay point or destination). More specifically, when the node is the transit node, these two different cells are equally subjected to format transformation, and are output according to (pass and drop ON/OFF) flags, if necessary. When the node is the access node, a user cell is discarded, and the ATM layer OAM cell is subjected to VPI transformation, is added with a routing tag, and is then dropped to the ATMSW.

i) User cell valid/invalid flag 525 (1 bit)

When a VPI is assured for the currently operating system, a capacity for a user cell may or may not be actually assured on a VP link on the ring starting from the D-RTA. When the capacity for a user cell is not assured, the D-RTA cannot output a user cell. This flag indicates for each VP whether or not a cell for a user cell is assured on a VP ring starting from the D-RTA. When this flag indicates that no capacity for a user cell is assured, a user cell is discarded, and only an ATM layer OAM cell is allowed to pass after format transformation.

j) Stand-by connection activating flag 526

In order to activate the stand-by connection, a special VPI is used for an OAM cell to be flowed through a ring when a trouble occurs. This flag indicates that the corresponding VPI is reserved for a stand-by connection activating OAM cell. When the stand-by connection activating flag of the D-RTA indicates that the stand-by connection is activated, a cell which is input carrying this VPI is discarded.

k) Stand-by connection inactivating flag 527

In order to inactivate the stand-by connection, a special VPI is used for an OAM cell to be flowed through a ring when a system is restored from a trouble state. This flag indicates that the corresponding VPI is reserved for a stand-by connection inactivating OAM cell. When the stand-by connection activating flag of the D-RTA indicates that the stand-by connection is inactivated, a cell which is input carrying this VPI is discarded.

Figure 50A:
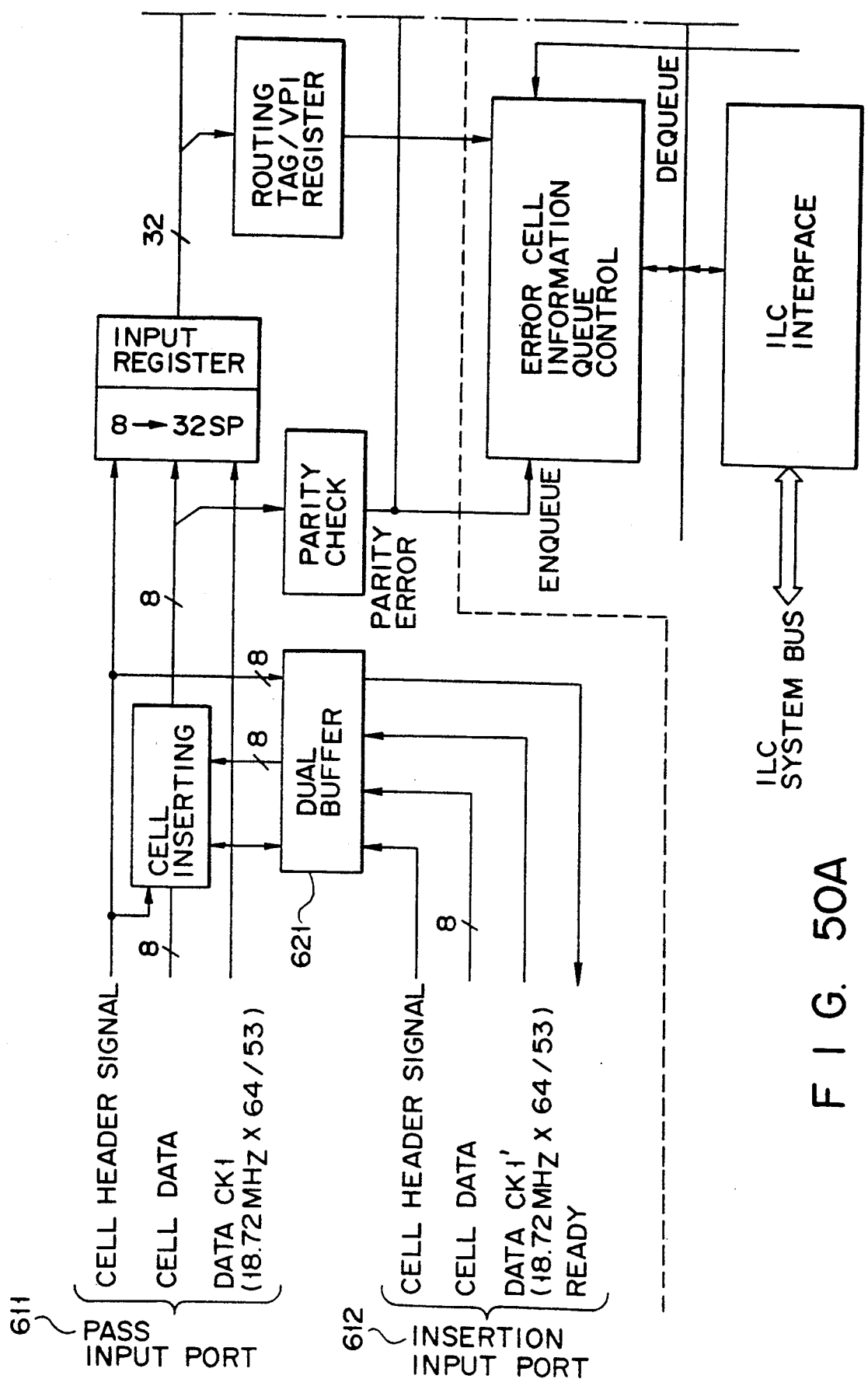
FIGS. 50A and 50B diagrams showing an arrangement of an I-RTD.
Figure 50B:
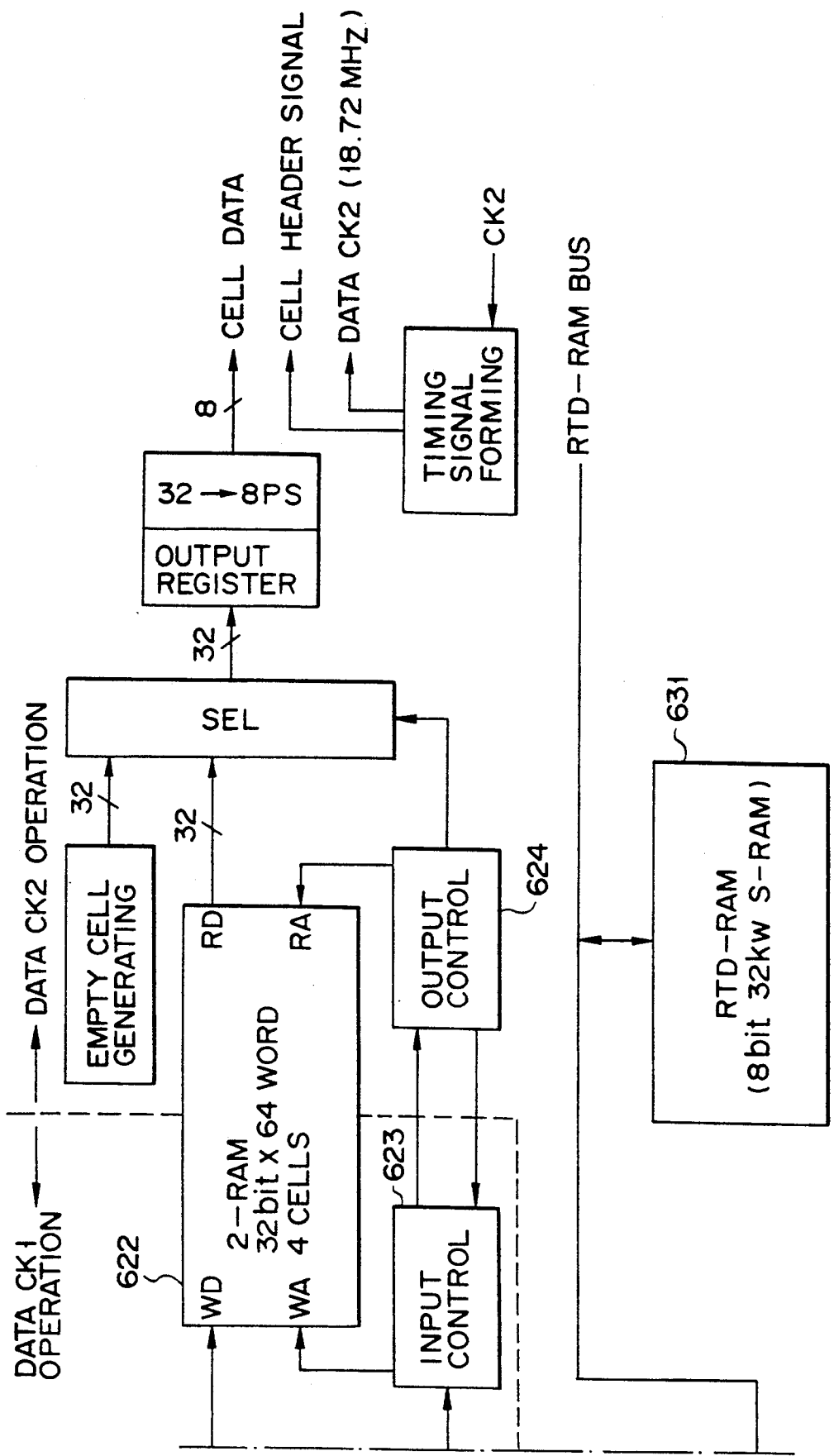

FIG. 50 shows an arrangement of the I-RTD.

A pass input port 611 is an input port for receiving a cell flow from the D-RTA. An insert input port 612 is an input port for receiving a cell flow from the ATMSW.

The insert input port 612 is connected to a dual buffer 621. When a cell is held in the dual buffer 621, an empty cell input from the pass input port 611 is replaced with the held cell. Flow control is made between the dual buffer 621 and the ATMSW so as not to discard a cell.

After a cell flow from the insert input port 612 is inserted, parity bits as the last octet of an SW cell are checked, and a cell having a parity error is discarded.

The address space of a 2P-RAM 622 is divided into blocks each of which can store one cell. An input control section 623 receives a number of a block written with no cell from an output control section 624, and when a cell is input, it writes the cell in the empty block. On the other hand, the output control section 624 receives a number of a block written with a cell from the input control section 623, and reads out a cell from the block. When a cell is read out from the 2-RAM 622, unnecessary octets are skipped, thereby performing transformation to a CCITT cell format. A number of a block from which a cell is read out is supplied to the input control section 623 as an empty block number. When no cell to be output is stored in the 2P-RAM 622, an output port outputs an empty cell.

When an SW cell is written in the 2P-RAM 622, a parity check of the last octet of the SW cell is simultaneously performed. A cell having a parity error is discarded. This discard operation can be executed in such a manner that the input control section 623 does not supply a number of a block written with a cell having a parity error to the output control section 624, and overwriting the next input cell in the corresponding block.

FIG. 51 shows an address map of an RTD-RAM 631.

Note that a link system with a copy function of the present invention may be used for constituting an ATM switch system having a copy function upon combination with an ATM switch, as shown in FIG. 52. A switch 711 is an ATM switch having no copy function. INFs 721 to 724 are input INFs, and INFs 731 to 734 are output INFs. The functions are those normally used for constituting an ATM switch system. In this case, a plurality of drop/insert sections 701 to 704 with a copy function according to the present invention, and a ring-like transmission path for coupling the drop/insert sections 701 to 704 are arranged, as shown in FIG. 52. The drop/insert sections 701 to 704 and the output INFs 731 to 734 are coupled. Assume that cells to be copied and output are input from the plurality of input INFs 721 to 724. This cell is transferred to one of the output INFs 731 to 734 from which the cell is to be copied and output. At this time, the cell is not copied yet. This cell is transferred from one of the output INFs 731 to 734 to one of the drop/insert sections 701 to 704 connected to the output INFs 731 to 734, and is then sent onto a ring-like transmission path 777. While this cell goes round the ring-like transmission path 777 once, each of the drop/insert sections 701 to 704 forms one copy, if necessary, according to the method of the present invention, and outputs it to the corresponding output INFs 731 to 734. In this manner, a cell can be copied and transferred to a plurality of desired output ports.

According to the above-mentioned embodiment, since a VP for a transmission path trouble is set in advance, when a transmission path trouble occurs, cells need only be physically looped back by a pass handling system adjacent to a trouble point, thus quickly taking a countermeasure against the transmission path trouble.

In the above description, the cell processing function in the ATM communication system has been exemplified. However, the present invention is not limited to the above embodiment. For example, hardware arrangements of the respective processing functions may be variously modified according to specifications, and only functions presented by specifications may be arranged as a cell processing function.

As described above, according to the present invention, various hardware problems upon realization of the ATM communication system can be effectively solved, and the cell processing function can be easily and effectively constituted as hardware, thus providing great practical advantages.

In particular, different levels are set for OAM cells, and are written in their information fields, so that cell drop judgment at OMDIs arranged in respective portions of the system is facilitated, thus reducing the processing volume and the number of hardware components in the ILC.

Physical VCIs are set in accordance with the number of simultaneously connected lines, thus reducing a VC space to be recognized by the HTT. Thus, the number of hardware components for the polishing function of the HTT can be reduced. Furthermore, the RTA recognizes UNI/NNI cells in units of cells, and changes rewrite positions of VPI fields, thus setting VCs for both the UNI and NNI cells on one RTA.

Since parity bits are set in an SW cell, detection performance of a bit error rate in the RTA-IBUF-ATMSW-OBUF-RTD path can be effectively improved by a small number of hardware components. In addition, since an alarm cell automatic generating function is provided, and an SW cell includes an SRA# and a shaping number, the number of tables to be managed is decreased, and the number of hardware components can be decreased.

Moreover, the polishing function is classified into low- and high-speed polishing modes, and the low-speed polishing mode is realized by a RAM. Therefore, the number of hardware components for the polishing function can be greatly decreased.

Cell discard control is performed by only the IBUF of the ATMSW, and cell delay control is performed by only its OBUF. Therefore, the arrangements of the buffers can be much simplified, thus providing great practical advantages.

Furthermore, there can be also provided a link system capable of quickly avoiding a fault, using a loopback of the cell level in the present invention, and having a ring shaped topology with a high reliability.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An ATM communication system including:
cell synchronization function means for detecting a header of a cell from an input bit string, and adding a mark to the header of the cell;
ATM switch means for performing cell switching processing of the cell;
routing tag adding function means for transforming a cell output form said cell synchronization function means and having a length suitable for transmission into a cell having a length to be able to be subjected to the cell switching processing by said ATM switch means;
routing tag deleting function means for transforming the cell having the length to be able to be subjected to the cell switching processing by said ATM switch means into a cell having the length suitable for transmission;
preliminary processing function means for performing, after the routing tag is deleted, predetermined processing necessary for a cell synchronization operation performed by said cell synchronization function means for the cell having the length suitable for transmission; and
function means, arranged between a first point between said cell synchronization function means and said routing tag adding function means, and a second point between said routing tag deleting function means and said preliminary processing function means, for inserting a cell of an arbitrary format into a cell flow passing through the first and second point.

2. An ATM communication system including:
cell synchronization function means for detecting a header of a cell from an input bit string, and adding a mark to the header of the cell;
ATM switch means for performing cell switching processing of the cell;
routing tag adding function means for transforming a cell output from said cell synchronization function means and having a length suitable for transmission into a cell having a length to be able to be subjected to the cell switching processing by said ATM switch means;
routing tag deleting function means for transforming the cell having the length to be able to be subjected to the cell switching processing by said ATM switch means into a cell having the length suitable for transmission;
preliminary processing function means for performing, after the routing tag is deleted, predetermined processing necessary for a cell synchronization operation performed by said cell synchronization function means for the cell having the length suitable for transmission; and
function means, arranged between a first point between said cell synchronization function means and said routing tag adding function means, and a second point between said routing tag deleting function means and said preliminary processing function means, for dropping a cell satisfying a predetermined condition from a cell flow passing through the first and second points.

3. An ATM communication system including:
cell synchronization function means for detecting a header of a cell from an input bit string, and adding a mark to the header of the cell;
ATM switch means for performing cell switching processing of the cell;
routing tag adding function means for transforming a cell output from said cell synchronization function means and having a length suitable for transmission into a cell having a length to be able to be subjected to the cell switching processing by said ATM switch means;
routing tag deleting function means for transforming the cell having the length to be able to be subjected to the cell switching processing by said ATM switch means into a cell having the length suitable for transmission;
preliminary processing function means for performing, after the routing tag is deleted, predetermined processing necessary for a cell synchronization operation performed by said cell synchronization function means for the cell having the length suitable for transmission; and
loop back function means arranged between a first point between said cell synchronization function means and said routing tag adding function means, and a second point between said routing tag deleting function means and said preliminary processing function means, and having a first function of dropping a cell satisfying a predetermined condition from a cell flow passing through the first point, and inserting the dropped cell into a cell flow passing through the second point, and a second function of dropping a cell satisfying a predetermined condition from a cell flow passing through the second point, and inserting the dropped cell into a cell flow passing through the first point.

4. An ATM communication system comprising:
a plurality of input buffers each having a cell discard class control function;
a plurality of output buffers each having a cell delay class control function; and
ATM switch means for receiving the flow of cells from said input buffers, and switching the cells, to output the flow of cells to said output buffers.

5. An ATM communication system including:
a functional element for providing information which shows a connection belonging to a cell discarded according to a predetermined condition, and
wherein said functional element comprises FIFO means which can temporarily hold a plurality of pieces of information which shows a connection belonging to a cell discarded according to a predetermined condition,
every time the information which shows a connection belonging to a cell discarded according to a predetermined condition is generated, the generated information is enqueued in said FIFO means, and
when said FIFO means is not empty, a request is issued to said control processor.

6. An ATM communication system including:
a functional element for providing information which is generated every cell period to a control processor for performing operation observation of functional elements constituting said ATM communication system, and
wherein said functional element comprises FIFO means which can temporarily hold a plurality of pieces of information which is generated for every cell period,
every time the information which is generated for every cell period is generated, the generated information is enqueued in said FIFO means,
when said FIFO means is not empty, a request is issued to said control processor, and
if said FIFO means is full when the information which may be generated for every cell period is generated, the information is discarded, and a message indicating that the information is discarded is informed to said control processor.

7. An ATM communication system including:
an ATM switch;
function means for transforming a VPI/VCI or a logical VCI of an input cell into a physical VCI as an identifier for looking up a routing tag table including a routing tag for designating a path in said ATM switch as at least a content of the table; and
means for discarding the input cell if converting from the VPI/VCI of the input cell to the physical VCI fails.

8. An ATM communication system including:
routing tag adding function means having a routing tag table having a plurality of entries to each of which is added error correction information; and
means for, when an error is found in a corresponding entry on the basis of the correction information of the entry of the routing tag table corresponding to an input cell, discarding the input cell.

9. An ATM communication system comprising:
cell processing function means including function means for generating an alarm cell according to a problem portion, and routing tag adding function means for generating the alarm cell when a problem is found between an input transmission path and said routing tag adding function means.

10. An ATM communication system comprising:
routing tag adding function means;
routing tag deleting function means for, when a fault is found in said routing tag adding function means in a cell processing function means, receiving a cell from said cell processing function means via an ATM switch and generating an alarm cell.

11. An ATM communication system comprising:
cell processing function means including function means for generating an alarm cell, wherein when a problem is found in link or node system connected to said cell processing function means by a transmission path, routing tag adding function means for generating an alarm cell is arranged in said cell processing function means to receive a cell from said link or node system.

12. A polishing apparatus for an ATM communication system, comprising:
a RAM for holding information for measuring a cell flow for each connection;
a register group for exchanging information with said RAM;
a first sequencer for controlling information transfer between said RAM and said register group;
an ALU for receiving information from said register group, and for performing arithmetic operations/bit operations; and
a second sequencer for controlling information transfer between said register group and said ALU.

13. An ATM communication system comprising:
a plurality of path handling systems; and
clockwise and counterclockwise ring-like transmission paths for coupling said path handling systems,
each of said path handling systems including:
a first drop/insert section connected to be inserted in said clockwise ring-like transmission path;
a second drop/insert section connected to be inserted in said counterclockwise ring-like transmission path;
a first loop back path extending from said first drop insert section to said second drop/insert section;
a second loop back path extending from said second drop/insert section to said first drop/inset section; and
a drop/insert path through which cells to be dropped from or to be inserted in the ring-like transmission paths flow,
wherein when connections of an active system are set among said path handling systems, connections of a stand-by system are simultaneously set,
the connection of the active system is set to go round one of two said ring-like transmission paths so that the connections start from a first path handling system as a starting point where an original connection is to be set, and are terminated at the first path handling system via a second path handling system as an end point where the original connection is to be set, the connections of the stand-by system are set to go round a second ring-like transmission path in a direction opposite to a first ring-like transmission path for accommodating the connections of the active system, and the connections of the active and stand-by systems are set to have the same identifiers at entrances and exits of the loop back path form the drop/insert section of the respective path handling systems inserted in the first ring-like transmission path to the drop/insert sections inserted in the second ring-like transmission path.

14. A system according to claim 13, wherein the path handling system as the original end point guides a user cell transferred along the connections of the active system to the drop/insert path, relays only an OAM cell, and sends the OAM cell onto the ring-like transmission path, so that the OAM cell flowing from the pass handling system at the starting point where the connection is to be set via the connections goes round the ring-like transmission path once, and is returned to the path handling system at the starting point where the connection is to be set, and a connection check operation is performed by confirming if the OAM cell normally goes round the ring-like transmission path once, and is returned to the path handling system at the starting point.

15. A system according to claim 13, wherein said insert/drop section has a copy function of outputting a cell input from the ring-like transmission path to the drop/insert path while relaying the cell to the ring-like transmission path in addition to three basic functions including drop, insert, and relay functions, and the path handling system executes the insert function in a start point of the connection of the ring-like transmission path, the relay function at a relay point of the connection, and the copy function at a point at which the copy cell drops while relaying the connection, when the cell is input to respective path handling systems, and thus allowing a 1-to-N drop connection of the pass handling systems connected by the ring-like transmission path as a whole.

* * * * *